April 9, 1935.   D. L. LINDQUIST ET AL   1,997,260
ELEVATOR SYSTEM
Filed April 7, 1932    22 Sheets-Sheet 3
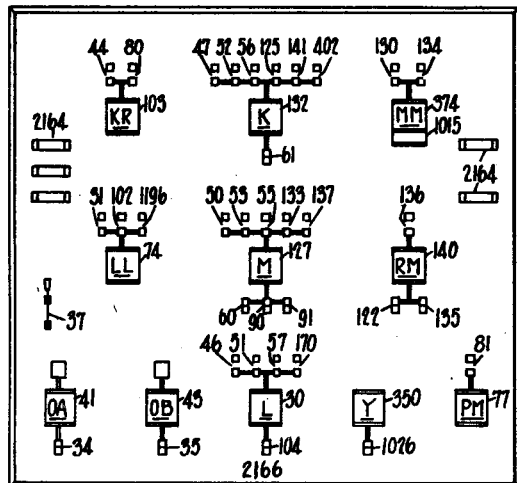
FIG. 27
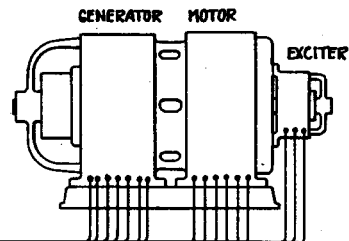
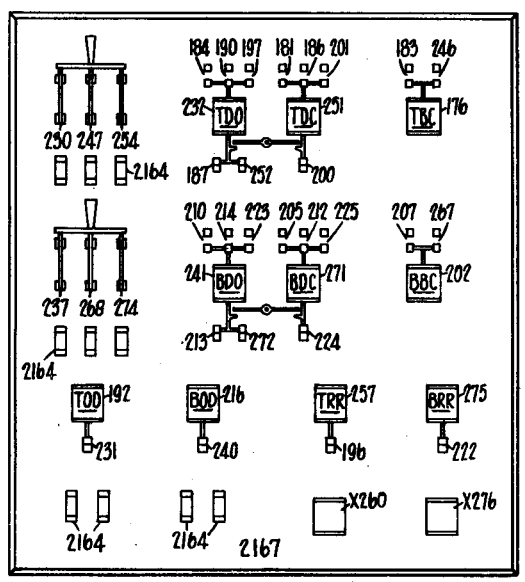
FIG. 28
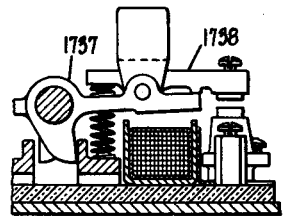
FIG. 5
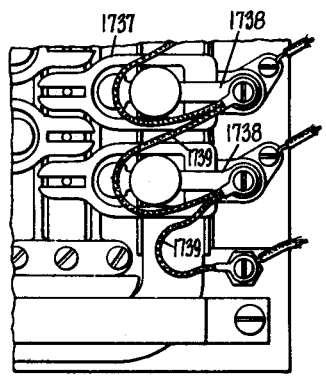
FIG. 6
INVENTORS
David Leonard Lindquist
Harold Watrous
William Frank Glaser
BY _____ ATTORNEY April 9, 1935. D. L. LINDQUIST ET AL 1,997,260
ELEVATOR SYSTEM
Filed April 7, 1932 22 Sheets-Sheet 5

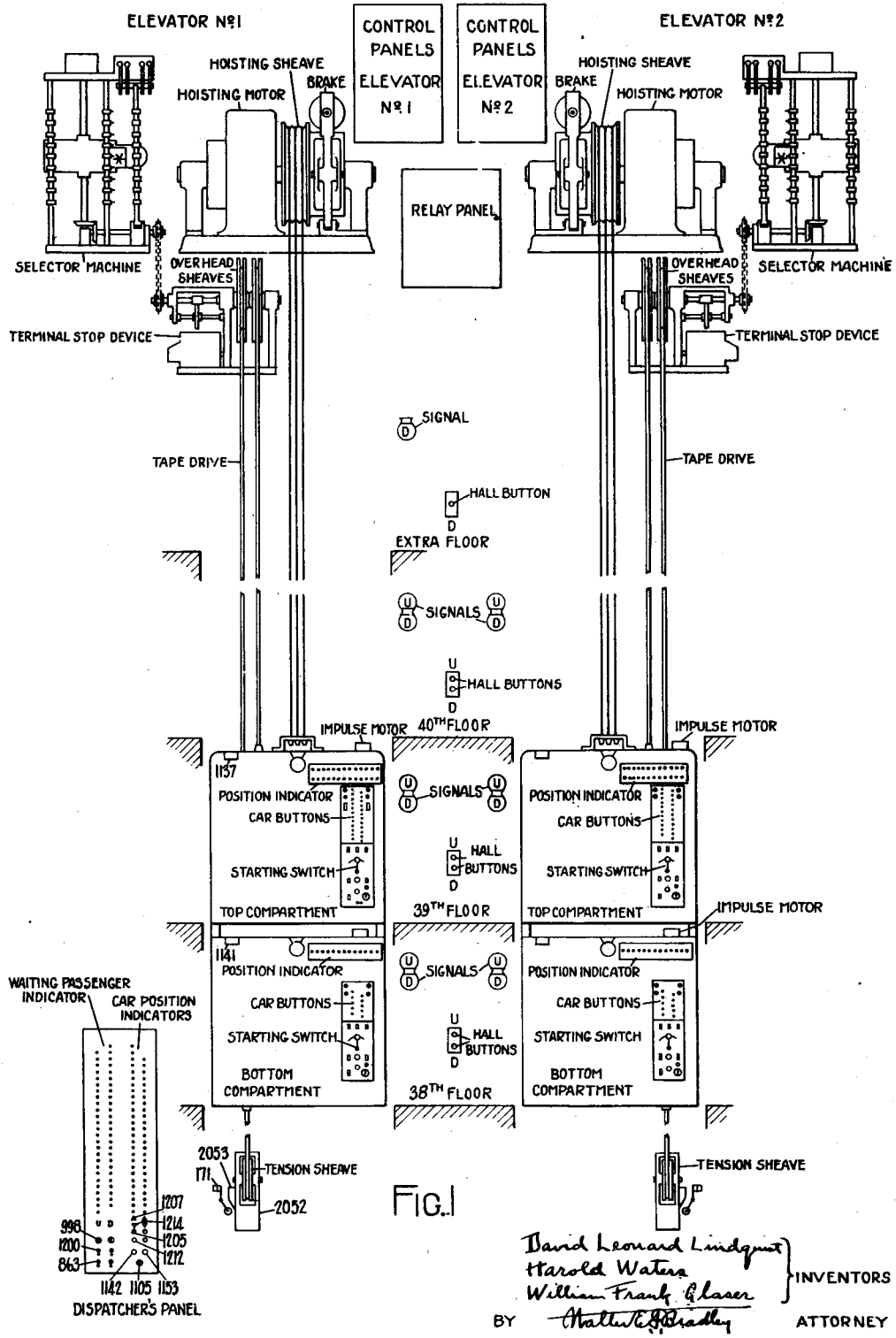

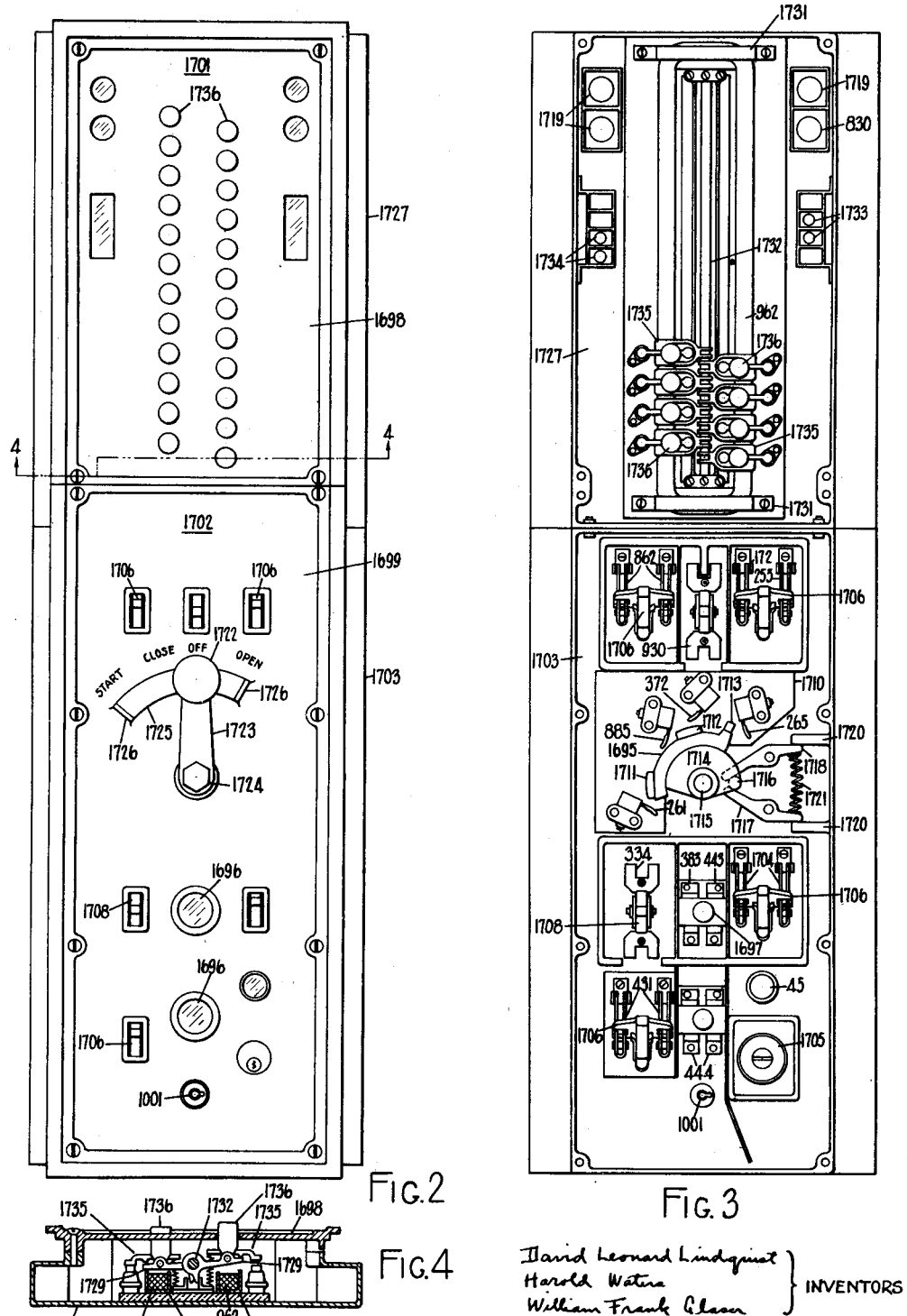

INVENTORS
David Leonard Lindquist
Harold Watres
William Frank Glaab
BY
ATTORNEY

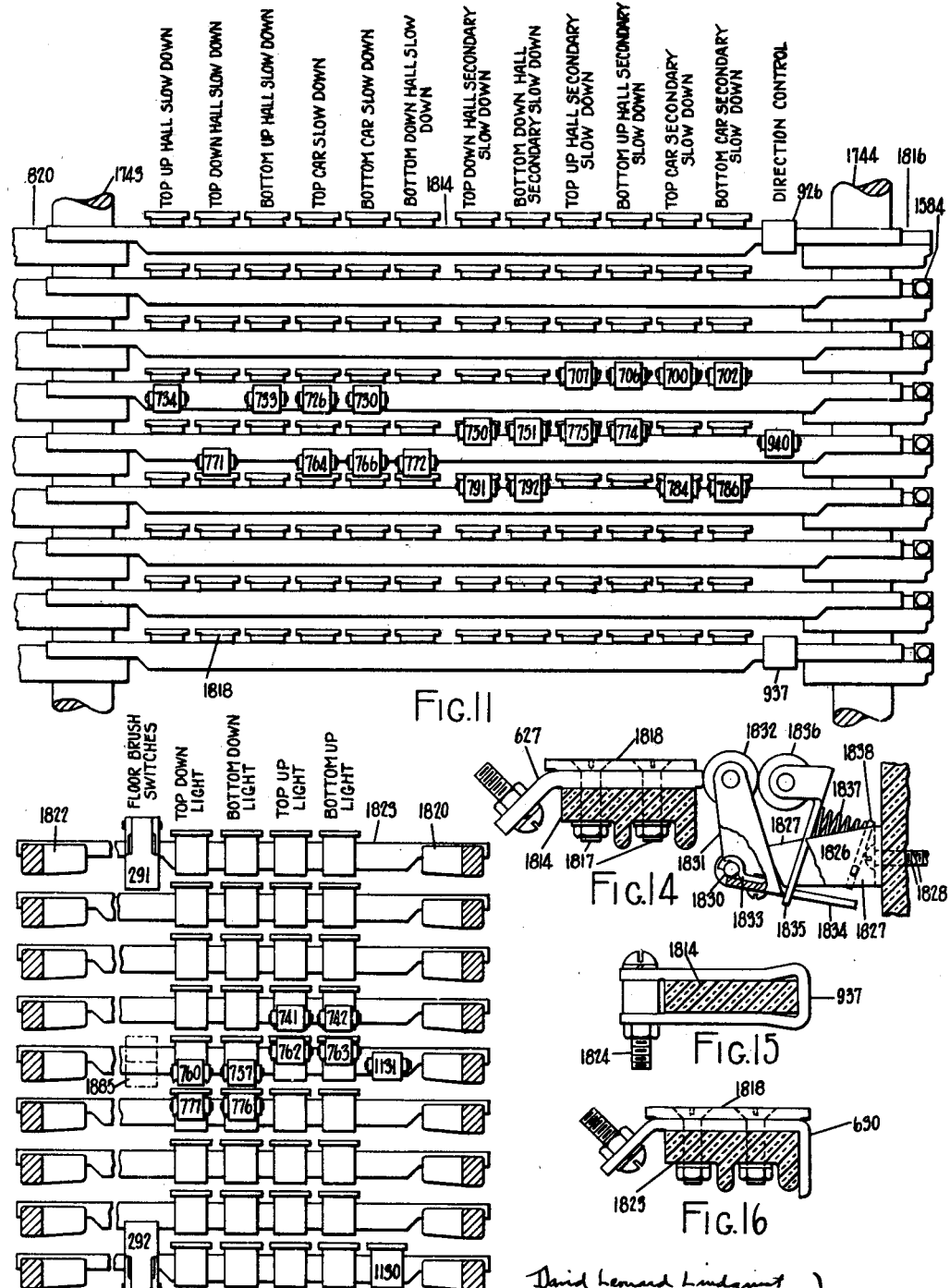

April 9, 1935. D. L. LINDQUIST ET AL 1,997,260
ELEVATOR SYSTEM
Filed April 7, 1932 22 Sheets-Sheet 9
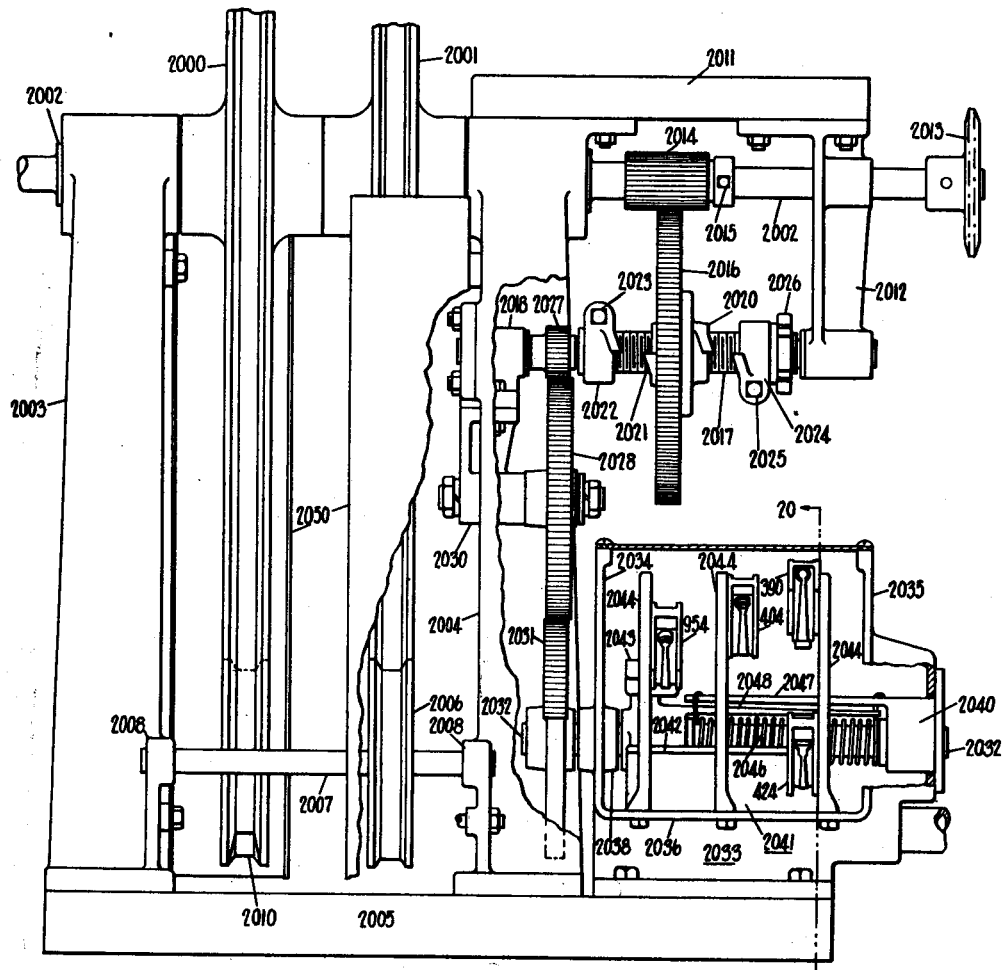
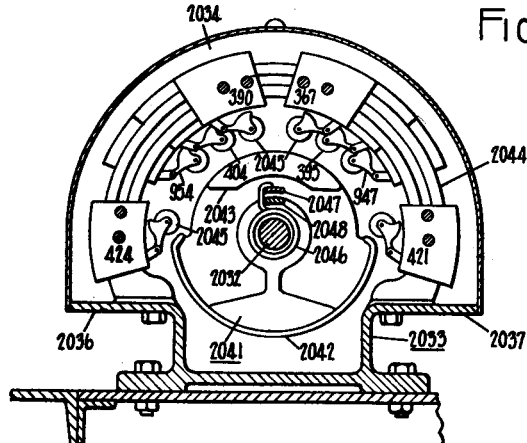
INVENTORS
David Leonard Lindquist
Harold Waters
William Frank Glaser
BY
ATTORNEY April 9, 1935.  D. L. LINDQUIST ET AL  1,997,260

ELEVATOR SYSTEM

Filed April 7, 1932   22 Sheets-Sheet 10

INVENTORS
David Leonard Lindquist
Harold Waters
William Frank Glass
BY
ATTORNEY

April 9, 1935. D. L. LINDQUIST ET AL 1,997,260

ELEVATOR SYSTEM

Filed April 7, 1932 22 Sheets-Sheet 11

David Leonard Lindquist
Harold Water
William Frank Glass } INVENTORS

BY Walter E. Bradley ATTORNEY

April 9, 1935.   D. L. LINDQUIST ET AL   1,997,260
ELEVATOR SYSTEM
Filed April 7, 1932   22 Sheets-Sheet 12
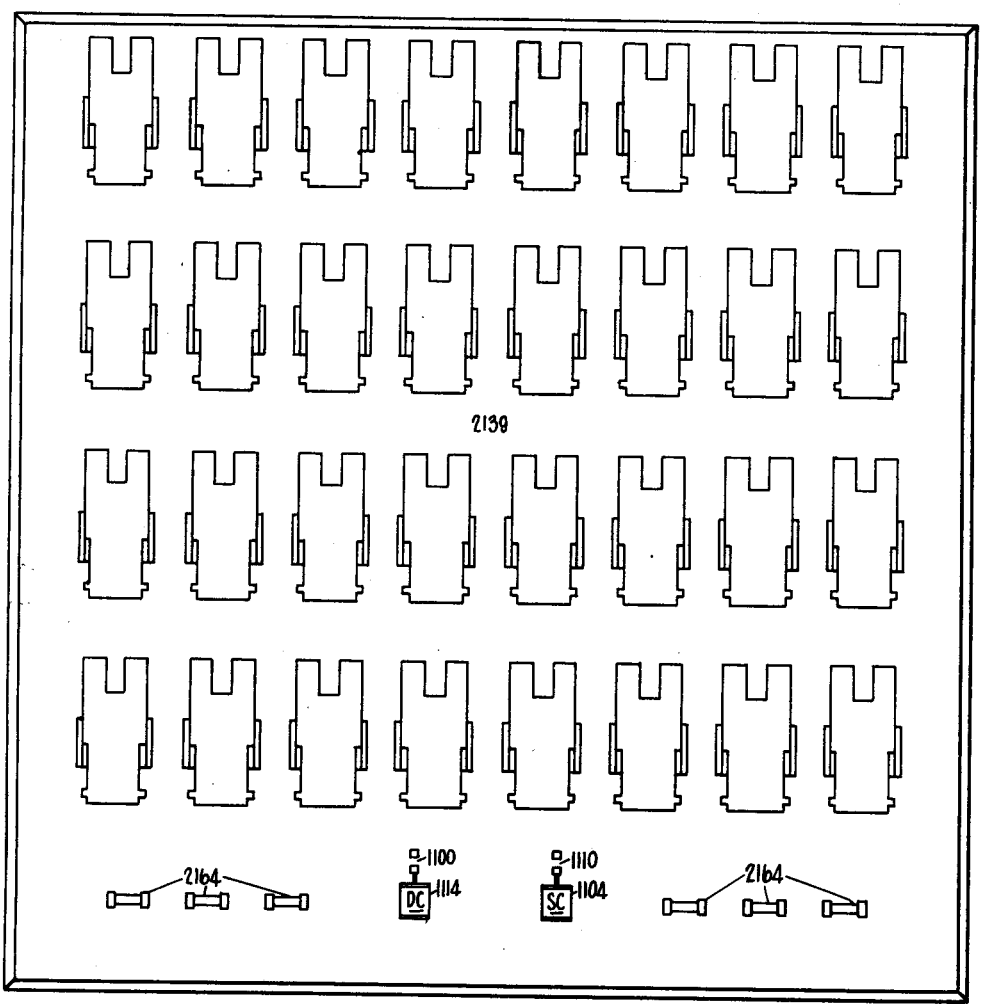
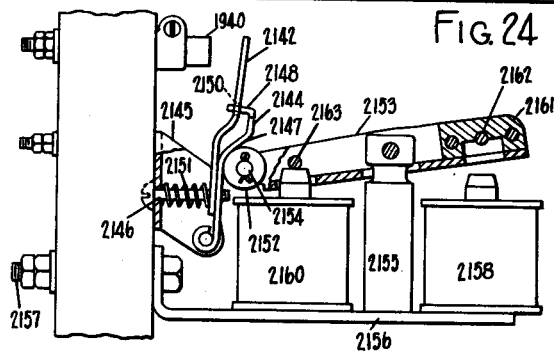
FIG. 25
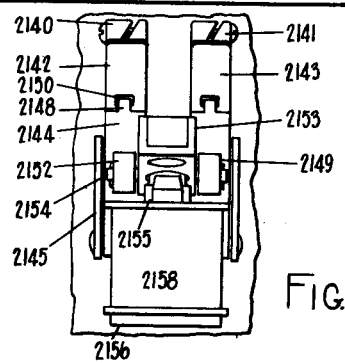
FIG. 26
David Leonard Lindquist
Harold Watres
William Frank Glaser    } INVENTORS
BY _____   ATTORNEY April 9, 1935. D. L. LINDQUIST ET AL 1,997,260

ELEVATOR SYSTEM

Filed April 7, 1932    22 Sheets-Sheet 19

INVENTORS
ATTORNEY

April 9, 1935.  D. L. LINDQUIST ET AL  1,997,260

ELEVATOR SYSTEM

Filed April 7, 1932  22 Sheets-Sheet 20

David Leonard Lindquist
Harold Waters
William Frank Glenn  } INVENTORS

BY  Walter E. Bradley  ATTORNEY

April 9, 1935.  D. L. LINDQUIST ET AL  1,997,260
ELEVATOR SYSTEM
Filed April 7, 1932    22 Sheets-Sheet 21

April 9, 1935.   D. L. LINDQUIST ET AL   1,997,260
ELEVATOR SYSTEM
Filed April 7, 1932   22 Sheets-Sheet 22

INVENTOR
BY   ATTORNEY

Patented Apr. 9, 1935

1,997,260

UNITED STATES PATENT OFFICE 1,997,260

ELEVATOR SYSTEM

David Leonard Lindquist, Hartsdale, N. Y., Harold Waters, Hohokus, N. J., and William Frank Glaser, Yonkers, N. Y., assignors to Otis Elevator Company, New York, N. Y., a corporation of New Jersey Application April 7, 1932, Serial No. 603,702

61 Claims. (Cl. 187—16)

The invention relates to elevator systems.

An increasingly important factor of high building construction is that of elevator transportation. Mounting land values in the business sections of large cities have practically forced the erection of buildings of increasing height. Zoning laws require, in buildings above a certain height, that the portion of a building above this height must be set back and be not more than a certain fraction of the cross sectional area of the lower portion of the building. These set back portions or superstructures have come to be known as "towers". These high buildings, to be economically possible, must have sufficient rentable area in their tower sections to warrant their erection. With small ground areas, and consequent small tower areas, the number of floors that can be economically served by elevators soon reaches a practical limit.

Various improvements have been devised in recent years to augment elevator service. The operating speed of the car has been increased. The control of the acceleration and retardation of the car has been made entirely automatic. Automatically operating mechanism has been provided for causing the car to be brought to an exact landing level during stopping, in case of overrun or underrun. The operation of the car gate and hatchway doors has been made automatic and the speed of their operation has been increased. These and other improvements have resulted not only in increased elevator service for the same number of elevators but also in taking more and more of the control of the car from the hands of the car attendant, leaving him more time to give to the handling of passengers. This, in turn, insures greater safety to passengers and also increases the speed with which the transfer of passengers may be effected, further increasing elevator service.

As higher buildings are constructed and the speed of elevator service is increased, the time consumed in effecting the transfer of passengers becomes an increasingly important factor. Although the handling of passengers has been speeded up, this cannot go beyond a certain point. Thus, in buildings where the towers are small in area and only a few elevators can be installed, without unprofitable encroachment upon the rentable area, a practical limit to the height of the buildings is reached if any sort of elevator service is to be given to the tower tenants. Even in the very tall buildings on large ground areas, there is a practical limit if the buildings are to be operated at a profit.

The principal object of the present invention is to increase elevator service. More particularly, the invention has for its object to increase traffic handling capacity of elevators without increasing the space taken up by the elevators in the building. The invention, as applied to high buildings, renders otherwise unprofitable buildings economically possible.

The invention, as applied to one elevator or to a plurality of elevators, involves the provision of a system in which each elevator car is provided with a plurality of passenger carrying compartments. The floors of the compartments of each car are spaced to correspond with the distances between adjacent floors served by the cars. The features, advantages and operation of the system and mechanisms employed will be set forth as applied to one or more double compartment cars, but these features and advantages are also present where more than two compartments are employed and many of them are present where only one compartment is employed.

One feature of the invention resides in the control of one or more double compartment elevator cars in such manner as to minimize the number of stops per round trip.

Another feature of the invention is to cause the top compartment to serve only certain floors and the bottom compartment to serve only certain other floors, in each case a floor next below one of the floors served by the top compartment.

Another feature of the invention is to initiate the slowing-down of the compartments, preparatory to stopping to take on passengers, in response to controls at the landings operable by the intending passengers.

A further feature of the invention, as applied to a plurality of cars, resides in having the controls at the landings common to all of the cars and capable of initiating the slowing down of any one of them but in causing only one to be slowed down in response to any operated control, that one being dependent upon the positions of the compartments which serve the landing at which such control is located.

Another feature is to initiate the slowing down of each car preparatory to stopping to discharge passengers from one or both compartments in response to controls within the compartments for the floors served thereby.

Still another feature resides in having the starting of the car under the joint control of the attendants in the two compartments.

Another feature is to automatically signal at any floor, the approach of any compartment which is about to stop at that floor to effect a transfer of passengers, without giving such signal when a stop is made and no transfer of passengers is to be effected.

A further feature is to cause the signal at a floor to be given when a compartment is stopped at that floor as the result of the slowing down and stopping of the car to effect a passenger transfer in the other compartment, when the control at that floor is operated after the slow-down has been initiated, so long as this control is operated prior to the initiating of the starting operation by the attendant in either compartment.

An additional feature resides in automatically opening the compartment gate and hatchway door at a landing at which the compartment is stopped to transfer passengers, and in maintaining the gate and door closed when a stop is made and there is to be no transfer of passengers in that compartment.

A further feature is to cause the opening of the compartment gate and hatchway door at a landing at which the compartment is stopped as a result of the slowing down and stopping of the car to effect a transfer of passengers in the other compartment, when the control at that landing is operated after the slow-down has been initiated, so long as this control is operated prior to the initiating of the starting operation by the attendant in either compartment.

Another feature resides in advising the attendant in each compartment as to the condition of the gate and opposite hatchway door for the other compartment.

Still another feature lies in changing the type of service of all cars from double to single compartment operation.

Another feature resides in changing the control for one or more of the cars to permit the operation of each of them by a single attendant, using one compartment, without affecting the double compartment operation of the other cars.

There are many other features and advantages of the present invention, relating not only to the control of the cars, compartment gates, hatchway doors, landing signals and apparatus employed to control the same, but also to other apparatus and the control thereof, such as apparatus for causing proper indication of the positions of the compartments in their hatchways. Such additional features and advantages will be apparent from the description which follows and appended claims.

In the drawings:

Figure 1 is a simplified schematic representation of an elevator installation of two double compartment elevator cars, as illustrative of an installation of a plurality of such cars arranged in a group;

Figure 2 is a front elevation of a car operating box for one of the compartments of a car;

Figure 3 is a similar view, with the cover plates removed;

Figure 4 is a view in horizontal section, taken along the line 4—4 of Figure 2;

Figure 5 is a detail, in section, of the arrangement of the push buttons in the car operating box for a compartment adapted to serve each of a plurality of floors or only alternate ones of those floors;

Figure 6 is a plan view of the arrangement illustrated in Figure 5;

Figure 11 is a face view illustrating the arrangement of the stationary slow down contacts of the selector machine and their cooperating brushes;

Figure 12 is a face view illustrating the arrangement of the stationary light contacts of the selector machine and their cooperating brushes;

Figure 14 is an enlarged detail of a stationary slow down contact of the selector machine and cooperating brush, parts being broken away;

Figure 15 is an enlarged detail of a direction control stationary contact of the selector machine;

Figure 16 is an enlarged detail of the light contact of the selector machine;

Figure 19 is a side view of the driving mechanism for the selector machine and of the terminal stopping device, with parts in section;

Figure 20 is a sectional view of the terminal stopping device, taken along the line 20—20 of Figure 19;

Figure 24 is a diagrammatic representation of the relay panel and the floor relays mounted thereon;

Figure 25 is a side view of a floor relay, with parts in section;

Figure 26 is a front view of the same;

Figure 27 is a diagrammatic representation of the control panel for the motor generator set, showing particularly the relationship of the coils and contacts of the various switches mounted thereon;

Figure 28 is a diagrammatic representation of the control panel for the door operating mechanism, showing the relationship of the coils and contacts of the various switches mounted thereon;

Figure 30A:
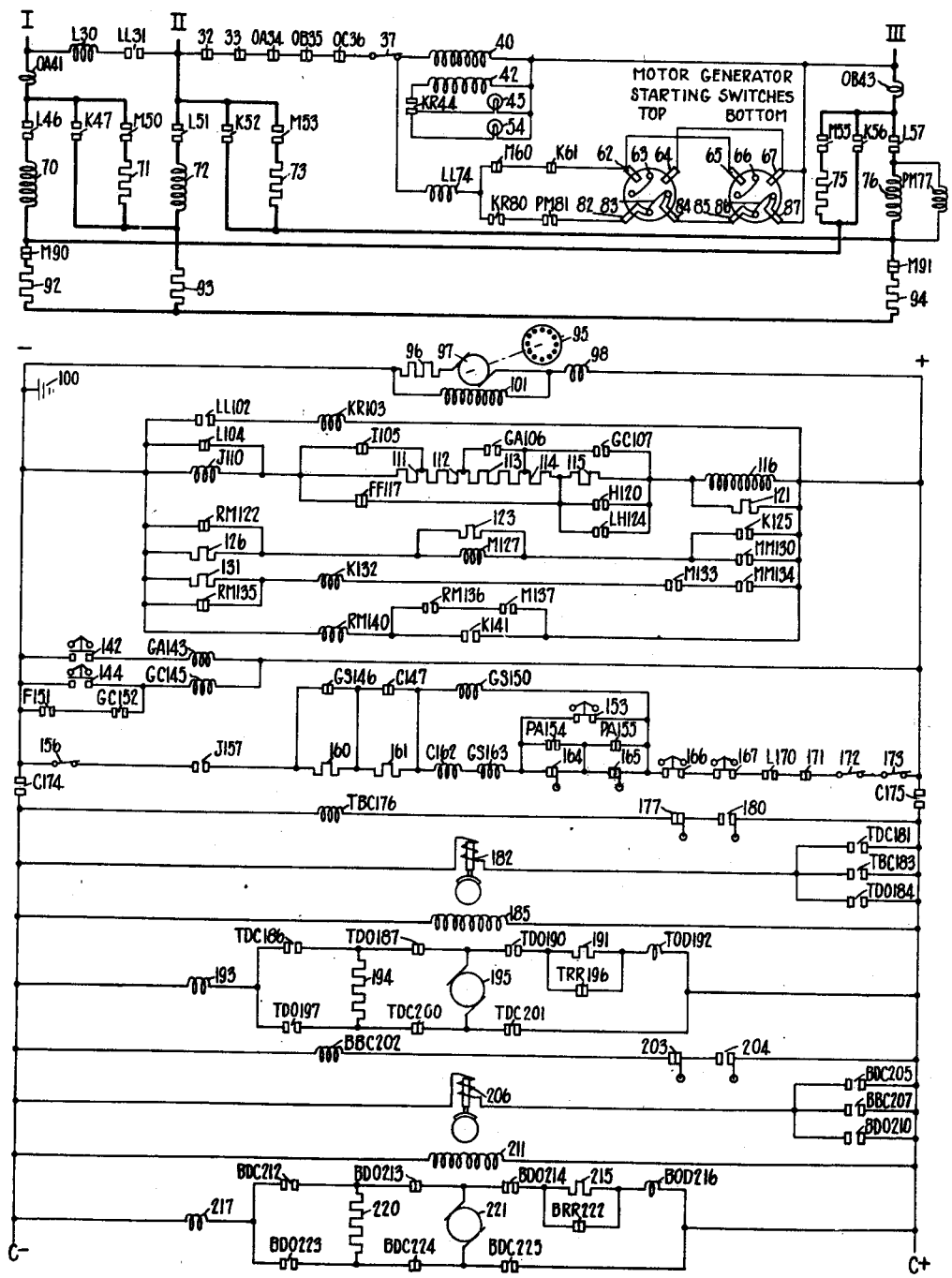
Figure 30B:
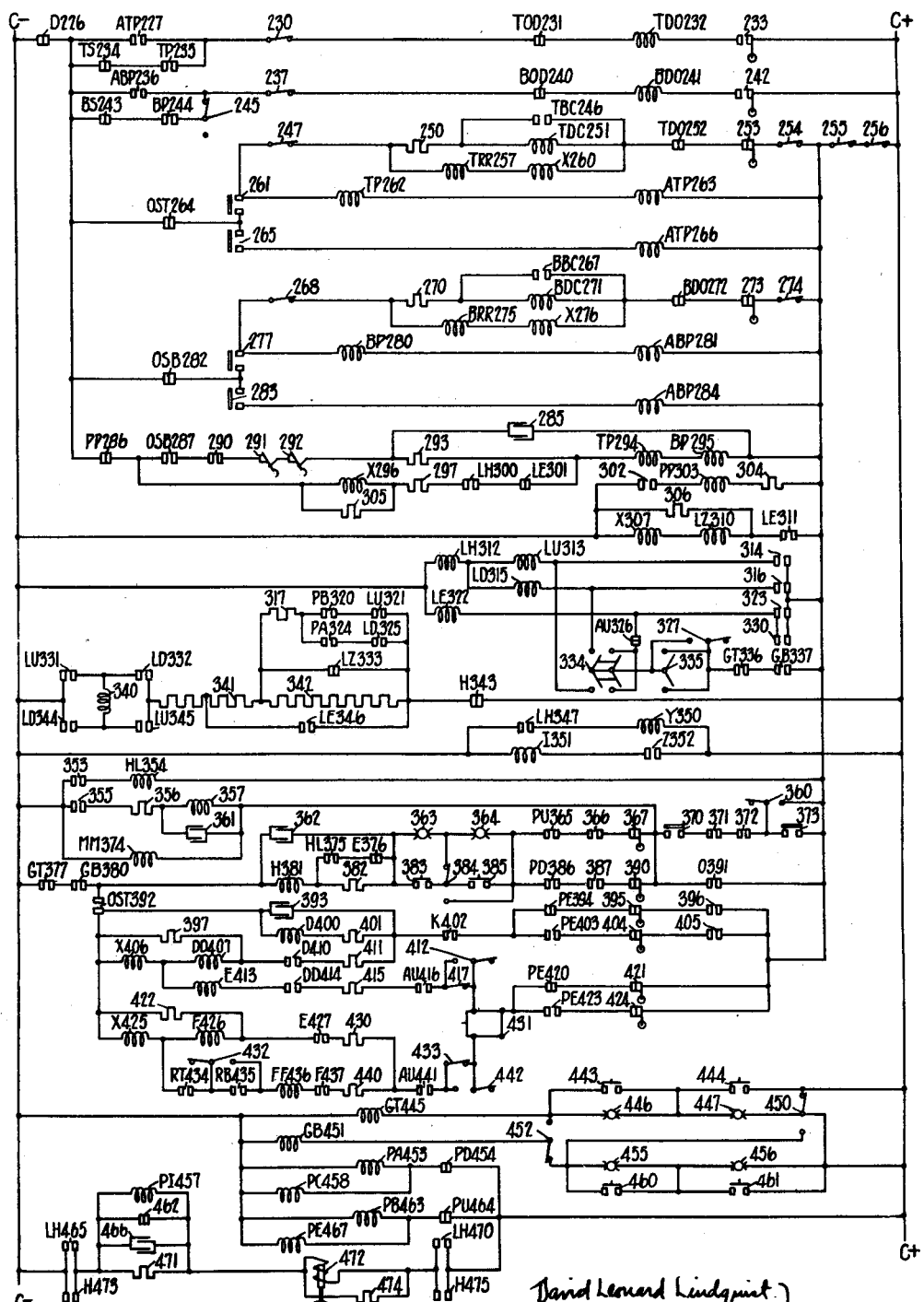
Figure 30C:
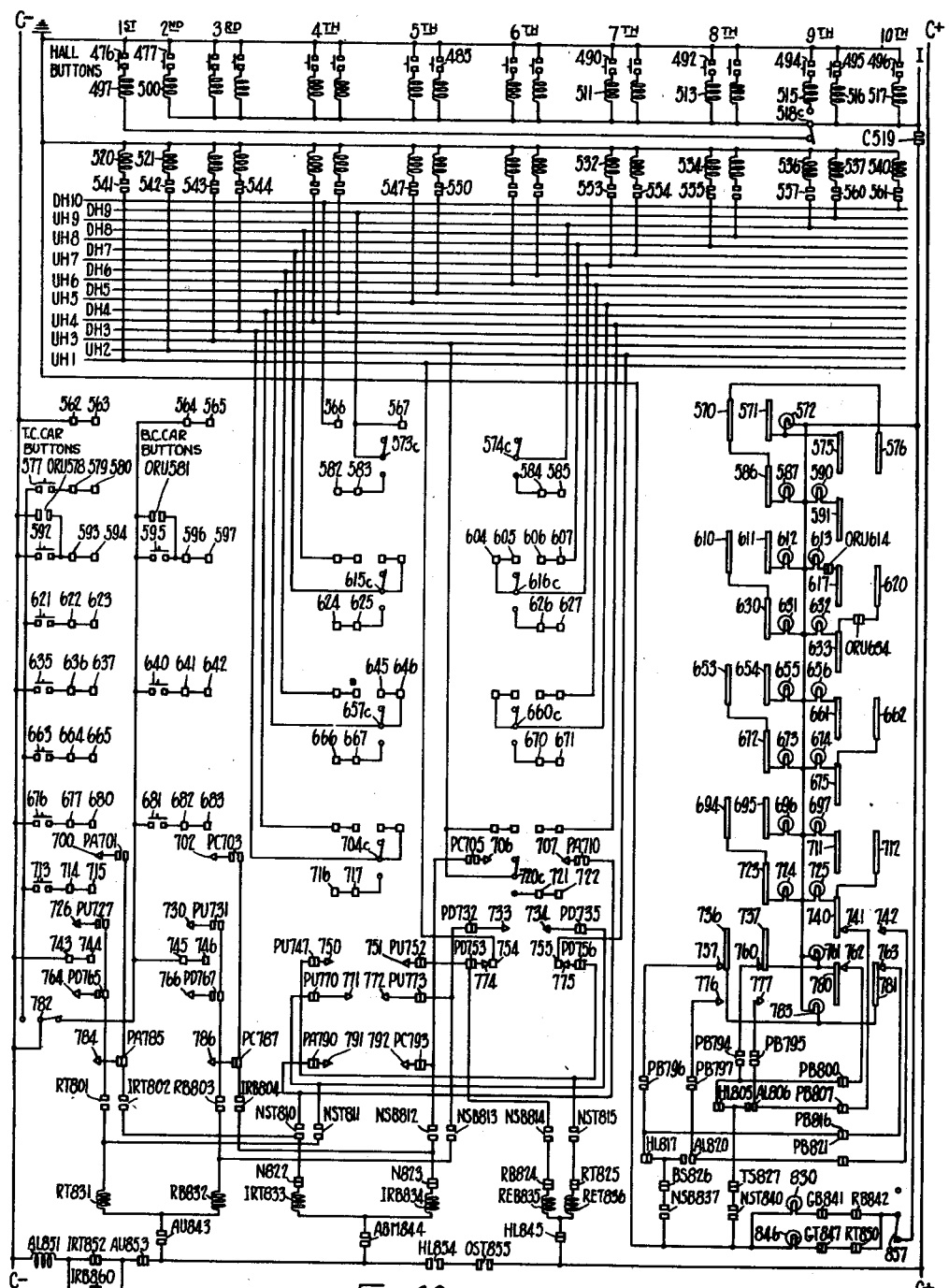
Figure 31:
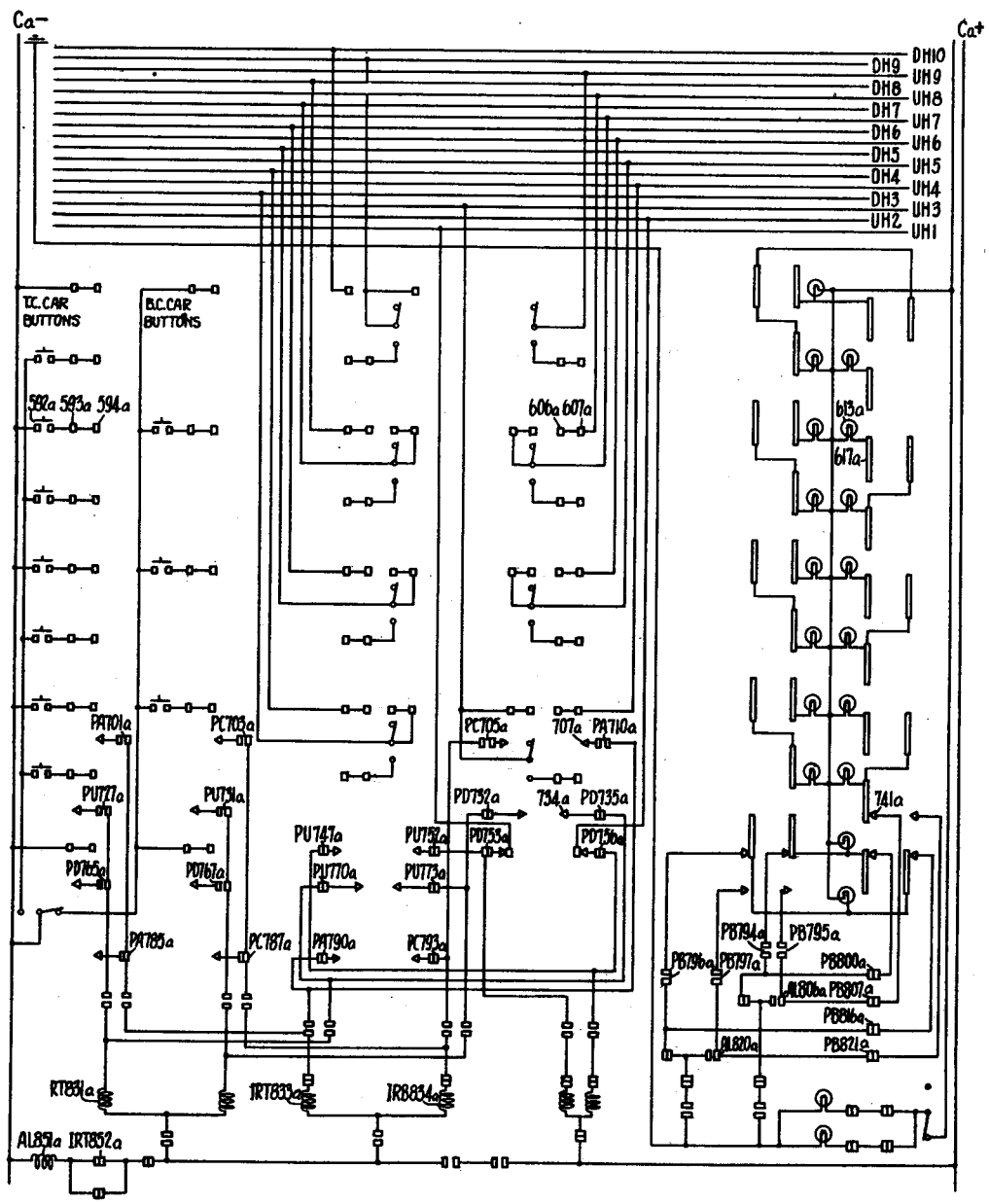

Figures 30a, b, c, and d, taken together, constitute a simplified diagram of the power and control circuits for one elevator;

Figure 31 is a simplified diagram of the slowdown and signal circuits for a second elevator, similar circuits for the first elevator being contained in Figure 30c.

Figure 45:
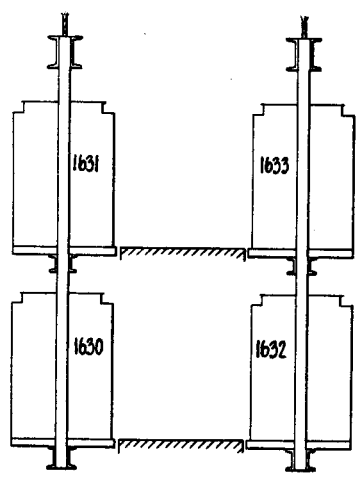
Figure 44:
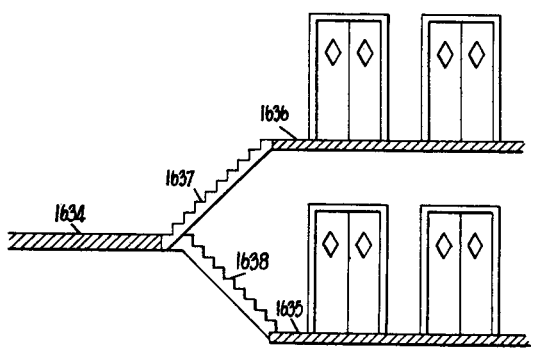
Figure 32:
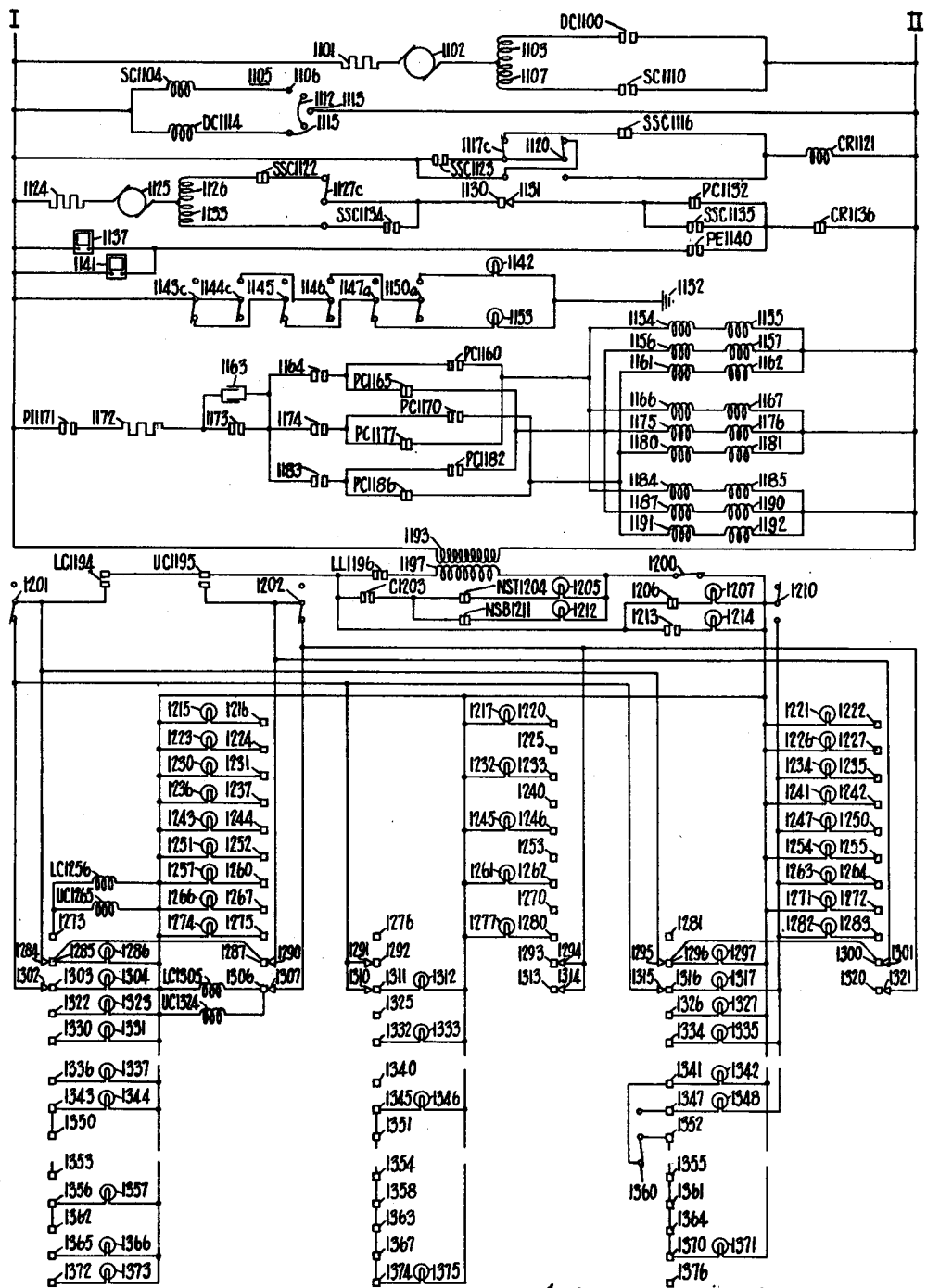
Figure 33:
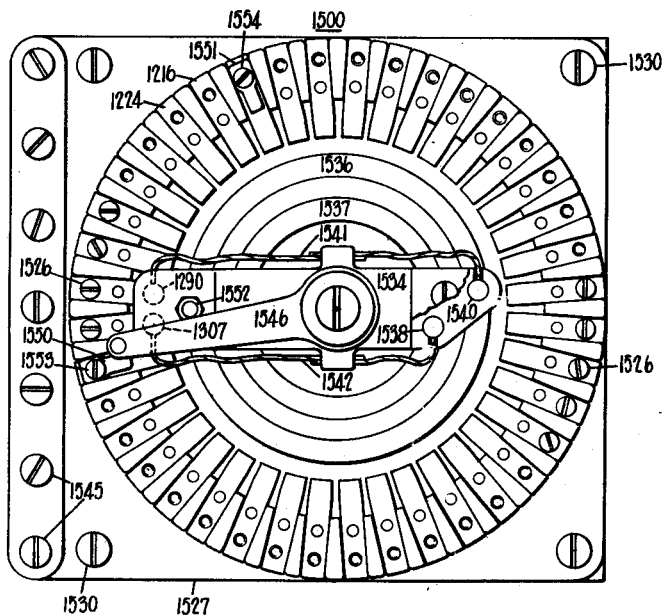
Figure 42:
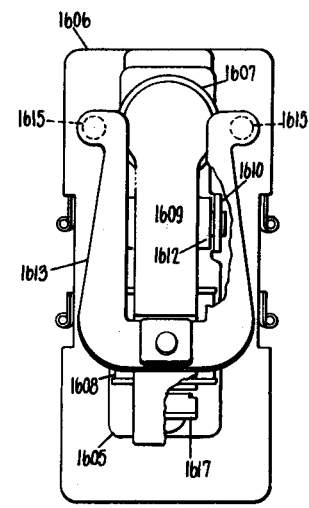
Figure 34:
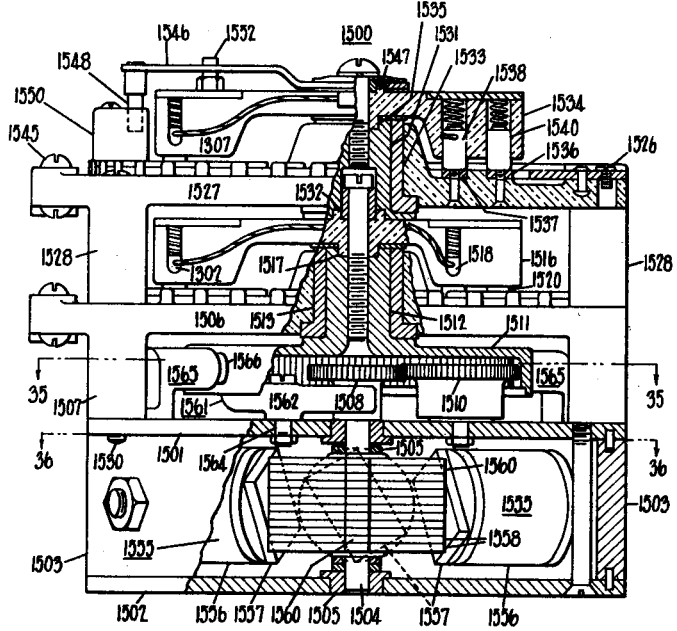
Figure 43:
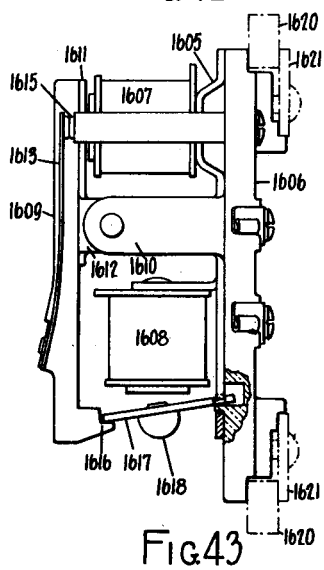
Figure 35:
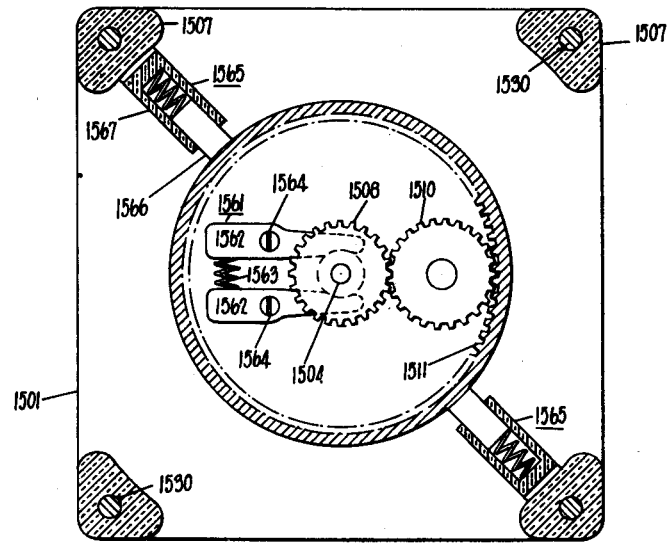
Figure 36:
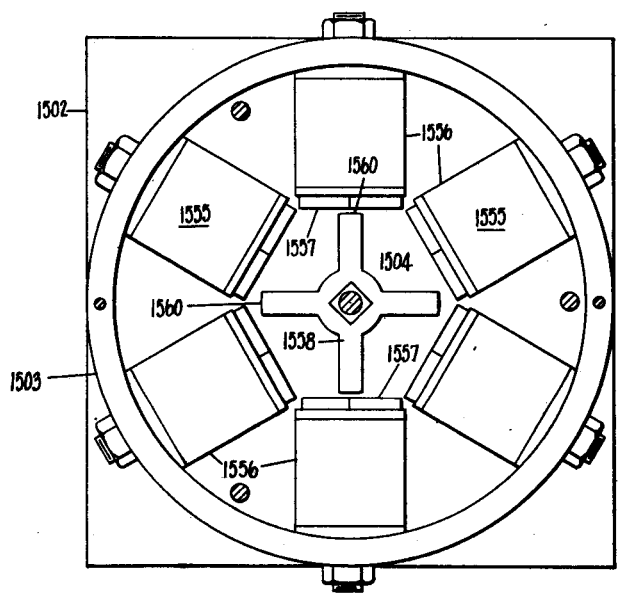
Figures 37, 38:
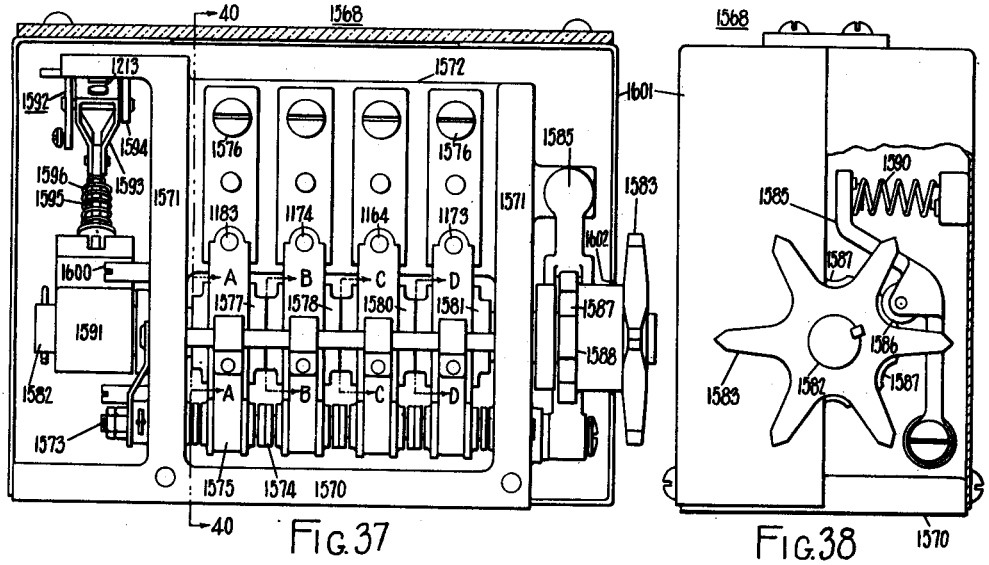
Figures 39, 40:
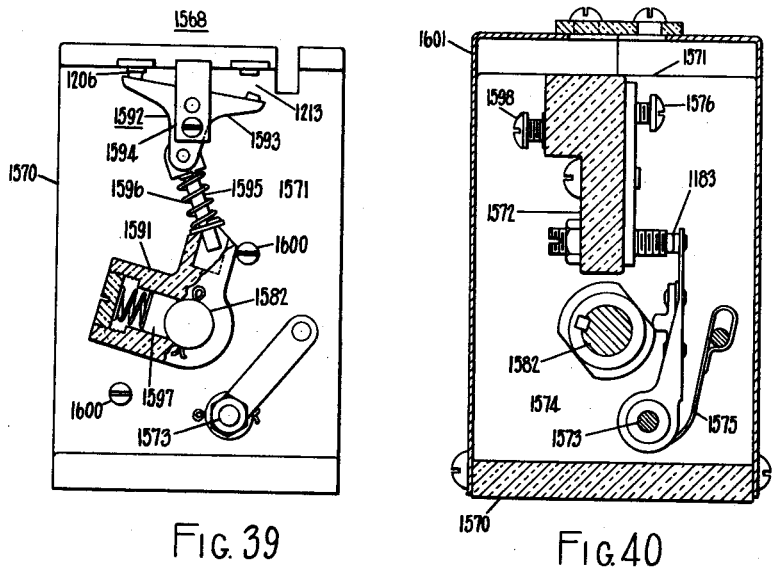
Figure 41:
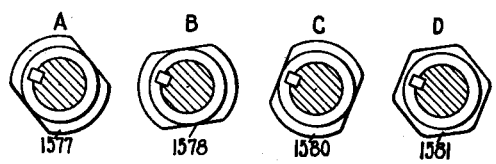

Figure 32 is a simplified diagram of circuits employed to change the type of service and of the position indicator circuits;

Figure 33 is a plan view of commutator mechanism employed in the position indicator circuits;

Figure 34 is a side view of the same, with parts broken away;

Figure 35 is a sectional view of the same, taken along the line 35—35 of Figure 34, illustrating the driving gear between the commutators and the impulse motor;

Figure 36 is a view in section, taken along the line 36—36 of Figure 34, illustrating the impulse motor;

Figure 37 is a view of a contactor device employed in the position indicator circuits, a portion of the cover being removed;

Figure 38 is an end view of the same, with parts broken away;

Figure 39 is a view of the other end of the contactor device with the cover removed and with parts shown in section;

Figure 40 is a view in section taken along the line 40—40 of Figure 37;

Figure 41 comprises a number of sections taken along lines A—A, B—B, C—C, and D—D of Figure 37 and shows the relative arrangement of the contactor cams and shaft;

Figure 42 is a front view of a latch switch employed in the position indicator circuits;

Figure 43 is a side view of the same;

Figure 44 is a schematic representation of an arrangement for affording access to the loading levels for the elevator cars at their lower terminal; and Figure 45 is a schematic representation of an arrangement of a group of double compartment cars in a building.

For a general understanding of the invention, reference may be had to Figure 1, wherein various parts of the system, chosen to illustrate the principles of the invention, are indicated by legend. Two elevators are illustrated but it is to be understood that the invention is applicable to any number of elevators. Also, each car is illustrated as having two compartments, hereinafter referred to as top compartment and bottom compartment. Double compartment construction is preferably provided by arranging two car enclosures in an elongated car sling.

Referring particularly to the left hand half of the figure wherein the parts for one elevator, hereinafter termed elevator No. 1, are represented, the elevator car is raised and lowered by means of a hoisting motor. This motor drives a traction sheave over which pass the hoisting ropes for the car and counterweight (not shown). An electromagnetic brake is provided and is applied to effect the final stopping operation and to hold the car when at rest. It is preferred to employ a direct current hoisting motor and to supply power thereto at a variable voltage by the generator of a motor generator set, shown in Figure 27. The hoisting mechanism for the other elevators is the same, as illustrated in the right hand half of Figure 1 for elevator No. 2.

A plurality of control switches are provided in each compartment. The switches in each compartment are arranged as a unit in what is hereinafter termed a "car operating box". Each car operating box is provided with a car starting switch for operation by the compartment attendant. The system is arranged so that both of these starting switches must be in start position to effect the starting of the car, thus placing the starting of the car under the joint control of the attendants in the two compartments. The starting switches are not effective to determine the direction of car travel, separate switching mechanism being provided for this purpose. In addition to effecting the starting of the car, the starting switches are effective to control the opening and closing of the compartment gates and opposite hatchway doors. The car cannot start unless the compartment gates and all hatchway doors for that elevator shaft are closed.

The system is arranged so that the top compartments serve only certain of the floors served by the cars of the group and the bottom compartments serve the floors next below. For example, the top compartments may stop only at even numbered floors and the bottom compartments only at odd numbered floors. In such event, the distance from each odd floor to the even floor next above would be the same for the floors served by the car. Also, the top compartments of some or all of the cars may serve odd numbered floors, in which event their bottom compartments serve even numbered floors. Where the top compartments of some cars serve even numbered floors and the top compartments of other cars serve odd numbered floors, the heights of the floors served by the cars must be the same.

The slowing down of the cars preparatory to stopping to effect passenger transfers is initiated in response to push buttons within the compartments and push buttons at the landings.

The push buttons within the compartments, hereinafter called car buttons, are individual to the compartments in which they are located. When a car button in a compartment is pressed, the car, upon that compartment arriving at the proper slow-down distance from the floor corresponding to the button pressed, is caused to slow down and is thereafter brought to a stop with the compartment level with the landing. There is only one car button in each compartment for each floor served by that compartment, these buttons serving as both up and down buttons. That is, during up travel of the car, each button is effective to cause slow-down to be initiated upon the arrival of the compartment at a certain distance below the landing for which the button is provided, and, during down travel of the car, the same button is effective to cause slow down to be initiated upon the arrival of the compartment at a certain distance above the landing.

The push buttons at the landings, hereinafter called hall buttons, are common to all of the cars of the group, and are capable of causing the slowing down of any one of them. Both an up hall button and a down hall button are provided for each intermediate floor served by the cars of the group. When an up hall button is pressed, the first of the up travelling cars whose compartment, serving the floor at which the button is located, arrives at a certain distance from that floor, is caused to slow down and is thereafter brought to a stop with that compartment level with the landing. Similarly, when a down hall button is pressed, the first of the down travelling cars whose compartment, serving the floor at which the button is located, arrives at a certain distance from that floor, is caused to slow down and is thereafter brought to a stop with the compartment level with the landing. A hall button may be provided also at each of the floors constituting the upper terminal and at each of the floors constituting the lower terminal for the cars of the group.

The hall buttons act through floor relays arranged on the relay panel. Each relay, once operated, is maintained so, permitting the push button which caused its operation to be released. An operated relay is retained in operated condition until the call registered by the hall button is answered. The reset of the relay avoids causing other cars to be slowed down in answer to that call.

The car buttons are held in operated condition magnetically and are released upon the direction of car travel being reversed.

The floors are served in the natural order of floors for each direction of car travel, regardless of the order in which the push buttons for the floors are operated.

The slowing down of the car, preparatory to bringing the proper compartment to a stop at a floor for which a push button has been pressed, is initiated by the selector machine for that car. In installations in which the cars operate above a certain speed, the slow-down distance may vary, depending upon whether the car which is caused to slow down is making a one-floor run or a multi-floor run. Thus, it is desirable under certain operating conditions to select a car to answer a hall button which car is farther from the floor at which the button is located than some other car. The selector machines, in cooperation with other control apparatus, act automatically to select the proper car. The selector machine for the car which has started to slow down also causes further slowing down of the car to take place and finally causes the car to be brought to a stop with the proper compartment at the floor landing.

Each selector machine is driven preferably by means of two steel tapes attached to the car. One tape extends from the top of the car to an overhead sheave. The other tape extends from the bottom of the car around a tension sheave and then up to a second overhead sheave. The tapes are wound on the overhead sheaves in a manner similar to the winding of a measuring tape, one being wound oppositely with respect to the other. The shaft upon which the overhead sheaves are mounted drives the selector machine through a chain and sprocket. The tapes may also cause the operation of a terminal stopping device which causes the car to be slowed down and stopped at the terminal floors. One tape is unwound as the other is wound up in effecting the driving operation. This silent tape drive is as positive as a sprocket chain and is unaffected by sliding or stretching ropes.

Signals are arranged at the floors for advising intending passengers of the approach to the floor of a compartment which is to be stopped thereat to effect a transfer of passengers. These signals are preferably in the form of lamps, usually known as hall lanterns. Each car is provided with both an up hall lantern and a down hall lantern at each intermediate floor, an up hall lantern at each of the floors constituting the lower terminal and a down hall lantern at each of the floors constituting the upper terminal. The up hall lanterns at intermediate floors are lighted only during upward travel of their respective cars and the down hall lanterns at intermediate floors are lighted only during downward travel of their respective cars. Single stroke gongs may be associated with the hall lanterns to be sounded upon the lighting of the lanterns and thus insure the attracting of the attention of the intending passengers.

When a compartment is being slowed down preparatory to effecting a transfer of passengers at a landing, the hall lantern at that landing for that car and for the direction in which the car is travelling is lighted. It is thereafter maintained lighted so long as the compartment is stopped at the floor, thus advising late arriving intending passengers of the presence of the compartment. When a compartment stops at a floor under conditions where no transfer of passengers is to be effected, as, for example, when a stop is made to effect a passenger transfer in the other compartment, the hall lantern at that floor for that car is not lighted. However, when a compartment is stopped at a floor as a result of the slowing down and stopping of the car to effect a passenger transfer in the other compartment and the hall button at that floor for the direction in which the car is travelling is pressed after the slowing down of the car has been initiated, the hall lantern at that floor for that direction of car travel for that car is lighted to advise the intending passenger who pressed the button and others of the availability of the compartment. If the button is pressed after the attendant in either compartment moves his starting switch to an operative position, preparatory to restarting the car, the lantern does not light and the call is reserved for the next car. The circuits for the hall lanterns are controlled by the selector machine.

Mechanism is also provided for causing the gate of a compartment which is being stopped to transfer passengers, and the opposite hatchway door to be opened as the car is stopped at a floor. The gate and door are thereafter maintained open until the starting switch for that compartment is moved into position to effect their closing. When a compartment stops at a floor under conditions where no transfer of passengers is to be effected, as, for example, when a stop is made to effect a passenger transfer in the other compartment, the gate for that compartment and hatchway door at that floor are not opened. However, when a compartment is stopped at a floor as a result of the slowing down and stopping of the car to effect a passenger transfer in the other compartment and the hall button for that floor for the direction of travel in which the car is travelling is pressed after the slowing down of the car has been initiated, the opening of the gate for that compartment and hatchway door at that floor is effected. If this button is pressed while the car is slowing down, the opening of the gate and door takes place as the car arrives at the floor. If the car is already stopped at the floor, the opening of the gate and door is effected immediately the button is pressed. If the button is pressed after the attendant in either compartment moves the starting switch to door close position, the compartment gate and hatchway door are not opened.

Mechanism is also provided for each car for causing the compartments, during stopping, to be brought to an exact landing level in case of an overrun or an underrun. This levelling mechanism may be arranged on the selector machine.

Each compartment of each car may be provided with a position indicator. Such arrangement is illustrated. These indicators may be arranged so as to indicate only the floors served by their respective compartments. That is, if the top compartment of a car serves only odd numbered floors and the bottom compartment even numbered floors, only odd numbered floor indications are displayed by the top compartment position indicator and only even numbered floor indications by the bottom compartment position indicator, the indications displayed being determined by the position of the car in its hatchway. The indicators are preferably operated by impulse motors.

A position indicator for each elevator is also provided on the dispatcher's panel. Each of these indicators may be arranged to indicate the position of both compartments simultaneously. Position indicators for two elevators have been shown on the panel. This panel may also have a waiting passenger indicator. This indicator is controlled by the floor relays to display the unanswered calls registered by hall buttons.

The system may be arranged to change the type of service for all cars of the group from double compartment operation, as outlined above, to single compartment operation. This change-over is controlled by the dispatcher. When single compartment service is provided, only one compartment of each car is utilized to carry passengers. Preferably, the top compartments are utilized for this purpose and the bottom compartments are cut out of service.

During single compartment service, assuming that the bottom compartments are cut out, the starting of each car is controlled by the starting switch in the top compartment. The slowing down of the cars preparatory to stopping to take on passengers is controlled by the hall buttons, as before, with the difference that all hall calls are answered by the top compartments. Additional car buttons are provided in the car operating box of each top compartment, these buttons being for floors served by the corresponding bottom compartment during double compartment operation and being effective during single compartment operation. Similarly, additional indications are provided on the top compartment position indicators for these floors and these position indicators are effective to display these additional indications during single compartment operation.

The system may also be arranged to change the type of service to permit any of the cars to be operated by a single attendant, using one compartment only, without affecting the double compartment operation of the other cars of the group. This change-over also is controlled by the dispatcher.

A non-stop switch is provided in the car operating box of each compartment. Each of these switches is operable to prevent the answering of hall buttons by the compartment in which the switch is located, without affecting the answering of hall buttons at floors served by the other compartment by that compartment.

A safety switch is provided in the car operating box of each compartment. Each of these switches is operable to cause immediate stop of the car.

A direction control switch is provided in each car operating box as is a levelling emergency operating switch. During single compartment operation, the direction control switch of the used compartment is operable to change the direction of car travel, and the levelling emergency operating switch of that compartment is operable to cause the car to run at a levelling speed. During double compartment operation, these switches in the other compartment serve as interlocks to control the effectiveness of the corresponding switches in the compartment used for single compartment service.

An emergency switch is provided in each compartment for permitting operation of the car during an emergency with a door or gate open. During double compartment operation these switches are effective only with respect to their respective compartment gates and hatchway doors for floors served by their respective compartments. During single compartment operation, the switch for the used compartment is effective for both compartment gates and all hatchway doors.

One or more of the elevators may be arranged to serve extra floors. Such arrangement is illustrated for elevator No. 1. Only one extra floor is shown, this being a floor above the normal upper terminal for this car. Service to extra floors may be provided during either double or single compartment operation.

The electromagnetic switches for controlling the operation of each elevator are mounted on the control panels for that elevator.

Many of the mechanisms and elements which go to make up a complete elevator system have not been illustrated in the drawings. Among these are the safety devices, including the governor operated by the car, the governor operated by the counterweight, the safety brakes, buffers and limit switches. It is desired to point out, however, that it is considered desirable in case of double compartment cars to provide extra safety brake gripping jaws at the top of the car sling.

The system will be described in connection with the wiring diagrams as applied to a ten floor installation. It is to be understood that the system may be arranged for any number of floors and it is particularly applicable to high buildings. In describing certain parts of the system, the application of the system to more than ten floors is illustrated. In each case, the number of floors and the particular floors served by the car are chosen for purposes of illustration. The car operating box, selector machine and other parts and mechanisms for one elevator are described for elevator No. 1, it being understood that these devices are identical for all the elevators of the group, subject to any exceptions which are noted.

Referring now to Figures 2, 3, and 4, the details of the preferred form of car operating box will be described. A car operating box is provided in each compartment, that shown being for the top compartment in the system illustrated. This box is arranged in two sections, the upper section 1701 for the magnetic push button apparatus and the lower section 1702 for the various control switches employed in the present system. The sections may be joined in any suitable manner, as by bolts as illustrated. These sections are provided with suitable cover plates designated 1698 and 1699.

The lower section comprises a casing 1703 within which the various control switches are inclosed. These switches comprise non-stop switch 862, direction control switch 930, safety switch 172—255, levelling emergency operating switch 334, emergency cut out switches 383, 443 and 444, light switch 1704, slow speed switch 431, motor generator starting switch 1705 and extra floor switch 1001.

The non-stop switch, safety switch, slow speed switch, and light switch may be of any suitable construction, being illustrated as double pole, single throw switches. Each switch is provided with an operating lever 1706, which extends through an aperture in cover plate 1699. The safety switch, slow speed switch and light switch are provided with toggle arrangements (not shown) of any well known construction, for maintaining the switches in either closed or open positions. Since it is desired to respond to calls from the various floors, except under certain conditions as will be explained later, the non-stop switch is spring biased to closed position. The light switch is used for completing the circuit to the lamp in the dome light of the compartment. The purpose of the safety switch, slow speed switch and non-stop switch will be evident from the description of operation hereinafter set forth.

Levelling emergency operating switch 334 is in effect two single pole, double throw switches. The switches are arranged in any suitable manner for connection to a common feed, such connection being diagrammatically representd in Figure 30b. The switches are biased, as by a spring (not shown), tending to maintain them in open position. The operating lever for this switch is designated 1708 and extends through an aperture in the cover plate.

The direction control switch 930 is of the same construction as the levelling emergency operating switch but, in effect, forms one single pole, double throw switch. The switch is biased by means of a spring (not shown) tending to maintain it in open position.

The emergency cut out switches 383, 443 and 444 are double pole switches spring biased to open position. Switches 383 and 443 are operated by the same button 1697. The two poles of switch 444 are joined to form a single switch. The switches are mounted behind glass plates 1696 arranged in apertures in the cover plate. In operation, the glass plates must be broken before the switches can be closed.

The extra floor switch 1001 may be in the form of a simple snap switch, and is not illustrated in detail. The details of the motor generator starting switch, which is key operated, will be understood from a description, given later, of the operation of starting and stopping the motor generator set. A lamp 45 is provided above this starting switch to indicate to the compartment attendant when the motor generator set is in operation.

The switch for starting the elevator car comprises pairs of contacts 261, 265, 370 and 885 mounted on a panel 1710 secured to casing 1703. The panel and the contact blocks for the contacts are of insulating material to assure the proper insulation of these contacts. Contact bars 1711, 1712 and 1713 for bridging these pairs of contacts are mounted on a segment 1695 of insulating material. This segment is carried by segmental support 1714, being secured thereto as by screws (not shown). Support 1714 is pivotally mounted on a spindle 1715 secured to the base of casing 1703.

A centering roller 1716 is pivotally mounted on support 1714 and is arranged to cooperate with centering arms 1717 and 1718 to return the starting switch to "off" or neutral position. These arms are pivotally mounted on the base of the casing, and are forced against limits 1720 by means of a centering spring 1721. The stops are arranged so that the centering arms cannot return the starting switch beyond the "off" position. Spring 1721, however, yields and permits the starting switch to be moved into an operative or contact bridging position.

Casing cover 1699 is provided with another aperture for receiving the hub of the starting switch lever 1723. This hub extends over the spindle 1715 and is keyed to the segmental support 1714. The lever is secured to the spindle by means of a nut 1724. The starting lever is maintained in "off" position by means of a locking pin. This pin is arranged for operation by the starting lever handle 1722 and extends into an aperture in the casing, this arrangement not being shown. The pin is withdrawn from the aperture by outward movement of the handle, as is well understood in the art. An arcuate boss 1725 is formed on cover plate 1699. Stops 1726 for the starting lever are arranged at each end of the boss. An "off" position and three alternative operative positions, namely, "close", "start" and "open", are indicated on the cover plate.

In operation, upon the starting switch lever being moved counterclockwise to "close" position, contacts 261 are bridged by contact bar 1711 and contacts 885 are bridged by contact bar 1712. Upon further counterclockwise movement of the starting switch lever to "start" position, contacts 370 are bridged by a contact bar 1713, contacts 261 and 885 being maintained bridged owing to the fact that contact bars 1711 and 1712 are elongated. Upon reverse rotative movement of the starting switch lever to "open" position, contact bar 1713 bridges contacts 265. In "close" position, circuits are established by the bridging of contacts 261 to effect the closing of the compartment gate and opposite hatchway door. Additional control functions are accomplished in this position of the starting switch lever as a result of the bridging of contacts 855, as will be seen from later description. In "start" position, circuits are established to effect the starting of the car. In "open" position, circuits are established to effect the opening of the compartment gate and opposite hatchway door. Whenever released, the starting switch lever is returned to "off" position by the centering mechanism described above.

The upper or magnetic push button section of the operating box similarly comprises a casing 1727 within which the car buttons and their hold down magnet are arranged. The car button magnet comprises a rectangular coil 962 arranged in elongated iron channels 1728 and 1730 (see Figure 4). The magnet is secured at each end to an insulating base by means of straps 1731.

In high speed, high rise buildings, it is usual to arrange certain elevators to provide express service to certain zones of the building. In illustrating the push button section of the operating box, a 60-floor installation has been assumed with two extra floors above the 60th floor. Also, an express zone is assumed from the lower terminal to the 38th floor so that no push buttons are illustrated for floors below the 38th floor. Inasmuch as the circuits are arranged to effect a stop at the uppermost extra floor regardless of whether a button is pressed for the floor or not, no car push button is provided for that floor. The operation of arranging the system so that the car travels to extra floors in response to push buttons is controlled by extra floor switch 1001, and will be described later. With switch 1001 in position to cause the car not to run to extra floors, the circuits may be arranged to by-pass the push-button for the 60th floor. In systems in which the car is not arranged to run to extra floors, the push buttons for the 60th floor and extra floor are omitted.

The push buttons are arranged in two columns, those for the even numbered floors on the right and those for the odd numbered floors on the left. Each push button switch 1735 is pivotally mounted on a shaft 1732 in such manner that its armature 1729 extends over the corresponding iron channel of the push button magnet. The push button switches are positioned by means of pins extending through shaft 1732. The operating buttons 1736 for the push button switches extend through apertures provided in cover plate 1698. The push button switches are illustrated as of the same construction as those shown in Patent No. 1,767,892, to which patent reference may be had for details. When a button is pressed to close its switch, its armature, in cooperation with the corresponding iron channel, maintains the switch closed. It will be seen that as many push buttons may be pressed as may be desired, all of which will be retained in closed position so long as the push button magnet remains energized. The system is arranged to effect the de-energization of the push button magnet coil to release all switches which have been operated as reversal of the direction of car travel is effected.

An annunciator comprising up and down lamps 1733 and 1734 may be arranged in the upper casing to indicate calls for extra floors. Where the car is not arranged to run to such extra floors, this annunciator may be omitted.

A pilot lamp 830 is provided in the upper casing for advising the top compartment attendant as to the condition of the compartment gate, opposite hatchway door and starting lever of the bottom compartment. Three additional lamps 1719 are illustrated in the upper casing to serve as scheduling lamps where the cars are under control of dispatching or scheduling systems, as may be the case here. Where no dispatching or scheduling is provided, these lamps may be omitted.

When the car is operating to provide double compartment service, the top compartment car buttons for alternate floors are effective and those for the other floors are cut out. For example, all car buttons for even numbered floors may be effective and those for odd numbered floors cut out of service. When the car is operating to provide single compartment service using the top compartment, all car buttons in the top compartment are effective.

The car operating box for the bottom compartment is of the same construction as the one in the top compartment with certain differences due to operating conditions. The bottom compartment during double compartment operation serves the floors next below those served by the top compartment. During single compartment operation, the bottom compartment is cut out. Thus, only car buttons for every other floor are provided in the bottom compartment car operating box.

The shaft 1732 serves as the electrical feed, common to the movable contacts of the car buttons in the bottom compartment. Two electrical feeds are provided for the movable contacts of the car buttons in the top compartment owing to the fact that during double compartment operation, half of the car buttons are cut out. A suitable arrangement for providing two feeds is illustrated in Figures 5 and 6, wherein each contact lever 1737 is insulated from the movable contact member 1738 carried thereby and the contact members are connected by flexible connectors 1739.

The extra floor switch 1001 would ordinarily be provided in the top compartment of only one of the cars, as one car would be sufficient to provide this extra service. Such switch might be provided in the bottom compartment car operating box of a car where it is desired to have the bottom compartment, under certain conditions, run to floors below its lower terminal. With such switch omitted from the bottom compartment, the extra floor annunciators would also be omitted. Although it will be found in considering the wiring diagrams that certain of the switches in the lower section of the bottom compartment car operating box are illustrated differently from the corresponding ones of the top compartment, the construction of the switches may be the same and the different circuit connections taken care of in the wiring.

If it is desired to utilize the bottom compartment of a car instead of the top compartment for single compartment service, the car operating box above described for use in the top compartment would be provided in the bottom compartment and the one described for use in the bottom compartment would be provided in the top compartment. If it is desired to be able to use either compartment for single compartment service, both compartments would have car operating boxes with car buttons for all floors served, as described for the top compartment.

Reference may now be had to Figures 7 to 18, inclusive, which illustrate the various details of a selector machine, illustrated for use in the system. This machine comprises a frame formed by base plate 1740, four standards 1741, 1742, 1743 and 1744, and a top plate 1745 supported by these standards. The standards are secured in sockets formed in bosses 1746 on base plate 1740 and sockets formed in bosses 1747 on top plate 1745.

Figure 7:
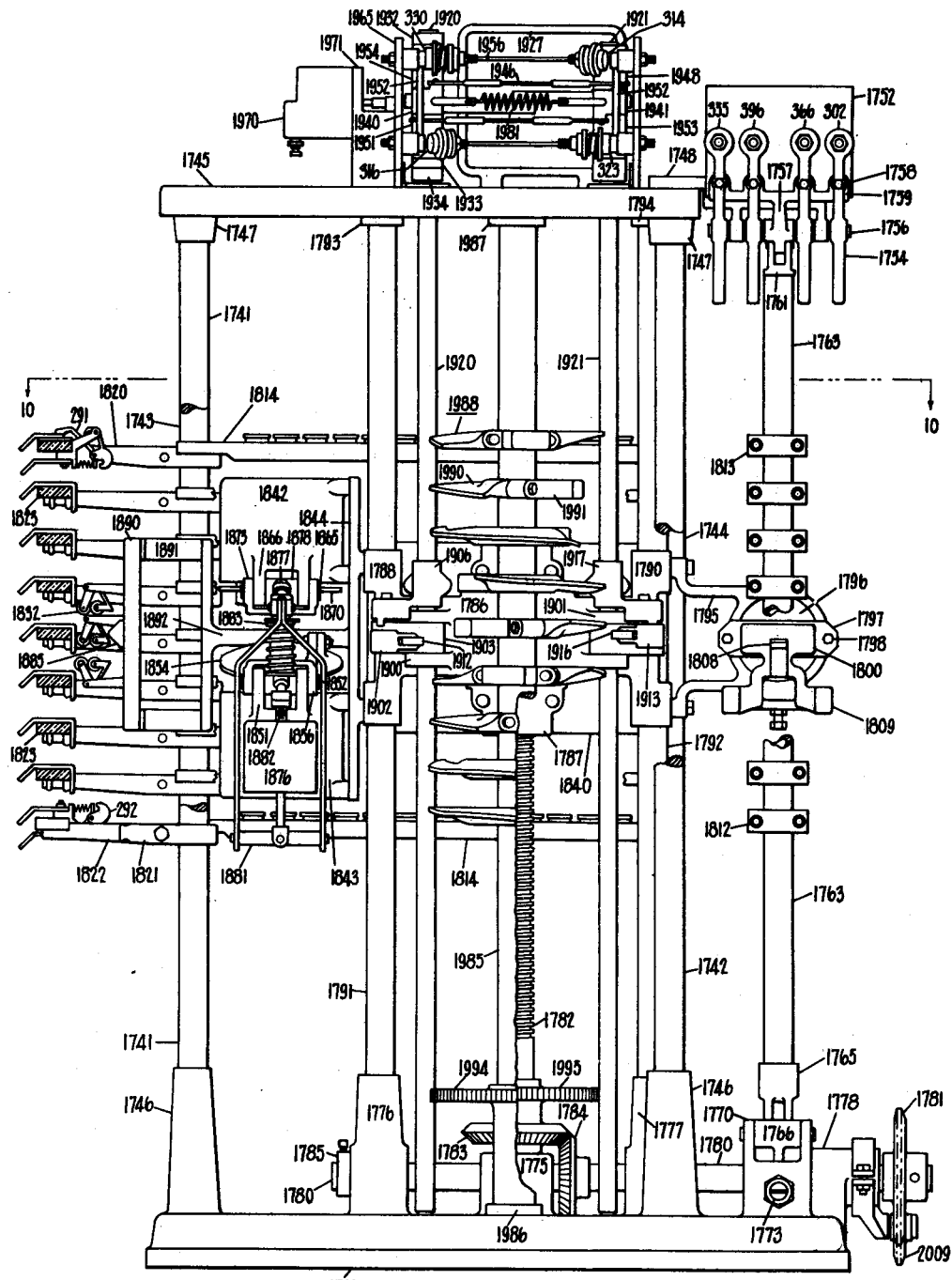
Figure 7 is a side elevation, with parts broken away, of the selector machine.
Figure 8:
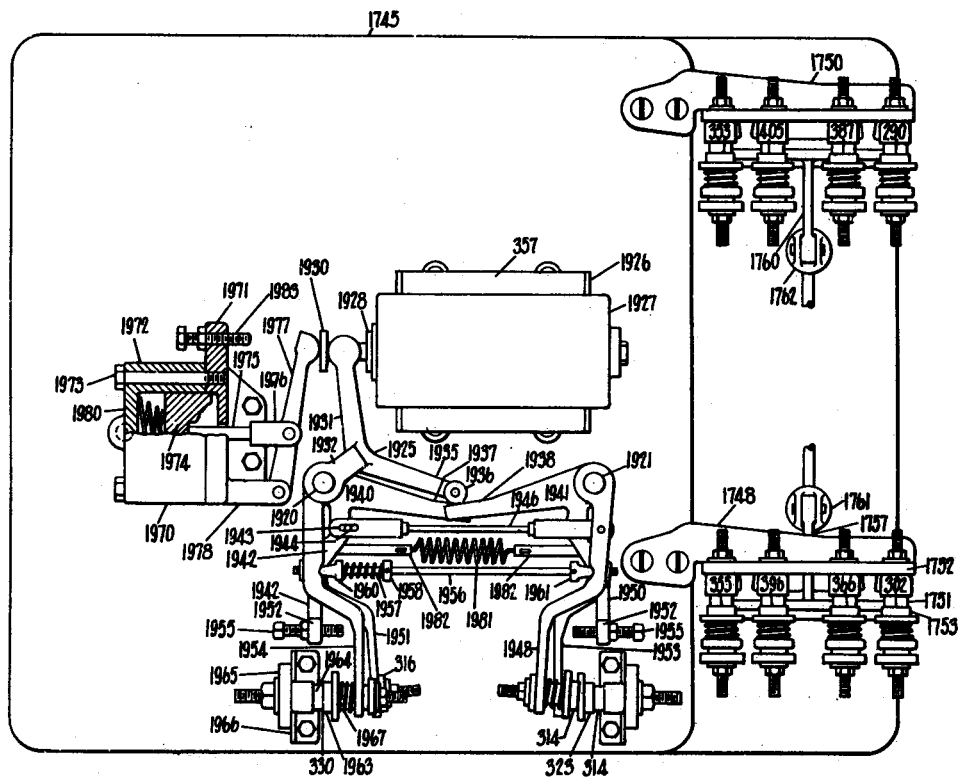
Figure 8 is a plan view of the same.
Figure 9:
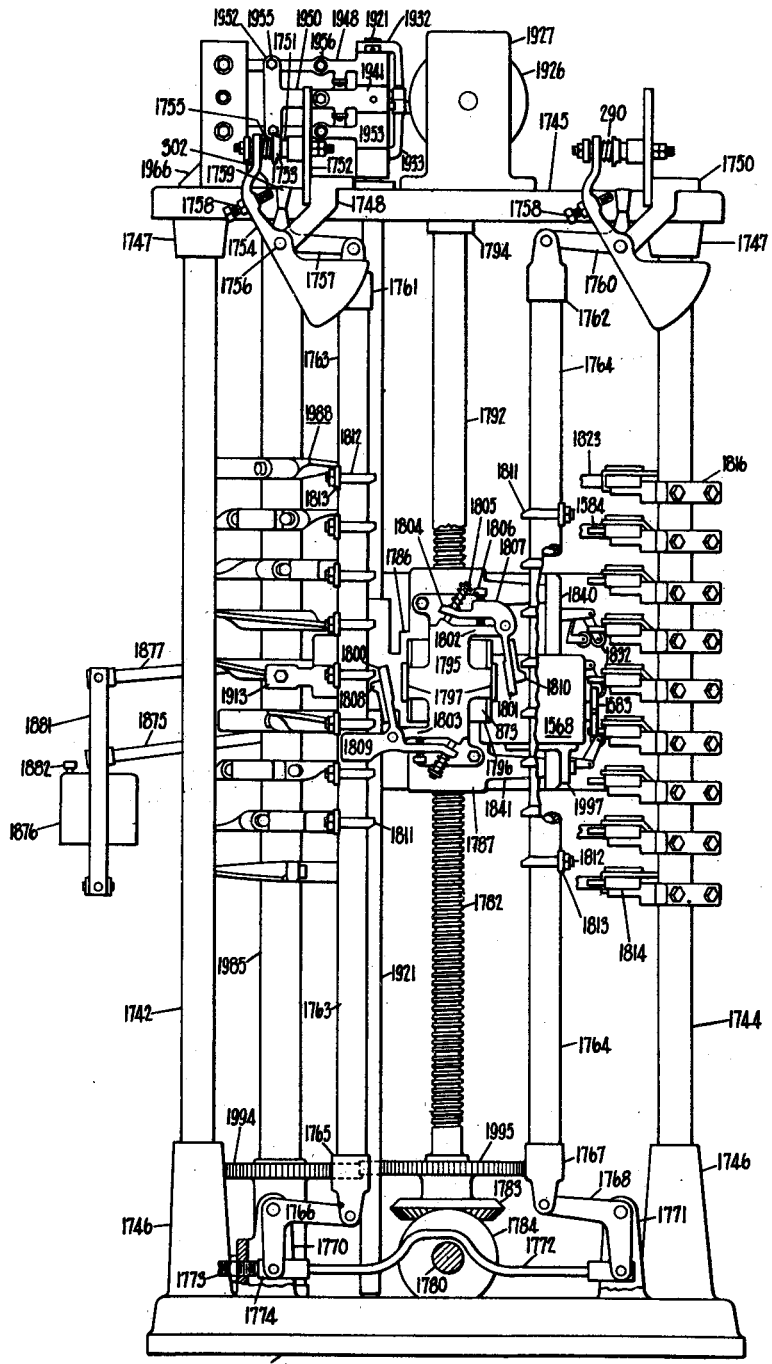
Figure 9 is a view in elevation, with parts broken away, of another side of the selector machine.

Referring particularly to Figures 7, 8, and 9, switches 290, 302, 353, 355, 366, 387, 396 and 405 are mounted on brackets 1748 and 1750 secured to top plate 1745 as by bolts. The switches on bracket 1748 are of the same construction so that only one of them, switch 302, will be described. This switch (Figure 9) comprises a stationary contact 1751 mounted on the insulated panel 1752 carried by bracket 1748. Binding nuts are provided on the stem of the stationary contact at the back of the panel for connecting the contact in the system. A movable contact 1753 is provided for engaging the stationary contact. This contact is mounted on one arm of an operating lever 1754, being insulated therefrom in any suitable manner. With the switch in closed position, the movable contact is pressed into engagement with the stationary contact by means of spring 1755. The movable contact is held on the operating lever by means of binding nuts on the contact stem. The operating lever is pivotally mounted on a pin 1756 supported by arms depending from bracket 1748. The other arm of the lever is enlarged to form a weight. Each weight acts as a bias tending to move its corresponding switch to closed position.

Also pivotally mounted on pin 1756, preferably between the operating levers for the switches, is a bell crank lever 1757. The vertical arm of the bell crank lever is formed with a cross member 1759 extending into the paths of all the operating levers. Abutment screws 1758, adjustably mounted in the upper arms of the operating members, are positioned to be engaged by the cross member 1759 to effect the opening of the switches. The abutment screws are adjusted to extend through the operating levers such distance as to provide the proper sequence and time of operation of the switches.

The switches mounted on bracket 1750 are of the same construction and are operated in the same manner as those mounted on bracket 1748, bell crank lever 1769 being provided and having a cross member for engaging the abutment screws 1759 of the operating levers.

A socket 1761 is pivotally mounted on the horizontal arm of bell crank lever 1757. Similarly, a socket 1762 is pivotally mounted on the horizontal arm of bell crank lever 1760. Vertical tubes 1763 and 1764 are secured in sockets 1761 and 1762 respectively. Tube 1763 extends downwardly into a similar socket 1765 mounted on the horizontal arm of the bell crank lever 1766. Similarly tube 1764 extends downwardly into a socket 1767 mounted on the horizontal arm of a bell crank lever 1768. These bell crank levers are pivotally mounted between supports 1770 and 1771 formed on base plate 1740. The depending arms of bell crank levers 1766 and 1768 are joined by means of a cross rod 1772.

With the above construction, tube 1763 must be pushed upwardly to effect the opening of switches 302, 355, 366 and 396, while tube 1764 must be pulled downwardly to effect the opening of switches 290, 353, 387 and 405. Thus, the weight of one tube is counterbalanced by the weight of the other. An adjustable screw stop 1773 extends through a web between the arms of support 1770 into an abutting relation with end piece 1774 provided on cross rod 1772. A weight (not shown) provided in the lower end of tube 1763, serves to unbalance tubes 1763 and 1764, thereby acting as a bias tending to maintain the switch opening mechanism in normal position—i. e., the position in which end piece 1774 engages screw stop 1773. The screw stop 1773 is so adjusted that, with the switch opening mechanism in normal position, the "selector" switches are free to return to closed position.

Figure 10:
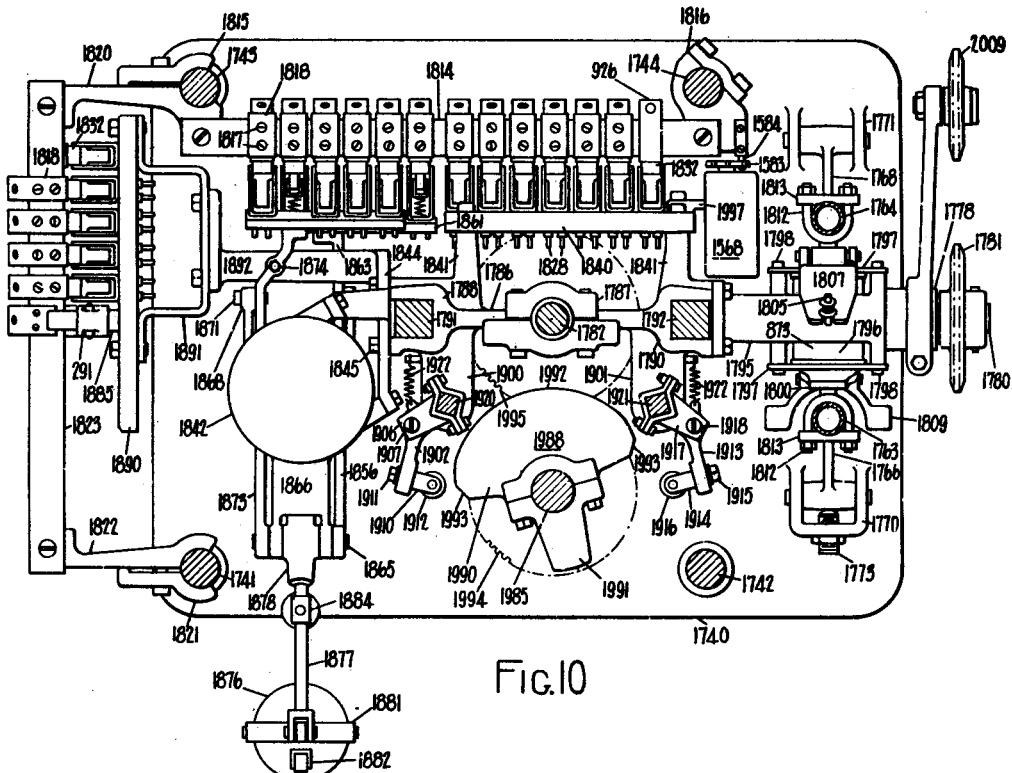
Figure 10 is a horizontal section taken along the line 10—10 of Figure 7.
Figures 17, 18:
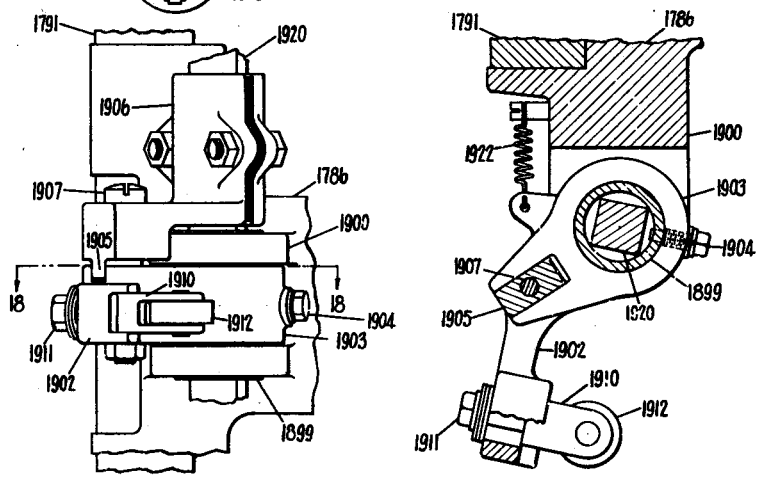
Figure 17 is an enlarged detail of a portion of the levelling mechanism.
Figure 18 is a sectional view of the same, taken along the line 18—18 of Figure 17.

The base plate 1740 is formed with a centrally disposed pedestal 1775. This pedestal and bosses 1776, 1777, and 1778 are arranged to provide bearings for the selector machine operating shaft 1780. The driving sprocket 1781 for the selector machine is secured to the outer end of the shaft, as illustrated in Figures 7 and 10. The pedestal 1775 is further arranged to rotatively support, through the intermediary of a ball thrust bearing (not shown), the vertical operating screw 1782. This screw extends into a bearing formed in the top plate 1745. A bevel gear 1783 is secured to vertical screw 1782. Another bevel gear 1784, engaging gear 1783 in driving relation, is secured to operating shaft 1780. Operative engagement between the bevel gears is maintained by a positioning collar 1785 on one end of shaft 1780 and the driving sprocket 1781 on the other end of the shaft.

A crosshead 1786, comprising a nut 1787 and two formed guiding ends 1788 and 1790, is arranged to be driven by screw 1782. Forked end 1788 engages vertically extending bar 1791 while forked end 1790 engages vertically extending bar 1792 to form a guide for the crosshead. Bar 1791 is secured in boss 1776 on the base plate 1740 and a boss 1793 on the top plate 1745. Similarly, bar 1792 is secured in boss 1777 on base plate 1740 and boss 1794 on top plate 1745.

A pawl magnet frame 1795 is carried by the crosshead, being secured to the forked end 1790, as by bolts. Frame 1795 is arranged to receive the pawl magnet 1796, the coil of this magnet being designated 873. Non-magnetic plates 1797, positioned at each end of the pawl magnet, are secured to the frame 1795 as by means of through bolts 1798. These plates form a mounting for the pawl magnet.

The pawl magnet is provided with two armatures 1800 and 1801, one at each end thereof. These armatures are pivotally mounted, as by means of pins, on arms 1802 and 1803 extending outwardly in opposite directions from the top and bottom of frame 1795. The non-magnetic plates 1797 further serve as spacing members to prevent armatures 1800 and 1801 from being held in by residual magnetism.

Armature 1801 extends inwardly from its pivot point to form an arm 1804. The end of arm 1804 is bifurcated to engage a pin 1805, secured in frame 1795. A spring is arranged on pin 1805 in such manner that it is compressed by arm 1804 as the armature is attracted by the magnet. Between its end and pivot point, the arm 1804 is enlarged to form a weight 1807. The spring and weight act to move the armature into unattracted position when the pawl magnet coil 873 is deenergized, the spring acting to give rapid initial movement. An adjusting screw 1806, provided in arm 1804, engages frame arm 1802 to determine the amount of outward movement of the armature.

Armature 1800 is similarly arranged with an arm, slot, pin, spring and adjusting screw, but is reversed. Thus its weight 1809, in order to function properly, extends outwardly from the pivot point.

Pawls 1808 and 1810 are secured, as by screws (not shown), to armatures 1800 and 1801 respectively, pawl 1808 being reversed to correspond with its armature. These pawls, with the armatures in unattracted positions, are arranged to engage collars 1811 provided on tubes 1763 and 1764. For a 10-floor installation with a double compartment car, each tube is provided with eight of these collars. On the basis of floors served by the top compartment, tube 1763 is provided with collars for the 3rd to 10th floors inclusive for operative engagement by pawl 1808 during upward car travel, and tube 1764 with collars for the 9th to 2nd floors inclusive for operative engagement by pawl 1810 during downward car travel.

The collars on tube 1763 are beveled on the bottom at their point of engagement by pawl 1808, while those on tube 1764 are beveled on the top at their point of engagement by pawl 1808, while those on tube 1764 are beveled on the top at their point of engagement by pawl 1810. The purpose of this arrangement is to provide a large engaging surface for the pawls and their collars. Each collar is formed by a U-bolt 1812 and a clamping plate 1813, so as to be readily adjustable.

In operation, assume that the car has started in the up direction and that a stop at some intermediate floor is to be made. The selector machine operating shaft 1780, driven by means of steel tapes in the manner previously described, rotates screw 1782 through bevel gears 1783 and 1784. The crosshead nut 1787, therefore, is driven upwardly by screw 1782 in accordance with the movement of the elevator car. Pawl magnet coil 873 being energized while the car is running, pawl magnet armatures 1800 and 1801 are in attracted positions and the pawls 1808 and 1810 do not engage the collars.

Upon the arrival of the car at a certain distance from the floor at which the stop is to be made, the pawl magnet coil 873 is deenergized. The operation of effecting the energization or deenergization of the pawl magnet will be described later. Pawls 1808 and 1810 are now forced out into positions for cooperating with the collars by their armature weights and springs. This is the position illustrated in Figure 9. As the crosshead is driven farther in the up direction, pawl 1808 engages the collar on tube 1763 for the floor at which the stop is to be made. Further movement of the crosshead forces tube 1763 upwardly, operating bell crank lever 1757 to open the selector switches on bracket 1748 in the desired sequence determined by the setting of their abutment screws 1758. At the same time, tube 1764 is pulled down through the connection to tube 1763 provided by bell cranks 1766 and 1768 and cross rod 1772. This operates bell crank lever 1760 to effect the opening of the selector switches mounted on bracket 1750 in the proper sequence determined by the setting of their abutment screws 1758.

It is to be noted that bell crank levers 1757 and 1766 are moved counterclockwise about their pivot during the switch-opening operation, moving tube 1763, and consequently the collars thereon, to the left as well as upwardly. Thus, if there is excessive movement of the crosshead, no injury to the selector machine can result because the collar is finally withdrawn with the pawl by movement of the levers. The back surface of each pawl is so inclined that, for example, in the above operation of stopping at an intermediate floor, as the back surface of pawl 1810 strikes a collar on tube 1764, the pawl slides over the collar without operative engagement.

As will be seen from later description, the opening of the selector switches causes the car to be further slowed down and finally brought to a stop. This results in the selector machine crosshead being stopped. The selector switches are held in open positions until the pawl magnet coil 873 is again energized. Upon this energization taking place, pawl 1808 is withdrawn from operative engagement with the collar. The biasing weight in tube 1763 then causes this tube to move downwardly and tube 1764 to move upwardly until stopped by the engagement of cross rod end piece 1774 with screw 1773. The bell crank levers 1757 and 1760 are thus moved out of operative engagement with the abutment screws 1758, permitting the selector switches to close. In the case of extra floors above the normal upper terminal, additional collars are provided on the tubes for causing slow-down and stopping operations at these floors.

Referring to Figures 11 and 12, a plurality of bars 1814 of insulating material are arranged between standards 1743 and 1744 to form mountings for the selector machine stationary contacts. Both of these standards are provided with a plurality of adjustable brackets, 1815 for standard 1743 and 1816 for standard 1744, the corresponding brackets on each standard being arranged in horizontal alignment to form mountings for the bars 1814. The stationary contacts are arranged on bars 1814 in columns, designated as follows: top up hall slow-down, top down hall slow-down, bottom up hall slow-down, top car slow-down, bottom car slow-down, bottom down hall slow-down, top down hall secondary slow-down, bottom down hall secondary slow-down, top up hall secondary slow-down, bottom up hall secondary slow-down, top car secondary slow-down, bottom car secondary slow-down and direction control. In these designations, top refers to the top compartment, bottom to the bottom compartment, hall to hall buttons and car to car buttons. The stationary contacts for all columns except the direction control column are secured to the insulator bars as by bolts 1817, as illustrated for stationary contact 627 in Figure 14. These bolts also secure insulating plates 1818 on the tops of the contacts, for a purpose to be described later.

For a 10-floor installation, mounting bars are provided for the 2nd to 10th floors inclusive as in the case of the collars. Contacts are illustrated in each column on each bar except in the direction control column. All of these contacts are not connected, it being preferred to provide contacts for each column on each bar, for manufacturing purposes. The contacts which are connected will be seen from an inspection of Figure 30c, which illustrates the selector machine circuits for a 10-floor installation.

Each of the brackets 1815 is provided with an arm 1820 extending outwardly to the side of the selector machine. The same number of brackets, designated 1821, are mounted on standard 1741 and each of these brackets is provided with a similar arm 1822. The arms 1822 are arranged in horizontal alignment with the arms 1820, and form mountings for insulating bars 1823. These bars are for the purpose of mounting additional stationary contacts on the selector machine. As in the case of bar 1814, bars 1823 are provided for the 2nd to the 10th floors inclusive. Four columns of contacts are mounted on bars 1823, these contacts being designated as follows: top down light, bottom down light, top up light and bottom up light. These contacts are provided with insulating plates 1818 and are secured to the bars in a manner similar to that in which the stationary contacts are secured to bar 1814, as is evident from a comparison of the mounting of light contact 630 in Figure 16 with the mounting of slow-down contact 627 in Figure 14. The contacting face of each light contact is elongated to provide longer contact engagement with its brushes.

Referring back to Figure 11, only two contacts are illustrated in the direction control column, each of these contacts being clamped to its mounting bar by means of the screw 1824, as illustrated for contact 937 in Figure 15. In case of extra floors, for example, floors above the normal upper terminal, additional insulating mounting bars are provided and contacts are provided on these bars in the same manner as for the normal floors.

The selector machine is provided also with movable contacts or brushes for engaging the various stationary contacts. Each of these brushes may be of the same construction, the details of a suitable form of brush being illustrated in Figure 14. The brush illustrated is a roller type brush and is mounted on an insulating panel. The brush comprises a U-shaped metallic bracket 1826 having arms 1827. This bracket is secured to the insulating panel as by bolts 1828. A metallic pin 1830 is secured to the ends of arm 1827. This pin pivotally supports metallic U-shaped member 1831 which in turn rotatably supports a conducting roller 1832. A removable locking strip 1833 is provided to prevent the dislodgment of member 1831 from pin 1830. The member 1831 is also provided with a strip 1834 that extends through a hole in one end of a metallic plate 1835.

A second conducting roller 1836 is mounted on the other end of plate 1835. A compression spring 1837 is positioned between the arms 1827 and arranged so that one of its ends engages the plate 1835 and the other of its ends engages the mounting plate through the intermediary of an insert member 1838. As a result of this construction, the spring maintains the conducting roller 1836 bearing against the conducting roller 1832, and thus tends to rotate the member 1831 counterclockwise until the extending strip 1834 engages with the insert member 1838 as a stop. When the roller 1832 engages a selector contact, the member 1831 is rotated clockwise to compress the spring 1837 still further, and thus insures, as a result of the bearing of roller 1836 against roller 1832, a positive electrical circuit between the selector contact and the bolts 1828.

To suit the wiring diagram, each of these brushes has been given a different reference numeral. The brushes are illustrated in Figures 11 and 12 in the position which they assume with the car stopped at the 6th floor. The brushes for cooperating with the secondary slow-down contacts are mounted on insulating panel 1840. This panel is carried by the crosshead, being secured to bosses 1841 formed on the crosshead as by screws.

Two brushes are provided on this panel for the contacts in each column. The brushes for engaging the stationary contacts in the top down hall secondary slow-down column are designated 750 and 791; those for engaging the stationary contacts in the bottom down hall secondary slow-down column are designated 751 and 792; those for engaging the stationary contacts in the top up hall secondary slow-down column are designated 707 and 775; and those for engaging stationary contacts in the bottom up hall secondary slow-down column are designated 706 and 774. Of these brushes, brushes 750, 751, 775 and 774 are positioned on their mounting panel so as to be in engagement with stationary contacts for a floor when the car is stopped at that floor. The purpose of these brushes will be explained in describing the operation of the control system. Brushes 791, 792, 707 and 706 are advance brushes and are principally for causing slow-down operation. The brushes for cooperating with the stationary contacts in the top car secondary slow-down column are designated 700 and 784, while those for engaging the stationary contacts in the bottom car secondary slow-down column are designated 702 and 786. These are advance brushes and serve principally to cause slow-down operation. The stationary contacts in the up and down secondary slow-down columns are rendered "alive" in response to hall buttons so that brushes 707, 706, 750, 751, 775, 774, 791 and 792 are effective in answering operated hall buttons. The stationary contacts in the car secondary slow-down columns are rendered "alive" in response to car buttons so that brushes 700, 702, 784 and 786 are effective in answering operated car buttons.

The brushes for cooperating with the light contacts of the selector machine are mounted on an insulting panel 1890 carried by an extension 1891 secured to an arm 1892 formed on bracket 1844. Two brushes are provided on the panel for the contacts in each column. The brushes for engaging the stationary contacts in the top down light column are designated 760 and 777; those for engaging the stationary contacts in the bottom down light column are designated 757 and 776; those for engaging the stationary contacts in the top up light column are designated 741 and and 762; and those for engaging the stationary contacts in the bottom up light column are designated 742 and 763. These brushes serve to cause a lighting of the hall lanterns for the direction in which the car is travelling at floors at which the car is being slowed down, and is finally brought to a stop. The manner in which this is effected will be seen from later description. Brushes 741, 742, 776 and 777 are advance brushes for initiating the lighting operations. Brushes 757, 760, 762 and 763 are following brushes and cause the floor lanterns to be maintained lighted as the advance brushes leave the contacts. In this connection, it is to be noted that the spacing of the advance and following brushes for each column of contacts is such that the following brush, in each instance, engages the stationary contact before the advance brush leaves. It is to be further noted that the following brushes, with the car stopped at a floor, are near the edge of the stationary contacts for that floor in the direction for which the brushes are provided, this arrangement providing periods of greater duration of lighting of the hall lanterns.

The brush for engaging the stationary contacts in the top up hall slow-down column is designated 734, the brush for engaging the stationary contacts in the bottom up hall slow-down column is designated 733, the brush for engaging the stationary contacts in the top down hall slow-down column is designated 771; and the brush for engaging the stationary contacts in the bottom down slow-down column is designated 772. Two brushes are provided for engaging the stationary contacts in the car slow-down columns, those for engaging the stationary contacts in the top car slow-down column being designated 726 and 764, while those for engaging the stationary contacts in the bottom car slow-down column are designated 730 and 766. These brushes cooperate with the stationary contacts to initiate slow-down, brushes 734, 733, 726 and 730 being effective during up car travel and brushes 771, 764, 766 and 772 being effective during down car travel. These brushes are mounted in a different manner from those provided for cooperating with the secondary slow-down stationary contacts. The mounting provided for these brushes is such that, with the car at rest, the brushes are positioned only a short distance on each side of the stationary contact for the floor at which the car is stopped. Mechanism is provided for advancing the brushes under accelerating conditions. The construction of this mechanism may be seen upon reference to Figure 13.

Figure 13:
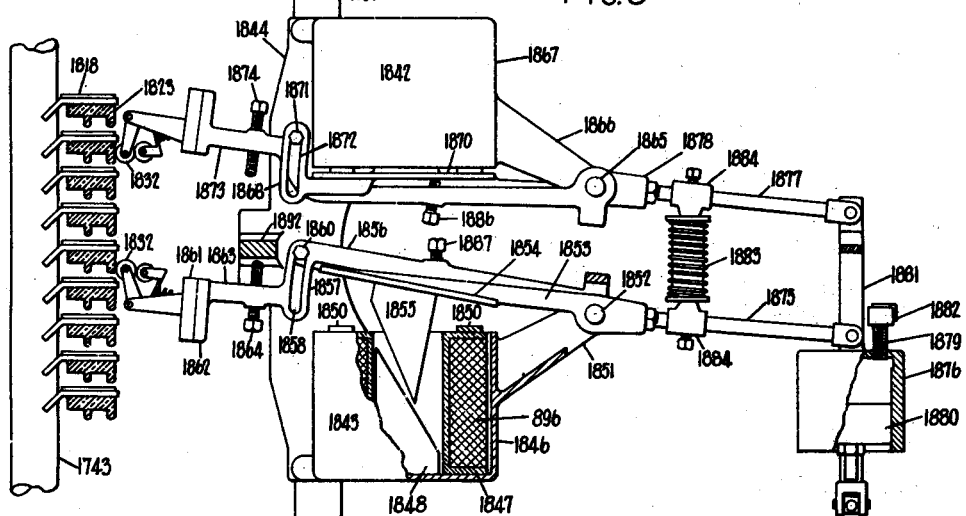
Figure 13 is a view of the selector machine brush advancing mechanism.

Referring to Figure 13, a pair of magnets 1842 and 1843 is mounted on bracket 1844 secured to forked end 1788 of the crosshead, as by screws 1845. Magnet 1842 is for advancing the up slow-down brushes, while magnet 1843 is for advancing the down slow-down brushes. Each magnet is of the same construction. Magnet 1843, for example, is arranged in a magnet case 1846. The magnet coil 896 is wound on an insulating spool 1847. A beveled core 1848 secured to the bottom of the case 1846 extends upwardly partly into the magnet coil. The magnet is maintained in position within the case by means of non-magnetic strips 1850 secured to the case.

An arm 1851 is formed on the case and supports a pivot pin 1852 for armature lever 1853. The outer end of the lever is in the form of a flat plate 1854 which forms the armature for magnet 1843, a core 1855 being secured to the armature to extend into the magnet coil. This core is beveled to correspond with the magnet core 1848. The non-magnetic plates further serve as spacing members to provide an air gap between the cores in the attracted position of the armature, thereby preventing the retention of the armature in attracted position by residual magnetism.

A brush advance lever 1856 is also pivotally mounted on pin 1852 and is provided with an arcuate portion 1857 within which is provided a slot 1858. A screw 1860 extends through this slot into a lug formed on armature 1854. Beyond the arcuate portion, the advance lever supports the down slow-down brushes. These brushes are mounted on insulating panel 1861 secured to plate 1862 formed on the end of the lever. The neck 1863, extending between the plate and the arcuate portion 1857, is provided with an abutment screw 1864.

A similar arrangement of armature and advance lever is provided for magnet 1842. Both of these members are mounted on a pivot pin 1865 supported on an arm 1866 extending from the case 1867 for this magnet. As distinguished from the bottom brush advance mechanism, an arcuate portion 1868 is formed on an extension from the armature 1870 for the up advance magnet, and a screw 1871 extends through a slot 1872 in this arcuate portion into up brush advance lever 1873. An abutment screw 1874 extends through the lever 1873 opposite abutment screw 1864 for lever 1856.

To the right of pivot pin 1852, an extension rod 1875 is secured to armature lever 1853. This rod is connected at its other end to the cylinder 1876 of a dash-pot. Similarly, a rod 1877 is secured at the right of pivot pin 1865 to armature lever 1878. The outer end of this rod is connected to the piston 1880 of the dash-pot through linkage designated as a whole as 1881. The dash-pot is provided with a ball check vent 1882 to permit unrestricted upward movement of the dash-pot piston within the cylinder. The downward movement of the piston is regulated by adjusting the vent 1882 to increase or decrease the opening provided by tapered slot 1879.

A spring 1883 is arranged between rods 1875 and 1877 for biasing the brush advance levers to retarded positions. Collars 1884 are secured to the rods and are formed with spring seats for the biasing spring. These collars are adjustable on the rods to permit shifting of the spring to secure the desired compression.

The amount of advance of the brushes may be adjusted by shifting the brush advance levers with respect to their armature levers. To decrease the amount of advance of the up slow down brushes, for example, the screw 1871 is loosened and adjustment screw 1886 is turned in such direction as to cause these levers to be spread apart. When the desired adjustment is effected, screw 1871 is tightened to lock the levers together. To cause further advance of the up brushes, screw 1886 is turned in the opposite direction. The adjustment of the down brushes is effected by loosening screw 1850 and turning screw 1887 in the direction to effect the desired adjustment, and thereafter tightening screw 1860 when the desired position is reached.

In the retarded positions of the brushes, the abutment screws 1854 and 1874 rest against the arm 1892 extending from bracket 1844. The retarded positions of the brushes may be adjusted by turning these abutment screws.

In Figures 7 and 9, the various elements which are set according to floor height, including the stopping collars and stationary contacts, are considerably spaced in order that the construction may be readily seen from the illustration. This renders the illustrated relative positions of the brushes and contacts inaccurate. However, the spacing of the floor bars in Figures 11, 12 and 13 is in accordance with actual operating conditions and the actual relationship between the brushes and their cooperating contacts may be seen from these figures. The slow-down brushes are illustrated in retarded positions with the car stopped at a floor, in Figure 11. From this figure, the relative positions of the slow-down brushes and the secondary slow-down brushes may be seen. The light brushes are illustrated in Figure 12 in the positions which they assume with the car stopped at a floor. The up slow-down brushes are illustrated in advance position in Figure 13. As will be seen from later description, only the up slow-down brushes are advanced during up travel of the car and only the down slow-down brushes are advanced during down travel of the car.

In operation, assume that the car is travelling in the up direction. The crosshead is therefore being moved upwardly by screw 1782, causing the brushes to be moved in the up direction in accordance with the movement of the elevator car. The up brushes are "alive" but the down brushes are "dead" during upward car movement. As the car accelerates, the up brush advance magnet is energized, causing the up slow-down brushes to be advanced. The rate at which this advance takes place depends upon the adjustment of the vent 1882 of the brush advance dash-pot. Upon an "alive" top compartment slow-down contact being engaged by the up slow-down brush for that column of contacts, circuits are completed which cause the slowing down of the car to be initiated. Thereafter, as the car continues its upward movement, the corresponding top compartment up secondary slow-down brush, engaging its stationary contact for the floor at which the car is being slowed down, causes further slow-down to take place and the pawl magnet to be deenergized. The pawls are thereby extended and the up pawl 1808 engages the collar on tube 1763 for the corresponding floor, causing the car to be further slowed down as it continues its upward movement and finally brought to a stop with the top compartment at the floor landing.

The up hall lantern for that floor is lighted during this operation as a result of the cooperation of the up light brushes with the up light stationary contacts for the floor at which the slow-down and stop is made. A similar operation takes place in the event that an "alive" bottom compartment slow-down contact is engaged by the bottom compartment up slow-down brush for that column of contacts, the car being finally brought to a stop with the bottom compartment at the floor landing corresponding to the "alive" contact engaged. The up brush advance magnet is deenergized at the start of the slow-down operation, permitting the up slow-down brushes to return to retarded positions.

Similar operation is had during travel of the car in the down direction. The brushes are moved downwardly in accordance with the movement of the elevator car. The down brushes are "alive" but the up brushes are "dead" during this downward movement. As the car accelerates, the down brush advance magnet is energized, causing the down slow-down brushes to be advanced at a rate determined by the dash-pot. For example, upon an "alive" top compartment slow-down contact being engaged by the down slow-down brush for that column of contacts, circuits are completed which cause the slowing down of the car to be initiated. Thereafter, as the car continues its downward movement, the corresponding top compartment down secondary slow-down brush, engaging its stationary contact for the floor at which the car is being slowed down, causes further slow-down to take place and the pawl magnet to be deenergized. The pawls are thereby extended and the down pawl 1810 engages the collar on tube 1764 for the corresponding floor, causing the car to be further slowed down as it continues its downward movement, and finally brought to a stop with the top compartment at the floor landing. The down hall lantern for that floor is lighted during this operation as a result of the cooperation of the down light brushes with the down light stationary contacts for the floor at which the slow-down and stop is made. The down brush advance magnet is deenergized at the start of the slow-down operation, permitting the down slow-down brushes to return to retarded positions.

The stationary slow-down contacts are preferably short so that the slow-down distances may be made as nearly uniform as possible. The light contacts, however, are elongated to facilitate maintaining the hall lanterns lighted. The insulating plates 1818 on the top of the slow-down contacts aid in insuring uniform slow-down distances. The insulating plates 1818 on the top of the light contacts are of advantage, where the mounting bars are spaced closely together, to prevent false lighting of hall lanterns.

The direction control stationary contacts are engaged by a direction control brush 940 at the upper and lower terminals. Although these stationary contacts are wide, it will be seen from later description that the operation of switches to prepare the car for travel in the reverse direction is not effected until the car is brought to a final stop at the terminal landings. Where the car is arranged to run to extra floors, for example above the normal upper terminal, an additional direction control contact would be provided on the mounting bar for the highest of these extra floors. This will be better understood from later description. The purpose of the particular construction of the stationary contact illustrated is to facilitate removal and repositioning of these contacts after the selector machine has been installed.

Two switches, designated 291 and 292, are arranged on bars 1823, one at each terminal floor. A cam 1885 is positioned on panel 1890 for operating the switches, each switch being positioned so as to be opened upon the arrival of the car at a predetermined distance from the terminal floor.

Reference may now be had to Figures 7, 8, 9, 10, 17 and 18, which illustrate the details of switching mechanism operable in association with other parts of the control system to bring the car to exact landing levels regardless of whether underruns or overruns occur. This mechanism is illustrated as arranged on the selector machine to be operated through the intermediary of sprocket 1781, shaft 1780 and vertical screw 1782. The screw 1782, as pointed out previously, causes movement of the selector machine crosshead in accordance with movement of the elevator car. Two arms 1900 and 1901 extend from the crosshead. These arms are bifurcated at their outer ends. A lever 1902 has its hub 1903 positioned in the bifurcation of arm 1900. The hub 1903 is provided with an aperture through which a bushing 1899 extends. The bushing 1899 is secured to the lever by means of a set screw 1904 in the hub 1903, and extends into bearing apertures formed in the bifurcated ends of arm 1900.

The outer end of lever 1902 supports a roller block 1910, this block being adjustably retained in the lever by a screw 1911. An operating roller 1912 is rotatably carried by the block 1910.

A lever 1913 of the same construction as lever 1902 has its hub positioned within the bifurcation of arm 1901. The mounting of the hub within the arm is the same as described for lever 1902. The outer end of lever 1913 supports a roller block 1914. This block is adjustably retained in the lever by means of screw 1915. An operating roller 1916 is rotatably carried by the roller block. The levers 1902 and 1913 are vertically offset in such manner as to cause operating roller 1912 to be positioned slightly below operating roller 1916, see Figure 7. The purpose of this arrangement will be described later.

The lever 1902 is slotted to receive a key 1905 formed on a clamp 1906. This clamp is secured to the lever as by a screw 1907. Similarly, lever 1913 is slotted to receive a key formed on a clamp 1917. This clamp is secured to the lever as by a screw 1918. Levelling switch operating rods 1920 and 1921 are arranged parallel to screw 1782 and extend through the bushings provided in levers 1902 and 1913. These rods have square cross sections. Clamp 1906 is clamped to rod 1920, while clamp 1917 is clamped to rod 1921. Sufficient clearance is provided to permit the clamps to slide upon the rods as movement of the crosshead takes place. The clamps cannot turn with respect to the rods, however, so that any pivotal movement of levers 1902 and 1913 is imparted to the rods and any pivotal movement of the rods is imparted to the levers. Springs 1922, extending between the levers and the crosshead, act to take up any lost motion.

The lower ends of rods 1920 and 1921 are of circular cross section and extend into bearing cavities provided in base plate 1740. At their upper ends, these rods extend through top plate 1745. They are of circular cross section above this plate, and are supported by ball thrust bearings not shown.

A bell crank lever 1925 is mounted on rod 1920 above the top plate 1745. This lever is operable by the levelling magnet 1926. This magnet comprises a magnet frame 1927 secured to the top plate 1745. The magnet is of the solenoid type, its coil being designated 357 and the sliding magnet core being designated 1928. A flange portion 1930 is formed on the outer end of core 1928 for engaging the outer end of arm 1931 of bell crank lever 1925 to effect clockwise movement of the lever as viewed in Figure 8.

Lever 1925 is formed with yoke arms 1932 and 1933, which are provided with apertures through which the upper portion of rod 1920 extends. The bell crank is free to turn on rod 1920, being positioned on the rod by means of a spacing bushing 1934. The other arm 1935 of the bell crank is provided with a roller 1936, the end of the arm and the roller engaging the arms 1937 and 1938 of additional bell crank levers 1940 and 1941 mounted on rods 1920 and 1921 respectively. These bell cranks are pinned to these rods so as to rotate and to be rotated by them. The other army 1942 of bell crank 1940 is provided with a pin 1943 which extends upwardly into a slot 1944 provided in an interlocking bar 1946. The other end of the interlocking bar is pivotally secured to a contact arm 1948. There is a similar arrangement for connecting the other arm 1950 of bell crank lever 1941 to a contact arm 1951, the interlocking connecting bar being arranged beneath interlocking bar 1946.

Contact arm 1948 and another contact arm 1953 are pivotally mounted on rod 1921, while contact arm 1951 and similar contact arm 1954 are pivotally mounted on rod 1920. The outer ends of arms 1942 and 1950 of bell crank levers 1940 and 1941 are formed with cross members 1952. Abutment screws 1955 are adjustably mounted in the cross members 1952 in the paths of movement of the contact arms for a purpose to be described later. Contact arms 1954 and 1948 are joined by a rod 1956 extending through the arms. A spring 1957 is arranged on the rod between a collar 1958 pinned to the rod and a positioning member 1960 slidably mounted thereon. A similar positioning member 1961 is pinned on the other end of the rod. The rod is maintained in position as by washers and cotterpins on the outer ends, as illustrated. A similar arrangement joins contact arms 1951 and 1953.

The contact arms operate the contacts of the levelling switching mechanism. To facilitate the description of the wiring diagram, the various pairs of levelling switch contacts have been designated by single reference numerals, 314, 316, 323 and 330. Contacts 330 are operated by contact arm 1954, contacts 316 by arm 1951, contacts 314 by arm 1948 and contacts 323 by arm 1953. The arrangement of each pair of contacts is the same so that only one pair will be described. Referring to contacts 330, the movable contact 1963 is carried by the end of contact arm 1954. The stationary contact 1964 engaged by the movable contact is mounted on an insulating plate 1965 secured to a bracket 1966, in turn secured to top plate 1745. With the contacts in engagement, the movable contact is pressed against the stationary contact by spring 1967.

Dash-pot 1970 is provided for cushioning the operation of the levelling mechanism upon the deenergization of the magnet coil 357. This dash-pot comprises a face plate 1971 which also forms a bracket for securing the dash-pot to top plate 1745. The dash-pot cylinder 1972 is secured to the face plate as by through bolts 1973. The dash-pot piston 1974 is connected by rod 1975 and yoke 1976 to a lever 1977 pivotally mounted on the bifurcated arm 1978 extending from face plate 1971. The lever 1977 abuts the flange portion 1930 of the solenoid core 1928. A spring 1980 is arranged within the dash-pot cylinder beneath piston 1974 which tends to move the piston outwardly within the cylinder, thereby biasing lever 1977 into abutting relation with flange portion 1930.

A spring 1981 is connected between the arms 1950 and 1942 of the bell cranks 1941 and 1940 through the intermediary of link members 1982. This spring is under tension and tends to move bell crank lever 1941 clockwise about rod 1921 and bell crank lever 1940 counterclockwise about rod 1920, thereby tending to move armature core 1928 into unattracted position through the intermediary of bell crank lever 1925, against the action of the dash-pot. An adjustable abutment screw 1983 is provided in face plate 1971 to form a stop to limit the outward movement of armature core 1928 and the inward movement of the dash-pot piston, this screw being positioned in the path of movement of the outer end of lever 1977.

The magnet 1926 is employed to move the operating rollers 1912 and 1916 into retracted positions during movement of the car. When this magnet is deenergized, the rollers are permitted to return to positions for cooperation with levelling cams to effect the levelling operation. Referring particularly to Figures 7 and 9, a cam shaft 1985 extends between the base plate 1740 and top plate 1745. At its lower end, this shaft is supported by ball thrust bearing 1986 and at its upper end extends into a bearing 1987 in the top plate. A plurality of cams 1988 are provided on this shaft. Considering floors served by the top compartment, a cam is provided for each floor at which a stop is to be made. The levelling cams are spaced along the cam shaft so that the distances between adjacent cams are in accordance with the distances between the respective floor landings.

These cams are all similar in construction and each comprises a cam portion 1990 and a yoke portion 1991. Screws extend through apertures in the yoke portion and are threaded into the cam portion to bind the cam to the cam shaft. Referring to Figure 10, the radius of the working face 1992 of each cam is a maximum at the central portion thereof and a minimum at the end portions. These end portions are beveled at 1993. Referring back to Figures 7 and 9, each of the cams is helical and has a pitch equal to the pitch of the thread on screw 1782. A gear 1994 is secured to cam shaft 1985 to effect rotative movement thereof. This gear meshes in a driven relation with a corresponding gear 1995 secured to the shaft portion of screw 1782 so as to rotate therewith.

When the car is at rest, the levelling magnet coil 357 is not energized. Under such conditions, spring 1981 holds bell crank levers 1940 and 1941 in non-retracted positions. That is, bell crank lever 1941 is in a position clockwise with respect to the position illustrated in Figure 8, and bell crank lever 1940 is in a position counterclockwise with respect to the position illustrated. As a consequence, operating rollers 1912 and 1916 are in non-retracted positions. Owing to the fact that the car is positioned at a landing, the rollers are disengaged from the levelling cam for that floor at points adjacent the beveled end portions 1993 of the cam. As will be seen from later description, all levelling contacts are separated under these conditions.

The coil 357 of the levelling magnet is energized upon the starting of the car, and acts to pull its core 1928 inwardly. The flange 1930 on the core pushes bell crank lever 1925 clockwise about rod 1920, causing clockwise movement of bell crank 1940 and counterclockwise movement of bell crank 1941 against the force of spring 1981. The resultant movement of these rods causes movement of levers 1902 and 1913 into positions where the operating rollers 1912 and 1916 clear the levelling cams during movement of the car. As the movement of bell crank levers 1940 and 1941 takes place, spring 1957 on rod 1956 and the corresponding spring on the rod extending between levers 1951 and 1953 act to spread the contact arms until the lost motion provided by the slots in the interlocking bars is taken up. Thus each of these contact arms moves inwardly toward contact engaging position. The inner movement of arms 1948 and 1951 is stopped upon this lost motion being taken up, and they are thereafter disengaged from the abutment screws 1955 and pulled away from contact engaging positions by the bell crank levers acting through the interlocking bars. The contact arms 1953 and 1954 are maintained in engagement with their abutment screws 1955, as further movement of the bell crank levers takes place, by spring 1957 on rod 1956 and the corresponding spring on the rod beneath. This results in the engagement of contacts 323 and contacts 330, the mechanism assuming the position illustrated in Figure 8 in the retracted positions of the operating rollers.

When the car is slowed down and stopped at a floor, levelling magnet coil 357 is deenergized during the latter part of the slow-down operation. Assume that the car has been travelling in the up direction and is below the floor at the time the deenergization of coil 357 takes place. Spring 1981, acting through bell cranks 1940 and 1941, causes counterclockwise movement of rod 1920 and clockwise movement of rod 1921, retarded by the action of dash-pot 1970. Owing to the fact that the car is below the floor at this time, roller 1916 engages the face 1992 of the cam for that floor. Roller 1912, however, does not engage the cam. Assume that the car is such distance below the floor that the roller engages the cam at a point of maximum radius. Under such conditions, the rotative movement of bell crank 1941 is stopped as the roller engages the cam, maintaining contacts 323 in engagement. Bell crank 1940, however, continues its rotative movement and acts through interlocking bar 1946 to effect the engagement of contacts 314. Also, abutment screw 1955 engages contact arm 1954 to effect the separation of contacts 330. Contacts 316 are maintained separated. With contacts 314 and 323 engaged, the car runs at fast levelling speed.

As continued rotative movement of the cam takes place, roller 1916 moves on to a point of less radius of the working face 1992 of the cam, permitting further clockwise movement of bell crank 1941. This results in the engagement of contact arm 1953 by its abutment screw 1955 to effect the separation of contacts 323. This slows the car to a slow levelling speed. As the car arrives at the floor, roller 1916 rides onto the beveled portion 1993 of the cam, permitting further clockwise movement of bell crank lever 1941. This results in the engagement of contact arm 1948 by its abutment screw 1955 to effect the separation of contacts 314. This causes the car to be stopped at the exact landing level, and with the car in this position both operating rollers 1912 and 1916 are disengaged from the cam adjacent beveled portions 1993.

Should the car overrun the floor, roller 1912 rides onto the working face 1992 of the cam for that floor, causing clockwise movement of rod 1920. Assume that the car overruns the floor such distance as to cause the roller to ride onto the cam to a point of maximum radius. The resultant clockwise movement of bell crank lever 1940 causes the abutment screws 1955 in arm 1942 thereof to disengage contact arms 1951 and 1954 to effect the engagement of contacts 316 and 330. This causes the car to be returned to the floor at a fast levelling speed. The resultant reverse rotative movement of the cam causes the roller to ride onto the cam to a point of less radius, permitting counterclockwise movement of bell crank lever 1940 to effect the engagement of contact arm 1954 by its abutment screw and thus the separation of contact 330. This slows the car to a slow levelling speed. The disengagement of the roller from the cam as the car arrives at the floor results in further counterclockwise movement of bell crank lever 1940, causing contact arm 1951 to be engaged by its abutment screw to effect the separation of contacts 316. This brings the car to a stop.

Should the car overrun the floor such a short distance that roller 1912 does not engage the working face of the cam beyond the end portion, bell crank 1940 does not move clockwise sufficiently to effect the disengagement of the abutment screw from contact arm 1954, and therefore contacts 330 are not engaged. Contacts 316, however, are moved into engagement, causing the car to be returned to the floor at a slow levelling speed. A similar operation is had in case the roller 1916 initially engages the opposite end portion of the cam upon an underrun, in that contacts 314 are caused to engage by the counterclockwise movement of bell crank lever 1940 and the engagement of contact arm 1953 by its abutment screw by the clockwise movement of bell crank lever 1941 effects the separation of contacts 323. This causes the car to be brought to the floor at a slow levelling speed.

A contactor device, designated as a whole as 1568, is carried by the crosshead for movement thereby as movement of the car takes place. This device is mounted on a bracket 1997 secured to insulating panel 1840. The details of this contactor device, as well as the manner in which it is operated, will be described later. Briefly, a star wheel 1583 effects the operation of the device. A plurality of stationary pins 1584, mounted on brackets 1816, engage the star wheel to effect the operation of the device as movement of the crosshead takes place.

The details of the tape drive arrangement for the selector machine are illustrated in Figure 19. The overhead sheaves 2000 and 2001, upon which the tapes are wound and unwound as the elevator car moves up and down the hatchway, are secured to a shaft 2002 journaled in pedestals 2003 and 2004. These pedestals are mounted on a base plate 2005. An idler sheave 2006 for sheave 2001 is rotatively mounted on a shaft 2007 supported by members 2008 extending from pedestals 2003 and 2004. An idler sheave 2010 for sheave 2000 is similarly supported at the back of the pedestals. These idlers serve to position the tapes so as to extend into the hatchway at the desired points. Aprons 2050 are secured to the pedestals 2003 and 2004 to serve as guards for the tapes.

An extension 2011 is secured to pedestal 2004 and supports a hanger 2012 on its outer end. The shaft 2002 extends through a bearing in this hanger and on its outer end is secured a sprocket 2013. This mechanism is usually situated on the penthouse secondary level. This sprocket drives the sprocket 1781 of the selector machine by a chain as illustrated in Figure 1. An idler sprocket 2009 is adjustably mounted on the selector machine to take up any slack in the chain.

This driving mechanism may also be utilized to operate a terminal stopping device, and a suitable arrangement has been illustrated in Figures 19 and 20. Secured to shaft 2002 between hanger 2012 and pedestal 2004 is an elongated pinion 2014. This pinion is adjustably secured to the shaft, as by a set screw 2015. This pinion meshes with and drives a gear 2016 arranged on a screw 2017. This screw is journaled in bracket 2018 secured to pedestal 2004 and in the lower end of hanger 2012. The hub of gear 2016 is threaded and is provided with clutch members 2020 and 2021. Clutch member 2021 is arranged to cooperate with a similar clutch member 2022 clamped to the screw 2017 as by a set screw 2025. This latter clutch member is adjustable on the screw 2017 and is provided with a nut 2026 for locking it in adjusted position. A pinion 2027 is provided on the inner end of screw 2017. This pinion meshes with a gear 2028 pivotally supported by the hanger 2030 secured to bracket 2018. Gear 2028, in turn, meshes with a segmental gear 2031 secured to the end of the terminal stopping device operating shaft 2032 to effect rotative movement thereof.

The terminal stopping device is mounted on the bed plate 2005 and comprises a frame 2033 having upright end portions 2034 and 2035 and horizontal side portions 2036 and 2037. Shaft 2032 is journaled in a bearing 2038 provided in end portion 2034. The end portion 2035 extends outwardly and supports a bearing 2040 for the outer end of shaft 2032. A cam 2041 is secured to the shaft 2032 for rotation therewith. This cam has an elongated camming portion 2042 for operating the switches of the terminal stopping device. The camming portion 2042 is counterbalanced by a weight 2043 formed on the cam.

The switches of the stopping device are adjustably mounted on segmental racks 2044 secured to horizontal side portions 2036 and 2037. There are four of these switches for each direction of travel, those operated at the upper terminal being designated 421, 947, 395 and 367 and those operated at the lower terminal being designated 424, 951, 404, and 390. Each switch is provided with an operating roller 2045 which is engaged by the camming portion 2042 upon rotative movement of shaft 2032 to effect the opening of the switch. These switches may be of the same construction as the switches shown in Patent No. 1,717,046, granted June 11, 1929, and illustrated therein in Figure 7. A torsion spring 2046 is arranged on shaft 2032 and at its ends is hooked on a finger 2047 extending from bearing 2040. A finger 2048 arranged on cam 2041 engages one or the other of the ends of the spring during rotative movement of shaft 2032, thereby causing this rotative movement to be effected against the force of the spring.

In operation, assume that the car is travelling in the up direction. The tapes, therefore, drive the sheaves 2000 and 2001 in such direction as to rotate the shaft 2002, and therefore pinion 2014, in a direction to cause the gear 2016 to move to the right on screw 2017. The screw is prevented from turning during the rotative movement of gear 2016 by spring 2046. As the car nears the upper terminal, clutch member 2020 engages clutch member 2024, causing rotative movement of the screw to take place. This rotative movement is transmitted through pinion 2027, intermediate gear 2028 and segmental gear 2031 to shaft 2032, resulting in counterclockwise rotative movement of this shaft as viewed in Figure 20. Cam 2041 is rotated by shaft 2032 and as a result the camming surface engages the operating roller for switch 421 to move the switch to open position. Further rotative movement causes the opening of switch 947 and thereafter the opening of switches 395 and 367 in the order named. For example, in an installation in which the car runs at 1,000 feet per minute, switch 421 would be positioned on its rack to be opened when the car is about 34 feet from the upper terminal, switch 947 when the car is about 15 feet from the upper terminal, switch 395 when the car is about 6 feet from the upper terminal, and switch 367 when the car is about 1 foot from the upper terminal.

Upon the car being started in the down direction from the upper terminal, the spring 2046, acting through the gears 2031, 2028 and 2027, returns the screw 2017 to its former position as opposite rotative movement of gear 2016 takes place. At the same time, cam 2041 is returned to neutral position, as illustrated in Figure 20, permitting the reclosing of the up switches of the terminal stopping device. Thereafter, gear 2016 travels to the left along screw 2017 until the car approaches the lower terminal. Upon the arrival of the car at a certain distance from such terminal, clutch member 2021 engages clutch member 2022. This causes rotative movement of the screw to take place in such direction as to rotate cam 2041 in a direction opposite to that obtained as the car approaches the upper terminal. The camming portion 2042 engages the operating rollers 2045 for switches 424, 951, 404 and 390 to effect the opening of these switches in the order named. The setting of these down switches corresponds to the setting of the up switches. Upon the car being started in the up direction from the lower terminal, the spring 2046 acts to return the cam 2041 to neutral, permitting the closing of the down switches of the terminal stopping device, and to return shaft 2017 to its former position as rotative movement of gear 2016 takes place.

The mechanism described is suitable for elevator installations in buildings of various heights and for different speeds of operation of the elevator cars. A certain number of revolutions of sheaves 2000 and 2001 is assumed for a complete trip in a building of a given height. For higher buildings of a given height, these sheaves are made of larger diameter to maintain the assumed number of revolutions the same. Similarly, for lower buildings of a given height, smaller-sized sheaves are used to obtain the assumed number of revolutions. For buildings of other heights, compensation may be made by shifting clutch member 2024 to the left on screw 2017, and locking it in its new position by nut 2026.

It is desirable that the switches of the terminal stopping device be opened quickly and for this reason, in case of slower operating speeds of the elevator car, the size of pinion 2027 is increased and the size of gear 2028 is decreased so as to obtain the desired speed of opening. The proper meshing of the gears may be maintained in case of change in gear size by the use of shims between hanger 2030 and bracket 2018.

As pointed out in the general discussion of the system in connection with Figure 1, the tape connected to the bottom of the car extends around a tension sheave in the bottom of the elevator hatchway. Referring to Figure 1, the tension sheave is mounted in a frame 2052. Guides (not shown) are provided for the frame for retaining it in a definite position in the hatchway. A switch 171 is positioned to be opened by cam 2053 provided on the frame 2052 in case of the dropping of the frame as a result of the breaking of either tape. As will be seen from later description, this causes the elevator car to be brought to an immediate stop.

Figure 22:
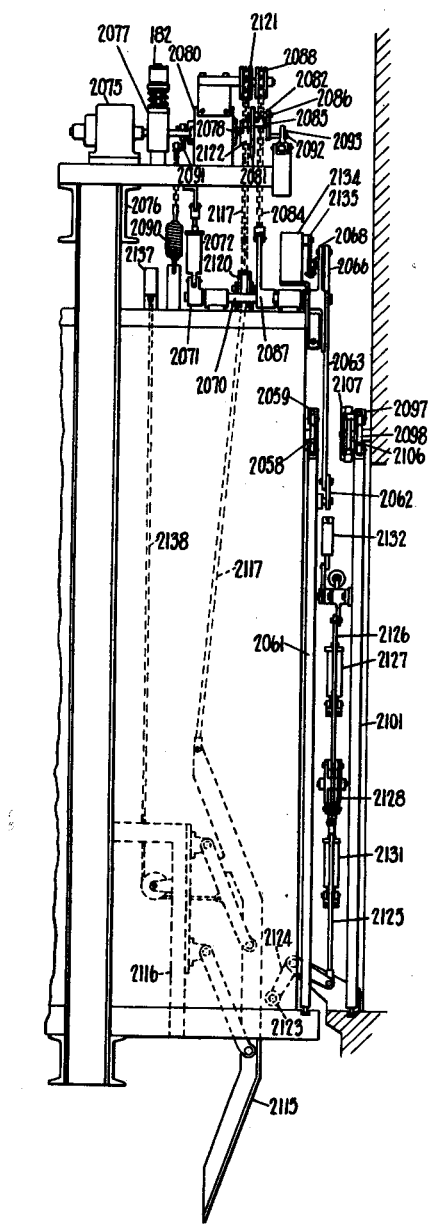
Figure 22 is an end view of the gate and its operating mechanism.
Figure 21:
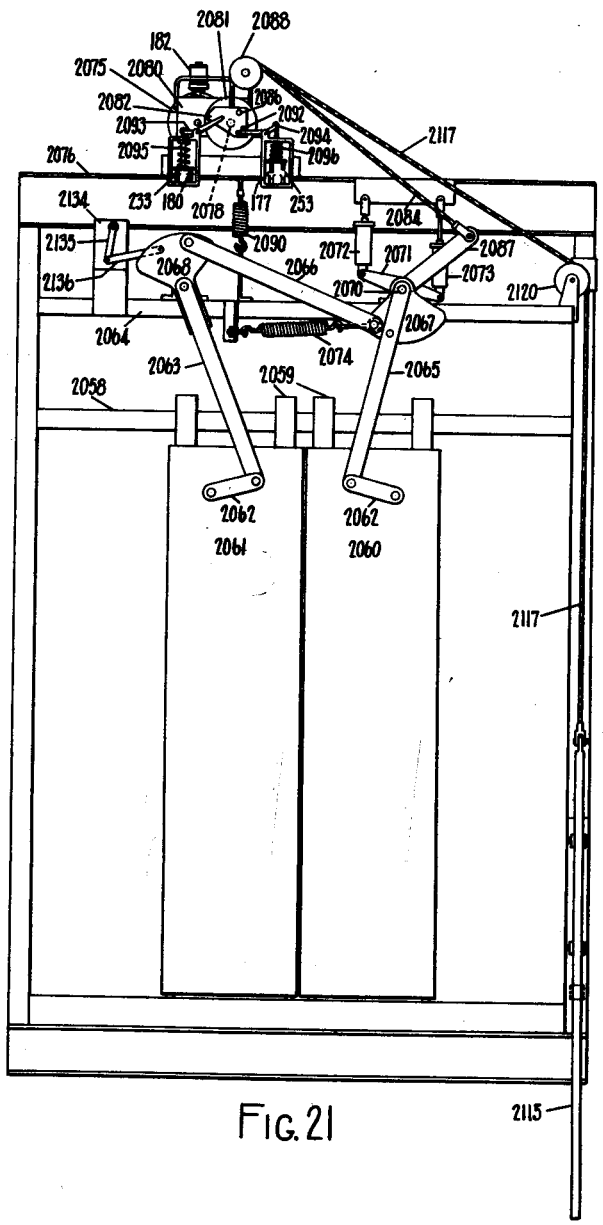
Figure 21 is a front view of a compartment gate and mechanism for operating the same.
Figure 23:
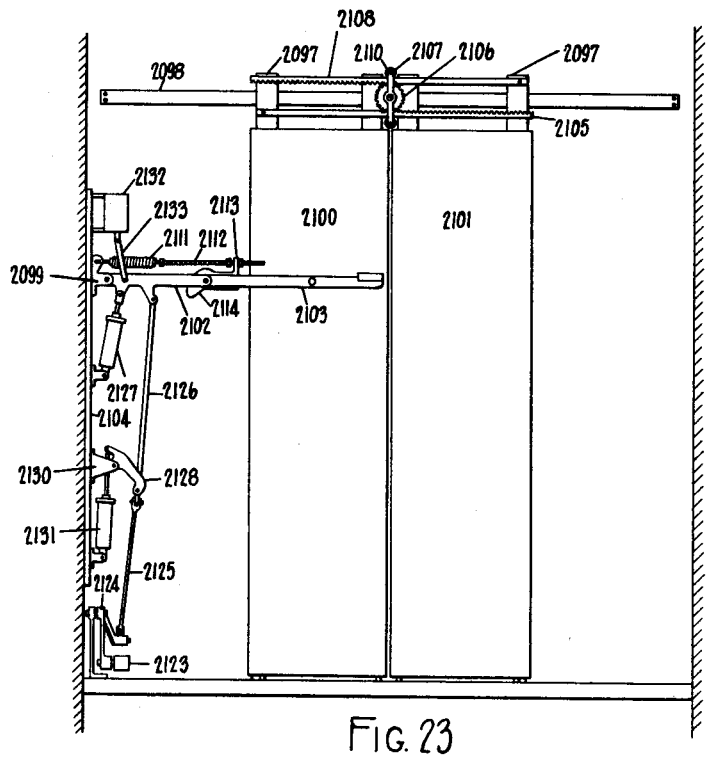
Figure 23 is a rear view of a hatchway door and its operating mechanism.

Referring to Figures 21, 22 and 23, suitable mechanism for operating the compartment gates and opposite hatchway doors is illustrated. This operating mechanism may be the same for each compartment so that the mechanism for only one compartment is illustrated. Door and gate operating mechanism for the top compartment is shown. Various details of construction are not illustrated, the mechanism being shown in somewhat simplified form, particularly in view of the fact that other forms of door and gate operating mechanisms may be employed if desired.

A center opening compartment gate has been illustrated, the two sections of the gate being designated 2060 and 2061. It is to be understood that other forms of gate may be employed than that illustrated. The sections are supported by hangers 2059 operating on track 2058. Each section is provided with an operating arm, connected thereto by a link 2062 as illustrated. The operating arm 2063 for section 2061 is pivotally mounted on the framework 2064. Similarly, the operating arm 2065 for section 2060 is pivotally mounted on framework 2064. The operating arms are joined by a link 2066. The link is connected to segments 2067 and 2068 joined to the arms. Shaft 2070, to which arm 2065 is secured, extends rearwardly and has a lever 2071 operatively secured thereto for operating checks 2072 and 2073.

The gate is moved to closed position by a spring 2074 fixed at one end to framework 2064 and connected at its other end to segment 2067. The gate is moved to open position by a motor 2075 mounted on crosshead 2076. The motor is provided with an electromagnetic brake 2077 having a release coil 182. The motor operates a shaft 2078 through reduction gearing, provided in casing 2080. A disc 2081 is mounted on this shaft for rotative movement thereby. A plate 2082 is secured to this disc in spaced relation thereto as by bolts. A chain 2084 is anchored to a spacing block 2085 secured between the disc and plate. The other end of the chain is secured to a lever arm 2087 secured to shaft 2070. The chain passes over an idler pulley 2088 supported by an extension from casing 2080. A spring 2090 is secured at one end to framework 2064 and at its other end to a crank 2091 connected for rotative movement with shaft 2078.

Limit switches 233, 180, 253 and 177 are arranged for operation by pin 2092 extending from plate 2082. Operation of switches 233 and 180 is effected by the engagement of the pin with switch operating lever 2093, while the operation of switches 253 and 177 is effected by the engagement of the pin with switch operating lever 2094. The switches and their manner of connection to these operating levers are illustrated schematically, as any suitable arrangement may be employed. A spring 2095 biases lever 2093 counterclockwise about its pivot, while a spring 2096 biases lever 2094 clockwise about its pivot.

In operation, with the gate in closed position, it may be opened by releasing brake 2077 and supplying power to motor 2075 in a direction to cause counterclockwise rotative movement of shaft 2078. This causes chain 2084 to engage securing bolt 2086, thus forming a crank. Continued rotative movement causes the chain to pull crank 2087 counterclockwise. The resultant rotative movement of shaft 2070 causes movement of arm 2065 and, through link 2066, arm 2063 in directions to open the gate.

As this rotative movement of shaft 2078 takes place, pin 2092 permits spring 2096 to move lever 2094 clockwise to effect the closing of limit switch 177 and thereafter the closing of limit switch 253. As the sections of the gate near open position, pin 2092 engages lever 2093 to move it clockwise against the force of its biasing spring 2095. This results in the opening of limit switch 180 and thereafter the opening of limit switch 233. The opening of limit switch 233 causes deenergization of the motor 2075 and the application of the brake, causing the gate to be brought to a stop and thereafter held in open position. As the gate is moved to open position, springs 2074 and 2090 are placed under tension.

To close the gate, the brake 2077 is released and power is supplied to motor 2075 in the opposite direction to cause clockwise rotative movement of shaft 2078. As pin 2092 moves clockwise, spring 2095 causes the closing of limit switch 233 and thereafter the closing of limit switch 180. The closing of switch 180 effects the deenergization of the motor. The brake 2077, however, is maintained released, permitting the motor to be returned to its former position by spring 2090. As the initial reverse rotative movement of the motor takes place, a slight slack is created in chain 2084, permitting the gate sections to be returned to closed positions by spring 2074. Just before the gate is closed, limit switch 253 is opened by the engagement of pin 2092 with lever 2094 and thereafter limit switch 177 is opened. The opening of switch 177 causes the brake to be applied, bringing the gate to a stop. The purpose of the other limit switches will be set forth in the description of operation of the system. The checks 2072 and 2073 act to cushion the final opening and closing movements of the gate.

This mechanism is also utilized to effect the operation of the hatchway door for the landing at which the car is stopped, the arrangement for one of the hatchway doors being illustrated in Figure 23. A center opening hatchway door has been shown, the two sections of the door being designated 2100 and 2101. The sections are supported by hangers 2097 operating on track 2098. Section 2100 is arranged to be operated by toggle arms 2102 and 2103, arm 2102 being pivotally mounted on a bracket 2099 secured to a plate 2104 fixed to the hatchway wall. Lever 2103 is pivotally connected to the door section. The section 2100 is provided with a rack 2105 which meshes with a pinion 2106 pivoted to a support 2107 secured to the track 2098. Also meshing with this pinion is another rack 2108 secured to door section 2101. These racks are maintained in meshing relation with the pinion by means of rollers 2110 pivoted to support 2107.

The door is moved to closed position by a spring 2111 anchored at one end to bracket 2099 and adjustably connected through a chain 2112 to a bracket 2113 secured to toggle arm 2103. A cam 2114 is provided on the bracket 2113 for engaging the chain 2112 during the door-opening movement.

The door is moved to open position by the motor 2075 on the car through the intermediary of the retiring cam 2115 pivoted to side frame work 2116. This cam is biased by its own weight to retired position and is connected to the motor to be extended thereby by a chain 2117. The chain passes over an idler pulley 2120 secured to the car framework and over another idler pulley 2121 mounted on reduction gearing casing 2080 along with idler pulley 2088. The end of the chain is anchored to a cam 2122 secured to the inner face of disc 2081. The cam 2115, when moved to extended position, engages a roller 2123 mounted on one arm of a bell crank lever 2124 pivotally mounted in the hatchway. This lever is joined to toggle arm 2102 by links 2125 and 2126. Owing to the fact that the movement of cam 2115 is transverse to the movement of the hatchway door, link 2125 is joined to bell crank lever 2124 and link 2126 by universal joints.

Toggle arm 2102 is connected to the piston rod of a door closing check 2127, the cylinder of this check being pivotally connected by means of a bracket to plate 2104. A lever 2128 is pivotally supported by a bracket 2130 secured to plate 2104. One end of this lever is connected to link 2126, while the other end is connected to the piston rod of the door opening check 2131. The cylinder of this check is pivotally supported by a bracket secured to plate 2104.

With the door in closed position, upon energization of motor 2075 to cause opening of the compartment gate, chain 2117 engages with the camming surface of cam 2122 to provide a crank action. This causes the cam 2115 to be extended into engagement with the roller 2123, causing movement of bell crank 2124 in a direction to push links 2125 and 2126 upwardly. This causes upward movement of toggle arm 2102 about its pivot, first breaking the toggle and thereafter, as continued movement takes place, moving door section 2100 to open position. At the same time, door section 2101 is moved to open position through the intermediary of the racks 2105 and 2108 and pinion 2106. As the opening movement of the door takes place, cam 2114 engages chain 2112, causing spring 2111 to be placed under tension. The final opening movement of the door is retarded by check 2131.

Upon the closing of the compartment gate being effected, cam 2115 is permitted to drop into retired position. As this takes place, spring 2111 acts through the toggle arms to return door section 2100 and, through the racks and pinion, door section 2101 to closed positions. The final closing movement of the door is retarded by check 2127.

Door contacts are arranged within the casing 2132 secured to the plate 2104. As any suitable form of door contacts may be employed, no details are illustrated. The door contacts are caused to open as the door is moved to open position by a link 2133 connected to toggle arm 2102. Contacts are also provided for operation by the compartment gate. These contacts are arranged within casing 2134 supported by framework 2064. It is preferred to provide two pairs of gate contacts. As any suitable form of gate contacts may be utilized, no details are illustrated. The gate contacts are caused to open as the gate is moved to open position by a crank 2135 connected to segment 2068 by a link 2136. Additional contacts are provided in casing 2137 secured to framework 2064. These contacts are operably connected to cam 2115 by a flexible member 2138 and are caused to be separated whenever the cam is out of retired position.

Reference may now be had to Figures 24, 25 and 26, which illustrate the details of a suitable form of floor relay. The floor relays are identical in construction, one being provided for each hall push button. These relays are mounted on the relay panel 2139, illustrated in Figure 24. Thirty-two relays are illustrated on this panel, which would be suitable for up and down floor relays for sixteen intermediate floors. Floor relays for more floors would be arranged on a separate panel section, similar to the one illustrated.

The relay comprises two pairs of contacts, the stationary contacts being designated 2140 and 2141 and the movable contacts being designated 2142 and 2143. The stationary contacts are of the same construction and are mounted on the panel, being secured thereto by binding nuts on the contact stems. The movable contacts also are of the same construction and only one of them, namely, contact 2142, will be described. A contact arm 2144 is pivotally mounted on a pin extending between the sides of the bracket 2145 secured to the panel. A pin 2146 is held by bracket 2145 and extends through an aperture in arm 2144. The pin is provided with a cotter pin on its outer end to limit the outer movement of the contact arm. Above the pin, arm 2144 is formed with an inclined portion 2147, above which the arm terminates in a hook 2148. The movable contact 2142, which is a blade, is provided with a slot 2150 through which the horizontal portion of the hook 2148 extends. Pin 2146 also extends through an aperture provided in the blade 2142 and a spring 2151 is arranged on the pin, biasing the contact blade to disengaged position.

A pair of rollers 2152 and 2149 are provided for moving the movable contacts to engaged position. These rollers are arranged on the inner end of armature 2153 for cooperation with the contact arm 2144. The armature is channel-shaped, and the roller pin 2154 for the rollers extends through the legs of the channel. The armature is fulcrumed on a stand 2155 supported by magnet frame 2156. This frame is secured to the panel as by screws 2157. The frame extends outwardly from the panel and, in addition to supporting the stand 2155, supports the magnets 2158 and 2160. Magnet 2158 is for causing engagement of the contacts and may be termed the operating magnet, while magnet 2160 is for effecting the disengagement of the contacts, and may be termed the reset magnet. The outer end of the armature is provided with a weight 2161, secured thereto by pins, preferably of non-magnetic material. The middle one 2162 of these pins acts as a stop for the armature in its contact engaging position, while a similarly arranged pin 2163 acts as a stop for the armature in its reset position, apertures being provided in the armature through which the magnet cores extend.

In operation, it will be assumed that the various parts of the relay are in the positions illustrated. Upon the pushing of the hall button for which the floor relay is provided, magnet 2158 is energized. As a result, the outer end of the armature is attracted and rocks the armature clockwise about its fulcrum. During this movement, rollers 2152 and 2149 roll up the inclined portions 2147 of their respective contact arms, moving the contact blades 2142 and 2143 into engagement with their respective stationary contacts. Pin 2162 brings the armature to a stop at or slightly beyond dead center point, thus latching the contact blades in engaged positions. The contacts therefore remain in engagement after a release of the hall button to deenergize magnet 2158.

Upon the reset magnet 2160 being energized, the inner end of the armature is attracted and the armature is rocked counterclockwise about its fulcrum. During this movement, springs 2151 act to move the contact blades away from their stationary contacts. The contact blades are brought to rest by the engagement of the contact arms with the cotter pins in the ends of pins 2146, while the armature is brought to rest by the engagement of pin 2163 with the top of the core for the magnet 2160.

It is to be understood that other types of floor relays may be provided, for example relays which are maintained operated by holding circuits. The floor relays on the relay panel are illustrated in outline in Figure 24. No reference characters are applied to the parts of these relays. Neither are reference characters applied to the relays as a whole, inasmuch as floor relays for sixteen floors are illustrated, whereas, to avoid complication, only a ten floor installation is illustrated in the wiring diagrams. 2164 represents fuses employed in the system.

Figure 29:
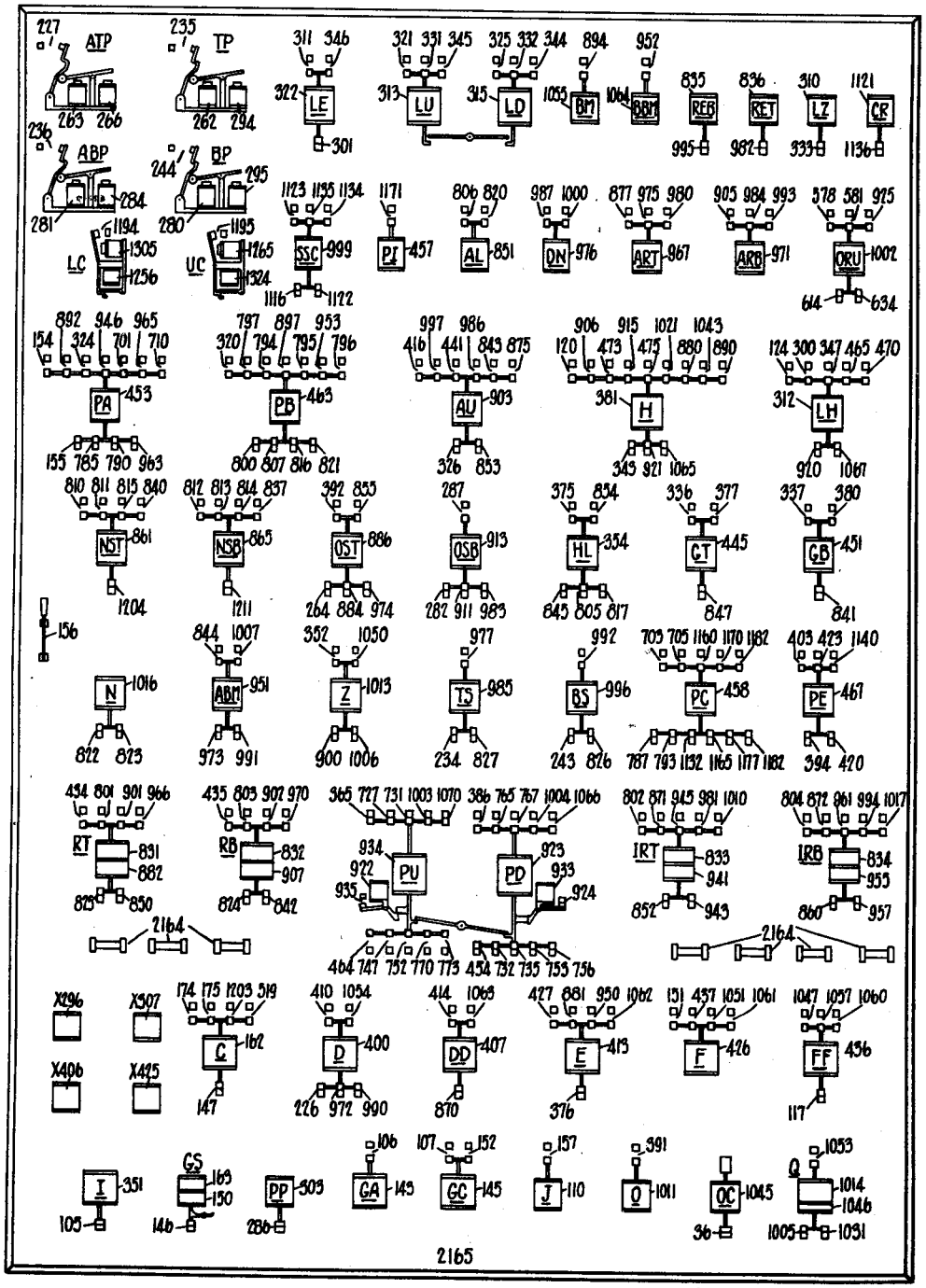
Figure 29 is a diagrammatic representation of a control panel for the hoisting motor, showing the relationship of the coils and contacts of the various switches mounted thereon.

The electromagnetic control and power switches are arranged on additional panels illustrated in Figures 27, 28 and 29. The switches arranged on the panel 2165, shown in Figure 29, are principally for controlling the operation of the motor for raising and lowering the elevator car. The switches mounted on the panel 2166, shown in Figure 27, are principally for controlling the operation of the motor generator set employed to supply current to the elevator hoisting motor. The switches mounted on panel 2167, shown in Figure 28, are for controlling the operation of the mechanisms for effecting the operation of the doors and gates.

In addition to the electromagnetic switches on these panels, manually operable knife switches are provided, which will be referred to later. Also, further fuses 2164 are provided on these panels. The fuses are not shown in the wiring diagrams inasmuch as it is understood that fuses may be employed wherever desirable. In addition, inductances for controlling the timing of certain of the controlling switches are provided on these panels. Two additional control switches are provided on relay panel 2139. The various electromagnetic switches are shown schematically in these figures, inasmuch as it is only intended that these figures serve to aid in the understanding of the description of the wiring diagrams which follow.

Reference may now be had to Figures 30a, b, c and d, 31 and 32 which illustrate diagrammatically the various control and power circuits. No attempt is made in these figures to show the coils and contacts of the switches in their associated positions, "straight" diagrams being employed, wherein the coils and contacts of the various switches are separated in such manner as to render the circuits involved relatively simple. The relation of the coils and the contacts may be seen upon reference to Figures 24, 27, 28 and 29.

Figures 30a, b, c and d and Figure 32 constitute a wiring diagram of the control system for one elevator. Figure 30c shows the slow-down initiating and signal circuits for that elevator. Figure 31 illustrates the slow-down initiating and signal circuits for a second elevator, it being understood that the second elevator is provided with additional control and power circuits which may be identical with those illustrated in Figures 30a, b and d and Figure 32. The slow-down initiating and signal circuits are illustrated for only ten floors.

Any suitable form of power supply may be provided for the elevator motor. One of the preferred arrangements, as previously pointed out, is to employ a direct current elevator motor and to cause current to be supplied to the motor at a variable voltage, as from a driven generator in accordance with Ward-Leonard principles. Such arrangement has been illustrated. The driving motor for the motor generator set is illustrated as a polyphase squirrel cage induction motor. The supply mains for the driving motor are designated I, II, and III. The rotor of the driving motor is designated 95 and the stator phase windings are designated 70, 72 and 76. The armature of the supply generator, driven by the rotor 95, is designated 1024, its separately excited field winding being designated 1023, its series field winding 1012 and its interpole field winding 1044. The armature of the elevator motor is designated 1027, and its separately excited field winding is designated 116.

With the arrangement illustrated, an exciter driven by the driving motor is employed to supply current to the separately excited field windings of the supply generator and the elevator motor and to the coils of various electromagnetic switches. The armature of the exciter is designated 97, its shunt field winding 101 and its series field winding 98. A resistance 96 is provided for regulating the voltage.

Discharge resistances 121 and 1022 are provided for the separately excited field windings 116 and 1023 of the elevator motor and generator respectively. A resistance 1025 is arranged in shunt to generator series field winding 1012. A resistance, arranged in steps 1032, 1033, 1034, 1035, 1036, 1037, 1040, 1041 and 1042, is provided for controlling the strength of the generator separately excited field, and therefore the voltage applied to the elevator motor armature. A resistance, arranged in steps 111, 112, 113, 114 and 115, is provided in series with the elevator motor field winding 116. 472 is the release coil for the elevator electromagnetic brake. This coil is provided with a discharge resistance designated 474. It is also provided with cooling resistance 471. Reference to the various safety and emergency switches and door and gate contacts employed may be had in connection with the description of the various circuits in the operation of the system.

The electromagnetic switches have been designated as follows:

ABM—First auxiliary brush magnet relay.
ABP—Bottom compartment auxiliary door operating relay.
AL—Advance light relay.
ARB—Bottom compartment auxiliary slow-down switch.
ART—Top compartment auxiliary slow-down switch.
ATP—Top compartment auxiliary door operating relay.
AU—Auxiliary retarding relay.
BBC—Bottom compartment brake and cut-off relay.
BBM—Second auxiliary brush magnet relay.
BDC—Bottom compartment door closing switch.
BDO—Bottom compartment door opening switch.
BM—Brush magnet relay.
BOD—Bottom compartment overload relay.
BP—Bottom compartment door operating relay.
BRR—Bottom compartment reverse relay.
BS—Bottom compartment selective relay.
C—Potential switch.
CR—Change-over relay.
D—First speed switch.
DC—Double compartment switch.
DD—Second speed switch.
DN—Door non-interference relay.

E—Third speed switch.
F—Fourth speed switch.
FF—Fifth speed switch.
GA—First governor relay.
GB—Bottom compartment door contact relay.
GC—Second governor relay.
GS—Protective sequence relay.
GT—Top compartment door contact relay.
H—Main brake and field switch.
HL—Hall light relay.
I—Field switch.
IRB—Bottom compartment secondary slow-down switch.
IRT—Top compartment secondary slow-down switch.
J—Minimum current field relay.
K—Resistance cut-out switch.
KR—Running relay.
L—Line switch.
LC—Lower commutator switch.
LD—Down levelling direction switch.
LE—Levelling fast speed switch.
LH—Levelling brake and field switch.
LL—Line switch relay.
LU—Up levelling direction switch.
LZ—Levelling slow-down relay.
M—Idling switch.
MM—Idling switch relay.
N—Non-interference relay.
NSB—Bottom compartment non-stop relay.
NST—Top compartment non-stop relay.
O—Safety handle relay.
OA, OB, OC—Overload relays.
ORU—Upper reversal relay.
OSB—Bottom compartment starting switch sequence relay.
OST—Top compartment starting switch sequence relay.
PA, PB, PC, PE, PF—Auxiliary direction switches.
PD—Down direction switch.
PI—Position indicator switch.
PM—Protective relay.
PP—Auxiliary door opening relay.
PU—Up direction switch.
Q—Load magnet.
RB—Bottom compartment slow-down switch.
RT—Top compartment slow-down switch.
REB—Bottom compartment reset relay.
RET—Top compartment reset relay.
RM—Resistance relay.
SC—Single compartment switch.
SSC—Special single compartment switch.
TBC—Top compartment brake and cut-off relay.
TC—Top compartment switch.
TDC—Top compartment door closing switch.
TDO—Top compartment door opening switch.
TOD—Top compartment overload relay.
TRR—Top compartment reverse relay.
TP—Top compartment door operating relay.
TS—Top compartment selective relay.
UC—Upper commutator switch.
Y—Series field switch.
Z—Notch-back switch.

The letter X is employed to designate reactance coils.

Figure 30D:
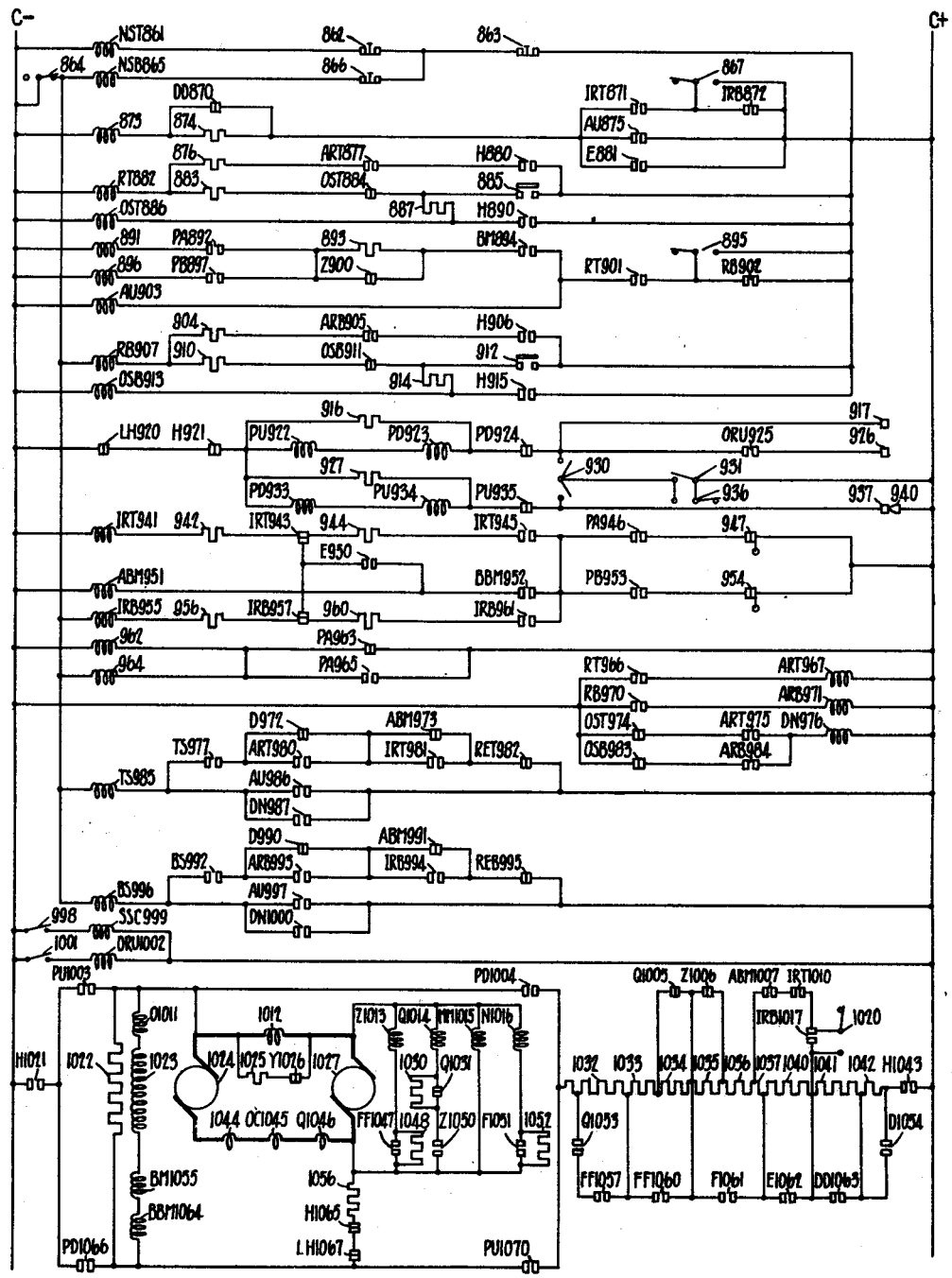

Throughout the description which follows, these letters, in addition to reference numerals, will be applied to parts of the above designated switches. For example, "contacts C174" indicates that the contacts are on the potential switch C, while "operating coil L30" indicates that the coil operates the line switch L. The numerals employed are arranged in sequence, the lowest number, 30, appearing in the upper left hand corner of Figure 30a, with the succeeding numbers following in numerical sequence from left to right downwardly on the sheet of drawings. The circuits in Figure 30a are joined to the circuits in Figure 30b as indicated by the continuance of wires C— and C+, and the numbers continue in Figure 30b in the same sequence. The same is true of Figure 30c, Figure 30d and Figure 32. The arrangement of numerals in this sequence facilitates the location of any element referred to in the description. All electromagnetic switches are illustrated in deenergized position. All latching switches are illustrated in reset condition.

Certain switches are provided, particularly for the top compartment, while certain others are provided particularly for the bottom compartment. These switches are designated by two or more letters, those for the top compartment containing the letter T and those for the bottom compartment containing the letter B. This will be clear from the above tabulation of switches.

The operation of the control system illustrated will now be described. It will be assumed that the car is stationed at the lower terminal, that is, with the bottom compartment at the first level and the top compartment at the second level. Assume further that the motor generator set is not in operation.

The motor generator set may be started by the motor generator starting switch in the top compartment or by the motor generator starting switch in the bottom compartment. These switches are turned in a clockwise direction to effect the starting operation.

Assume that the motor generator starting switch in the top compartment is turned to its start position. This results in the engagement of contacts 62 and 64 by bridging contacts 63, connecting the actuating coil LL74 of the line switch relay to power mains II and III through thermal cut-outs 32 and 33, contacts OA34, OB35 and OC36 of the overload relays, knife switch 37, idling switch contacts M60 and contacts K61 of the resistance cut-out switch. This relay operates to cause the engagement of its contacts LL96, LL102 and LL31. Contacts LL196 are arranged in certain of the signal and controlling circuits and their purpose will be described later. Contacts LL102 connect the actuating coil KR103 of the running relay to the exciter armature. Contacts LL31 connect the actuating coil L30 of the line switch across the mains I and II.

The line switch L, operating as a result of the energization of its actuating coil L30, causes the separation of its contacts L104 and the engagement of its contacts L46, L51, L57 and L170. The separation of contacts L104 removes the short circuit from around coil J110 of the minimum current field relay. The engagement of contacts L170 prepares the circuit for the actuating coil C162 of the potential switch. The engagement of contacts L46, L51 and L57 connects the driving motor stator phase windings 70, 72 and 76 to power mains I, II and III respectively. It is to be noted that the stator phase windings are connected in star relation. Resistances 92, 93 and 94, included in circuit with the respective phase windings, serve to reduce the current to the desired value. Contacts L57 also complete the circuit for the actuating coil PM77 of the protective relay. The protective relay operates to engage its contacts PM81 to prepare a holding circuit for coil LL74.

The stator windings of the driving motor being energized, this motor starts in operation. The rotor 95 drives the generator armature 1024 and the exciter armature 97. The E. M. F. of the exciter builds up as the driving motor's speed increases. Upon a predetermined value of exciter E. M. F. being attained, the running relay KR operates to engage its contacts KR44 and KR80. Contacts KR80, upon engagement, complete the holding circuit for coil LL74, this circuit extending through contacts 82, 84 and bridging contacts 83 of the top compartment motor generator starting switch, and contacts 85, 87 and bridging contacts 86 of the bottom compartment motor generator starting switch in series relation. Contacts KR44, upon engagement, connect running lamps 45 and 54 across the secondary winding 42 of a lighting transformer, the primary winding 40 of this transformer being connected across power mains II and III.

Lamp 45 is arranged in the top compartment and lamp 54 is arranged in the bottom compartment, being positioned so as to be readily visible to the attendants of the respective compartments. The lighting of lamp 45 in the top compartment indicates that the motor generator set is in operation. Thus, with the lamp lighted, the motor generator starting switch may be released, this switch, as well as the motor generator starting switch in the bottom compartment, being biased to off positions, i. e., the positions illustrated, as by springs (not shown). It is to be noted that contacts 82, 84 and 85, 87 of the starting switches are bridged when these switches are in off positions. Thus, the holding circuit for coil LL74 remains completed after release of the motor generator starting switch in the top compartment.

The starting of the motor generator set by the motor generator starting switch in the bottom compartment is accomplished in a similar manner, clockwise turning of this switch causing contacts 65, 67 to be bridged by bridging contacts 66. Contacts 65, 67 are arranged in parallel relation with contacts 62, 64 of the motor generator starting switch in the top compartment.

A similar motor generator starting switch may be provided on the dispatcher's panel, if desired, to permit the starting of the motor generator set from the dispatcher's panel. Also, a running lamp may be provided on the panel to advise when the motor generator set is in operation.

The E. M. F. of the exciter builds up to its full value as the driving motor comes up to full speed. As stated previously, the exciter supplies current to the field winding 116 of the elevator motor. According to the preferred arrangement, however, with the motor generator set running but with the elevator motor at rest, this current is reduced, providing what may be termed a "standing field". Resistance 115 is employed for this purpose.

As previously explained, contacts L104 separate to remove the short circuit for coil J110 of the minimum current field relay upon the connection of the driving motor to the power mains, coil J110 being connected in series relation with the elevator motor field winding 116. This relay, however, does not operate immediately, its operation being delayed owing to the fact that the time constant of the elevator motor field winding delays the building up of the current supplied to coil J110.

As soon as the elevator motor field builds up to substantially "standing field" value, relay J operates to cause the engagement of contacts J157, completing the circuit for coil C162 of the potential switch. This circuit is through knife switch 156, protective sequence relay contacts GS146, potential switch contacts C147, protective sequence relay coil GS163, governor operated switches 153, 166 and 167, line switch contacts L170, broken tape switch 171, and blades 172 and 173 of the safety switches. Contacts J157 also complete a parallel circuit for another coil GS150 of the protective sequence relay. The two coils of this relay are wound in opposition so that their simultaneous energization by contacts J157 does not cause the operation of this relay. The purpose of the relay will be explained later.

It is to be noted that with the above arrangement of circuits, the potential switch actuating coil cannot be energized and therefore the potential switch cannot operate until the elevator motor field has built up to substantially full "standing field" value. This prevents starting the elevator motor on a weak field.

The potential switch, upon operation, engages its contacts C174 and C175 in the feed lines from the exciter to the control and field circuits. The potential switch also causes the engagement of contacts C1203 and C519 and the separation of contacts C147. Contacts C147 act to insert cooling resistance 161 in the circuit with the potential switch coil C162. Contacts C1203 are arranged in a circuit common to the top and bottom compartment non-stop lights on the dispatcher's panel. Contacts C519 are arranged in a circuit common to the hall lanterns.

With the car at the lower terminal, the up direction switch PU is latched in operated condition and the down direction switch PD is in reset condition. With the up direction switch in operated condition, its contacts PU1003, PU1070, PU365, PU727 and PU731 are in engagement and its contacts PU770, PU773, PU747, PU752 and PU464 are separated. With the down direction switch in reset condition, its contacts PD1004, PD1066, PD386, PD765 and PD767 are separated and its contacts PD732, PD735, PD753, PD756 and PD454 are in engagement. The direction switches are also provided with latch contacts PU935 and PD924. Under the conditions assumed, contacts PD924 are in engagement and contacts PU935 are separated.

Owing to the fact that contacts PD454 of the down direction switch are in engagement when the car is at the lower terminal, circuits are completed for the actuating coils PA453 and PC458 of the auxiliary direction switches PA and PC upon the engagement of potential switch contacts C174 and C175. Switch PA, upon operation, engages its contacts PA946, PA701, PA710, PA965, PA154, PA324 and PA892 and separates its contacts PA790, PA963, PA785 and PA155. Switch PC, upon operation, engages its contacts PC703 and PC705 and separates its contacts PC787 and PC793.

The engagement of potential switch contacts C174 and C175, together with the engagement of auxiliary direction switch contacts PA965 effects the energization of the car button magnet coils 962 and 964 in the top compartment and the bottom compartment, respectively.

The engagement of potential switch contacts C174 and C175 also completes the circuits for the actuating coils NST861 and NSB865 for the top compartment non-stop relay and bottom compartment non-stop relay, respectively. Top compartment non-stop relay NST, upon operation, engages its contacts NST810, NST811, NST815 and NST840 and separates its contacts NST1204. Bottom compartment non-stop relay NSB, upon operation, engages its contacts NSB812, NSB813, NSB814 and NSB837 and separates its contacts NST1211. The purpose of the various contacts of the non-stop relays will be explained later in the description.

The motor generator set runs idle until the car is started. During the idling period, the phase windings of the driving motor are connected in star relation with the mains so that the magnetizing current is small and the power factor is high. Condensers (not shown) may be connected across the mains to bring the power factor to the desired value under these conditions. Owing to the fact that the magnetizing current is small when the driving motor phase windings are connected in star relation, these condensers are but a fraction of the size that would be required to bring the power factor to the same value were the phase windings of the driving motor connected in delta.

The car is started by moving the starting switch in the top compartment and the starting switch in the bottom compartment to full start position. Each of these starting switches has an intermediate position for effecting certain control operations and for effecting the closing of the compartment gate and the hatchway door for the floor opposite that compartment. Each of these switches may be operated in its steps or may be thrown immediately to full start position. For convenience of description, it will be assumed that the starting switches are operated in steps.

Movement of the starting switch in the top compartment to its intermediate position causes the bridging of contacts 261 and 885. The purpose of contacts 885 will be described later. The bridging of contacts 261 completes the circuit for the coil TDC251 of the top compartment door closing switch. This switch engages its contacts TDC181 to effect the energization of the release coil 182 of the brake for the top compartment door operating motor. It also engages its contacts TDC186 and TDC201 to complete the circuit for the armature 195 of the top compartment door operating motor, the switch operating at the same time to separate its contacts TDC200 to disconnect dynamic brake resistance 194 from across motor armature 195. Coil TRR257 of the top compartment reverse relay is energized simultaneously with coil TDC251. The purpose of this relay will be explained later.

The bridging of top compartment starting switch contacts 261 also completes the circuit for the coils TP262 and ATP263 of the top compartment door operating relay TP and top compartment auxiliary door operating relay ATP. Relays TP and ATP are both latching relays, each being provided with an operating coil and a reset coil. Coils TP262 and ATP 263 are the reset coils of these relays and act, upon energization, to cause their respective relays to be reset. The reset of relays TP and ATP causes the contacts of these relays, TP235 and ATP227, respectively, to be separated. These contacts are arranged in parallel relation in the circuit for coil TDO232 of the top compartment door opening switch.

The field winding 185 of the top compartment door operating motor having previously been energized as a result of the engagement of potential switch contacts C174 and C175 the completion of the circuit for the top compartment door operating motor armature through its series field winding 193 causes operation of the motor in a direction to permit movement of the top compartment gate and opposite hatchway door toward closed positions.

Upon movement of the door operating mechanism a certain distance, door open limit switch 233 in circuit with top compartment door opening switch coil TDO232 is closed. The circuit for coil TDO232 is not completed, however, as contacts TP235 and contacts ATP227 of the top compartment door operating relays are separated.

Upon further movement of the door operating mechanism, door open limit switch 180 is closed, completing a circuit for the coil TBC176 of the top compartment brake and cut-off relay. This relay engages its contacts TBC183 to by-pass contacts TDC181 in circuit with the release coil 182 for the brake for the top compartment door operating motor. It also engages its contacts TBC246 to short-circuit coil TDC251 of the top compartment door closing switch. This causes the top compartment door closing switch to return to open condition, separating its contacts TDC181, TDC186 and TDC201 and reengaging its contacts TDC200.

The brake release coil 182 is not deenergized as the result of the separation of contacts TDC181 its circuit being maintained through contacts TBC183. The separation of contacts TDC186 and TDC201, however, disconnects the armature 195 of the top compartment door operating motor from across the exciter armature.

The energization of the door operating motor for the initial part of the door and gate closing operation serves as an electrical kickoff. A slight slack is initially produced in the chains, permitting the door and gate closing springs to start movement of the compartment gate and opposite hatchway door to closed positions. The door operating mechanism is returned to door closed position by its return spring. The door operating motor acts as a brake to limit the closing speed of the gate and door owing to the dynamic brake resistance 194 being reconnected across motor armature 195 by contacts TDC200 of the top compartment door closing switch.

As the door and gate near closed position, door close limit switch 253 opens, breaking the circuit for coil TRR257 of the top compartment reverse relay. Just before the end of the door and gate closing operation, door close limit switch 177 opens, deenergizing coil TBC176 of the top compartment brake and cut-off relay. This relay separates its contacts TBC183 to deenergize release coil 182 of the brake for the top compartment door operating mechanism, causing this mechanism to be brought to a stop. The door and gate are brought to a stop as they reach closed position by their checks, as previously described.

If the attendant in the top compartment, after he has effected the closing of the door and gate, desires to open the door and gate, or if he desires to arrest the movement of the door and gate in closing, he may do so by moving the starting switch back through off position to door opening position. Assume that the top compartment gate and opposite hatchway door are closed and that the top compartment attendant moves his starting switch to door open position. The starting switch contacts 265 are bridged in this position of the starting switch, completing a circuit for the operating coil ATP266 of the top compartment auxiliary door operating relay. Relay ATP operates to engage its contacts ATP227, completing the circuit for the actuating coil TDO232 of the top compartment door opening switch. Switch TDO engages its contacts TDO184 in circuit with brake release coil 182 to effect the release of the brake for the top compartment door operating motor. It also separates its contacts TDO187 and engages its contacts TDO190 and TDO191 in circuit for the armature 195 of the top compartment door operating motor, energizing the armature of this motor in a direction to effect the opening of the door and gate.

Upon movement of the door and gate a short distance in the opening direction, limit switch 177 closes, completing the circuit for coil TBC176 of the top compartment brake and cut-off relay. This relay operates as before to establish an additional circuit for the brake release coil and to short-circuit coil TDC251. Upon further movement, limit switch 253 closes. No circuit is completed, however, as starting switch contacts 261 are not bridged.

Upon the door and gate nearing open position, limit switch 180 opens to deenergize coil TBC176. The resulting separation of contacts TBC183 does not effect deenergization of brake release coil 182, the circuit for this coil being maintained through contacts TDO184. Just before the door and gate reach open position, limit switch 233 opens, deenergizing coil TDO232 of the door opening switch. This switch returns to open condition, causing the application of the brake, the disconnection of top compartment door operating motor armature 195 from the exciter, and the reconnection of resistance 194 in shunt to the motor armature. This causes the door operating mechanism to be brought to a stop. It also causes the door and gate to be brought to a stop, assisted by their checks.

Assume that the top compartment gate and opposite hatchway door are closing and that the top compartment attendant moves his starting switch to door open position to halt the closing movement of the door and gate and cause them to be returned to open condition. The bridging of starting switch contacts 265 causes the operation of the door opening switch TDO. This switch energizes the door operating motor armature in a direction to effect the opening of the door and gate. Should the door and gate be in such position that both limit switches 177 and 180 are closed at the time that the starting switch is moved to door open position, relay TBC is in operated condition and maintains the brake released as the reversal of the door and gate is effected. Also, if limit switch 253 is closed, coil TRR257 of top compartment reverse relay is in energized condition at the time the reversal of the door and gate is effected. This relay, when energized, separates its contacts TRR196 in shunt to resistance 191 in the door opening circuit for the top compartment door operating motor armature 195. As the starting switch is moved from door close position to door open position, relay TRR is deenergized, the relay being delayed in dropping out, however, owing to reactance X260 and resistance 250. Thus resistance 191 is included momentarily in circuit with the motor armature as the reversal is effected, and prevents any shock to the door operating mechanism.

Similarly, if the door and gate are opening and it is desired to arrest their opening movement and return them to closed condition, this may be done by moving the starting switch from door open position to its intermediate or door close position. If the position of the door and gate at the time that such reversal is effected is such that limit switches 177 and 180 are both closed, relay TBC is in operated condition. Its contacts TBC246, therefore, are in engagement, short-circuiting coil TDC251 of the top compartment door closing switch. This eliminates utilizing the door operating motor for giving the initial impetus to the door closing operation under these conditions, permitting the whole of the door and gate closing operation to be performed by the springs. This avoids the possibility of slamming.

The controlling of the bottom compartment gate and opposite hatchway door is effected in a similar manner. Movement of the starting switch in the bottom compartment to its intermediate position causes the bridging of contacts 277 and 912. Contacts 912 will be referred to later along with top compartment starting switch contacts 885. The bridging of contacts 277 completes the circuit for the coil BDC271 of the bottom compartment door closing switch, for coil BRR275 of the bottom compartment reverse relay and for coils BP280 and ABP281 of the bottom compartment door operating relay BP and auxiliary door operating relay ABP. Relay BRR serves the same purpose as relay TRR as will be seen from later description. Switch BDC engages its contacts BDC205 to energize release coil 206 of the brake for the bottom compartment door operating motor. It also separates its contacts BDC224 and engages its contacts BDC212 and BDC225 in the circuit for the armature 221 of the bottom compartment door operating motor. Relays BP and ABP operate to effect the separation of their contacts BP244 and ABP236, respectively, in the circuit for coil BDO241 of the bottom compartment door opening switch. These relays, as in the case of relays TP and ATP, are latching relays.

The field winding 211 of the bottom compartment door operating motor having previously been energized as a result of the engagement of potential switch contacts C174 and C175, the completion of the circuit for bottom compartment door operating motor armature 221 through its series field winding 217 causes operation of this motor in a direction to permit movement of the bottom compartment gate and opposite hatchway door toward closed positions. As this movement occurs, first limit switch 242 and then limit switch 204 is closed. Limit switch 204 completes the circuit for coil BBC202 of the bottom compartment brake and cut-off relay. This relay engages its contacts BBC207 in circuit with brake release coil 206 and engages its contacts BBC261 in shunt to coil BDC271. The short-circuiting of coil BDC271 causes bottom compartment door closing switch to return to open condition. The brake release coil 206 is not deenergized as the result of the separation of contacts BDC205, its circuit being maintained through contacts BBC207. The separation of contacts BDC212 and BDC225 disconnects the armature 221 from the exciter and the remainder of the door and gate closing operation is effected by the springs as previously described. The door operating motor acts as a brake during the remaining portion of the closing operation as a result of dynamic brake resistance 220 being reconnected across armature 221 by contacts BDC224.

As the door and gate near closed position, limit switch 273 and thereafter limit switch 203 open. Limit switch 203 deenergizes coil BBC202 of the bottom compartment brake and cut-off relay. Relay BBC separates its contacts BBC207 to deenergize release coil 206 of the brake for the bottom compartment door operating mechanism, causing this mechanism to be brought to a stop. The door and gate are brought to a stop as they reach closed position by their checks.

The opening of the bottom compartment gate and opposite hatchway door is effected by movement of the bottom compartment starting switch to door open position. Upon movement of the switch to this position, contacts 283 are bridged, completing a circuit for the operating coil ABP284 of the bottom compartment auxiliary door operating relay. Relay ABP engages its contacts ABP236 to complete the circuit for coil BDO241 of the bottom compartment door opening switch. Switch BDO engages its contacts BDO210 in circuit with brake release coil 206 and engages its contacts BDO214 and BDO223 and separates its contacts BDO213 in the circuit for the armature 221 of the bottom compartment door operating motor. This causes operation of this motor in a direction to effect the opening of the door and gate.

Upon movement of the door and gate a short distance, limit switch 203 closes and thereafter limit switch 273 closes. Limit switch 203 causes the operation of relay BBC.

Upon the door and gate nearing open position, limit switch 204 opens to deenergize relay BBC and, just before the door and gate reach open position, limit switch 242 opens to deenergize door opening switch BDO. The door opening switch returns to open condition, causing the application of the brake, the disconnection of the bottom compartment door operating motor 221 from the exciter and the reconnection of resistance 220 across the motor armature 221. This causes the door operating mechanism to be brought to a stop. It also causes the door and gate to be brought to a stop, assisted by their checks.

In the event that the bottom compartment gate and opposite hatchway door are closing at the time that the starting switch is moved to door open position, if limit switches 203 and 204 are both closed at this time, relay BBC is in operated condition and maintains the brake released. Similarly, if limit switch 273 is closed, coil BRR275 of bottom compartment reverse relay is in energized condition at the time the reversal of the door and gate is effected. This relay, when energized, separates its contacts BRR222 in shunt to resistance 215 in the door opening circuit. As the starting switch is moved from door close to door open position, relay BRR is deenergized, the relay being delayed in dropping out by the effect of reactance X276 and resistance 270. This arrangement, as in the case of the similar arrangement for the top compartment, serves to prevent shock to the door operating mechanism as the reversal is effected.

Should the bottom compartment starting switch be moved to door close position while the door and gate are opening, relay BBC is in operated condition provided limit switches 203 and 204 are both closed, causing the reversal of the door and gate to be effected by the spring of the door operating mechanism without the initial impetus of the motor.

An overload relay is provided for each door operating motor. The coil TOD192 of the top compartment overload relay is arranged in the opening circuit for the top compartment door operating motor armature while the coil BOD216 of the bottom compartment overload relay is arranged in the opening circuit for the bottom compartment door operating motor armature. Relay TOD is provided with contacts TOD231 in circuit with coil TDO232 of the top compartment door opening switch. Similarly, relay BOD is provided with contacts BOD240 in circuit with coil BDO241 of the bottom compartment door opening switch. Thus, should an overload occur on either motor during its door opening operation, the corresponding overload relay contacts are separated to cause the opening of the motor armature circuit.

The door opening switches are provided with additional contacts TDO252 and BDO272, these contacts serving as electrical interlocks. The knife switches 230, 237, 247, 254, 268 and 274 are provided primarily to facilitate servicing.

Each of the compartment gates is preferably provided with two sets of gate contacts, as set forth in previous description, those for the top compartment being designated 363 and 446 and those for the bottom compartment being designated 364 and 455. The hatchway door contacts for the even numbered floors are arranged in series relation and are represented by a single set of contacts designated 447. These contacts, along with gate contacts 446, are arranged in circuit with the actuating coil GT445 of the door contact relay for the top compartment. Similarly, the hatchway door contacts for the odd numbered floors are arranged in series relation and are represented by a single set of contacts designated 456. These contacts along with gate contacts 455 are arranged in circuit with the actuating coil GB451 of the door contact relay for the bottom compartment.

Upon the closure of the top compartment gate and the hatchway door opposite thereto, the engagement of the door contacts and gate contacts causes the operation of the door contact relay GT for the top compartment. This relay engages its contacts GT377 in a circuit common to the actuating coils of various control switches for the elevator hoisting motor and engages its contacts GT336 in circuit with levelling emergency operating switches 334, 335. Relay GT also separates its contacts GT847 in the circuit for the pilot light 846 in the bottom compartment.

Upon the closure of the bottom compartment gate and hatchway door opposite thereto, the engagement of the door contacts and gate contacts causes the operation of the door contact relay GB for the bottom compartment. This relay engages its contacts GB380 which are arranged in series with contacts GT377, and engages its contacts GB337 which are arranged in series with contacts GT336. Relay GB also separates its contacts GB841 in the circuit for the pilot light 830 in the top compartment.

Contacts GT377 and GB380 are provided for insuring safety of operation. In this connection, it is to be noted that these contacts are arranged on the grounded side of the exciter in the circuit for the coil H381 of the brake and field switch while compartment gate contacts 363 and 364 are arranged on the other side of the exciter in the circuit for this coil. This arrangement affords protection against grounds and short circuits. The arrangement of contacts GT336 and GB337 in the circuit for manually operable switches 334 and 335 prevents operation of the car by these switches with a gate or door open.

The pilot lights 830 and 846 are for advising the compartment attendants as to the condition of the compartment gate, opposite hatchway door and starting lever of the other compartment. This will be explained in detail as the description proceeds.

As has previously been explained, movement of the starting switch in the top compartment to its intermediate position not only bridges contacts 261 to effect the closure of the compartment gate and opposite hatchway door but also bridges contacts 885. The bridging of contacts 885 completes a circuit for coil RT882 of the top compartment slow-down switch through resistance 883. This switch, upon operation, separates its contacts RT825 and RT850 and engages its contacts RT434, RT966, RT801 and RT901.

Contacts RT850 are in series relation with contacts GT847 in the circuit for bottom compartment pilot light 846. This pilot light is lighted when the car is stopped, the top compartment gate open and the top compartment starting lever in neutral, being connected to supply main I and to the neutral of the supply mains which is grounded. Thus, upon movement of the starting switch in the top compartment to its door close position, the pilot light 846 in the bottom compartment is extinguished, informing the bottom compartment attendant that the attendant in the top compartment is manipulating his starting switch preparatory to starting the car.

Top compartment slow-down switch contacts RT966 complete the circuit for top compartment auxiliary slow-down switch actuating coil ART967. Contacts RT901 are in circuit with auxiliary retarding relay actuating coil AU903. Contacts RT801 are in circuit with slow-down brushes 726 and 764 for the top compartment car buttons. Contacts RT434 are in circuit with the fifth speed switch actuating coil FF436. Contacts RT825 are in circuit with the coil RET836 of the top compartment reset relay.

Upon the bridging of switch contacts 912 of the bottom compartment starting switch, this occurring at the same time that contacts 277 are bridged as has been previously pointed out, a circuit is completed for coil RB907 of the bottom compartment slow-down switch through resistance 910. This switch, upon operation, separates its contacts RB842 and RB824 and engages its contacts RB970, RB902, RB803 and RB435.

Contacts RB842 are in series relation with contacts GB841 in the circuit for top compartment pilot light 830. This pilot light is lighted when the bottom compartment gate is open and the bottom compartment starting lever is in neutral, being connected to supply main I and to the neutral of the supply mains which is grounded. Thus, upon movement of the starting switch in the bottom compartment to its door close position, the pilot light 830 in the top compartment is extinguished, informing the top compartment attendant that the attendant in the bottom compartment is manipulating the starting switch preparatory to starting the car.

Bottom compartment slow-down switch contacts RB970 complete the circuit for bottom compartment auxiliary slow-down switch actuating coil ARB971.

Contacts RB902 are in series relation with contacts RT901 in the circuit for auxiliary retarding relay actuating coil AU903. The circuit for this coil is completed when both contacts RB902 and RT901 are in engagement.

Contacts RB803 are in circuit with slow-down brushes 730 and 766 for the bottom compartment car buttons. Contacts RB435 are in series relation with contacts RT434 in circuit with the fifth speed switch actuating coil FF436. Contacts RB824 are in circuit with the coil REB835 of the bottom compartment reset relay.

Auxiliary slow-down switch ART is primarily for the purpose of providing additional contacts for top compartment slow-down switch RT. Similarly, auxiliary slow-down switch ARB is primarily for the purpose of providing additional contacts for bottom compartment slow-down switch RB. Switch ART, upon operation, engages its contacts ART877, ART 975 and ART980. Switch ARB, upon operation, engages its contacts ARB905, ARB984 and ARB993. Contacts ART 877 prepare a holding circuit for coil RT882 while contacts ARB905 prepare a holding circuit for coil RB907. Contacts ART975 and ARB984 are arranged in parallel circuits controlling the energization of coil DN976 of the door non-interference relay. Contacts ART980 are arranged in a circuit for coil TS985 of the top compartment selective relay while contacts ARB993 are similarly arranged in a circuit for coil BS996 of bottom compartment selective relay.

Auxiliary retarding relay AU is primarily for the purpose of providing additional contacts for both slow-down switches RT and RB, and is effective only when both of these switches are operated. Relay AU, upon operation, engages contacts AU416, AU441, AU843, AU875, AU986 and AU997 and disengages contacts AU326 and AU853. Contacts AU416 are in circuit with the actuating coil E413 of the third speed switch. Contacts AU441 are in a circuit common to coils F426 and FF436 of the fourth and fifth speed switches, respectively. Contacts AU843 are in a circuit common to restoring coils RT831 and RB832 of the top and bottom compartment slow-down switches, respectively. Contacts AU326 are arranged in the levelling control circuits to prevent unwanted circuits. Contacts AU853 are in the circuit for coil AL851 of the advanced light relay. Contacts AU986 complete a circuit for coil TS985 of top compartment selective relay while contacts AU997 complete a circuit for coil BS996 of the bottom compartment selective relay. The remaining pair of contacts AU875 completes a circuit for the coil 873 of the selector pawl magnet.

Door non-interference relay DN, upon energization, engages its contacts DN987 and DN1000. Contacts DN987 are arranged in parallel relation with contacts AU986 in circuit with the coil TS985 of the top compartment selective relay. Contacts DN1000 are similarly arranged in parallel relation with contacts AU997 in circuit with the coil BS996 of the bottom compartment selective relay. Relay DN provides additional contacts for each of the slow-down switches RT and RB and is operated when either of these slow-down switches is operated. Thus, relay DN is effective to cause the energization of the coils of both the top and bottom compartment selective relays TS and BS in the event that the starting switch of one compartment is moved to door close position ahead of the starting switch of the other. As will be seen as the description develops, this arrangement prevents the opening of a hatchway door opposite a compartment in response to a hall button at the floor for which the door is provided and the lighting of the hall lantern thereat for that car after the starting switch of either compartment has been moved to door close position.

Top compartment selective relay TS, upon operation, engages its contacts TS977 and separates its contacts TS234 and TS827. Contacts TS977 are arranged in a self-holding circuit for the relay. Contacts TS234 are arranged in series relation with contacts TP235 in the control circuits of the coil TDO232 of the top compartment door opening switch. Contacts TS827 are in the feed circuit for the hall lantern brushes for the top compartment.

Bottom compartment selective relay BS is similarly provided with one pair of forward contacts BS992 and two pairs of back contacts BS243 and BS826. Contacts BS992 are arranged in a self-holding circuit for the relay. Contacts BS243 are in series relation with contacts BP244 in the control circuit for the bottom compartment door opening switch coil BDO241. Contacts BS826 are arranged in the feed circuit for the hall lantern brushes for the bottom compartment.

Energization of the pawl magnet coil 873 causes the pawls to be retracted, effecting the closing of selector switches 290, 302, 353, 355, 366, 387, 396 and 405. Selector switches 366 and 387 are arranged in the control circuits for the coil H381 of the brake and field switch. Selector switches 396 and 405 are arranged in the circuits for the coils D400 and DD401 of the first and second speed switches. Selector switch 290 is in circuit with the operating coils TP294 and BP295 of the top and bottom compartment door operating relays, respectively. Selector switch 355 prepares the circuit for the levelling selector magnet 357. Selector switch 353 completes the circuit for coil HL354 of the hall light relay. Selector switch 302 completes the circuit for the coil PP303 of the auxiliary door opening relay through resistance 304.

Auxiliary door opening relay PP, upon operation, separates its contacts PP286. These contacts are arranged in the circuit for the operaing coils TP294 and BP295 of the door operating relays.

The hall light relay HL, upon operation, engages its contacts HL375 and HL854 and separates its contacts HL805, HL817 and HL845. Contacts HL375 act to short-circuit resistance 382 in circuit with coil H381. Contacts HL854 are arranged in series relation with contacts OST855 in a circuit common to the circuit for the coil AL851 of advanced light relay and circuits leading to brushes of the selector machine. Contacts HL805 are in the circuit for top compartment hall light brushes 760 and 762 while contacts HL817 are in the circuit for bottom compartment hall light brushes 757 and 763. Contacts HL845 are arranged in a circuit common to the coils REB835 and RET836 of the bottom and top compartment reset relays, respectively.

Assume now that the starting switch in the top compartment is moved from door close position to full start position. This bridges starting switch contacts 370. The starting of the car, however, is prevented until the starting switch in the bottom compartment is moved to full start position. Upon movement of the bottom compartment starting switch to full start position, starting switch contacts 373 are bridged, which, together with top compartment starting switch contacts 370, completes the circuit for coil H381 of the main brake and field switch. This circuit is through contacts HL375, compartment gate contacts 363 and 364, contacts PU365 and selector switch 366. The contacts operated by the cams 2115 for the two compartments are also in the circuit for coil H381. These contacts, designated 371 and 372, prevent the energization of this coil unless the operating cams for the hatchway doors have been moved to retired positions. Contacts 371 and 372 may be omitted.

Switch H, upon operation, engages contacts H120, H473, H475, H880, H890, H906, H915, H1021 and H1043 and separates its contacts H343, H921 and H1065. In practice, it is preferred to employ two switches to provide these contacts, with the actuating coils of the switches connected in series relation in the place of the single coil H381. Contacts H880 and H906 establish holding circuits for the coils RT882 and RB907 of the top and bottom compartment slow-down switches, respectively. Cooling resistances 876 and 904 for these coils are arranged in the holding circuits. Contacts H890 complete the circuit for coil OST886 of the top compartment starting switch sequence relay while contacts H915 complete the circuit for coil OSB913 of the bottom compartment starting switch sequence relay. Contacts H921 open the circuit common to the coils of the direction switches PU and PD. Contacts H343 are arranged in the circuit for the generator auxiliary separately excited field winding 340, preventing the completion of this circuit so long as switch H is operated. Contacts H120 short-circuit step 115 of the elevator motor field winding control resistance. Contacts H1065 disconnect the generator separately excited field winding 1023 across the generator armature 1024. Contacts H473 and H475 complete the circuit for the brake release coil 472. Contacts H1021 and H1043 complete the circuit for the generator separately excited field winding 1023.

The completion of the circuit for the generator separately excited field winding causes current to be supplied from the generator armature 1024 to the hoisting motor armature 1027 and, the brake being released as the result of the energization of its release coil 472, the elevator motor starts the car in the up direction. The elevator motor field is brought up to full strength as the starting of the elevator motor is effected, owing to the short-circuiting of resistance step 115 by contacts H120. As the brake releases, brake switch contacts 462 separate, inserting cooling resistance 471 in circuit with the brake release coil 472. The condenser 466 connected across contacts 462 is to prevent arcing.

The levelling selector magnet coil 357 is energized by way of selector switch 355 and resistance 356 at the same time that coil H381 of the brake and field switch is energized. This magnet operates to retract the levelling rollers of the selector machine so as to cause these rollers to clear the levelling cams as floors are passed at which stops are not to be made. The retraction of the rollers causes the engagement of levelling contacts 323 and 330 to complete the circuit for the actuating coil LE322 of the levelling fast speed switch. This switch engages contacts LE311 and LE346 and separates contacts LE301. Contacts LE301 are in a control circuit for the doors and gates. The purpose of these contacts will be explained later. Contacts LE346 short-circuit steps 341 and 342 of the control resistance for the generator auxiliary separately excited field winding 340. Contacts LE311 complete the circuit for the actuating coil LZ310 of the levelling slow-down relay. This relay separates its contacts LZ333 in shunt to step 342 of the generator auxiliary field winding control resistance.

The bridging of contacts 370 and 373 of the starting switches for the two compartments also completes a circuit for coil MM374 of the idling switch relay. This relay, upon operation, engages its contacts MM130 and MM134. Contacts MM130 complete the circuit for the coil M127 of the idling switch while contacts MM134 prepare the circuit for coil K132 of the resistance cut-out switch. Switch M operates to engage its contacts M50, M53, M55, M137 and M133 and separates its contacts M90, M91 and M60. Contacts M60 open the initial energizing circuit for the coil of line switch relay LL. The purpose of contacts M60 is to prevent the starting of the motor generator set when switch M is in operated condition. Contacts M137 prepare a holding circuit for the coil RM140 of the resistance relay RM. The separation of contacts M90 and M91 and the engagement of contacts M50, M53 and M55 change the connections of the phase windings of the driving motor from star to delta relation. Thus, upon connections being made to cause the starting of the elevator motor, the phase windings of the driving motor of the motor generator set are changed from star to delta connection.

Contacts M133 complete the circuit for the actuating coil K132 of the resistance cut-out switch. Switch K, upon operation, engages contacts K47, K52, K56, K141, K125 and K402 and separates contacts K61. Shock resistances 71, 73 and 75 are connected in series with the respective phase windings of the driving motor upon the change of the driving motor from star to delta being effected by switch M, these resistances serving to obviate undesirable current surges due to the change in phase and value of voltage applied to the phase windings as the change-over is effected. These resistances are short-circuited, upon operation of switch K, by contacts K47, K52 and K56. Contacts K61 are in the initial energizing circuit for coil LL74 of the line switch relay. The purpose of contacts K61 is to prevent starting of the motor generator set when switch K is in operated condition. Contacts K125 are in parallel relation with contacts MM130 in circuit for the coil M127 of the idling switch. Contacts K402 are in a circuit common to the coils D400 and DD407 of the first and second speed switches. Contacts K141 complete the circuit for the coil RM140 of the resistance relay.

Resistance relay RM is provided with one pair of forward contacts RM136 which act to complete the self-holding circuit for the relay and two pairs of back contacts RM122 and RM135 which act to insert cooling resistances 126 and 131 in circuit with the coils of switches M and K, respectively.

Starting switch sequence relay OST for the top compartment, upon operation as a result of the completion of the circuit for its actuating coil OST886 by contacts H890, engages contacts OST392 and OST855 and separates contacts OST264, OST884 and OST974. Contacts OST855 are arranged in series relation with contacts HL854 as has already been pointed out. Contacts OST392 are in a circuit common to the actuating coils of the various speed switches. Contacts OST884 open the initial energizing circuit for coil RT882 of the top compartment starting switch, this coil being maintained energized, however, through contacts ART877 and H880. Contacts OST264 open the circuit leading to the contacts 261 and 265 of the top compartment starting switch.

Bottom compartment starting switch sequence relay OSB, upon operation as a result of the energization of its coil OSB913 by contacts H915, engages contacts OSB287 and separates its contacts OSB911, OSB282 and OSB983. Contacts OSB287 are in the circuit for coils TP294 and BP295 of the door operating relays. This circuit is not completed, however, as contacts PP286 are separated. The separation of contacts OSB983, together with the separation of contacts OST974, breaks the circuit for the coil DN976 of the door non-interference relay. Contacts OSB911 open the initial energizing circuit for coil RB907 of the bottom compartment slow-down switch, this coil being maintained energized, however, through contacts ARB905 and H906. Contacts OSB922 open the circuit to contacts 277 and 283 of the bottom compartment starting switch.

Door non-interference relay DN, upon opening, separates its contacts DN987 and DN1000. Coils TS985 and BS996 are maintained energized through contacts AU986 and AU997, respectively.

The engagement of contacts OST392 in the feed circuit common to the actuating coils of the speed switches completes the circuit for the actuating coil D400 of the first speed switch through resistance 401, contacts K402, contacts PE394 of auxiliary direction switch PE and selector switch 396. Switch D, upon operation, engages its contacts D410 and D1054 and separates its contacts D972, D990 and D226. Contacts D226 are in a circuit common to circuits for the coils of various switches which control the operation of the doors and gates, preventing energization of these coils. Contacts D972 and D990 are arranged in parallel relation with contacts ART980 and ARB993 in the holding circuits for the coils TS985 and BS996, respectively. The purpose of this arrangement will be explained later. Contacts D1054 short-circuit step 1042 of the generator field resistance. This causes the voltage of the generator armature 1024 to be increased with a resultant increase in speed of the elevator motor.

Contacts D410 complete the circuit for the actuating coil DD407 of the second speed switch through reactance coil X406, resistance 411 and contacts K402. The operation of the second speed switch is delayed by the action of the reactance coil. Switch DD, upon operation, engages contacts DD414 and DD1063 and separates contacts DD870. Contacts DD870 act to insert cooling resistance 874 in circuit with pawl magnet coil 873. Contacts DD1063 short-circuit step 1041 of the control resistance for the generator separately excited field. This causes the generator voltage to be increased with a consequent increase in the speed of the elevator motor. It is to be noted that contacts K402 of the resistance cut-out switch prevent the operation of switches D and DD until after the driving motor phase windings have been connected delta and resistances 71, 73 and 75 short-circuited.

Contacts DD414 complete a circuit for the actuating coil E413 of the third speed switch, this circuit also extending through reactance coil X406 and through resistance 415, contacts AU416, switches 417 and 431 and auxiliary direction switch contacts PE420. Reactance coil X406 acts to delay the operation of switch E. This switch, upon operation, engages its contacts E427, E881, E950 and E1062 and separates its contacts E376. Contacts E376 act to insert cooling resistance 382 in circuit with the brake and field switch actuating coil H381. Contacts E881 by-pass contacts AU875 in the circuit for pawl magnet coil 873. Contacts E950 prepare a circuit for the actuating coils IRT941 and IRB955 of the top and bottom compartment secondary slow-down switches. Contacts E1062 short-circuit step 1040 of the control resistance for the generator separately excited field winding, causing further increase in generator voltage and elevator motor speed.

Contacts E427 complete a circuit for the actuating coil F426 of the fourth speed switch, this circuit extending through reactance coil X425, resistance 430, contacts AU441, switches 433 and 431 and contacts PE420 of auxiliary direction switch PE. The operation of switch F is delayed by the action of reactance coil X425. This switch, upon operation, engages its contacts F151, F437, F1051 and F1061. Contacts F151 prepare a holding circuit for the coil GB145 of the second governor relay. Contacts F1051 short-circuit resistance 1052 in circuit with coil N1016 of the non-interference relay. Contacts F1061 short-circuit steps 1036 and 1037 of the resistance for the generator separately excited field winding, causing further increase in generator voltage and elevator motor speed.

Contacts 437 complete the circuit for coil FF436 of the fifth speed switch. This circuit also extends through reactance coil X425, and also through contacts RT434 and RB435, resistance 440 and contacts AU441. The reactance coil acts to delay the operation of speed switch FF. This switch, upon operation, engages contacts FF1047, FF1057 and FF1060 and separates contacts FF117. Contacts FF1060 short-circuit step 1033 of the generator field resistance while contacts FF117 remove the short circuit for steps 112, 113 and 114 of the elevator motor field control resistance. The resulting increase in generator voltage and the weakening in the elevator motor field causes further increase in speed of the elevator motor. Contacts FF1057 are in the by-pass circuit for step 1032 of the control resistance for the generator separately excited field winding. Contacts FF1047 short-circuit resistance 1048 in circuit with coil Z1013 of the notchback switch.

As the current in the generator field winding builds up as the result of the operation of the speed switches, a point is reached where a sufficient voltage is applied to the actuating coil O1011 of the safety handle relay O to cause the operation of this relay. Relay O, upon operation, engages contacts O391 to by-pass contacts 370 and 373 of the starting switches for the two compartments. This arrangement permits the return of the starting switches to neutral upon the speed of the elevator car reaching a predetermined value, say, 40% of normal full speed. It also permits the car to be stopped by centering either starting switch before the car reaches 40% normal full speed. This is particularly useful where it is desired to stop quickly in emergencies such as occasioned by the catching of clothes or stationary parts in the hatchway which would be noticed before any appreciable speed had been obtained.

The actuating coils BM1055 and BBM1064 of the brush magnet relay are also in series with the generator separately excited field winding 1023 and, as in the case of relay O, are subject to the delay in the building up of the current supplied to the generator field winding. Upon the voltage applied to these coils reaching a certain value, brush magnet relay BM is operated.

Relay BM, upon operation, engages contacts BM094 to complete the circuit for up brush magnet coil 891 to advance the up slow-down brushes 726, 730, 733 and 734. As these brushes are being advanced, the voltage applied to coil BBM1064 of the second auxiliary brush magnet relay increases, causing the operation of this relay upon the voltage attaining a predetermined value.

Relay BBM, upon operation, engages its contacts BBM952 to complete circuits for coils IRT941, IRB955 and ABM951 of the top compartment secondary slow-down switch, bottom compartment secondary slow-down switch and first auxiliary brush magnet relay, respectively. These circuits extend through contacts PA946 of auxiliary direction switch PA, the circuits for the coils of the secondary slow-down switches being through resistances 942 and 956 and contacts E950 of the third speed switch.

The first auxiliary brush magnet relay ABM, upon operation, engages its contacts ABM844 and ABM1007 and separates its contacts ABM973 and ABM991. Contacts ABM844 are in a circuit common to the reset coils IRT833 and IRB834 of the secondary slow-down switches. Contacts ABM1007 are arranged in a by-pass circuit for steps 1037 and 1040 of the generator separately excited field control resistance. Contacts ABM973 are arranged in the holding circuits for the coil TS985 of the top compartment selective relay. Contacts ABM991 are similarly arranged in the holding circuits for the coil BS996 of the bottom compartment selective relay.

Top compartment secondary slow-down switch IRT, upon operation, engages its contacts IRT802, IRT871, IRT945, IRT981 and IRT1010 and separates its contacts IRT852 and IRT943. The bottom compartment secondary slow-down switch IRB, upon operation, engages its contacts IRB804, IRB872, IRB961, IRB994 and IRB1017 and separates its contacts IRB860 and IRB951. Contacts IRT871 and IRB872 are arranged in series relation in a circuit for pawl magnet coil 873. Contacts IRT1010 and IRB1017 are arranged in series relation with contacts ABM1007 in the by-pass circuit for generator field control resistance steps 1037 and 1040. Contacts IRT945 establish a self-holding circuit for coil IRB941 through resistance 944, the initial energizing circuit being broken by contacts IRT943. Similarly, contacts IRB961 establish a self-holding circuit for coil IRB955 through resistance 960, the initial energizing circuit being broken by contacts IRB957. Contacts IRT981 are arranged in parallel relation with contacts ABM973 in the holding circuits for coil TS985. Contacts IRB994 are arranged in parallel relation with contacts ABM991 in the holding circuits for coil BS996. Contacts IRT802 are in circuit with the slow-down brushes 700 and 784 for the top compartment car buttons. Contacts IRB804 are similarly arranged in the circuit for the slow-down brushes 702 and 786 for the bottom compartment car buttons. Contacts IRT852 and IRB860 are arranged in parallel relation in the circuit for coil AL851.

Idling switch relay MM is provided with a coil MM1015 connected across the armature 1024 of the supply generator. This coil serves as a holding coil.

The actuating coil N1016 of the non-interference relay N also is connected across the generator armature and, as previously pointed out, is subject to contacts F1051 of the fourth speed switch. Relay N operates upon the operation of switch F and upon the voltage applied to coil N1016 reaching a predetermined value, to separate its contacts N822 and N823. Contacts N822 are in the circuit for coil IRT833 while contacts N823 are in the circuit for coil IRB834. The particular purpose of these contacts is served during the slow-down operation.

The coil Z1013 of the notch-back switch is also connected across the generator armature and is subject to contacts FF1047 of the fifth speed switch. The operation of switch Z is thus delayed until after the operation of switch FF and until the generator voltage rises to a predetermined value. Upon operation, switch Z engages contacts Z352 and Z1050 and separates contacts Z900 and Z1006. Contacts Z900 insert cooling resistance 893 in series with the up brush advance magnet coil 891. Contacts Z1006 control step 1035 of the generator field control resistance. Contacts Z1050 connect voltage coil Q1014 of the load switch across the generator armature. Contacts Z352 complete the circuit for the actuating coil I351 of the field switch I. Switch I is provided with one pair of back contacts I105 which separate to insert resistance step 111 in the circuit with the elevator motor separately excited field winding. The operation of switch I to weaken the elevator motor field causes the elevator motor to come up to full speed.

Load switch Q is provided with a current coil Q1046 in addition to its voltage coil Q1014. These coils act cumulatively when the elevator motor is lifting above balanced load to cause the operation of the switch. The switch is provided with forward contacts Q1053 and with back contacts Q1005 and Q1031. Contacts Q1031 separate to insert cooling resistance 1030 in circuit with voltage coil Q1014 while contacts Q1005 separate to remove a shunt for step 1034 of the generator field control resistance. Resistance step 1034 is maintained short-circuited, however, by contacts FF1060. Contacts Q1053, in conjunction with contacts FF1057 of the fifth speed switch, short-circuit the remaining step 1032 of generator field resistance to compensate for the load conditions.

Governor operated switches 142 and 144 control the first and second governor relays GA and GC to provide speed regulation. A slight overspeed causes governor switch 142 to complete the circuit for coil GA143 of the first governor relay. This relay operates to engage its contacts GA106, short-circuiting step 113 of the elevator motor separately excited field control resistance. This strengthens the elevator motor field to reduce the speed of the motor. In case of a higher overspeed, governor switch 144 completes a circuit for coil GC145 of the second governor relay. This relay, upon operation, engages contacts GC107 and GC152. Contacts GC107 short-circuit step 114 of the control resistance for the elevator motor separately excited field winding, thereby reducing the speed of the motor. The other contacts GC152, in conjunction with contacts F151 of the fourth speed switch, establish a self-holding circuit for the coil GC145. The purpose of the second governor relay GC is served particularly under full load conditions during downward travel.

It will be assumed that the top compartment stops at even numbered floors and the bottom compartment stops at odd numbered floors. It will be further assumed that a passenger has been taken into the top compartment at the lower terminal and that this passenger desires to alight at the eighth floor. Upon the passenger signifying his destination, the top compartment attendant presses the car button 592 for the eighth floor. This button may be pressed either before or after the starting of the car. In fact, it will be seen as the description proceeds that a car button may be pressed at any time prior to the compartment within which the car button is located having passed its slow-down initiating point for the corresponding floor, and cause the compartment to slow down at that floor during that trip. The top compartment car buttons, when pressed, are maintained operated by the top compartment car button magnet 962, this magnet being energized as the result of the engagement of potential switch contacts C174 and C175.

Assume for purposes of description that the car attains a speed of 1,000 F. P. M. under full speed operating conditions. It has been found in practice that under average installation conditions, the car may be accelerated from standstill to substantially full speed and retarded therefrom to a stop in approximately 70 feet. A six-floor run has been assumed so that in an average installation the car will have got up to substantially full speed and the up brush advance magnet will have advanced the up slow-down brushes to fully advanced positions before the slow-down point for the eighth floor is reached. Upon the arrival of the top compartment at a point approximately thirty feet from the eighth floor, this distance being subject to variation depending upon the character of the installation, up slow-down brush 726 for the top compartment car buttons engages selector stationary contact 593 for the eighth floor. Contact 593 is being maintained "alive" by car button 592 so that the engagement of this contact by brush 726 completes a circuit for restoring coil RT831 of the top compartment slow-down switch. This coil neutralizes the effect of the operating coil RT882 causing the separation of contacts RT434, RT966, RT801 and RT901 and the engagement of contacts RT825 and RT850.

Contacts RT850 are in circuit with the pilot light 846 in the bottom compartment, the engagement of these contacts being of no effect at this time, however, owing to the fact that contacts GT847 of the top compartment door contact relay are separated. Contacts RT825 are in circuit with coil RET836 of the top compartment reset relay, the purpose of these contacts being served when a slow-down and stopping operation is being made at a floor at which a hall button is pressed.

The separation of contacts RT801 renders brush 726 "dead". This prevents an arc being drawn upon the brush leaving contact 593 during continued movement of the car. Contacts RT801 serve the additional purpose of preventing unwanted circuits between selector stationary contacts controlled by car buttons and those controlled by hall buttons.

The separation of contacts RT966 deenergizes top compartment auxiliary slow-down switch actuating coil ART967. This results in the disengagement of contacts ART877, ART975 and ART980. Contacts ART975 are in the circuit for coil DN976 of the door non-interference relay, the circuit for this coil having previously been broken by the separation of contacts OST974 and OSB983. Contacts ART877 deenergize operating coil RT882 of the top compartment slow-down switch, the restoring coil RT831 being deenergized as the result of the separation of contacts RT801.

Contacts RT901, upon separation, deenergize up advance magnet coil 891, permitting return of the up slow-down brushes to retarded position. These brushes are "dead" during such return because contacts AU843 are separated at that time.

Contacts RT901 also deenergize coil AU903 of the auxiliary retarding relay. This relay separates its contacts AU416, AU441, AU843, AU875, AU986 and AU997 and reengages its contacts AU326 and AU853. Contacts AU843 are in the circuit to coils RT831 and RB832, the circuit for coil RT831 having been broken by contacts RT901. Contacts AU326 are in the levelling control circuits as previously pointed out. Contacts AU997 are in a circuit for coil BS996 of the bottom compartment selective relay, this coil being maintained energized, however, by way of its holding contacts BS992, contacts ARB993 and contacts IRB994. Contacts AU875 are in the circuit for pawl magnet coil 873, this coil being maintained energized, however, by way of contacts E881 and contacts IRT871 and IRB872. Contacts AU853 are in the circuit for coil AL851 of the advance light relay. This circuit is not completed, however, owing to the fact that contacts IRT852 and IRB860 are separated.

The separation of contacts AU986, together with the separation of contacts ART980, causes the deenergization of coil TS985 of the top compartment selective relay. This relay separates its contacts TS977 and engages its contacts TS234 and TS827. Contacts TS977 are in the holding circuit for coil TS985, this circuit being broken as the result of the separation of contacts ART980. Contacts TS234 are arranged in series relation with contacts TP235 in a circuit for coil TDO232 of the top compartment door opening switch, the reengagement of contacts TS234 preparing a circuit for this coil for the door and gate opening operation at the eighth floor. Contacts TS827 are in the circuit for the hall lantern brushes for the top compartment. No circuit is completed, however, owing to the fact that contacts AL806 and HL805 are separated.

Contacts RT434, upon separation, deenergize coil FF436 of the fifth speed switch. Switch FF separates contacts FF1047, FF1057 and FF1060 and reengages contacts FF117. Contacts FF1047 reinsert resistance 1048 in circuit with coil Z1013 of the notch-back switch. Contacts FF1057 control resistance step 1032 for the generator field winding 1023, the separation of these contacts causing the reinsertion of this step whenever load conditions are such that the contacts Q1053 are caused to be in engagement. The separation of contacts FF1060 reinserts resistance step 1033 in circuit with the generator field winding. When load conditions are such that load switch Q is operated, the separation of contacts FF1060 also inserts resistance step 1034 along with resistance step 1033 in circuit with generator field winding 1023. Contacts FF117, upon reengagement, short-circuit resistance steps 111, 112, 113 and 114 for the elevator motor field winding 116.

The weakening of the generator field and the strengthening of the elevator motor field as a result of the return of the fifth speed switch FF to deenergized condition causes the elevator car to slow down. Thus, the engagement of an "alive" slow-down brush with an "alive" selector stationary contact initiates the slowing down of the car.

Contacts AU441, upon separation, deenergize coil F426 of the fourth speed switch while contacts AU416, upon separation, deenergize coil E413 of the third speed switch. The fourth speed switch F does not drop out immediately this coil is deenergized owing to the effect of reactance coil X425 and discharge resistance 422. The third speed switch E, however, drops out immediately, separating its contacts E427, E881, E950 and E1062 and reengaging its contacts E376. Contacts E376 short-circuit cooling resistance 382 for coil H381 of the brake and field switch. Contacts E427 are in the circuit for coil F426, this circuit having been broken by contacts AU441. Contacts E881 are in a circuit for the pawl magnet coil 873, this coil being maintained energized by contacts IRT871 and IRB872. Contacts E950 are in the initial energizing circuits for coils IRT941 and IRB955. The initial energizing circuits for these coils have previously been broken by contacts IRT943 and IRB957. Contacts E1062 are in a shunt circuit for generator field control resistance step 1040, this resistance step being maintained short-circuited under the assumed conditions of operation, however, by contacts ABM1007, IRT1010 and IRB1017.

Upon the time interval provided by reactance coil X425 and resistance 422 having expired, the fourth speed switch F separates its contacts F151, F437, F1051 and F1061. Contacts F437 are in the circuit for coil FF436 of the fifth speed switch, this circuit having previously been broken by contacts RT434. If operating conditions are such that the second governor relay GC is operated, the separation of contacts F151 causes the return of relay GC to deenergized position. It is to be noted that control resistance step 114 for the elevator motor field winding 116 is short-circuited at the initiation of the slow-down operation by contacts FF117. However, contacts GC107, whenever engaged, continue in engagement until contacts F151 are separated to maintain resistance step 114 short-circuited under running conditions, thereby preventing "hunting". Contacts F1051 reinsert resistance 1052 in circuit with coil N1016 of the non-interference relay. Contacts F1061 reinsert resistance steps 1035 and 1036 in circuit with generator field winding 1023, contacts Z1006 being separated. This reduces the generator voltage and consequently the speed of the elevator car.

Upon the generator voltage decreasing to a certain value, coil N1016 is no longer able to maintain its contacts N822 and N823 separated. These contacts, therefore, return to engaged condition, contacts N822 rendering top compartment up secondary slow-down brush 700 "alive". Upon the engagement of contact 594, being maintained "alive" by the top compartment eighth floor car button 592, and secondary slow-down brush 700 as the result of the continued movement of the car, a circuit is completed for the restoring coil IRT833 of the top compartment secondary slow-down switch. Coil IRT833 neutralizes the effect of operating coil IRT941, causing the separation of contacts IRT802, IRT871, IRT945, IRT981 and IRT1010 and the reengagement of contacts IRT852 and IRT943. Contacts IRT981 are in the holding circuits for coil TS985, this coil having already been deenergized as a result of the separation of contacts AU986 and ART980. Contacts IRT943 are in the initial energizing circuit for coil IRT941. Contacts IRT945 break the holding circuit for coil IRT941 while, at the same time, contacts IRT802 break the circuit for restoring coil IRT833. Contacts IRT802 also render secondary slow-down brush 700 "dead", thereby preventing an arc being drawn upon this brush leaving "alive" contact 594. Contacts IRT1010 remove the short circuit for resistance steps 1037 and 1040 for the generator field winding 1023 causing a decrease in the generator voltage with consequent decrease of elevator motor speed.

Contacts IRT852 complete a circuit for coil AL851 of the advance light relay. This relay engages its contacts AL820 and AL806 in circuit with the advance light brushes of the selector machine. At this time, the top compartment up advance light brush 741 is in engagement with up hall lantern contact 617 for the eighth floor. Also, selector relay contacts TS827 are engaged as a result of the previous separation of contacts AU986 and contacts ART980. Thus, the engagement of contacts AL806 completes a circuit for the up hall lantern 613 at the eighth floor, this circuit extending from power main I through the lantern, selector contact and brush and by way of contacts PB807, contacts TS827 and NST840 to the grounded neutral. Therefore, upon the top compartment reaching a certain distance from the eighth floor, the up hall lantern at that floor is lighted. The engagement of contacts AL820 under the assumed conditions is without effect as contacts BS826 are separated. The up hall lantern at the seventh floor is therefore not illuminated. Thus, the selective relays TS and BS act to select the hall lantern which is lighted upon a slow-down being made.

Contacts IRT871 break the circuit for pawl magnet coil 873. The pawl magnet, upon being deenergized, permits the pawls to be extended for cooperation with their stopping collars. As the car continues its movement, the up pawl engages the stopping collar for the eighth floor and, upon continued movement, causes the opening of selector switch 353. This deenergizes coil HL354 of the hall light relay, this relay separating contacts HL375 and HL854 and reengaging contacts HL805, HL817 and HL845.

Contacts HL845 are in the circuit to coils REB835 and RET836 of the reset relays. The purpose of the reset relays will be described in connection with the operation of the system in case of a late pressed hall button. Contacts HL375 act to reinsert resistance 382 in circuit with coil H381 of the brake and field switch.

Contacts HL805 and HL817 control the circuit for the following hall light brushes. Thus, top compartment up following light brush 762 is rendered "alive" by the engagement of contacts HL805. The remaining pair of contacts HL854 breaks the circuit for the coil AL851 of the advance light relay, causing the separation of contacts AL806 and AL820. At this time, the top compartment up following light brush 762 is in engagement with up hall lantern contact 617 for the eighth floor. Thus, although the separation of contacts AL806 breaks the circuit for the up hall lantern 613 at the eighth floor through advance light brush 741, this lantern is maintained lighted by way of a circuit through following brush 762 and contacts HL805.

Upon further movement of the car, selector switches 405 and 396 are opened, preferably in the order named. The purpose of selector switch 405 is served during stopping when the car is travelling in the down direction. Selector switch 396, upon opening, breaks the circuit for coil D400 of the first speed switch and for coil DD401 of the second speed switch.

Switch D opens immediately to separate its contacts D410 and D1054 and to reengage its contacts D972, D990 and D226. Contacts D410 are in circuit with coil DD401, the circuit for this coil being already broken at selector switch 396. The reengagement of contacts D226 prepares circuits for causing the opening of the gate for the top compartment and the hatchway door at the eighth floor. Contacts D972 and D990 are in the holding circuits for coils TS985 and BS996. Contacts D972 serve their purpose under the assumed conditions of operation by permitting the deenergization of coil TS985 at the time of separation of contacts ART980. Contacts D990 serve a similar purpose with respect to coil BS996 when a stop is being made to effect the transfer of passengers in the bottom compartment. The separation of contacts D1054 reinserts resistance step 1042 in circuit with the generator field winding 1023, causing further reduction in the speed of the elevator car.

Second speed switch DD does not drop out immediately the circuit for its coil is broken by selector switch 396, being delayed by the effect of reactance coil X406 and discharge resistance 397. Upon opening, this switch separates its contacts DD414 and DD1063 and reengages contacts DD870. Contacts DD870 short-circuit cooling resistance 874 for pawl magnet 873. Contacts DD414 are in the circuit for coil E413 of the third speed switch, previously broken by contacts AU416. Contacts DD1063 reinsert resistance step 1041 in circuit with generator field winding 1023, bringing the elevator car down to a slow speed.

Selector switch 355 is next opened to deenergize levelling selector magnet coil 357. As a result, the levelling rollers are permitted to assume positions for cooperation with the levelling cam for the eighth floor. The top compartment being below the eighth floor at this time, the up roller of the levelling mechanism engages the eighth floor levelling cam, causing the engagement of levelling contacts 314. As pointed out in the description of the starting operation, the retraction of the levelling rollers causes the engagement of levelling contacts 323 and 330. If the car is a certain distance below the floor at the time that the rollers are re-extended, levelling contacts 323 are maintained in engagement, thereby maintaining coil LE322 energized. Contacts 330, however, are permitted to separate. Contacts 314 complete the circuit for the actuating coils LH312 and LU313 of the levelling brake and field switch and up levelling direction switch respectively.

Switch LU, on operation, engages contacts LU321, LU331 and LU345. Contacts LU331 and LU345 serve as direction contacts for the generator auxiliary field winding 340. Contacts LU321 are in series with auxiliary direction switch contacts PB320 in a shunt circuit for step 342 of the control resistance for the generator auxiliary field winding 340. The purpose of this arrangement is served in case of an overrun of a floor in stopping during downward car travel. Contacts LU331 and LU345 prepare a circuit for field winding 340. Owing to the fact that contacts H343 are separated, however, no circuit is completed for field winding 340 at this time.

Switch LH, upon operation, engages contacts LH124, LH300, LH347, LH465 and LH470, and separates contacts LH920 and LH1067. Contacts LH920 are in the circuit for the coils of direction switches PU and PD. Contacts LH1067 are in the suicide connection for generator field winding 1023. Contacts LH300 are arranged in series relation with contacts LE301 in a circuit for controlling the door and gate operation. Contacts LH347 complete a circuit for the actuating coil Y350 of the series field switch. Contacts LH465 and LH470 are arranged in parallel with contacts H473 and H475 respectively of the main brake and field switch. The remaining pair of contacts LH124 are in parallel with main brake and field switch contacts H120 in shunt relation to step 115 of the elevator motor field winding control resistance.

Immediately after the opening of selector switch 355, selector switches 367 and 366 open, preferably in the order named, switch 366 deenergizing coil H381 of the main brake and field switch. Owing to the fact that selector switch 366 is a relatively slow opening switch, condenser 362 is provided to absorb the arc. Condensers 285, 361 and 393 are for a similar purpose. Switch H opens to separate its contacts H120, H473, H475, H880, H890, H900, H915, H1021 and H1043, and reengages its contacts H343, H921 and H1065.

Contacts H880 are in the holding circuit for coil RT882, this circuit having previously been broken at contacts ART877. Contacts 906 break the holding circuit for coil RB907. The separation of contacts H890 breaks the circuit for coil OST886 of the top compartment starting switch sequence relay, assuming that the starting switch in the top compartment has been returned to neutral. The separation of contacts H915 breaks the circuit for coil OSB913 of the bottom compartment starting switch sequence relay, assuming the starting switch of the bottom compartment has been returned to neutral.

Relay OST separates contacts OST392 and OST855, and reengages contacts OST264, OST884 and OST974. Contacts OST855 are in the circuit for coil AL851 of the advance light relay, this circuit having already been broken by contacts HL854. Contacts OST392 control the circuits for the coils of the speed switches, these coils having previously been deenergized. Contacts OST884 reengage in the initial energizing circuit for coil RT882, this circuit being open at top compartment starting switch contacts 885. Contacts OST264 engage in the circuit leading to top compartment starting switch contacts 261 and 265.

The bottom compartment starting switch relay OSB separates contacts OSB287 and reengages contacts OSB911, OSB282 and OSB983. Contacts OSB287 are in the circuit for coils TP294 and BP295 of the door operating relays. As will be explained later, this circuit is completed before the separation of contacts OSB287, provided certain speed conditions exist at that time. Contacts OSB282 reengage in the circuit for bottom compartment starting switch contacts 277 and 283. Contacts OSB911 reengage in the initial energizing circuit for coil RB907, this circuit being open at bottom compartment starting switch contacts 912 with this switch in neutral position.

Bottom compartment slow-down switch RB drops out as a result of the deenergization of its coil RB907 by contacts H906. It separates its contacts RB970, RB902, RB803 and RB435 and reengages its contacts RB824 and RB842. Contacts RB842 are in the circuit for top compartment pilot light 830, this circuit being open, however, at contacts GB841. Contacts RB902 are in the circuit with coil AU903, this circuit having previously been broken at contacts RT901. Contacts RB803 render bottom compartment up slow-down brush 133 for the car buttons "dead". Contacts RB435 are in the circuit for coil FF435 of the fifth speed switch, this circuit having already been broken by contacts RT434. Contacts RB824 are in circuit with coil REB835 of the bottom compartment reset relay. The purpose of this arrangement is served in case of stops in response to hall buttons. Contacts RB970 break the circuit for bottom compartment auxiliary slow-down switch actuating coil ARB971.

Switch ARB drops out to separate its contacts ARB905, ARB984 and ARB993. Contacts ARB905 are in the circuit for coil RB907, this circuit having been broken previously at contacts H906. Contacts ARB993 are in the holding circuits for coil BS996, this coil being maintained energized, however, through contacts D990, now in engagement, and contacts IRB994. Contacts ARB984 are in the circuit for coil DN976, these contacts and contacts ART975, already separated, preventing the operation of door non-interference relay DN upon the reengagement of contacts OST974 and OSB983.

Returning to switch H, the separation of contacts H120 in shunt to elevator motor field winding control resistance step 115 is without effect as this step is maintained short-circuited by contacts LH124. The reengagement of contacts H921 in the circuit for the coils of direction switches PU and PD is without effect as this circuit is maintained open at contacts LH920. The reengagement of contacts H1065 in the suicide connection for field winding 1023 is without effect as the circuit for connecting this field winding to the generator armature is maintained open at contacts LH1067. The separation of contacts H473 and H475 in the circuit for brake release coil 472 does not cause the application of the brake as this coil is maintained energized by contacts LH465 and LH470. The separation of contacts H1021 and H1043 disconnects the generator main separately excited field winding 1023 from the exciter. At the same time, however, the generator auxiliary separately excited field winding 340 is connected to the exciter by contacts H343.

The excitation of the generator is now effected through the auxiliary field winding 340. Assuming that the car is in the fast speed levelling zone, contacts LE346 are in engagement to short-circuit resistance steps 341 and 342, causing the car to travel at a fast levelling speed. Switch Y, operated as a result of the engagement of contacts LH347, separates its contacts Y1026 to disconnect resistance 1025 in parallel with the generator series field winding 1012. This strengthens the field of the generator for the levelling operation.

As the car runs from the fast speed to the slow speed levelling zone, contacts 323 are separated, deenergizing fast speed levelling switch coil LE322. Switch LE drops out to separate its contacts LE346. This removes the short circuit for steps 341 and 342 of the control resistance for the generator auxiliary field winding 340, decreasing the generator voltage and causing the car to run at a slow levelling speed. Switch LE, upon dropping out, also separates its contacts LE311 to break the circuit for the coil LZ310 of the levelling slow-down relay. Relay LZ is delayed in dropping out after the breaking of the circuit for its coil by the effect of reactance coil X307 and discharge resistance 306. The purpose of this arrangement is to minimize the possibility of overruns during stopping operations due to the time constant of the auxiliary field winding 340. The insertion of both resistance steps 341 and 342 as the car enters the slow speed zone decreases the voltage applied to the field winding to a sufficiently low value to obviate the effect of the lag of the field, thus insuring the desired retardation. The later reengagement of contacts LZ333 short-circuits resistance step 342 to insure the generation of sufficient voltage to bring the car to the floor.

Just before the top compartment reaches the exact level with the eighth floor landing, levelling contacts 314 are separated. The circuit for coils LH312 and LU313 is thus broken. Switch LH drops out, causing the separation of contacts LH124, LH300, LH347, LH465 and LH470, and the reengagement of contacts LH920 and LH1067. The reengagement of contacts LH920 prepares the circuit for coils PU922 and PD923 of the direction switches. The separation of contacts LH347 deenergizes series field switch Y to effect the reengagement of contacts Y1026. The separation of contacts LH300 breaks the control circuit for the doors and gates through contacts LE301. The separation of contacts LH465 and LH470 breaks the circuit for the brake releasing coil 472. The separation of contacts LH124 reinserts resistance step 115 in circuit with the elevator motor field winding, reducing the current therein to a "standing field" value. The reengagement of contacts LH1067 completes the suicide connection for generator field winding 1023, the circuit including resistance 1056. The polarity of the connection of this winding to the generator armature is such that the generator sends current through the winding in a direction to oppose the flux which produces the generator E. M. F., thus tending to destroy the residual flux of the generator field.

Up levelling direction switch LU, dropping out simultaneously with switch LH, separates contacts LU321, LU331 and LU345. The separation of contacts LU321 is in preparation for the next starting operation. The separation of contacts LU331 and LU345 disconnects the generating auxiliary field winding 340 from the exciter, the main field winding 1023 being simultaneously connected to the generator armature by contacts LH1067 as above set forth.

Thus, the brake being applied and the generator separately excited field windings being disconnected from the exciter, the car is brought to rest with the top compartment in exact alignment with the eighth floor landing.

Should an overrun occur, circuits are completed to return the top compartment to the eighth floor landing level. Assume that an overrun occurs into the slow speed levelling zone. This results in the engagement of levelling contacts 316 to complete a circuit for coils LH312 and LD315 of the levelling brake and field switch and down levelling direction switch respectively. Switch LH operates to effect the release of the brake, to disconnect the main field winding 1023 from the generator armature, to strengthen the field of the elevator motor and to cause the shunt circuit for the generator series field winding to be broken. Switch LD engages contacts LD325, LD332 and LD344. Contacts LD332 and LD344 connect the generator auxiliary field winding 340 to the exciter. Due to the reversal of the flow of current through this winding from that during the levelling operation upon the car approaching the floor in the up direction, the car is caused to start in the down direction.

The engagement of contacts LD325 connects resistance 317 in parallel with resistance step 342, owing to the fact that auxiliary direction relay contacts PA324 are in engagement during upward car travel. This insures the generation of sufficient voltage to return the car to the floor in the event that the time interval for levelling slow-down relay LZ has not expired to permit the reengagement of contacts LZ333. Contacts PB320 and LU321 serve a similar purpose in case of an overrun during down car travel. As the car returns to the floor, it is stopped by the separation of levelling contacts 316 in a manner similar to that described for the approach of the car to the floor in the up direction.

If the overrun extends into the fast speed levelling zone, levelling contacts 330 as well as levelling contacts 316 are engaged. The engagement of contacts 330 causes the operation of levelling fast speed switch LE which engages its contacts LE346 to short-circuit steps 341 and 342 of the control resistance for field winding 340. This increases the generator voltage, causing the elevator motor to run at a fast levelling speed. As the car returns to the slow speed levelling zone, switch LE is dropped out permitting the remainder of the return of the car to the floor to be effected at a slow levelling speed.

During the slowing down of the top compartment at the eighth floor, selector switch 302 is opened, this occurring ahead of the opening of selector switch 366 with the arrangement of circuits illustrated. The opening of selector switch 302 deenergizes coil PP303 of the auxiliary door opening relay. This relay reengages its contacts PP286, completing a circuit for coils TP294 and BP295 of the top compartment door operating relay and bottom compartment door operating relay respectively, this circuit extending through resistance 293, selector switch 290 and contacts OSB287 which are not yet opened. Immediately after the opening of selector switch 302, selector switch 290 opens, thus providing only a short interval in which coils TP294 and BP295 are energized. If the speed of the car has dec eased to a certain value at the time of opening of selector switches 302 and 290, this time interval is of sufficient duration to effect the latching of relays TP and BP in operated condition. Assuming that the time interval is of sufficient duration to permit the latching of these relays in operated condition, contacts TP235 and BP244 are engaged. The engagement of contacts TP235 completes the circuit for the top compartment door opening switch actuating coil TDO232, contacts TS234 of the top compartment selective relay having been reengaged at the initiation of the slow-down operation.

Switch TDO operates to cause the opening of the top compartment gate and the hatchway door at the eighth floor, this operation being effected in the same manner as described for opening the top compartment gate and hatchway door at the second level in response to movement of the starting switch to door opening position as previously described.

The engagement of contacts BP244 does not effect the opening of the hatchway door at the seventh floor and the bottom compartment gate owing to the fact that contacts BS243 of the bottom compartment selective relay are separated. Thus, the selective relays TS and BS act to select the gate and door which are opened upon a stop being made.

Should the speed of the car be above a predetermined value at the time that selector switch 302 opens, the subsequent opening of selector switch 290 is effected in so short a period that the energization of coils TP294 and BP295 is not of sufficient duration to effect the operation of relays TP and BP respectively. As a consequence, the opening of the top compartment gate and eighth floor hatchway door is not initiated at this time. In case the speed of the elevator car at the time selector switch 302 opens is unusually high due to some abnormal condition, selector switch 290 may open before contacts PP286 of the auxiliary door opening relay engage, thereby preventing energization of coils TP294 and BP295.

In the event that relays TP and BP are not operated during the interval between the opening of selector switch 302 and the opening of selector switch 290, they may be subsequently operated as the car enters the slow speed zone, provided that the speed of the car has been reduced to a certain value. As the car enters the slow speed zone, contacts LE301 of the levelling fast speed switch reengage, completing a circuit for coils TP294 and BP295 through contacts LH300, resistance 297 and reactance coil X296. The building up of the current supplied to these coils, under the assumed conditions of operation, is delayed by the effect of reactance coil X296. The effect of this reactance coil is adjustable by means of resistance 305. If the speed of the car at this time is not such as to cause the separation of contacts LE301, as a result of an overrun into the fast speed levelling zone, before the current supplied to coil TP294 and BP295 of the door operating relays has had time to build up sufficiently to effect the operation of the relays, contacts TP235 become latched in engagement to initiate the door and gate opening operation. Should the car overrun the floor into the fast speed levelling zone without having caused the operation of relays TP and BP, these relays are operated as a result of the reengagement of contacts LE301 upon the return of the car from the fast speed zone into the slow speed zone.

Upon the opening of the top compartment gate and the hatchway door at the eighth floor, gate contacts 363 and 446 open and the door contacts 447 for the eighth floor hatchway door open. The opening of gate contacts 363 prevents subsequent energization of coil H381. The opening of gate contacts 446 and door contacts 447 deenergize coil GT445 of the top compartment door contact relay. Relay GT separates its contacts GT377 and GT336 and engages its contacts GT847. Under the assumed conditions of operation the coils of the various switches subject to contacts GT377 have all been deenergized. The separation of contacts GT336 prevents manual control of the car at levelling speed by switches 334 and 335. The reengagement of contacts GT847 causes the lighting of the pilot light 846 in the bottom compartment, notifying the attendant therein that the stop is a normal one and that a transfer of passengers is due to take place in the top compartment. Furthermore, this serves as a signal to the bottom compartment attendant to center his starting switch in the event he has not already done so.

Upon the passenger having been discharged at the eighth floor, the top compartment attendant moves his starting switch to start position. This effects the reclosure of the top compartment gate and door at the eighth floor. It also causes the immediate extinguishing of pilot light 846 in the bottom compartment by causing the separation of contacts RT850 as previously described. This informs the attendant of the bottom compartment that the transfer of passengers in the top compartment has been completed and that he should move his starting switch to start position. Upon both starting switches being moved to start position, the car is restarted in the up direction upon the hatchway door at the eighth floor and top compartment gate reaching closed positions. Contacts OSB287 prevent the automatic reopening of the top compartment gate and opposite hatchway door upon closure of selector switch 290 during the starting operation.

The lighted hall lantern at the eighth floor is extinguished during the starting operation as a result of the operation of hall light relay HL and top compartment selector relay TS. It is to be noted in this connection that relay TS, operating immediately the starting switch is moved to door close position as a result of the operation of relay DN, causes the extinguishing of the hall lantern without waiting on the closure of the door and gate, thereby eliminating the attraction of intending passengers to the compartment after the starting switch has been thrown to on position. This augments the service afforded by the elevator installation.

In the above described slow-down operation, it was assumed that the starting switches in both compartments had been returned to off position. In the event that these switches are held in full running or intermediate positions, the starting switch sequence relays OSB and OST insure the slowing down of the car and bringing it to a stop, and the opening of the gate and door. Assume in the above example where the top compartment is brought to a stop at the eighth floor, that the top compartment starting switch is held in either full running or intermediate position during the slow-down operation. Upon the separation of contacts H890, coil OST886 of the top compartment starting switch sequence relay is not deenergized, owing to the fact that a circuit remains established for the coil through resistance 887 and starting switch contacts 885. Thus, relay OST does not drop out, maintaining its contacts OST884 in the circuit for coil RT882 separated. This prevents energization of coil RT882 by way of starting switch contacts 885 and therefore prevents the reoperation of the top compartment slow-down switch RT. Similarly, contacts OST264 remain separated, preventing the establishment of a circuit through starting switch contacts 261 for coil TP262 of the top compartment door operating relay to prevent the latching of contacts TP235 in engaged condition, which would prevent the opening of the door and gate. It is to be noted that with this arrangement, the top compartment starting switch must be returned to off position before the reclosing of the door and gate, and the restarting of the car can be effected.

Relay OSB operates in a similar manner when the bottom compartment starting switch is held in either full running or intermediate position. In the above example in which the stop was made to effect a transfer of passengers only in the top compartment, if the bottom compartment starting switch is held in an operative position during the slow-down operation, relay OSB, being maintained energized through resistance 914, would prevent the energization of coil RB907 and coil BP280 of the top compartment slow-down switch and door operating relay respectively through starting switch contacts 912 and 277. Thus, upon a stop at the eighth floor as above described, the starting switch in the bottom compartment must be returned to off position before the starting of the car may be effected. In this connection, it is to be noted that the energization of coils RT882 and RB907 during slowing down, as a result of holding both starting switches in operated condition, would result in the operation of switch AU to energize pawl magnet 873. This would cause the retraction of the pawls and prevent the car being brought to a full stop.

The steps of resistance in the circuit for the generator main field winding 1023 are proportioned to suit the requirements of the particular installation, both as regards the time for bringing the car up to speed and the smoothness of the starting operation. For retardation, in order to cause the car to slow down in the desired time interval, which may be less than the time interval for acceleration, the short circuit for resistance step 1035 is removed by contacts Z1006 of the notch-back switch, to permit a larger amount of resistance to be reinserted in the generator field winding circuit upon the separation of contacts F1061.

The load switch Q, by means of its contacts Q1005, assists in bringing the car to an accurate stop under different conditions of load. With the car travelling up with a light load, for example, the elevator motor armature is supplying current to the generator motor armature, and therefore the generator series field winding is opposing the separately excited field. The load switch Q, therefore, is not operated, its contacts Q1005 remaining in engagement. Thus, when contacts FF1060 are separated, only step 1033 of the control resistance is reinserted in circuit with the generator field winding. This reduces the generator E. M. F. and therefore increases the regenerative braking action.

Assume, by way of further example, that the car is travelling up with full load, which means that the generator armature is supplying current to the elevator motor armature, and therefore that the generator series field is assisting the separately excited field. The load switch, therefore, is operated and its contacts Q1005 are separated. Thus, when contacts FF1060 are separated, both steps 1033 and 1034 of the generator field control resistance are reinserted in the circuit of the generator field winding 1023. In this manner the tendency of the series field to keep the generator E. M. F. above the counter E. M. F. of the elevator motor is overcome by a large reduction in the strength of generator field winding 1023 so that regeneration is immediately effected.

Switches Z and Q drop out late in the slow-down operation. Switch Z, in dropping out, separates its contacts Z352 to deenergize coil I351 of the field switch. Switch I reengages contacts I105 in shunt to resistance step 111 for the elevator motor field winding.

The brush magnet relay BM and second auxiliary brush magnet relay BBM drop out during the slow-down period. Relay BM separates its contacts BM894 in circuit for up brush advance magnet 891, this circuit having been previously broken by the separation of contacts RT901. Relay BBM separates its contacts BBM952 to break the circuit for coil ABM951 of the first auxiliary brush magnet relay. Switch IRT, energized initially by relay BBM has already dropped out as a result of the energization of its coil IRT833. Switch IRB, also energized initially as a result of the engagement of contacts BBM952, is maintained energized through contacts IRB961.

Relay ABM separates its contacts ABM844 and ABM1007 and reengages its contacts ABM973 and ABM991. The separation of the contacts ABM1007 in the by-pass circuit for resistance steps 1037 and 1040 is without effect, as this circuit has already been broken at contacts IRT1010. Contacts ABM844 separate in preparation for the next starting operation. Contacts ABM973 are in the holding circuits for coil TS985, this coil having already been deenergized as a result of the separation of contacts AU986 and ART980. Contacts ABM991 in the holding circuits for coil BS996 reengage in preparation for the next starting operation, this coil being maintained energized through contacts D990 and contacts IRB994 in parallel with contacts ABM991.

The safety handle relay O is arranged to hold in until after the separation of contacts H1021 and H1043, being assisted by the action of generator field discharge resistance 1022. This insures the deenergization of coil H381 by selector switches 366 and 387. Relay O, upon dropping out separates contacts O391 to break the circuit for coil MM374 of the idling switch relay. Relay MM drops out as a result of the deenergization of this coil and causes the separation of its contacts MM130 and MM134. The separation of contacts MM134 causes the deenergization of coil K132 of the resistance cut-out switch, causing this switch to drop out. The resultant separation of contacts K47, K52 and K56 reinserts resistances 71, 73 and 75 in circuit with the phase windings of the driving motor.

Switch K also separates contacts K125, which, together with the separation of contacts MM130, deenergizes coil M127 of the idling switch. Resistance 123 is connected across this coil to prevent arcing upon the breaking of the circuit. The idling switch separates its contacts M50, M53 and M55 and reengages its contacts M90 and M91 to change the connections of the driving motor from delta back to star relation. Thus, during levelling and the time that the elevator car is stopped, the driving motor runs star connected.

Relay M also separates contacts M137 and M133 and reengages contacts M60. Switch K also separates contacts K141 and K402 and reengages contacts K61. Contacts M60 and K61 are in the initial energizing circuit for the coil of line switch relay LL. Contacts M133 are in the circuit for coil K132, already broken at contacts MM134. Contacts K402 are in the circuit for speed switch coils D400 and BB407. The separation of contacts K141, together with the separation of contacts M137, breaks the circuit for coil RM140 of the resistance relay. This relay separates contacts RM136 in its holding circuit and reengages contacts RM122 and RM135 to short-circuit cooling resistances 126 and 131 for coils M127 and K132 respectively.

In the example chosen for purposes of illustrating the operation of the system, it was assumed that the passenger taken into the top compartment at the lower terminal desired to be carried to the eighth floor. Assume now, for purposes of further illustration, that the passenger desired to be carried to the sixth floor instead. The top compartment attendant presses the sixth floor car button 635, rendering stationary contacts 636 and 637 "alive". As the car moves up the hatchway, slow-down brush 726 is moved to its fully advanced position and, upon its engagement with contact 636, causes the dropping out of top compartment slow-down switch RT. Although all the speed switches are in operated condition at this time, the time constant of the generator field prevents the field from being built up to its full strength and the dropping out of the fifth speed switch FF, as a result of the separation of contacts RT434, does not cause slow-down to begin.

It is to be noted that secondary auxiliary brush magnet relay BbM, which operates right after brush magnet relay BM, causes first auxiliary brush magnet relay ABM to be operated and therefore contacts ABM1007 to be in engagement completing the by-pass circuit for generator field control resistance steps 1037 and 1040. Thus, although the auxiliary retarding relay AU, deenergized as a result of the separation of contacts RT901, breaks the circuit for the coils of the speed switches F and E, the immediate dropping out of switch E and the delayed dropping out of switch F is not effective to reinsert resistance steps 1037 and 1040 in circuit with field winding 1023. Continued acceleration takes place, therefore, after the engagement of brush 726 with contact 636 until a speed is attained commensurate with the amount of generator field control resistance which is short circuited.

As the car continues to approach the floor, secondary slow-down brush 700 engages "alive" contact 637, causing the dropping out of top compartment secondary slow-down switch IRT. Switch IRT separates its contacts IRT1010 to remove the short-circuit for resistance steps 1037 and 1040, causing slow-down to take place, and separates its contacts IRT871 to deenergize pawl magnet 873, causing the car to be further slowed down and brought to a stop with the top compartment level with the sixth floor landing. The top compartment gate and sixth floor hatchway door are opened as the top compartment comes to rest at the sixth floor. Switch IRT also causes the operation of advance light relay AL, which engages contacts AL806 to complete a circuit for up hall lantern 656 at the sixth floor, this circuit extending through contact 661 for the sixth floor and up advance light brush 741. Thereafter, the hall light relay HL is deenergized to transfer the circuit for the up sixth floor hall lantern 656 to up following light brush 762.

Assume for purposes of further illustration that the fourth floor car button 676 was pressed instead of the sixth floor car button 635. This being a two floor run, the up slow-down brushes will advance beyond the up secondary slow-down brushes so that top compartment slow-down switch RT is dropped out as a result of the engagement of brush 726 with "alive" contact 677. The operation is similar to that described for a four floor run in that acceleration continues after the engagement of brush 726 and contact 677, and slow-down is initiated upon the engagement of brush 700 with "alive" contact 680. The up hall lantern 697 at the fourth floor is lighted as a result of the operation of advance light relay AL and later dropping out of hall light relay HL, the circuit extending by way of stationary contact 711. The gate and door are opened as before as the car is being brought to a stop.

Assume now that instead of a passenger being taken into the top compartment at the lower terminal, a passenger is taken into the bottom compartment, and that this passenger desires to alight at the seventh floor. The attendant presses car button 595 for the seventh floor, which is maintained operated by bottom compartment car button magnet 964.

Upon the bottom compartment arriving at a certain distance from the seventh floor, slow-down brush 730 for the bottom compartment car buttons engages "alive" stationary contact 596 for the seventh floor. This completes the circuit for restoring coil RB932 of the bottom compartment slow-down switch. This coil neutralizes the effect of operating coil RB907, causing the switch to drop out.

Switch RB separates contacts RB970 to deenergize bottom compartment auxiliary slow-down switch ARB and also separates contacts RB902 to deenergize auxiliary retarding relay AU. Relay ARB separates contacts ARB993 and relay AU separates contacts AU997 to deenergize bottom compartment selective relay BS, thereby causing engagement of contacts BS243 to prepare the circuit for initiating the door and gate opening operation at the seventh floor and engagement of contacts BS826 to prepare the circuit for lighting the up hall lantern 632 at the seventh floor. Switch RB also separates contacts RB435 to deenergize fifth speed switch FF while AU separates contacts AU441 and AU416 to deenergize fourth speed switch F and third speed switch E respectively, as previously explained. This causes slowing down of the elevator car to take place.

Upon the engagement of up secondary slow-down brush 702 for the bottom compartment car buttons with "alive" stationary contact 597 as a result of continued movement of the car, a circuit is completed for restoring coil IRB834 of the bottom compartment secondary slow-down switch. This coil neutralizes the effect of operating coil IRB955, causing separation of contacts IRB994, IRB961, IRB872, IRB1017 and IRB804 and reengagement of contacts IRB957 and IRB860. Contacts IRB994 are in the holding circuits for coil BS996, this coil having already been deenergized as a result of the separation of contacts AU997 and ARB993. Contacts IRB957 are in the initial energizing circuit for coil IRB955. Contacts IRB961 break the holding circuit for coil IRB955 while, at the same time, contacts IRB804 break the circuit for restoring coil IRB834. Contacts IRB1017 remove the short-circuit for resistance steps 1037 and 1040 for generator field winding 1023, causing a decrease in the generator voltage with consequent decrease of elevator motor speed.

Contacts IRB860 complete a circuit for coil AL851 of the advance light relay, causing the engagement of contacts AL820. At this time, the bottom compartment up advance light brush 742 is in engagement with bottom compartment up hall lantern contact 620 for the seventh floor. Thus, the engagement of contacts AL820 completes a circuit for the up hall lantern 632 at the seventh floor, causing this lantern to be lighted.

Contacts IRB872 break the circuit for pawl magnet 873, permitting the pawls to be extended. The up pawl thereafter engages the stopping collar for the eighth floor and, as continued movement of the car takes place, opens the selector switches to cause the car to be further slowed down and finally brought to a stop with the bottom compartment in alignment with the seventh floor landing. The circuit for the hall lantern 632 at the seventh floor is taken up by the bottom compartment up following brush 763 upon the dropping out of hall light relay HL during the slow-down operation.

The circuit for initiating the opening of the bottom compartment gate and seventh floor hatchway door is completed shortly before the car is brought to a stop, by the engagement of contacts BP244. Upon the opening of the gate and door and consequent separation of gate contacts 455 and door contacts 456, the circuit for coil GB451 of the bottom compartment door contact relay is broken. This relay separates its contacts GB380 and GB337, and engages its contacts GB841. The engagement of contacts GB841 causes the lighting of the pilot light 830 in the top compartment, notifying the attendant therein that a transfer of passengers is due to take place in the bottom compartment.

If the fifth floor car button 640 in the bottom compartment is pressed instead of the seventh floor car button, the car is caused to slow down and stop with the bottom compartment level with the fifth floor landing, the up fifth floor hall lantern is lighted and the bottom compartment gate and fifth floor hatchway door are caused to open. These operations are effected in the same manner as described for a stop at the seventh floor. Button 640 renders contacts 641 and 642 "alive" so that a circuit is completed for bottom compartment slow-down switch restoring coil RB832 upon the engagement of contact 641 by brush 730 and a circuit is completed for the bottom compartment secondary slow-down switch restoring coil IRB834 upon the engagement of contact 642 by brush 702. The up hall lantern 674 at the fifth floor is lighted upon operation of advance light relay AL as before, the circuit for the lantern extending through contact 662 and brush 742 and later through brush 763 upon the dropping out of hall light relay HL.

Similarly, if third floor car button 681 is pressed instead of the seventh, the car is caused to slow down and stop with the bottom compartment level with the third floor landing, the up third floor hall lantern is lighted and the bottom compartment gate and third floor hatchway door are caused to open. Button 681 renders contacts 682 and 683 "alive" so that a circuit is completed for bottom compartment slow-down switch restoring coil RB832 upon the engagement of contact 682 by brush 730 and a circuit is completed for the bottom compartment secondary slow-down switch restoring coil IRB834 upon the engagement of contact 683 by brush 702. The up hall lantern 725 at the third floor is lighted upon operation of advance light relay AL, the circuit for the lantern extending through contact 712 and brush 742 and later through brush 763 upon the dropping out of hall light relay HL.

Assume for purposes of further description that a passenger is taken into each compartment at the lower terminal and that the passenger in the bottom compartment desires to alight at the seventh floor and the passenger in the top compartment desires to alight at the eighth floor. The pressing of top compartment eighth floor car button 592 and bottom compartment seventh floor car button 595 renders their corresponding stationary contacts "alive" as before. Brushes 726 and 730 engage stationary contacts 593 and 596 respectively at the same time upon the arrival of the compartments at a predetermined distance from these floors. This causes the simultaneous dropping out of the top compartment slow-down switch RT and the bottom compartment slow-down switch RB. These switches act in unison to cause slow-down of the car to take place. Similarly, upon further movement of the car, brushes 700 and 702 engage stationary contacts 594 and 597 respectively at the same time, causing the simultaneous dropping out of the secondary slow-down switches IRT and IRB. These switches act in unison to cause the car to be further slowed down and finally brought to a stop with the top compartment in alignment with the eighth floor landing and the bottom compartment in alignment with the seventh floor landing.

Both the auxiliary slow-down switches ART and ARB drop out during slow-down, as previously described, which, together with the dropping out of auxiliary retarding relay AU, causes the deenergization of the selective relays TS and BS for the two compartments. Thus, both up hall lantern 613 at the eighth floor and up hall lantern 632 at the seventh floor are lighted and, as the car is brought to a stop, both compartment gates and the eighth floor and seventh floor hatchway doors are caused to open. The pilot lights 830 and 846 in both compartments are lighted, advising each attendant that a passenger transferring stop has been made by the other compartment.

Assume, after a stop of the top compartment at the fourth floor, for example, that no other buttons are pressed. Upon the movement of the starting switches in both compartments to full running position and upon the closing of the fourth floor hatchway door and top compartment gate, the car is restarted in the up direction. The lighted hall lantern at the fourth floor is extinguished during the starting operation as a result of the operation of hall light relay HL and top compartment selective relay TS.

With no other buttons pressed the car continues to the upper terminal. Upon its arrival at a certain distance therefrom, switch 421 of the terminal stopping device is opened, breaking the circuit for coils FF436, F426 and E413 of the fifth, fourth and third speed switches. This causes the car to slow down as previously explained. Upon continued movement of the car, switch 947 of the terminal stopping device is opened, breaking the circuit for coils IRT941 and IRB955 of the secondary slow-down switches and for coil ABM951 of the first auxiliary brush magnet relay. This results in the separation of contacts IRT1010, IRB1017 and ABM1007 to effect further slow-down. Thereafter switch 395 of the terminal stopping device is opened to break the circuit for coils DD407 and D400 of the second and first speed switches, further slowing down the car. Finally switch 367 of the terminal stopping device is opened to deenergize coil H381 of the main brake and field switch, causing the car to be brought to a stop with the top compartment level with the top floor landing and the bottom compartment level with the ninth floor landing.

Owing to the fact that selector stationary contacts 562, 563, 564 and 565 are "alive" so long as contacts C174 and C175 are engaged, the engagement of these contacts by their cooperating slow-down and secondary slow-down brushes 726, 700, 730 and 702, respectively, insures the slowing down and stopping of the car at the upper terminal. It is preferred to cause the opening of the switches of the terminal stopping device in advance of the engagement of the slow-down brushes and stationary contacts and opening of selector switches for the corresponding slow-down operations to insure the car being brought to a stop at the upper terminal without any appreciable overrun. In this connection, it is to be noted that terminal stopping device switch 947 is not set to open so far in advance as to cause too premature deenergization of pawl magnet 813.

Selector terminal switch 291 is opened in sufficient advance of the stop to prevent the energization of coils TP294 and BP295 upon the opening of selector switch 302 to effect the reengagement of contacts PP286. This causes the door and gate opening operation to be initiated at the upper terminal upon arrival of the compartments in their slow speed levelling zones. This is in sufficient advance of the stop owing to the fact that the car is running very slowly during the latter part of the slow-down operation at the upper terminal, thus insuring time for substantially full opening of both compartment gates and opposite hatchway doors by the time the car is brought to a stop.

As the car approaches the upper terminal, limit switch 165 is opened. Auxiliary direction switch contacts PA155 are separated at this time so that, if governor switch 153 also is open, the opening of limit switch 165 breaks the circuit for coil C162 of the potential switch. Unless the car is running at an abnormally high speed at the time limit switch 165 opens, governor switch 153 is closed so that the potential switch is not dropped out. Should abnormal speed conditions exist, however, causing governor switch 153 to be open at the time that limit switch 165 opens, the potential switch is dropped out to cause the immediate deenergization of the generator field and the application of the brake to bring the car to a stop. This arrangement minimizes the possibility of the car running into the overhead due to its not having been slowed to a predetermined speed at the time limit switch 165 opens.

Limit switch 165, in breaking the circuit for coil C162 of the potential switch, at the same time breaks the circuit for coil GS163 of the protective sequence relay. This destroys the magnetic balance between coils GS163 and GS150, coil GS150 causing the separation of contacts GS146 to insert resistance 160 in circuit with coils C162 and GS163. Contacts GS146 are latched in separated condition so that, inasmuch as the value of resistance 160 is sufficient to prevent the operation of the potential switch after the closing of governor switch 153, it becomes necessary to manually restore the protective sequence relay GS before the potential switch can be reoperated. This insures that the abnormal condition which prevented the desired speed reduction is definitely called to the attention of the control room attendant for rectification before permitting reoperation of the system.

As the car arrives at the upper terminal, brush 940 engages selector stationary contact 926. Thus, upon the reengagement of contacts H921 and LH920 as the car is brought to a stop, a circuit is completed for restoring coil PU922 of the up direction switch and for operating coil PD923 of the down direction switch. This causes reset of the up direction switch and the latching of the down direction switch in operated condition. Upon the latching of the down direction switch being effected, contacts PD924 are separated, breaking the circuit. Switches PU and PD are preferably mechanically interlocked, as by a walking beam. This insures the reset of switch PU before latch contacts PD924 separate. Discharge resistance 916 in shunt to coils PD922 and PD923 acts to absorb any arc incident to the separation of contacts PD924.

Upon the reset of the up direction switch PU, contacts PU1003, PU1070, PU365, PU727 and PU731 are separated and contacts PU770, PU773, PU747, PU752 and PU464 are engaged. Upon the operation of down direction switch PD, contacts PD1004, PD1066, PD386, PD765 and PD767 are engaged and contacts PD732, PD735, PD753, PD756 and PD454 are separated.

The separation of contacts PD454 breaks the circuit for auxiliary direction switch coils PA453 and PC456, while the engagement of contacts PU464 causes the energization of auxiliary direction switch coils PD463 and PE467. Auxiliary direction switch PA, upon dropping out, separates its contacts PA946, PA701, PA710, PA965, PA154, PA324 and PA892, and reengages its contacts PA790, PA963, PA785 and PA155. Auxiliary direction switch PC, upon dropping out, separates contacts PC703 and PC705, and reengages contacts PC787 and PC793. Auxiliary direction switch PB, upon operation, engages contacts PB953, PB320, PB891, PB794, PB795, PB796 and PB797, and separates contacts PB800, PB807, PB816 and PB821. Auxiliary direction switch PE, upon operation, engages contacts PE423 and PE403, and separates contacts PE420 and PE394.

Contacts PU365 and PD386 are for the purpose of insuring the dropping out of switch H by the terminal stopping device switches at the terminals and permitting reoperation of switch H to effect starting of the car in the opposite direction. Contacts PA946 and PB953 serve a similar purpose in connection with the operation of switches IRT, IRB and ABM at the terminals. Contacts PE420 and PE423 serve a similar purpose in connection with the operation of speed switches FF, F and E at the terminals and contacts PE394 and PE403 serve a similar purpose in connection with the operation of speed switches DD and D at the terminals.

Contacts PA155 serve to maintain the circuit for potential switch coil C162 during starting of the car away from the upper terminal in the down direction in the event that governor switch 153 opens before the reclosing of limit switch 165. The separation of contacts PA892 opens the circuit for up brush advance magnet 891 while the simultaneous engagement of contacts PB891 prepares the circuit for down brush advance magnet 896. The separation of contacts PA965 and subsequent engagement of contacts PA963 causes the deenergization and subsequent energization of car button magnets 962 and 964 for the two compartments. This releases all pressed car buttons to open circuit condition and renders the magnets effective to maintain subsequently pressed car buttons in operated condition. The separation of contacts PA324 opens the circuit for resistance 317 through contacts LD325 while the engagement of contacts PB320 prepares the circuit for resistance 317 through contacts LU321.

The separation of contacts PU727 and PU731 opens the circuits to brushes 726 and 730 respectively while the simultaneous engagement of contacts PD765 and PD767 prepares the circuits to brushes 764 and 766. The separation of contacts PD732, PD735, PD753 and PD756 opens the circuits to brushes 733, 734, 774 and 775 respectively, while the simultaneous engagement of contacts PU770, PU773, PU747 and PU752 prepares the circuits to brushes 771, 772, 750 and 751 respectively. The separation of contacts PA701, PA710, PC703 and PC705 opens the circuit to brushes 700, 707, 702 and 706 respectively, while the simultaneous engagement of contacts PA785, PA790, PC787 and PC793 prepares the circuit to brushes 784, 791, 786 and 792 respectively.

The down top floor hall lantern 572 and down ninth floor hall lantern 587 are lighted as the car slows down at the upper terminal, the circuit for lantern 572 being through stationary contact 575 and brush 741 and later brush 762, while the circuit for lantern 587 is through stationary contact 576 and brush 742 and later brush 763. The separation of contacts PB800, PB807, PB816 and PB821 opens the circuits to brushes 762, 741, 763 and 742 respectively, while at the same time the engagement of contacts PB797 and PB795 prepares the circuits for brushes 776 and 777 respectively, and the engagement of contacts PB796 and PB794 connects brushes 757 and 760 respectively to the grounded neutral of the supply mains through contacts HL817 and HL805 respectively. Inasmuch as brushes 757 and 760 are in engagement with selector stationary contacts 570 and 571 respectively with the car stopped at the upper terminal, the circuits for the down hall lanterns at the top and ninth floors are transferred from the up to the down following light brushes as a result of the operation of auxiliary direction switch PB.

The separation of contacts PU1003 and PU1070 and the simultaneous engagement of contacts PD1004 and PD1066 causes the circuit prepared for the main generator field winding 1023 to be reversed. Thus, upon engagement of contacts H1021 and H1043 to complete the circuit for field winding 1023, the car is started in the down direction.

The closing of the compartment gates and hatchway doors and the starting of the car from the upper terminal is effected in the same manner as described for starting the car in the up direction. Movement of the car starting switches in both compartments to full running position bridges contacts 370 and 371 which, together with the engagement of gate contacts 363 and 364 and contacts GT377 and GB380 of the door contact relays as a result of the closure of the gates and doors, completes a circuit for coil H381 through auxiliary direction switch contacts PD386, selector switch 387 and switch 390 of the terminal stopping device. Switch H operates to engage contacts H1021 and H1043 to complete the circuit for the generator field winding 1023. The current through the field winding being reversed as a result of the operation of the direction switches, the car is started in the down direction. Otherwise the operation of the system to start and accelerate the car is the same as that previously described.

The circuits for certain coils are different as a result of the operation of the direction switches. The circuits for coils D400 and DD407 of the first and second speed switches are through auxiliary direction switch contacts PE403, switch 404 of the terminal stopping device and selector switch 405. The circuits for coils E413, F426 and FF436 of the third, fourth and fifth speed switches are through auxiliary direction switch contacts PE423 and switch 424 of the terminal stopping device. The circuits for coils IRT941, IRB955 and ABM951 of the secondary slow-down switches and first auxiliary brush magnet relay are through auxiliary direction switch contacts PB953 and switch 954 of the terminal stopping device. The brush magnet relay, upon operation to engage contacts BM894, completes a circuit for the down brush advance magnet 896 instead of the up magnet 891, causing movement of the down slow-down brushes to advanced positions.

Response is had to car buttons during downward travel of the car in a manner similar to that in which response is had to car buttons during upward travel. The pressing of any car button in the bottom compartment for an odd numbered floor or in the top compartment for an even numbered floor, renders the corresponding selector stationary contacts "alive". The engagement of "alive" car button stationary contacts for the top compartment by brushes 764 and 784 and the engagement of "alive" car button stationary contacts for the bottom compartment by brushes 766 and 786 during downward travel of the car causes slow-down to be initiated and the car is thereafter further slowed down and finally brought to a stop with the proper compartment in exact alignment with the floor corresponding to the button pressed. It is believed that this operation will be readily understood from previously described slow-down and stopping operations, and need not be described in detail.

The door and gate opening operation during stops in a down direction is effected in the same manner as described for stops in the up direction. Also the down hall lanterns are lighted at floors at which stops are being made. The circuits for the down hall lanterns for even numbered floors during stops for transfer of passengers from the top compartment being first through advance brush 777 and then following brush 760 and the circuits for the down hall lanterns for odd numbered floors during stops for transfer of passengers from the bottom compartments being first through advance brush 776 and then following brush 757. The circuit for down eight floor hall lantern 612 is through its stationary contact 611; the circuit for down seventh floor hall lantern 631 is through stationary contact 610; the circuit for down sixth floor hall lantern 655 is through stationary contact 654; the circuit for down fifth floor hall lantern 673 is through stationary contact 653; the circuit for down fourth floor hall lantern 696 is through stationary contact 695; and the circuit for down third floor hall lantern 724 is through stationary contact 694.

Upon the arrival of the car at a certain distance from the lower terminal, switch 424 of the terminal stopping device is opened, breaking the circuit for coils FF436, F426 and E413 of the fifth, fourth and third speed switches. Upon continued movement of the car, switch 954 of the terminal stopping device is opened, breaking the circuit for coils IRT941 and IRB955 of the top compartment secondary slow-down switch and for coil ABM951 of the first auxiliary brush magnet relay. Thereafter switch 404 of the terminal stopping device is opened to break the circuit for coils DD407 and D400 of the second and first speed switches. Finally switch 390 of the terminal stopping device is opened to deenergize coil H381 of the main brake and field switch. The car is therefore slowed down and finally brought to a stop with the top compartment level with the second floor level and the bottom compartment level with the first floor level.

As in the case of the selector car button stationary contacts for the upper terminal, these contacts 743, 744, 745 and 746 for the lower terminal are "alive" so that the engagement of the contacts by their cooperating slow-down and secondary slow-down brushes 764, 784, 766 and 786 respectively, insures the slowing down and stopping of the car at the lower terminal. Also, as in the case of the upper terminal, it is preferred to cause the opening of the switches of the terminal stopping device in advance of the engagement of the slow-down brushes and stationary contacts and the opening of selector switches for the corresponding slow-down operations to insure the car being brought to a stop at the lower terminal without any appreciable overrun.

Selector terminal switch 292 is opened in sufficient advance of the stop to prevent the energization of coils TP294 and BP295 of the door operating relays upon the opening of selector switch 302 to effect reengagement of contacts PP286. This causes the door and gate opening operation to be initiated at the lower terminal upon arrival of the compartments in their slow speed levelling zones. As in the case of the stop at the upper terminal, this is in sufficient advance of the stop owing to the fact that the car is running very slowly in the latter part of the slow-down operation at the lower terminal, thus insuring time for substantially full opening of both compartment gates and opposite hatchway doors by the time the car is brought to a stop.

The opening of limit switch 164 as the car approaches the lower terminal minimizes the possibility of the car running into the pit due to its not having been slowed down to a predetermined speed at the time limit switch 164 opens. This has already been described in connection with the operation of limit switch 165 at the upper terminal.

As the car arrives at the lower terminal, brush 940 engages selector stationary contact 937. Thus, upon the reengagement of contacts H921 and LH920 as the car is brought to a stop, a circuit is completed for restoring coil PD933 of the down direction switch and for operating coil PU934 of the up direction switch. This causes reset of the down direction switch and the latching of the up direction switch in operated condition. Upon the reset of the down direction switch and latching of the up direction switch being effected, contacts PU935 are separated, breaking the circuit. Discharge resistance 927 in shunt to coils PD933 and PU934 acts to absorb any arc incident to the separation of contacts PU935.

Upon the reset of the down direction switch PD, contacts PD1004, PD1066, PD386, PD765, PD767 are separated and contacts PD732, PD735, PD753, PD756 and PD454 are engaged. Upon the operation of the up direction switch PU, contacts PU1003, PU1070, PU365, PU727 and PU731 are engaged and contacts PU770, PU773, PU747, PU752 and PU464 are separated.

The separation of contacts PU464 breaks the circuit for auxiliary direction switch coils PB463 and PE467 while the engagement of contacts PD454 causes the energization of auxiliary direction switch coils PA453 and PC458. Auxiliary direction switch PA, upon operation, engages its contacts PA946, PA701, PA710, PA965, PA154, PA324 and PA892, and separates its contacts PA790, PA963, PA785 and PA155. Auxiliary direction switch PC, upon operation, engages contacts PC 703 and PC705, and separates contacts PC787 and PC793. Auxiliary direction switch PB, upon dropping out, separates contacts PB953, PB320, PB897, PB794, PB795, PB796 and PB797, and engages contacts PB800, PB807, PB816 and PB821. Auxiliary direction switch PE, upon dropping out, separates contacts PE423 and PE403, and engages contacts PE420 and PE394.

Contacts PU365, PD386, PA946, PB953, PE420, PE423, PE394 and PE403, as pointed out in describing the stopping of the car at the upper terminal, are for the purpose of insuring the dropping out of the respective switches which they control by the terminal stopping device switches and of permitting reoperation of these controlled switches to effect the starting of the car in the opposite direction. Contacts PA154 serve to maintain the circuit for potential switch coil C162 during starting of the car away from the lower terminal in the up direction in the event that governor switch 153 opens before the reclosing of switch 164. The separation of contacts PB897 opens the circuit for down brush advance magnet 896 while the simultaneous engagement of contacts PA892 prepares the circuit for up brush advance magnet 891. The separation of contacts PA963 deenergizes car button magnets 962 and 964 to release all operated car buttons while the subsequent engagement of contacts PA965 causes the reenergization of these magnets. The separation of contacts PB320 opens the circuit for resistance 317 through contacts LU321 while the engagement of contacts PA324 prepares the circuit for resistance 317 through contacts LD325.

Contacts PU727, PU731, PD765, PD767, PD732, PD735, PD753, PD756, PU770, PU773, PU747, PU752, PA701, PA710, PC703, PC705, PA785, PA790, PC787 and PC793 open the circuits for the down slow-down and reset brushes and prepare the circuits for the up slow-down and reset brushes.

The up first level hall lantern 783 and the up second level hall lantern 761 are lighted as the car slows down at the lower terminal, the circuit for lantern 783 being through stationary contacts 736 and brush 776 and later brush 757, while the circuit for lantern 761 is through stationary contacts 737 and brush 777 and later brush 760. The separation of contacts PB796, PB794, PB797 and PB795 opens the circuits to brushes 757, 760, 776 and 777 respectively, while at the same time the engagement of contacts PB807 and PB821 prepares the circuits for brushes 741 and 742 respectively, and the engagement of contacts PB800 and PB816 connects brushes 762 and 763 respectively to the grounded neutral of the supply mains. Inasmuch as brushes 762 and 763 are in engagement with selector stationary contacts 780 and 781 respectively with the car stopped at the lower terminal, the circuits for the up hall lanterns at the first and second levels are transferred from the down to the up following light brushes as a result of the operation of auxiliary direction switch PB.

The separation of contacts PD1004 and PD1066 and the simultaneous engagement of contacts PU1003 and PU1070 causes the circuit for the main generator field winding 1023 to be prepared for travel of the car in the upward direction.

Since the car buttons in both compartments are maintained operated, once pressed, by their respective car button magnets, until the next terminal is reached, the corresponding selector stationary contacts are maintained "alive" during this time. Thus, response is had to the car buttons regardless of the compartment in which the car buttons are operated, regardless of whether buttons in both or only one compartment are operated and regardless of the order in which the buttons are pressed. Also, response is had to car buttons regardless of the time during the run to the next terminal that the button is pushed, so long as the advance brush for that compartment has not passed the corresponding selector stationary contact for that floor at the time that the car button is pressed. Thus, during up car travel, response is had, for example, to the top compartment eighth floor car button pressed at the lower terminal floor, to bottom compartment third floor car button pressed at the lower terminal but after the top compartment eighth floor car button and to the bottom compartment seventh floor car button and top compartment sixth floor car button pressed in either sequence while the bottom compartment is stopped at the third floor. Similarly, during down car travel, response is had, for example, to the top compartment sixth floor car button pressed at the upper terminal, to the bottom compartment seventh floor car button pressed at the upper terminal either before or after the sixth floor button and to the bottom compartment third floor car button pressed after the bottom compartment leaves the seventh floor but prior to the disengagement of brush 766 and contact 682.

It is to be noted that no hall buttons have been pushed under the conditions thus far assumed in describing the operation of the system. Thus, no circuits have been completed by the slow-down brushes for the hall buttons during travel of the car. Assume now that, with the car positioned at the lower terminal, the up eighth floor hall button 492 is pressed. This completes a circuit from the grounded neutral to phase I of the supply mains through operating coil 513 of the up eighth floor relay. This relay operates in the manner previously described to latch contacts 555 in engagement. The engagement of these contacts connects selector stationary contacts 606 and 607 to ground through bus bar UH8 and up eighth floor relay reset coil 534. One side of the exciter being grounded at 100, the engagement of contacts 555 renders contacts 606 and 607 "alive".

As the car approaches the eighth floor, up slow-down brush 734 engages stationary contact 606, completing a circuit for restoring coil RT831 of the top compartment slow-down switch through contacts NST811, contacts PD735, bar UH8, contacts 555, coil 534 and ground to the negative side of the exciter, coil RT831 being connected to the positive side of the exciter through contacts AU843 and contacts C175. Owing to the resistance of this circuit, sufficient current is not supplied to reset coil 534 to effect the reset of the up eighth floor relay. Slow-down switch RT, however, operates to cause slow-down of the car as previously described.

Upon the engagement of contacts 607 by up secondary slow-down brush 707, a circuit is completed for restoring coil IRT833 of the top compartment secondary slow-down switch. This circuit also extends through up eighth floor relay reset coil 534. Inasmuch as the resistance of this circuit is lower than that of the circuit through coil RT831, the up eighth floor relay is caused to be reset, separating its contacts 555. The secondary slow-down switch is faster than the floor relay and opens before the reset of the floor relay is effected. The opening of the secondary slow-down switch causes the further slowing down of the car. Thereafter, the car is brought to a stop with the top compartment level with the eighth floor landing in the manner previously described.

Assume now that the up seventh floor hall button 490 was pressed instead of the eighth floor hall button. Button 490 causes the energization of operating coil 511 of the up seventh floor relay. This relay operates to latch its contacts 553 in engagement. The engagement of contacts 553 renders selector stationary contacts 604 and 605 for the bottom compartment "alive", the circuit extending through bus bar UH7. Upon the engagement of contacts 605 by brush 733 as the car travels up the hatchway, a circuit is completed for coil RB832 of the bottom compartment slow-down switch, causing the slowing down of the car to take place. Thereafter, as the car continues its movement, brush 706 engages contacts 604, completing a circuit for coil IRB834 of the bottom compartment auxiliary slow-down switch. This results in the further slowing down of the car. The circuit for coil IRB834 extends through reset coil 532 of the up seventh floor relay, causing this relay to be reset. The car is thereafter brought to a final stop with the bottom compartment in alignment with the seventh floor landing as previously described.

Response is had to other operated up hall buttons during up car travel in a similar manner. When the slow-down is initiated in response to an up hall button for an even numbered floor, the stop is made with the top compartment at the floor landing at which the button is pressed. When the slow-down is initiated in response to an up hall button for an odd numbered floor, the stop is made with the bottom compartment at the floor landing at which the button is pressed.

In the event that down hall buttons are pressed, these buttons are answered during downward travel of the elevator car. When the slow-down is initiated in response to a down hall button for an even numbered floor, the stop is made with the top compartment at the floor landing at which the button is pressed. When the slow-down is initiated in response to a down hall button for an odd numbered floor, the stop is made with the bottom compartment at the floor landing at which the button is pressed.

Upon each stop in response to a hall button, the hall lantern for the direction in which the car is travelling and at the floor at which the button is located is lighted during the slow-down operation and while the car is stopped at the floor. Also, the proper compartment gate and opposite hatchway door are opened as the compartment comes to rest at the landing. These operations have already been fully described.

As in the case of the car buttons, response is always had to hall buttons, regardless of the time that the hall buttons are pressed. This is true since the floor relays, once operated in response to the pressing of their corresponding buttons, are maintained operated until tripped out by reset operations. Thus, the corresponding stationary contacts of the selector machine are maintained "alive" until the call is answered. With this arrangement, stops are made in the natural order of floors, regardless of the order in which the buttons are pressed. During a run from the lower to the upper terminal, if an up hall button slow-down brush has not disengaged the selector stationary contact corresponding to the up hall button pressed at the time that the pressing of the button occurred, the car is caused to slow down and stop at the floor at which the button is located. Similarly, during a run from the upper to the lower terminal, if a down hall button slow-down brush has not disengaged the selector stationary contact corresponding to the down hall button pressed at the time that the pressing of the button occurred, the car is caused to slow down and stop at the floor at which the button is located. As distinguished from car button operation, the selector stationary contacts are not rendered "dead" at the terminals, so the call is ultimately responded to. Thus, a hall button pressed after the disengagement of the slow-down brush for the corresponding direction of travel and the selector stationary contact corresponding to the button pressed, is answered on the next trip of the car.

Since the result of pressing either a car button or a hall button is to render a corresponding contact of the selector machine "alive", it is believed obvious that a car responds to all operated buttons during a run, regardless of whether car or hall buttons and regardless of the relative order in which the buttons are pressed.

Should a hall button for the direction in which the car is travelling be pressed after the disengagement of the corresponding stationary contact and cooperating slow-down brush, but prior to the engagement of the secondary slow-down brush and corresponding selector stationary contact, a false operation is prevented by non-interference relay N. This relay has its contacts N822 and N823 in circuit for the restoring coils IRT833 and IRB834 of the secondary slow-down switches. Thus, under the conditions assumed, the circuits for these coils cannot be completed, avoiding a slow-down as well as the unwarranted reset of the floor relay.

However, should this late pressed hall button be at an odd numbered floor and be pressed under conditions where the car has already started to slow down to permit the transfer of passengers at the floor next above, or should this button be for an even numbered floor and be pressed under conditions where the car has already started to slow down to permit the transfer of passengers at the floor next below, the system operates automatically to answer this late pressed button. Assume, for example, that the top compartment has started to slow down in answer to the up hall button at the eighth floor or the car button for the eighth floor, and that prior to the disengagement of bottom compartment secondary slow-down brush 706 from selector stationary contact 604, up seventh floor hall button 490 is pressed. Owing to the fact that the car has already slowed down below a predetermined speed, the engagement of the up seventh floor hall button relay contacts 553 and brush 706 with contact 604 completes a circuit for coil IRB834 of the bottom compartment secondary slow-down switch. This switch separates its contacts IRB994 which, owing to the fact that contacts AU997 and ABM991 are separated, breaks the circuit for the bottom compartment selective relay coil BS996. As a consequence, relay BS engages its contacts BS243, preparing the circuit for effecting the opening of the bottom compartment gate and seventh floor hatchway door as the car is brought to rest. The floor relay is reset as a result of the completion of the circuit through brush 706 and contact 604.

This system also operates automatically to respond to late pressed hall buttons under conditions where a slow-down has already been started preparatory to effecting a transfer of passengers in one compartment, even though the button is pressed after the disengagement of the secondary slow-down brush for the other compartment and selector stationary contact corresponding to the button pressed. Assume in the above example where a stop is being made at the eighth floor that the up seventh floor hall button is pressed after brush 706 disengages contact 604. Upon the arrival of the top compartment at the eighth floor, brush 774 engages "alive" contact 604, completing a circuit for coil REB835 of the bottom compartment reset relay. This relay separates its contacts REB995 to break the holding circuit for bottom compartment selective relay coil BS996. Relay BS, in turn, engages its contacts BS243 in the circuit for the door opening switch coil BD9241 for the bottom compartment, thus causing the opening of the bottom compartment gate and seventh floor hatchway door. The circuit completed for coil REB835 of the bottom compartment reset relay is through the reset coil of the floor relay, causing this relay to be reset at the time that the engagement of brush 774 and contact 604 occurs. Brush 751 takes the place of brush 774 during downward travel. It is to be noted that the circuit through coil REB835 is subject to contacts HL845 of the hall light relay, thereby preventing unwanted operations.

A similar operation is had in the event that a hall button for an even numbered floor is pressed under conditions where the slow-down has already been initiated for a stop of the bottom compartment at an odd numbered floor. If the button is pressed before the disengagement of the secondary slow-down brush for the top compartment for that direction of travel and corresponding selector stationary contact occurs, the top compartment secondary slow-down switch IRT functions to cause the door opening circuits to be prepared. In case of a later pressed button, the top compartment reset relay RET functions in the same manner as the bottom compartment reset relay. A circuit is completed for coil RET836 of this relay through either brush 775 or brush 750, depending upon the direction of travel, the relay operating to separate its contacts RET982 to break the holding circuit for the coil TS985 of the top compartment selective relay.

A similar operation is had in the event of late pressed car buttons, provided the buttons are pressed prior to the disengagement of the car button secondary slow-down brushes for the direction in which the car is travelling from the corresponding stationary contacts. This operation is believed clear from the above discussion of late pressed hall buttons. Otherwise, the opening of the compartment gate and opposite hatchway door to discharge the passenger is effected by the compartment attendant moving his starting switch to door open position when the car stops at the floor.

This arrangement is also effective to permit response to a hall button pressed under conditions where the car is already stopped to effect a transfer of passengers in one compartment with the other compartment at the floor at which the button is pressed but with the compartment gate and hatchway door closed. The operation of the floor relay in response to such pressing of a hall button causes the operation of the proper reset relay to cause the opening of the corresponding selective relay, which in turn causes the compartment gate and hatchway door at the floor at which the button is pressed to be opened. The system remains effective to provide such operation until the proper sequence of operations has been effected toward starting the car to the extent of causing the operation of door non-interference relay DN. Relay DN, as pointed out previously, causes both selective relays to be operated, the circuit for the coils of these relays through contacts of relay DN not being subject to the contacts of the reset relays. As previously explained, relay DN is caused to operate upon movement of the starting switch in either compartment to door close position. Thus, once the attendant in either compartment is ready to start the car and takes steps to do so, response is no longer given to late pressed hall buttons and the call is reserved for the next car. This is considered desirable operation, as it aids in speeding up service.

Owing to the fact that the floor relay is reset at the time that the circuit is completed for the coil of the reset relay, this arrangement is effective to reset floor relays which are reoperated, after being reset, as a result of reoperation of the hall buttons. However, the call registered by a hall button pressed after starting circuits have been prepared by operation of the starting switches is maintained registered owing to the resultant separation of contacts RB824 and RT825.

In every case where response is given to a late pressed button, the hall lantern at the floor for which the button is pressed for the direction in which the car is travelling is lighted as a result of the opening of the selective relay. The manner in which the lighting of a lantern is effected has already been described. If the button is pressed in time to cause the opening of the selective relay in response to the operation of the secondary slow-down switch, the lighting of the hall lantern occurs at the time that the operation of the secondary slow-down switch takes place. In case of a later pressed button, however, the hall lantern does not light until the reset relay is operated. This lighting of the hall lantern in response to a late pressed hall button serves to advise the intending passenger who operated the button and others of the approach or presence of the compartment at that landing.

Hall buttons 476 and 477 are illustrated for the first and second levels and hall buttons 495 and 496 are illustrated for the ninth and tenth floors. These buttons are further illustrated as operating through floor relays as in the case of hall buttons at intermediate floors, the operating coils of these relays being designated 497, 500, 516 and 517, the reset coils being designated 520, 521, 537 and 540 and the contacts being designated 541, 542, 560 and 561. The contacts of the floor relays for the upper terminal are connected to selector stationary contacts 566 and 567 by way of bus bars DH10 and DH9 respectively, while those of the floor relays for the lower terminal are connected to contacts 754 and 755 by way of bus bars UH1 and UH2 respectively, the purpose of this arrangement being to effect the reset of the floor relays as the car arrives at the terminals. Although the stopping of the car at the terminals is effected by the operation of the terminal stopping device and by the engagement of the slow-down brushes for the car buttons and selector stationary contacts, the hall buttons at the terminals may be utilized for purposes other than providing slow-down circuits, such as, for example, causing the operation of the terminal indications of the dispatcher's waiting passenger indicator. In case no particular function is to be performed by the terminal hall buttons, these buttons may be omitted or "dummy" buttons provided for psychological reasons.

Referring now also to Figure 31, the operation of a group of multi-deck elevators will be described.

The power and control circuits for the additional elevators are not illustrated as they may be identical with those illustrated and described for one elevator.

The hall buttons and their floor relays are common to all the elevators. The circuits through the contacts of the floor relays lead to the bus bars from where they are taken off in branch circuits to the selector machines of the various elevators. The bus bars have been characterized generally in accordance with the floor which is involved. For example, UH7 indicates that the bar is in the up hall button floor relay circuit for the seventh floor. These bars are also common to all of the elevators of the group. Each elevator has one up and one down hall lantern at each intermediate floor, a down hall lantern at the top floor and an up hall lantern at each of the first and second levels. The compartments of each car are provided with sets of car buttons, as has already been described for the compartments of one elevator car. The car buttons are individual to their respective elevator cars and operate independently of the car buttons in any other car. Also, each compartment of each car is provided with a starting switch, as described for the compartments of one car.

It is believed that unnecessary duplication will be avoided and that the principles of operation will be readily understood from the illustration of the circuits for the selector machines for two elevators. It is to be understood, however, that the principles of the invention are applicable to any number of multi-deck elevators. The selector machine circuits for the second elevator, hereinafter referred to as No. 2, may be identical with the selector machine circuits for the elevator previously described, hereinafter referred to as No. 1, and will not be described in detail except as set forth in the description of operation. In describing elevator No. 2, the same reference characters will be employed for the corresponding parts as have already been employed in describing elevator No. 1, with the exception that the latter "a" will be affixed to the designating character, as a means of differentiation. The travelling brushes of the selector machines for the two elevators are positioned on the wiring diagrams for both cars at the lower terminal. Thus, as in the case of elevator No. 1, elevator No. 2 direction switch contacts PD752a, PD767a, PU747a, PU752a, PU770a, PU773a, PA785a, PA790a, PC781a, PC783a, PB794a, PB795a, PB796a and PB797a are separated, and contacts PD732a, PD735a, PD753a, PD756a, PU727a, PU731a, PA701a, PA710a, PC703a, PC705a, PB800a, PB807a, PB816a and PB821a are engaged.

Assume that the up eighth floor hall button 492 is pressed. This causes contacts 555 to be latched in engagement and thus contacts 606 and 607 of the selector machine for elevator No. 1 and 606a and 607a of the selector machine for elevator No. 2 to be connected to ground, the exciter for elevator No. 2 being grounded on the negative side as well as the exciter for elevator No. 1. The manner in which this button is answered by car No. 1, resulting in the top compartment thereof being brought to rest at the eighth floor, has already been described.

However, assume that car No. 2 is first to arrive at its slow-down distance from the eighth floor during upward travel. Upon the engagement of brush 734a with contact 606a, a circuit is completed from the negative side of the exciter for elevator No. 2 to ground, through reset coil 534 for the up eighth floor relay, contacts 555 of the relay, bus bar UH8, contacts 606a, brush 734a, restoring coil RT831a of elevator No. 2 top compartment slow-down switch to the positive side of the exciter for elevator No. 2. This causes car No. 2 to slow down. Upon the engagement of brush 707a and contact 607a, a circuit is completed for the restoring coil IRT833a of elevator No. 2 top compartment secondary slow-down switch. This circuit also extends through the reset coil of the up eighth floor relay, and, due to the decreased resistance of this circuit, causes the relay to be reset. Thus, not only are contacts 606a and 607a for elevator No. 2 rendered "dead" but also contacts 606 and 607 for elevator No. 1. The later engagement of contacts 606 and 607 by the brushes of the selector machine of elevator No. 1, therefore, does not cause car No. 1 to slow down at the eighth floor.

As a result of the restoration of the top compartment secondary slow-down switch for elevator No. 2, contacts IRT852a engage to complete the circuit for coil AL851a of the advance light relay for elevator No. 2. This relay engages its contacts AL820a and AL806a, the latter contacts completing a circuit for elevator No. 2 up hall lantern 613a through contact 617a and brush 741a. Thereafter, the car is caused to further slow down and finally is brought to a stop with the top compartment of car No. 2 in exact alignment with the eighth floor landing. It is believed that further description of the slow-down, stop and floor relay reset operations is unnecessary, in view of the fact that such operations have already been described in detail for elevator No. 1. The top compartment gate and eighth floor hatchway door are opened as the car is brought to rest. Upon the car being restarted, the up hall lantern at the eighth floor for elevator No. 2 is extinguished as in the manner previously described.

If the button had been pressed too late to be answered by elevator No. 2, contacts of the various selector machines controlled by up eighth floor hall button are maintained "alive" so that the call is answered by the next car to arrive in the up direction at its slow-down distance from the eighth floor. Thus, it is seen that a push button, once pressed, is sure to be responded to. It is believed unnecessary to describe the operation of elevator No. 2 in answering hall buttons during downward travel, inasmuch as this operation is effected in the same manner as has already been described for elevator No. 1. Furthermore, it is believed unnecessary to describe slow-downs and stops for elevator No. 2 at odd numbered floors, inasmuch as under such conditions car No. 2 is brought to rest with the bottom compartment at the odd numbered floor in the manner already described for elevator No. 1.

The operation of elevator No. 2 in case of car buttons is also the same as that described for elevator No. 1. The car button circuits for each elevator are independent. That is, the pressing of eighth floor car button 592a, for example, in the top compartment of car No. 2 renders contacts 593a and 594a for elevator No. 2 "alive" but has no effect on the corresponding contacts for elevator No. 1. Thus only car No. 2 is caused to slow down in response to the operated car buttons for that car.

In buildings for which the above system is particularly suitable, it is usual that the traffic varies during certain parts of the day. For example, in office buildings, in the morning the incoming traffic is heavy, at noon both the incoming and outgoing traffic are heavy, and at night the outgoing traffic is heavy. Between these periods, the traffic is relatively light.

The system is illustrated as arranged to change the type of service to suit the different traffic conditions. A series of change-over switches is provided for changing to single compartment service during light traffic periods and for changing back to double compartment service when the traffic is heavy. In order that the service may be entirely satisfactory during both rush hours and light traffic periods, it is desirable that all cars of a group operate to provide the same type of service, i. e., either double compartment or single compartment operation. The controls illustrated are arranged to suit this group principle but it is to be understood that numerous variations may be made to suit particular operating requirements.

Referring to Figure 32, a key-operated master switch 1105 is provided on the dispatcher's panel (see Figure 1). This master switch, as will be seen as the description proceeds, controls the change-over from double compartment to single compartment operation, and vice versa.

In making this change, all the group functions of the elevators are changed from one type of service to the other. This includes the changing of the arrangement of stops. This rearrangement takes place immediately upon the operation of the master switch.

Also, the individual functions of the elevators are changed from one type of service to the other. This includes making all the operating switches in the operating box for one compartment effective or ineffective, depending on the type of service desired; making all the control changes for cutting in or out this one compartment operation; and changing the operation of the car and starter's position indicators, where such are employed, as will be explained later. In order not to interfere with the operation of the elevator cars and permit the discharging and taking on of the attendant at the lower terminal for the compartment which is cut into and out of service, it is desirable that the change of individual functions takes place automatically as each elevator car arrives at the lower terminal after the master throw-over switch has been operated.

Assume that the elevators are being operated to provide double compartment service. To change over to single compartment service, the dispatcher turns the master switch 1105 to single compartment position, counterclockwise as viewed in Figure 32. This results in the engagement of contacts 1106 and 1113 by bridging contacts 1112, connecting the actuating coil SC1104 of the single compartment switch to power mains I and II. Switch SC, upon operation, engages its contacts SC1110 to complete the circuit for the master switch motor armature 1102 through resistance 1101 and series field winding 1107. This motor operates in a direction to move change-over switches 518c, 573c, 574c, 615c, 616c, 657c, 660c, 704c and 720c, for elevator No. 1, from the positions illustrated to their other operative positions, i. e., from double compartment to single compartment positions. It also moves the corresponding switches for the other elevators of the group from double compartment to single compartment positions. Inasmuch as the changes effected by these switches are changes in group functions, reference letter "c" has been appended to the reference numerals applied to these change-over switches as indicative of the fact that the operating motor for the switches is common to all of the cars. This appended letter also serves to distinguish the switches from those which are individual to the cars.

The operation of switches 573c, 574c, 615c, 616c, 657c, 660c, 704c and 720c from double compartment to single compartment positions makes the top compartment of car No. 1 responsive to all hall calls. Switch 573c for the ninth floor connects selector stationary contacts 582 and 583 for the top compartment to contacts 560 of the down ninth floor relay. Switch 574c for the ninth floor connects selector top compartment stationary contacts 584 and 585 to contacts 557 of the up ninth floor relay by way of bus bar UH9. Similarly, selector contacts 624 and 625 are connected by switch 615c to down seventh floor relay contacts 554, selector contacts 626 and 627 are connected by switch 616c to up seventh floor relay contacts 553, selector contacts 666 and 667 are connected by switch 657c to down fifth floor relay contacts 550, selector contacts 670 and 671 are connected by switch 660c to up fifth floor relay contacts 547, selector contacts 716 and 717 are connected by switch 704c to down third floor relay contacts 544, and the selector contacts 721 and 722 are connected by switch 720c to up third floor relay contacts 543. The corresponding selector top compartment stationary contacts for the other elevators are connected by the corresponding change-over switches to these contacts of the floor relays.

The master switch motor, upon operation, also moves change-over switches 1117c, 1127c, 1143c and 1144c from their double compartment positions, the positions illustrated, to their single compartment positions. The movement of change-over switch 1117c out of double compartment position breaks the circuit for coil CR1121 of the change-over relay for elevator No. 1. This relay drops out to reengage its contacts CR1136. The reengagement of these contacts, together with the movement of change-over switch 1127c into single compartment position, prepares the circuit for series field winding 1133 and armature 1125 of the change-over switch motor for elevator No. 1.

Assume that car No. 1 is travelling in the down direction or is set for travel in the down direction at the time that the master switch 1105 is moved to single compartment position. Under such conditions, additional contacts PE1140 of auxiliary direction switch PE are in engagement and additional contacts PC1132 of auxiliary direction switch PC are separated. With contacts PE1140 in engagement, the above described reengagement of contacts CR1136 of the change-over relay completes the circuit for a signal in each compartment. Any suitable signal may be employed, such as lamps. Buzzers are illustrated, designated 1137 for the top compartment and 1141 for the bottom compartment. Thus, the buzzers are caused to sound and thus notify the compartment attendants that a change in the type of service is being effected.

During the downward travel of car No. 1, the top compartment continues to answer operated hall buttons for floors which it serves during double compartment operation, and, in addition, for this remaining downward trip, answers operated hall buttons at the other floors under conditions where the button is pressed too late to intercept the bottom compartment but in time to effect a stop of the top compartment. Assume, for example, that the down fifth floor hall button 485 is pressed during downward travel of car No. 1 under the assumed conditions. If pressed in time, this button causes the stopping of the bottom compartment at the fifth floor. However, with change-over switch 657c in single compartment position, selector contacts 666 and 667 for the top compartment, as well as selector contacts 645 and 646 for the bottom compartment, are rendered "alive" in response to the pressing of hall button 485, so that if this button is pressed too late to intercept the bottom compartment but before the top compartment brush 771 disengages contact 667, the top compartment is caused to slow down and stop at the fifth floor. Conditions requiring the answering of the additional buttons by the top compartment for this one downward trip very rarely arise. Both compartments stop during this downward trip in response to car buttons to discharge their passengers.

Assume that car No. 1 is travelling in the up direction or is set for travel in the up direction at the time that master switch 1105 is moved to single compartment position. The top compartment thereafter responds to all hall buttons at floors in advance of the car. This is due to the fact that with the group change-over switches in single compartment position, the top compartment selector stationary contacts for the odd numbered floors are rendered "alive" in response to the pressing of hall buttons for those floors. The bottom compartment responds to up hall buttons for floors which it normally serves during double compartment operation which are pressed too late to intercept the top compartment but in time to intercept the bottom one. Both compartments stop during the upward trip to discharge their passengers. Upon the arrival of the car at the upper terminal, the signals are given to the compartment attendants that a change in the type of service is being effected. Stops are made during the downward travel of the car as above described.

As the car arrives at the lower terminal, selector brush 1131 engages selector stationary contact 1130. This, together with the fact that contacts PC1132 provided on auxiliary direction switch PC are maintained in engagement until the car is brought to a stop and contacts H921 and LH920 are engaged, completes a circuit for the armature 1125 and series field winding 1133 of the change-over switch motor for elevator No. 1 through resistance 1124. This motor operates to move change-over switches 1145, 1146, 1120, 245, 327, 360, 384, 412, 432, 442, 450, 452, 782, 857, 864, 867, 895, 936 and 1020 for elevator No. 1 from double compartment to single compartment positions. This changes the individual functions of elevator No. 1 from a double compartment to single compartment service. The giving of the warning signals is terminated as a result of the separation of auxiliary direction switch contacts PE1140 as the car is brought to a stop at the lower terminal.

The movement of change-over switch 1120 into single compartment position reenergizes coil CR1121 of the change-over relay, the circuit extending through change-over switch 1117c in single compartment position. The change-over relay separates its contacts CR1136, breaking the circuit for the change-over motor for elevator No. 1.

The attendant of the bottom compartment, after the passengers have been discharged therefrom at the lower terminal, starts the closing of the bottom compartment gate and opposite hatchway door and leaves the compartment. The top compartment thereafter takes care of all the traffic handled by that elevator. The movement of the various "individual" change-over switches into single compartment positions places the control circuits in position to provide this operation.

Change-over switch 864, in single compartment position, is open-circuited, thus preventing the energization of the coils of various switches provided for bottom compartment operation. Among these switches is bottom compartment non-stop switch NSB. As previously pointed out in describing the operation of starting the motor generator set, the engagement of potential switch contacts C174 and C175 completed the circuits for coils NST861 and NSB865 of the non-stop relays. This assumes that double compartment service is to be provided and that change-over switch 864 is in double compartment position. Thus, upon movement of switch 864 out of this position, the circuit for coil NSB865 is broken, causing the opening of the bottom compartment non-stop relay. This relay, upon opening, separates its contacts NSB812, NSB813, NSB814 and NSB837. The separation of these contacts prevents bottom compartment selector brushes 792, 706, 772, 733, 751, 774, 757, 776, 742 and 763 being rendered "alive" and therefore prevents the answering of hall calls by the bottom compartment and the lighting of the hall lanterns incident thereto.

Change-over switch 245, in single compartment position, is in open-circuit condition, thereby preventing the establishment of the circuit for the bottom compartment door opening switch coil BDO241 through contacts BS243 and BP244. This prevents the automatic opening of the bottom compartment gate and opposite hatchway door upon a stop being made. Movement of change-over switch 360 into single compartment position by-passes bottom compartment starting switch contacts 373, permitting the establishment of a circuit for coil H381 of the main brake and field switch by the starting switch in the top compartment. Change-over switch 432, in single compartment position, permits the establishment of the circuit for coil FF436 of the fifth speed switch during single compartment operation. Change-over switch 782, in single compartment position, makes car buttons 577, 621, 663 and 713 in the top compartment effective to render "alive" their corresponding selector stationary contacts 579, 580, 622, 623, 664, 665, 714 and 715. This change-over switch also renders the car buttons of the bottom compartment ineffective. Change-over switch 857, in single compartment position, cuts out the pilot lights 830 and 846.

Change-over switch 864, as above pointed out, upon movement out of double compartment position, thereafter prevents the energization of coils of certain switches provided for bottom compartment operation. In addition to coil NSB865, this includes coil RB907, coil IRB955, and bottom compartment car button magnet 964. It also prevents the energization of coils TS985 and BS996 of the selective relays, the energization of these coils being prevented because there is no selection of compartments during single compartment operation.

Change-over switch 867, in single compartment position, by-passes contacts IRB872 to permit the initial energization of pawl magnet 873 during starting operations. Change-over switch 895, in single compartment position, by-passes contacts RB902, to permit energization of the brush magnets 891 and 896 and coil AU903. Change-over switch 1020, in single compartment position, by-passes contacts IRB1017 to permit the establishment of the shunt for generator field resistance steps 1037 and 1040 through contacts ABM1007 and IRT1010. The purpose of the other change-over switches will be described later.

It is desirable to prevent the change-over of the individual functions of an elevator from double compartment to single compartment service under conditions where the car is standing at the lower terminal at the time that master switch 1105 is operated. It is preferable to delay this change-over until the next return of the car to the lower terminal so as to avoid discharging passengers from the bottom compartment at the lower terminal who have already been taken into that compartment at that terminal at the time the master switch is thrown, and thus avoid the delays and inconveniences which would be incident to such discharge of passengers. The system illustrated is arranged so that the change-over is delayed until the next return of the car to the lower terminal.

Assume, for example, that car No. 1 is at the lower terminal at the time that master switch 1105 is thrown to single compartment position. Auxiliary direction switch contacts PC1132 are separated at this time so that even though brush 1131 and contact 1130 are in engagement and change-over switch 1127c is moved to single compartment position, no circuit is completed for the individual change-over switch motor. Elevator No. 1, therefore, continues to exercise double compartment functions, the car answering hall buttons during its upward travel and subsequent return trip, as already described for conditions where the master switch 1105 was thrown at a time when the car was travelling or was set to travel in the up direction. Stops are made to discharge passengers from each compartment at floors for which the car buttons of the respective compartments are pressed, as before. Upon the return of the car to the lower terminal, a circuit is established, for the individual change-over motor armature 1125 through series field winding 1133, by the engagement of brush 1131 with selector stationary contact 1130, as previously described.

Upon the master switch 1105 being moved to single compartment position, the individual functions of each of the other elevators of the group are changed from double compartment to single compartment service as the individual cars arrive at the lower terminal. The change-over switch motor for each elevator is energized by the engagement of the corresponding selector machine brush and stationary contact of the selector machine for that elevator, as the car arrives at the lower terminal. This motor then operates to move the change-over switches for that elevator into single compartment positions, as has been described for elevator No. 1.

Change-over switch 518c, operated by the master switch motor, upon movement from double compartment to single compartment position, disconnects operating coil 497 of the first floor relay from main I and connects coil 515 of the up ninth floor relay to this main. This is done because, under single compartment operation, none of the cars takes on or discharges passengers at the first landing and each car may move upwardly after a stop at the ninth floor. If a passenger desires to be carried from the ninth floor to the tenth floor, he may obtain the car for this purpose, under single compartment operation, by pressing up ninth floor hall button 494.

Upon each stop of the car during single compartment operation, the hall lantern for that floor for the proper direction of car travel is lighted. The manner in which the lighting of a hall lantern is effected has already been described. Selector stationary contacts 586, 630, 672, 723, 591, 633, 675 and 740 are employed to complete the hall lantern circuits for floors served by the bottom compartment under double compartment operation. Hall lantern 590 at the ninth floor is lighted in case of a stop in response to up ninth floor hall button 494.

When it is desired to change from single compartment service back to double compartment service, the dispatcher turns the master switch 1105 to double compartment position, clockwise, as viewed in Figure 32. This results in the engagement of contacts 1113 and 1115 by bringing contacts 1112, connecting the actuating coil DC1114 of the double compartment switch to mains I and II. Switch DC, upon operation, engages its contacts DC1100 to complete the circuit for the master switch motor armature 1102 and series field winding 1103. Series field winding 1103 causes opposite rotation of the master switch motor to move change-over switches 518c, 573c, 574c, 615c, 616c, 660c, 704c and 720c, for elevator No. 1, and the corresponding switches for the other elevators back into double compartment positions. The master switch motor also moves change-over switches 1117c, 1127c, 1143c and 1144c back to double compartment positions.

The movement of change-over switch 1117c out of single compartment position breaks the circuit for coil CR1121 of the change-over relay for elevator No. 1. This relay drops out to reengage its contacts CR1136, which, together with the movement of change-over switch 1127c into double compartment position, prepares the circuit for the change-over switch motor for elevator No. 1. Change-over switches corresponding to switches 1117c, 1127c, 1143c and 1144c for each of the other elevators are moved by the master switch motor into double compartment position, resulting in circuits being prepared for the change-over switch motors for these elevators in the same manner as described for elevator No. 1.

Assume that car No. 1 is travelling in the down direction or is set for travel in the down direction at the time that master switch 1105 is moved to double compartment position. Under such conditions, contacts PE1140 are in engagement and contacts PC1132 are separated. Thus, the reengagement of contacts CR1136 completes a circuit for the warning signals as before. This notifies the attendant of the top compartment that a change back to double compartment service is being effected. During the downward travel of the car, all the car buttons of the top compartment remain effective to cause the stop of the car to discharge passengers. However, the car can be intercepted only by the down hall buttons at floors which the compartment serves during double compartment operation, owing to the fact that change-over switches 573c, 615c, 657c and 704c have been moved out of single compartment position.

Assume that car No. 1 is travelling in the up direction or is set for travel in the up direction at the time that master switch 1105 is moved to double compartment position. All the top compartment car buttons are effective during the remainder of the upward trip to cause stops to discharge passengers. Stops in response to hall buttons are made only at floors served by the top compartment during double compartment service, owing to the fact that change-over switches 574c, 616c, 660c and 720c have been moved out of single compartment positions. Upon the direction of travel being reversed, the warning signal is given. The car responds during subsequent downward travel as above described.

As each elevator car arrives at the lower terminal, the warning signal is stopped and the individual functions of that elevator are changed from single compartment to double compartment service. In addition, the bottom compartment gate and hatchway door automatically open to permit the lower compartment attendant to enter. Inasmuch as these operations are effected in the same manner for each elevator, the operation for only one of them will be described.

Referring to elevator No. 1, as the car arrives at the lower terminal, selector brush 1131 engages selector stationary contact 1130. This, together with the fact that contacts PC1132 are maintained in engagement until the car is brought to a stop, completes a circuit for the armature 1125 and series field winding 1126 of the change-over switch motor for elevator No. 1. Owing to the fact that field winding 1126 causes opposite rotative movement, this motor operates to move change-over switches 1145, 1146, 1120, 245, 327, 360, 384, 412, 432, 442, 450, 452, 782, 857, 864, 867, 895, 936 and 1020 from single compartment to double compartment positions. This changes the individual functions of elevator No. 1 from single to double compartment service. The giving of the warning signals is terminated as a result of the separation of auxiliary direction switch contacts PE1140 as the car is brought to a stop at the lower terminal.

The movement of change-over switch 1120 into double compartment position energizes coil CR1121 of the change-over relay, the circuit extending through change-over switch 1117c in double compartment position. This relay separates its contacts CR1136, breaking the circuit for the change-over motor for elevator No. 1.

As the car arrives in the slow speed levelling zone for the lower terminal, coil BP295 of the bottom compartment door operating relay is energized, as has previously been discussed, resulting in the latching of contacts BP244 in engagement. Contacts BS of the bottom compartment selective relay are in engagement owing to the fact that coil BS996 is deenergized. Therefore, movement of change-over switch 245 back into double compartment position completes the circuit for coil BDO241 of the bottom compartment door opening switch. As has already been described, this results in the automatic opening of the bottom compartment gate and first landing hatchway door. The attendant for the bottom compartment of car No. 1 enters the compartment upon the gate and door being opened, and permits passengers to enter the compartment. After the loading of passengers in both compartments, the elevator car is started in response to operation of the starting switches in both compartments in accordance with double compartment operation, as has already been fully described. The car button circuits for the bottom compartment being restored and those for the top compartment for floors which that compartment does not serve during double compartment operation being rendered ineffective as a result of the return of change-over switch 782 to double compartment position, the stopping of the car is thereafter accomplished in accordance with double compartment operation in the manner originally described.

It is desirable to prevent the change-over of the individual functions of an elevator from single compartment to double compartment service under conditions where the car is standing at the lower terminal at the time that master switch 1105 is moved to double compartment position. The arrangement previously described delays this change-over until the next return of the car to the lower terminal. This avoids transferring passengers from the top compartment to the bottom compartment at the lower terminal who have already been taken into the top compartment at that terminal but who desire to alight at floors served by the bottom compartment during double compartment operation, and thus avoids the delays and inconveniences which would be incident to such transfer of passengers.

Assume, for example, that car No. 1 is at the lower terminal at the time that master switch 1105 is thrown to double compartment position. Contacts PC1132 are separated at this time so that the engagement of brush 1131 and contact 1130 and movement of change-over switch 1127c into double compartment position do not complete a circuit for the individual change-over switch motor. Thus, the bottom compartment gate and first landing door are not opened, all the car buttons in the top compartment remain effective and the system otherwise, insofar as elevator No. 1 is concerned, continues to exercise single compartment functions. However, as regards the hall buttons, stops are made only at floors served during double compartment operation, as has been previously described.

When a change from single to double compartment service is about to be effected, sufficient compartment attendants may not be available for all compartments. To insure the operation of all elevator cars during heavy traffic periods, even though one or more compartment attendants may be lacking, it is desirable to provide for the shutting-down of one compartment of one or more elevator cars while the elevators are operating to provide double compartment service. It is preferable, under such conditions, that the remaining compartment should not serve all floors, as this would double the number of possible stops which that car would make, thereby seriously handicapping the maintaining of the cars on the desired operating schedule. The system illustrated is arranged so that, even though one or more of the elevators is operating with one compartment shut down, the stops for those elevators remain the same as for the others of the group.

To provide this operation, a key-operated service switch is provided on the dispatcher's panel for each elevator car. The operation effected in response to each switch is the same for each elevator so that these functions will be described only in connection with one elevator.

Assume that an attendant for one compartment of car No. 1 is lacking at the time that a change from single compartment to double compartment service is to be effected. Under such conditions, the dispatcher closes the key-operated service switch for car No. 1. This switch, designated 998, completes a circuit for coil SSC999 of special single compartment switch SSC. This switch, upon operation, separates contacts SSC1116 and SSC1122, and engages contacts SSC1123, SSC1134 and SSC1135.

Upon movement of master control switch 1105 to double compartment position, the master switch motor moves its change-over switches into double compartment position, causing the group functions of the elevators to be changed immediately to provide double compartment service, as above described. As each of the other elevator cars arrives at the lower terminal, their individual functions are changed over to double compartment operation, as previously described. Upon the arrival of car No. 1 at the lower terminal, however, no change of the individual functions from single compartment to double compartment service is effected. This is due to the operation of the special single compartment switch.

The engagement of contacts SSC1123 of the special single compartment switch prevents the deenergization of coil CR1121 of the change-over relay upon movement of change-over switch 1117c from single compartment to double compartment position. Contacts CR1136, therefore, are maintained separated, preventing energization of the change-over switch motor for elevator No. 1 to move its change-over switches into double compartment position as the car arrives at the lower terminal. Also, the maintaining of contacts CR1136 separated prevents the giving of the warning signals for car No. 1 upon its becoming set for downward travel. This is desirable because no change-over of individual functions from single compartment to double compartment operation of that car is to be effected. Thus, immediately the master switch is thrown to double compartment position, the top compartment of car No. 1 continues to discharge passengers in response to top compartment car buttons but answers hall buttons only for floors which it serves on double compartment service, and continues such operation so long as its service switch 998 is maintained closed.

Assume that the elevators are operating on double compartment service and that it is desired to change one of them, for example elevator No. 1, to single compartment service. Service switch 998 is closed, causing the operation of the special single compartment switch SSC. Owing to the fact that the change-over switches, both for group functions and for individual functions for elevator No. 1, are in double compartment positions, the separation of contacts SSC1116 breaks the circuit for coil CR1121, resulting in the reengagement of contacts CR1136. As soon as car No. 1 becomes set for downward travel, the warning signals are given, owing to the engagement of contacts PE1140. Upon the arrival of the car at the lower terminal, a circuit is completed for the individual change-over switch motor for elevator No. 1, extending through its series field winding 1133. Owing to the fact that change-over switch 1127c is in double compartment position, the circuit is completed through contacts SSC1134 of the special single compartment switch. Contacts SSC1122 prevent the simultaneous energization of field winding 1126 of the motor. The resultant movement of change-over switch 1120 from double compartment to single compartment position effects the reenergization of coils CR1121 through contacts SSC1123. This causes the separation of contacts CR1136 to break the circuit for the change-over switch motor. Thereafter, car No. 1 operates to provide service only with the top compartment but on group double compartment operation.

If, while the elevators are operating to provide single compartment service, a service switch, for example service switch 998, is moved to closed position, no change in operation takes place. The resultant separation of contacts SSC1116 has no effect, owing to the fact that the circuit for coil CR1121 remains closed through change-over switches 1117c and 1120. The engagement of contacts SSC1123 is without effect, owing to the fact that they are by-passed by change-over switch 1117c. The separation of contacts SSC1122 is without effect as the circuit for series field winding 1126 is open at change-over switch 1127c. The engagement of contacts SSC1134 is without effect, owing to the fact that they are by-passed by change-over switch 1127c.

If the elevators are operating to provide double compartment service and one of the cars, for example car No. 1, is at the lower terminal at the time that its service switch 998 is closed, the engagement of contacts SSC1135 of switch SSC, by-passing contacts PC1132 open at this time, causes the energization of change-over motor armature 1125 and series field winding 1133 by way of contacts SSC1134, contacts CR1136 being engaged as a result of the separation of contacts SSC1116. Thus, the individual functions of elevator No. 1 are immediately changed to single compartment service. This is desirable as it avoids a complete round trip of the car before the lower compartment attendant is relieved. The fact that passengers may have to be discharged at the lower terminal from the bottom compartment is not considered particularly undesirable under the conditions assumed, which are abnormal.

If the elevators are operated to provide double compartment service but with one or more of them, for example elevator No. 1, operating one compartment only, as a result of its service switch being closed, the opening of this service switch causes the individual functions of the car to be changed over to double compartment operation upon the next arrival of the car at the lower terminal. The opening of this service switch deenergizes coil SSC999 to effect the reengagement of contacts SSC1116 and SSC1122 and the separation of contacts SSC1123, SSC1134 and SSC1135. The separation of contacts SSC1123 breaks the circuit for coil CR1121 through change-over switch 1120 in single compartment position. This results in the reengagement of contacts CR1136, causing the giving of the warning signals when the car becomes set for downward travel, and the completion of the circuit for change-over switch motor armature 1125 and series field winding 1126 through contacts SSC1122 and change-over switch 1127c by the engagement of selector contact 1130 and brush 1131 as the car arrives at the lower terminal. This causes operation of the change-over switch motor to change the individual functions of elevator No. 1 from single compartment to double compartment operation. The movement of change-over switch 1120 to double compartment position reestablishes the circuit for coil CR1121 through contacts SSC1116.

Should car No. 1 be standing at the lower terminal when the service switch 998 is opened, the car is caused to make a complete round trip before the change-over of the individual functions of the elevator to double compartment service is effected, owing to the separation of contacts SSC1135. The desirability of this operation has already been set forth.

If the group of elevators is operating to provide double compartment service but with one of the elevators, for example elevator No. 1, operating single compartment, and the master switch 1105 is thrown to single compartment position, there is no change in the operation of elevator No. 1 except that the top compartment becomes immediately responsive to all hall buttons, owing to the movement of the change-over switches, controlling the circuits from the selector stationary contacts to the contacts of the floor relays, from double compartment to single compartment positions.

Indicating lights 1142 and 1153 are provided on the dispatcher's panel for advising him when the complete change-over from single to double compartment service or from double to single compartment service has been effected. The circuit for these lamps is controlled by change-over switches 1143c and 1144c, operated by the master switch motor, 1145 and 1146, operated by change-over switch motor for elevator No. 1 and 1147a and 1150a, operated by the change-over switch motor for elevator No. 2. The corresponding switches for additional elevators of the group would be arranged in the same manner in these circuits. With all the elevators operating to provide double compartment service, the double compartment lamp 1153 is energized from main I through switches 1143c, 1145 and 1147a to grounded neutral 1152. Switches 1144c, 1146 and 1150a similarly complete the circuit for single compartment lamp 1142 when all the elevators are operating to provide single compartment service.

Although only one master switch motor has been described, it is to be understood that more may be employed if the number of change-over switches to be operated requires it. Additional master switch motors would be connected in parallel with the one illustrated. The same is true of the individual change-over switch motor for each elevator. If additional ones were employed, they would be connected in parallel with the one illustrated.

Although it is preferred, when changing from double compartment to single compartment service, to utilize the top compartment, the bottom compartment may be utilized instead, if desired. The circuit connections involved would be altered accordingly, and it is not believed that this need be described in detail, since the principles involved in the arrangement of the circuits would be the same for bottom compartment as for top compartment. Also, the bottom compartments of some cars and the top compartments of others may be utilized to provide single compartment service, as for example, to take care of incoming traffic at both loading levels of the lower terminal.

If the system were not arranged to change from double compartment to single compartment service, certain parts of the system might be omitted, as for example, the car buttons in the top compartment for floors served by the bottom compartment, the down ninth floor relay and the down hall lantern at the ninth floor. Also, the parts of the selector machine with which these elements are associated could be omitted.

Assume that double compartment service is being provided and that one compartment of car No. 1 is fully loaded and that its attendant desires to prevent the taking on of more passengers until room is again provided in the compartment as a result of discharge of passengers. He may do so by opening the non-stop switch provided in his compartment. If the top compartment is the one that is fully loaded, the attendant therein moves non-stop switch 862 to open position, deenergizing coil NST861 of the top compartment non-stop relay. This relay, upon deenergization, separates its contacts NST810, NST811, NST815 and NST840. The separation of contacts NST810 prevents the rendering of top compartment brushes 791 and 707 "alive". The separation of contacts NST811 prevents the rendering of top compartment brushes 771 and 734 "alive". The separation of contacts NST815 prevents the rendering of top compartment brushes 715 and 750 "alive". This prevents the answering of hall calls by the top compartment. The separation of contacts NST840 prevents the rendering of top compartment hall lantern brushes 741, 760, 762 and 777 "alive", preventing energization of the hall lanterns for floors served by the top compartment.

The bottom compartment non-stop relay NSB, upon being deenergized by the opening of non-stop switch 866, serves a similar purpose. The operation of this switch, upon being deenergized, has already been described in connection with changing the type of service provided by the car.

The non-stop switches 862 and 866 may be operated to cause their respective compartments to run past hall calls for other reasons as, for example, where it is desired to maintain operation of the car in accordance with a predetermined time schedule. The non-stop switch 863, under the control of the dispatcher, may be employed for a similar purpose or to cause non-stop operation of the car when desired for other reasons. This switch is common to the actuating coils of the non-stop relays.

The non-stop relays, upon dropping out, do not prevent responses of the compartments to their respective car buttons. Slow-downs are made in response to these buttons in the manner previously described. Furthermore, in the case of hall buttons, the selector stationary contacts are maintained "alive" so that the proper compartment of the next car running in the proper direction is slowed down in response to the hall buttons which the car under non-stop operation has passed by.

Although it is preferred to prevent the lighting of hall lanterns at floors served by compartments under non-stop operation, and contacts NSB837 and NST840 of the non-stop relays are provided in the system illustrated for this purpose, it may be desirable to permit the lighting of these lanterns under conditions where the compartment under non-stop operation is stopped in response to a car button. This may be done by omitting contacts NSB837 and NST840. With these contacts omitted, the hall lantern for the floor at which a stop is made in response to a car button is lighted so that if any intending passengers are waiting to be carried in the direction in which the compartment is travelling, they may be taken on to replace the passengers discharged.

If it is desired to change the upper terminal for car No. 1, this may be done by manually operable switch 1001. When this switch is open, upper reversal relay coil ORU1002 is deenergized, contacts ORU578, ORU581 and ORU925 of the relay are separated and contacts ORU614 and ORU634 of the relay are engaged. These contacts are associated with apparatus provided for the optional reversal terminal. In the arrangement illustrated, these contacts are arranged for the seventh and eighth floors.

Upon switch 1001 being closed, relay ORU operates, engaging contacts ORU578, ORU581 and ORU925 and separating contacts ORU614 and ORU634. Upon the arrival of the upper compartment at the eighth floor, brush 940 engages selector stationary contact 926. With contacts ORU925 in engagement, this completes a circuit for the restoring coil PU922 of the up direction switch and for operating coil PD923 of the down direction switch, assuming the reengagement of contacts H921 and LH920. This causes the direction of car travel to be reversed as has previously been described. With contacts ORU578 and ORU581 in engagement, the top compartment car button 592 for the eighth floor and the bottom compartment car button 595 for the seventh floor are by-passed, rendering contacts 593, 594, 596 and 597 "alive". This insures the car being stopped at the new terminal and the doors and gates being opened without buttons for these floors being pressed. The separation of contacts ORU614 and ORU634 prevents the lighting of the up hall lanterns at these floors, the down lanterns being lighted as reversal is effected.

A similar arrangement may be provided for changing the lower terminal, if desired. This has not been illustrated, as the principle is the same. Also, a similar arrangement may be provided for one or more of the other elevators of the group for either or both terminals.

This arrangement is particularly suitable for causing an elevator car to run to extra floors, when service at these floors is desired. Ordinarily, only one elevator is arranged for the car to make such runs, owing to the fact that the extra floors are seldom used.

Assume, for example, that it is desired that car No. 1 serve these extra floors and that these floors are above the normal upper terminal. The system illustrated may be employed for this purpose, with contact 926 provided for the tenth floor instead of the eighth floor, and with contact 917 provided for effecting reversal of the car upon arrival of the car at the farthest of the extra floors. The circuits for the hall lanterns at the normal upper terminal would be arranged as illustrated for the seventh and eighth floor hall lanterns. Also, the slow-down contacts for the floors at the normal upper terminal would be made subject to the push buttons, as in the case of the seventh and eighth floors, if desired.

Under normal operating conditions, switch 1001 would be closed so that reversal would be effected at the normal upper terminal. When it was desired to run to the extra floors, switch 1001 would be opened, causing contacts ORU925 to be open and thus avoiding reversal at the normal upper terminal.

For convenience of description, assuming the seventh and eighth floors to be the normal upper terminal, selector contacts 610 and 620 may be connected subject to additional making contacts on relay ORU, and selector contacts 617 may be connected to lamp 612 subject to further additional making contacts on relay ORU, if desired. This would cause the lighting of the down lanterns at the normal upper terminal under normal operating conditions, as has already been described in connection with the down hall lanterns for the ninth and tenth floors.

With only one elevator of the group arranged to provide service to the extra floors, it might be desirable to provide this extra floor service only when the car is operating single compartment. Under such conditions, contact 620, assuming this contact to be for the lower floor of the normal upper terminal, could be disconnected from lamp 632 and contacts ORU634 omitted. Also, contacts 564 and 565 could be disconnected, contacts 596 and 597 connected directly to switch 782 and contacts ORU581 omitted.

When a car is arranged to run to extra floors above the normal upper terminal, the terminal stopping device for that car would be set to cause slow-down and stopping at the highest of these extra floors.

The direction of car travel may be changed at any floor at the will of the compartment attendants by means of the manually operable direction control switches 930 and 931. Switch 931 is arranged in the bottom compartment, while switch 930 is arranged in the top compartment. This arrangement serves to prevent reversal of the direction of car travel unless the attendants of both compartments are in agreement. The circuits to the coils of the direction switches are controlled by switch 930 in the top compartment. To change the direction of car travel, switch 931 must be closed before switch 930 is effective. Switch 930 by-passes the circuits made by brush 940 in cooperation with selector stationary contacts 917 and 937, so that the operations effected need not be described. The attendants of the compartments are in communication, as by a speaking tube between the two compartments, so as to insure the proper control functions being exercised. Change-over switch 936, operated by the individual change-over switch motor for elevator No. 1 when moved to single compartment position, by-passes switch 931. This permits the direction of car travel to be reversed by manipulating switch 930 in the top compartment alone.

The car may be caused to operate at slow speed by opening switches 417—433 and 431. Switch 431 is in the top compartment and, when open, breaks the circuit for the coils of speed switches E, F and FF. This prevents the car operating at a speed above that obtainable with the speed switch DD in operated condition. Switch 417—433 in the bottom compartment serves the same purpose. Change-over switches 412 and 442, operated by the individual change-over switch motor for elevator No. 1, serve to prevent undesired operation of the car at this slow speed under single compartment operating conditions.

These slow speed switches are useful in maintaining the cars on a predetermined time schedule. When a car reaches the upper terminal, for example, the dispatcher, at the time he desires that car to start down, may cause a signal to be given in the compartments for the car to start down. This signal may be given automatically by dispatching mechanism. If the car gets too far ahead in its relation to the other cars during a run, the dispatcher, being advised of this fact from the position indicator, may give another prearranged signal for that car to slow down. This signal may also be given by the automatic dispatching mechanism. When such signal is given, the attendant in one of the compartments opens the slow-speed switch, causing the car to slow down. The car will then run at the slow speed until further signal is given. In this manner, the cars may be maintained on a predetermined time schedule.

Levelling emergency operating switches 334 in the top compartment and 335 in the bottom compartment are provided for use under unusual or emergency conditions. As in the case of the direction control switches, switch 335 in the bottom compartment serves, under double compartment operation, to prevent manual control of the car at levelling speeds from the top compartment unless this switch is closed. With switch 335 closed, movement of switch 334 in a counter-clockwise direction as illustrated in Figure 30b causes the operation of down levelling direction switch LD and levelling fast speed switch LE to cause the car to operate in the down direction at a fast levelling speed. This is provided the doors and gates are closed so that contacts GT336 and GB337 are in engagement. Movement of switch 334 in a clockwise direction causes operation of the car in the up direction at fast levelling speed.

Change-over switch 327, operated by individual change-over switch motor for elevator No. 1, when moved into single compartment position, by-passes switch 335 in the bottom compartment. This permits manually controlled operation of the car at levelling speeds by manipulation of switch 334 in the top compartment alone.

Switches 334 and 335 are particularly useful under conditions where the main field winding of the generator becomes ineffective or where the car is carrying a heavy load, such as a safe. These switches may also be employed to bring the car into a floor provided a stop is made outside the levelling zone for that floor.

In the case of an extreme emergency, such as a fire, when a compartment gate or hatchway door cannot be closed, operation may be had by means of the emergency cut-out switches 383, 385, 443, 460, 444 and 461. Switches 383 and 443 are operated by the same control handle as are switches 385 and 460. For example, if the top compartment gate cannot be closed, operation may be had by closing switches 383 and 443 to by-pass gate contacts 363 and 446. If the hatchway door for a floor served by the bottom compartment, for example, cannot be closed, operation may be had by closing switch 461.

Change-over switches 450 and 452, operated by the change-over switch motor for elevator No. 1, when in single compartment positions, act to insure the proper safety as well as to permit operation under the emergency conditions. It is to be noted that with the switches in single compartment positions, coils GT445 and GB451 are connected in parallel and are subject to all gate contacts and door contacts 446, 447, 455 and 456 in series, while emergency switch 444 serves to by-pass all door contacts and gate contacts 455 in the bottom compartment under emergency operating conditions.

Safety switches, one in each compartment, are provided for stopping the car in the event of an emergency. The safety switch in the top compartment is provided with two blades, designated 172 and 255, while the safety switch in the bottom compartment is also provided with two blades, designated 173 and 256. Blades 172 and 173 control the circuit for the actuating coil of the potential switch, while blades 255 and 256 control circuits for the coils of the various speed switches and other switches employed in controlling the operation of the elevator motor.

The opening of the safety switch in either compartment breaks the circuit for coil C162 of the potential switch. The potential switch thereupon separates its contacts C174 and C175 in the feed lines from the exciter to the control and field circuits. It also separates contacts C519 and C1203 and reengages contacts C147. Contacts C147 short-circuit the cooling resistance 161 for the potential switch actuating coil. Contacts C519, as previously pointed out, are in the circuit common to the hall lanterns. Contacts C1203 will be referred to later.

The separation of contacts C174 and C175 breaks the circuit for the separately excited field winding of the generator and the control circuits, causing the car to be brought to a quick stop. It is to be noted that if the car is stopped at any point by opening a safety switch, its direction of travel may be reversed at that point by means of the direction control switches 930 and 931. Upon reclosing the safety switch, the car may then be started in the opposite direction by the starting switches. The opening of any of the "safety switches", such as overspeed governor switches 166 and 167, broken tape switch 171 and other safety switches usual in elevator control systems, which may be included in this circuit but which have been omitted for convenience of description, or of contacts J157 or L170, effects the stopping of the car in the same manner.

The operation of the broken tape switch has already been described. As regards the governor switches, a safety brake is provided on the elevator car and preferably also on the counterweight. In such event, a separate governor is provided for operation by the counterweight. One of these governor switches is operated by the counterweight governor, being opened in case of overspeed of the counterweight, and the other by the car governor, being opened in case of overspeed of the car. It is preferred to operate governor switches 142 and 144, previously referred to, by the car governor and to operate governor switch 153, previously referred to, by the counterweight governor. Switch 156 is provided on the control panel to enable some one in the control room to open the potential switch, for example in case of servicing.

When an emergency stop is made, each compartment attendant is immediately advised that such stop has been made, owing to the fact that the compartment gate remains closed and the pilot light in his compartment is not lighted. This shows that the stop is an abnormal one and the attendants may then get in immediate communication with each other, whereas, without this immediate knowledge of conditions, they might wait several minutes without realizing that an emergency stop had been made.

It is to be noted that coil MM374 of the idling switch relay is immediately deenergized upon opening of a safety switch. Under such conditions, coil MM1015 of this relay maintains the relay operated until the generator voltage decreases to a predetermined value.

The driving motor may be brought to a stop by turning the motor generator starting switch in either compartment in a counterclockwise direction to stop position. Assume that the motor generator starting switch in the top compartment is moved to stop position. This results in the disengagement of bridging contact 83 from contacts 82 and 84. As a result, the holding circuit for coil LL74 of the line switch relay is broken. Relay LL, therefore, drops out, causing the separation of its contacts LL1196, LL102 and LL31. The separation of contacts LL102 disconnects coil KR103 of the running relay from the exciter armature. The separation of contacts LL31 disconnects the actuating coil L30 of the line switch from the mains I and II. Contacts LL1196 will be referred to later.

The line switch L, upon dropping out, reengages its contacts L104 and separates its contacts L46, L51, L57 and L170. The separation of contacts L46, L51 and L57 breaks the circuit for the driving motor stator windings 70, 72 and 76. Contacts L170, as previously explained, are in the circuits for the actuating coil for the potential switch. Thus, in the event that the elevator car is in operation at the time that the circuit for the driving motor is broken, the potential switch is caused to drop out and bring the elevator motor to a stop, preventing the generator operating as a motor, under overhauling load conditions, to drive the driving motor and exciter and thus permit the elevator car to continue in operation. Contacts L104, upon reengagement, short-circuit coil J110 of the minimum current field relay to prevent the restarting of the elevator motor on a weak field, as previously explained.

The running relay KR, upon dropping out, causes the separation of its contacts KR44 and KR80. The separation of contacts KR44 breaks the circuit for the secondary winding 42 of the lighting transformer, resulting in the discontinuance of the supply of current to lamps 45 and 54. At the same time, the separation of contacts KR80 opens the holding circuit for coil LL74 between this coil and the motor generator starting switches. Thus, upon the light 45 in the top compartment becoming extinguished, the attendant may release the motor generator starting switch, which is returned to neutral position, the circuit for coil LL74 remaining broken at contacts KR80.

Contacts L57, upon separation, also break the circuit for coil PM77 of the protective relay. This relay, upon dropping out, causes the separation of its contacts PM81, these contacts also being in the holding circuit for coil LL74. The purpose of protective relay PM is to cause the dropping out of line switch L to effect the separation of its contacts L170 and thus cause the stopping of the elevator motor in the event that idling switch M does not function properly upon operation to change the connections for the driving motor phase windings.

In order that this may be readily understood, assume that switch M, upon operating to change the connections for the phase windings from star to delta, fails to cause the engagement of contacts M50, M53 and M55, or fails to cause good contact engagement of these contacts, after causing the separation of contacts M90 and M91. Under such conditions, coil PM77 is deenergized, resulting in the separation of contacts PM81 to deenergize coil LL74 of the line switch relay. Relay LL, as above explained, upon dropping out, causes the deenergization of the line switch L, which in turn separates its contacts L170 in the circuit for coil C162 of the potential switch. Thus, the elevator motor is brought to a stop.

Otherwise, should the faulty operation of switch M occur under overhauling load conditions, the generator would act as a motor to drive the driving motor and exciter, permitting the elevator motor to continue in operation and, with the driving motor exerting no braking action, dangerous overspeed of the elevator motor might result. Relay PM does not drop out under normal conditions during the change-over of the connections for the driving motor phase windings, as the driving motor field is sustained over this transition period to maintain coil PM77 energized.

Contacts M60 of the idling switch, as previously explained, are separated upon operation of the switch to change the connections of the phase windings of the driving motor from star to delta, these contacts being in the initial energizing circuit for coil LL74 of the line switch relay. Thus, in the event that the phase windings of the driving motor are connected delta at the time that the motor generator starting switch is moved to start position, contacts M60 are separated, preventing the starting of the driving motor.

In the event of sustained overload on the driving motor, the overload relay coils OA41 and OB43 are energized sufficiently to effect separation of their contacts OA34 and OB35, these contacts being arranged in the holding circuit for LL74 of the line switch relay. This relay, as above explained, upon dropping out, causes the disconnection of the driving motor from the mains and the bringing of the elevator motor to a stop. Each of these relays is preferably provided with suitable means, such as a dash-pot, to prevent the separation of the relay contacts in case of temporary overloads. It is to be noted that relay OA is arranged in main I, whereas relay OB is arranged in main III, thus affording protection in the event of overload in all phases or in any one phase.

In the event of sustained flow of overload current in the generator armature-motor armature circuit, the generator overload relay OC operates to cause the separation of its contacts OC36. The coil OC1045 of this relay is arranged in the generator armature, motor armature circuit and the contacts OC36 are arranged in the circuit for coil LL74 of the line switch relay. Thus, upon separation of contacts OC36, the line switch relay drops out to cause the disconnection of the driving motor from the mains and the stopping of the elevator motor. Relay OC, as in the case of relays OA and OB, is preferably provided with suitable means, such as a dash-pot, to prevent its operation in case of temporary overload.

Relay OC also affords protection against phase reversal. Assuming that the phases are reversed at the time that the motor generator starting switch is moved to start position, the driving motor starts in operation in a direction opposite to that in which it normally runs, driving the generator in a reverse direction. As a result, the generator becomes self-excited, owing to the fact that contacts H1065 and LH1067 connect field winding 1023 to the generator armature in such manner as to oppose the generator E. M. F., when the generator is driven in the proper direction. Thus, the generator E. M. F. builds up and, as the electromagnetic brake is not lifted, the current soon reaches a value to cause the operation of relay OC to shut down the motor-generator set.

Thermal cut-outs 32 and 33 are also arranged in the circuit for coil LL74 to cause the motor generator set to be shut down and the elevator motor stopped, in the event of overheating of the motor-generator set. These cut-outs may be positioned so as to be subject to the resistances of the driving motor stator circuits. Knife switch 37, arranged in this circuit, is provided for use in case of servicing the motor generator set.

It is of advantage in elevator installations, particularly those for high buildings, to minimize the number of conducting wires in the travelling cables, not only because of the saving in cost but also because of the saving in weight of the travelling cable. It is also of advantage to reduce the number of conducting wires between other remote points. It is desirable in installations employing systems such as the one previously described to provide a position indicator in each compartment of each car and one at the dispatcher's station for each car. A position indicator system is illustrated and in this system the number of conducting wires between the indicators and remote control points is reduced to a minimum.

The circuits for the position indicators for one elevator are illustrated in Figure 32. As has been previously stated, the control system illustrated is applicable to any number of floors. The position indicator circuits are illustrated for a sixty floor installation. The circuits for the position indicator for the other elevators may be the same as those illustrated. However, various changes may be made, including those to suit operating requirements.

The mechanism employed in the system illustrated comprises a motor-operated commutator mechanism at each indicating station, i. e., one on the top compartment, one on the bottom compartment and one on the dispatcher's panel for each elevator. The commutator mechanisms for each elevator are controlled by a contactor device arranged on the selector machine for that elevator. In order that the operation of the position indicators may be readily understood, the details of the control mechanism employed will first be described.

Motor-operated commutating mechanism is illustrated in Figures 33, 34, 35 and 36. Inasmuch as each commutator mechanism is preferably of the same construction, only one of them will be described. This mechanism, designated as a whole by numeral 1500, comprises a compartment for the driving motor and two decks of commutators.

The driving motor compartment comprises a top plate 1501, a base plate 1502 and circular band 1503. A shaft 1504 for the driving motor is mounted in suitable bushings 1505 which are pressed into apertures in the centers of the plates 1501 and 1502.

The two commutators are mounted on insulating plates 1506 and 1527. Each of these plates is provided with depending spacer lugs 1507 and 1528. These plates are joined to the motor compartment, as by bolts 1530 extending through the spacer lugs.

The driving motor drives the brushes for the commutators, operating through the intermediary of reduction gearing arranged between plates 1505 and 1506. The reduction gearing comprises a pinion gear 1508, idler gear 1510 and internally toothed gear 1511. The pinion gear 1508 is secured to the end of shaft 1504 projecting through plate 1501. The idler gear 1510 is rotatably mounted on a suitable boss projecting upwardly from plate 1501 and meshes with pinion 1508. The internally toothed gear 1511 engages with idler gear 1510 and is formed with a shaft portion 1512 which is rotatably mounted in a bearing 1513 secured in plate 1506.

The commutator contacts of the lower commutator deck are secured in slots formed in plate 1506. These contacts are radially disposed relative to and equidistant from the shaft 1512 of the gear 1511. An outer collector ring and an inner collector ring are also mounted on the plate 1506 concentrically with respect to shaft 1512. The arrangement is the same as for the upper commutator deck illustrated in plan in Figure 33 and described later. A brush holder 1516 is mounted above the plate 1506 and is secured to the shaft 1512, as by a key 1517 formed on the holder, so as to rotate therewith. Spring pressed brushes 1518 and 1520 are mounted on one end of brush holder 1516 so as to engage the inner and outer rings respectively. On the opposite end of brush holder 1516 two other spring pressed brushes are mounted so as to engage adjacent radial contacts in different positions of the brush holder. One of these brushes, designated 1284, is shown in Figure 32; the other, designated 1302, is shown in Figure 34.

A stub shaft 1531 is secured to the brush holder 1516, as by a key 1532 formed on the holder. This shaft is rotatably mounted in a bearing 1533 secured in plate 1527. This shaft drives the brush holder 1534 for the upper commutator, the brush holder being secured to shaft 1531 as by a key 1535 formed on the holder. The commutator contacts of the upper commutator deck, designated, for example, 1216 and 1224, are secured in slots formed in plate 1527. These contacts, as in the case of the contacts for the lower commutator, are radially disposed relative to and equidistant from the shaft 1531. An outer collector ring 1536 and an inner collector ring 1537 are mounted on plate 1527 concentrically with respect to shaft 1531. Spring pressed brushes 1538 and 1540 are mounted on one end of brush holder 1545 so as to engage the inner and outer rings 1537 and 1536 respectively. On the opposite end of brush holder 1534, other spring pressed brushes 1290 and 1307 are mounted so as to engage two adjacent commutator contacts at a time.

Conductor 1541 connects brushes 1290 and 1540, and conductor 1542 connects brushes 1307 and 1538. Brushes 1284 and 1520 and brushes 1302 and 1518 for the lower commutator are connected in a similar manner. Conductors connect the inner and outer rings to suitable terminals 1545 disposed along the margin of plate 1527. Similar conductors connect the inner and outer rings of the lower commutator to terminals along the margin of plate 1506. Screws 1526 are threaded to each of the commutator contacts to provide suitable terminals therefor.

A reset arm 1546 is provided, being free to rotate about a hub 1547 formed on brush holder 1534. A stop pin 1548 is secured in the end of the reset arm for cooperation with stops 1550 and 1551 mounted on plate 1527. The reset arm, in conjunction with these stops and a pin 1552 mounted on brush holder 1534, acts at the terminals to bring the commutators in step if, for any reason, they have got out of step. Screws 1553 and 1554 are provided for assembly purposes.

An impulse motor is employed as the driving motor for the brushes of the commutators. The details of the motor are shown in Figures 34 and 36. The impulse motor field pole structure is illustrated as comprising six poles. These poles, designated 1555, are positioned equidistantly around the inside or ring 1503. Each pole is provided with a field magnet 1556. Also, each pole is provided with a comparatively large pole shoe 1557 in the form of a rectangular plate, tangentially disposed relative to the armature and skewed at an angle of approximately thirty degrees with respect to the armature shaft 1504. The dimensions of each shoe are such that one diagonal of its rectangular face is disposed parallel with the armature axis. The ring 1503, poles 1555 and shoes 1557 constitute the field structure of the motor.

The armature is formed of a suitable number of laminations 1558 which may be punched out of sheet iron or steel. Each finished lamination is in the form of a cross and is pressed on the shaft 1504, providing a four pole armature. The armature poles thus formed present long, narrow pole faces 1560, which are parallel with the armature axis.

In the above construction, the armature poles are caused to have very definite positions with respect to the field poles. Assume, for example, that the coils of the top and bottom field poles, as viewed in Figure 36, are energized. Under such conditions, the armature assumes the illustrated position with the longitudinal centerlines of two armature pole faces 1560 directly aligned with the diagonals joining opposite corners of the top and bottom field pole faces 1557. Similarly, the energization of the coils of the other pairs of oppositely arranged field poles causes the armature to assume positions in which the longitudinal centerlines of two of its diametrically opposite pole faces are in direct alignment with the diagonals of opposed field pole faces.

In each of these positions the magnetic reluctance between the field and armature poles is at a minimum for two reasons: First, because a maximum area of the faces of the field poles is opposed to the faces 1560 of the armature poles, and second, because the air gaps between the tangentially disposed field pole faces and armature pole faces are, in this position, reduced to a minimum. This gives a very definite locking position since movement of the armature poles to either side of the locking position reduces the iron path available to the flux threading between the field and armature poles and at the same time increases the length of the air gap between said poles.

The skewed arrangement of the field pole shoes also allows the use of large-areaed, closely-spaced shoes to effect a strong starting torque for rotating the armature to a succeeding position in either direction. Furthermore, the strong starting torque is obtained without causing excessive magnetic leakage between adjacent shoes, since essentially parallel surfaces are presented to one another and points or corners of one shoe are widely separated from those of adjacent shoes.

It is preferred to provide braking mechanism to produce a frictional drag on the armature shaft 1504 and on the gear 1511 to cause the armature poles to stop in locking positions without oscillation or vibration. Such braking mechanism, designated as a whole as 1561, is illustrated. In the arrangement shown, a pair of brake arms 1562 is disposed on either side of the armature shaft 1504 and is biased into engagement with the hub of pinion 1508 by a spring 1563. The brake arms 1562 are pivotally mounted at intermediate points on screws 1564 which thread into the top plate 1501. Additional braking mechanism may be provided. Such braking mechanism is illustrated and is designated as a whole as 1565. It is shown in the form of diametrically opposed spring pressed plungers 1566, engaging the outer periphery of gear 1511 and mounted in guides 1567. These guides are secured to the lugs 1507 of plate 1506. Braking mechanism 1565, in addition to assisting brake 1561 in preventing vibration, causes the back lash of gears 1508, 1510 and 1511 to be taken up. Other forms of braking mechanism may be employed, if desired.

Diametrically opposed magnet coils 1556 may be connected either in parallel or in series. Also, the opposed coils are oppositely wound so that their energization produces magnetic poles of opposite polarity. As oppositely disposed magnets are energized, the pair of armature poles separated therefrom by the least angle moves into a position in alignment with the energized magnets. With the three pairs of magnets successively energized in one direction around the ring 1503, the armature rotates in the opposite direction in steps of thirty degrees each. At the completion of each step, two oppositely disposed armature poles are in alignment with two oppositely disposed field poles so that each locking position is equally definite.

The impulses from a source of current to the impulse motor are transmitted through contactor device 1568. The details of a preferred form of contactor device are illustrated in Figures 37, 38, 39, 40 and 41. The device comprises a frame 1570 of insulating material which is of a channel shape, with the flange portions 1571 connected by a cross member 1572. The stationary contacts of four cam operated switches 1173, 1164, 1174 and 1183 are mounted on the cross member 1572. The movable contacts of these switches are pivotally mounted on a contact rod 1573 extending between flange portions 1571. These movable contacts are equally spaced by positioning collars 1574 on rod 1573, the stationary contacts being correspondingly equally spaced, as illustrated in Figure 37. Each movable contact is biased toward its corresponding stationary contact by a spring 1575. The arrangement for switch 1164 is shown in Figure 40. The movable contacts are electrically connected by the rod 1573 and by the rod extending behind the biasing springs, while the stationary contacts are insulated from each other and provided with separate connecting screws 1576.

The operating cams 1577, 1578, 1580, 1581 for the switches are keyed on a shaft 1582 rotatably mounted in flange portions 1571. Cam 1581 is hexagonal in form. Cams 1577, 1578 and 1580 are each formed with flat portions one hundred and eighty degrees apart, and at equal, but slightly less distance from the center of the cam than the flats of cam 1581. Cams 1577, 1578 and 1580 are each arranged on shaft 1582 so that its flats are parallel to two flats of cam 1581, but at an angle to the flats of each of the other cams. Since the flats of cam 1581 are farther from shaft center than the flats of the other cams, cam 1581 causes switch 1173 to close after and open before each of the other switches.

Rotative movement is imparted to shaft 1582 to effect the operation of these switches by means of a star wheel 1583 keyed on the outer end of the shaft. The contactor device, as previously stated, is mounted on the crosshead of the selector machine. Stationary pins 1584 are provided on the selector machine in position to engage the points of the star wheel 1583 as movement of the crosshead takes place. Thus, during travel of the car, the star wheel is moved by each pin to cause sixty degree rotative movement of shaft 1582. The pins are positioned to cause operation of the star wheel at desired points in the travel of the car. The number of pins is one less than the combined number of effective operative positions assumed by the brush holders of a commutator.

Positioning mechanism is provided for causing the shaft to assume definite positive positions upon each step of rotative movement. This mechanism consists of a pivoted arm 1585 provided with a roller 1586 for cooperating with depressions 1587 formed in a rim 1588 on the star wheel 1583. Spring 1590 biases the arm in a direction to move the roller 1586 into a depression. This mechanism not only assures correct positioning of shaft 1582 but also assists in effecting the latter portion of each rotative movement of the star wheel.

On the other end of shaft 1582 is mounted an operating member 1591 for switching mechanism, designated as a whole as 1592. This mechanism comprises a metallic switch lever 1593, pivoted in a bracket 1594 secured to an extension from the flange portion 1571. This lever is provided with contacts for engaging stationary contacts mounted on the insulating extension piece. These cooperating contacts form switches 1206 and 1213. A toggle link 1595 is pivoted to the lever 1593 and extends into an opening formed in operating member 1591. A compression spring 1596 surrounds the toggle link, and presses at one end against a shoulder on the toggle link and at the other end through the intermediary of a washer against the operating member. The operating member is provided with a block 1597 which is spring pressed against shaft 1582 to provide a frictional drive for the member. Terminals 1598 are provided on cross member 1572 for this switching mechanism.

Counterclockwise movement of shaft 1582, as viewed in Figure 39, causes counterclockwise movement of operating member 1591. This causes the toggle link 1595 to be gradually displaced until a point is finally reached where the lever 1593 is forced to its other position with a snap action, causing the opening of switch 1206 and the closing of switch 1213. Similar action takes place upon reverse rotative movement of shaft 1582. Stops 1600 are provided for operating member 1591 to permit continued rotative movement of shaft 1582 without further effect upon the switching mechanism. The contactor device is provided with a suitable cover 1601 having an opening 1602 through which the star wheel 1583 extends.

Before proceeding with the description of operation of the position indicating mechanism, reference will be had to Figures 42 and 43 which illustrate in somewhat simplified form the details of a latch switch utilized in effecting the transfer of circuits from one commutator deck to the other. Although other forms of switches may be employed, the one illustrated is considered suitable in view of its simplicity. It comprises two electromagnets mounted at right angles on a frame 1605 secured to an insulating base 1606. The upper of these electromagnets, designated 1607, serves as the operating magnet, while the lower one, designated 1608, serves as a reset magnet. A latch lever 1609 of insulating material is pivotally mounted between two arms 1610 formed on the frame 1605. An armature 1611 for the operating magnet is secured to the upper end of the latch lever, and is formed with flanges 1612 which form the pivotal support for the lever. A U-shaped contact spring 1613 is secured to the latch lever on the other side of the pivot. This contact spring forms a bridge for the stationary contacts 1615 secured to the base 1606. The latch lever 1609 is formed with a latch portion 1616 for cooperating with the armature 1617 for the reset magnet. This armature is pivotally secured to the frame and is biased for counterclockwise movement, as viewed in Figure 43, as by weight 1618.

The switch is illustrated in latched position. Upon energization of the reset magnet 1608, its armature is pulled upwardly, releasing the latch and permitting the latch lever to move counterclockwise about its pivot under the influence of gravity, assisted initially by the contact spring 1613. This results in the disengagement of the spring contact from the stationary contacts. Upon energization of the operating magnet 1607, the armature 1611 on the latch lever pulls the lever clockwise about its pivot, causing the reengagement of the spring contact with the stationary contacts, and permitting the reset armature to drop into position to latch the contact spring in bridging position.

The latch switch illustrated is adapted for uses other than that about to be described. For example, in flashlight annunciator systems, a plurality of these switches could be employed to serve as the relays for the push buttons. Where a large number of these switches is employed as in the example stated, they may be conveniently mounted on elongated bars extending between uprights. Such cross bars are illustrated in dotted line and designated 1620. This arrangement permits the ready mounting of several switches on one pair of bars, each switch being held in position by means of clamps 1621. This arrangement is not only of advantage for mounting purposes, but also permits the initial mounting and replacement of the switch as a unit. In addition, the arrangement is economical. Where a small number of these switches is employed, they may be mounted on a panel, as by employing elongated mounting studs.

Two of these switches are employed in the position indicator system, one for transferring from the lower to the upper commutator and the other for transferring from the upper to the lower commutator. These switches have been termed upper commutator switch and lower commutator switch, and have been designated by reference letters "UC" and "LC" respectively. In view of the fact that two switches are employed, and to suit the system of numbering employed for the wiring diagram, Figure 32, the contacts of each switch formed by the stationary contacts and bridging contact spring, have been given different reference numerals, namely, LC1194 and UC1195. Similarly, the coils of the electromagnets have been given different reference numerals, the coils for the reset magnets being designated LC1256 and UC1324, and the coils of the operating magnets being designated UC1265 and LC1305. For like reasons and because of the fact that three impulse motors are provided for each elevator, the coils of the field magnets of these motors are given different reference numerals, referred to later.

In the wiring diagram, Figure 32, the commutator mechanisms for car No. 1 are illustrated for the condition with the top compartment of the car positioned at the 51st floor. In the position indicator circuits, the system is arranged for stopping the car with the top compartment at odd numbered floors. This further illustrates the flexibility of the system. With the car stopped at any floor, cam 1581 of the contactor device is in such position as to cause switch 1173 to be open. The parts of the contactor device have been illustrated in Figures 40 and 41 for this condition. With the cams in the position illustrated in Figure 41, switches 1183 and 1164 are closed and switches 1174 and 1173 are open.

Assume that the elevator car is started in the up direction. This causes the selector machine crosshead to move upwardly. As this takes place, a point is reached at which a point of the star wheel engages one of the pins 1584. This causes counterclockwise rotative movement of shaft 1582, as viewed in Figure 38, and clockwise rotative movement of the cams, as viewed in Figure 41. Cam 1580 opens switch 1164. Immediately thereafter, cam 1581 permits the closing of switch 1173. Upon continued rotative movement of the star wheel, cam 1581 reopens switch 1173 and immediately thereafter cam 1578 permits the closing of switch 1174. This occurs at the end of the sixty degree rotative movement of the star wheel, and the wheel is caused to assume its correct position by roller 1586. Continued movement of the selector machine crosshead results in the star wheel engaging another one of the pins 1584, and this causes further clockwise rotative movement of the cams. As this movement takes place, cam 1577 causes the opening of switch 1183. Immediately thereafter cam 1581 permits the closing of switch 1173. Further rotative movement of the star wheel results in the opening of switch 1173 by cam 1581, and finally the closing of switch 1164 as the locking point of the star wheel is reached. A similar operation takes place upon further sixty degree rotative movement of the star wheel, namely, the opening of switch 1174 by cam 1578, the closing of switch 1173 by cam 1581, the opening of switch 1173 by cam 1581, and finally the closing of switch 1183 by cam 1577.

It is to be noted that, with the above arrangement, switch 1173 and one of switches 1164, 1174 and 1183 are closed at the same time during each sixty degree rotative movement of the star wheel. It is also to be noted that switch 1173 closes after and opens prior to the closing and opening of each of these other switches. From a consideration of the circuits in which these switches are employed, about to be described, it will be seen that switch 1173 serves as a master switch for the other switches.

These switches are arranged in the circuits for the coils of the field magnets of the impulse motors. Also arranged in these circuits are contacts of auxiliary direction switch PC. It is to be understood that the additional contacts of switch PC may be arranged on a separate switch with the actuating coil of this additional switch connected in parallel with the actuating coil of switch PC. Contacts of the position indicator switch PI are arranged in the common wire for these circuits. The actuating coil PI457 of this switch is connected across contacts 462 of the brake so as to be energized when the brake is lifted and the car is in operation. A condenser 1163 is connected across switch 1173 to prevent arcing.

Assume that the car is moving. Thus, contacts PI1171 of the position indicator switch are in engagement. Assume further that the direction of car movement is up. Under such conditions, auxiliary direction switch coil PC458 is energized, causing contacts PC1169, PC1179 and PC1182 to be engaged and contacts PC1165, PC1177 and PC1186 to be separated. Assume now that the next operation of the star wheel causes switches 1183 and 1173 to be closed. This completes a circuit through resistance 1172 for the oppositely disposed field coils 1156, 1157, 1175, 1176, 1187 and 1188 of the three impulse motors. This results in one step of rotative movement of the armature of each of the impulse motors. The circuit for these field coils is broken upon the subsequent opening of master switch 1173. Upon the next step of sixty degree rotative movement of the star wheel, switches 1173 and 1174 are closed, resulting in the energization of oppositely disposed field coils 1161, 1162, 1180, 1181, 1191 and 1192 of the impulse motors, causing another step of rotative movement of the armatures of these motors to take place. The circuit for these field coils is thereafter broken by the opening of master switch 1173. The next step of sixty degree rotative movement of the star wheel causes switches 1173 and 1164 to be closed. This causes the energization of oppositely disposed field coils 1154, 1155, 1166, 1167, 1184 and 1185 of the impulse motors, causing another step of rotative movement of the armatures of the impulse motors. The circuit for these field coils is subsequently broken by the opening of master switch 1173. This operation is repeated upon continued steps of rotative movement of the star wheel.

The operation is similar during downward movement of the elevator car, with the exception that the field coils of the impulse motors are energized in such sequence as to cause opposite rotative movement of the armatures of the impulse motors. This is due to contacts PC1165, PC1177 and PC1186 being in engagement instead of contacts PC1160, PC1170 and PC1182 and the closing of switches of the contactor device in the order of 1164, 1174, and 1183.

With this arrangement, all the makes and breaks of the circuits for the field coils are effected by master switch 1173. Thus, the single condenser 1163 is effective to eliminate arcing. The impulse motor switch PI prevents the energization of the field coils of the impulse motors when the car is stopped, not only reducing current consumption but permitting these coils to be designed for intermittent duty.

The rotative movement of the impulse motor armatures, as the impulses of current are supplied to the field coils, causes rotative movement of the brush holders to effect the proper lighting of the lamps of the indicators. The current for the indicator lamps is supplied from a low voltage source illustrated as a transformer having primary and secondary windings 1193 and 1197 respectively. The circuits for the commutator and indicator lamps at the dispatcher's station are illustrated in Figure 32 on the left, those for the bottom compartment in the middle and those for the top compartment on the right.

Considering the circuits for the dispatcher's indicator, assume that the car is at the lower terminal and is operating to provide double compartment service. Under such conditions, lower commutator switch contacts LC1194 are latched in engagement and brushes 1302 and 1284 are in engagement with lower deck commutator contacts 1372 and 1365 respectively. This causes position indicator lamps 1373 and 1366 on the starter's panel to be illuminated, showing the compartments to be at their lower terminal floors. Upper commutator switch contacts UC1195 are open under the conditions assumed.

The circuits for the position indicators are illustrated for express service to the 28th floor with local service from this point to the 60th floor. It is satisfactory in certain installations to provide indication on the dispatcher's panel of the position of the car in the express zone at floor intervals. In the circuits illustrated, indication is provided in the express zone at every fourth floor. The operating pins for the contactor device star wheel are positioned accordingly on the selector machine.

Upon the first step of rotative movement of the impulse motor armature for the dispatcher's indicator, brushes 1284 and 1302 are moved into engagement with contacts 1365 and 1362 respectively. This results in the lighting of lamps 1366 and 1357 and the extinguishing of lamp 1373, lamp 1357 being for the 4th floor. The next step of rotative movement of the armature moves the brushes into engagement with contacts 1356 and 1362. This extinguishes lamp 1366 but maintains lamp 1357 lighted. In a similar manner, as the brushes move into engagement with contact 1353 and contacts for floors above in the express zone (not shown), the lamps for the floors above for every fourth floor are lighted.

Upon the engagement of brush 1284 with contact 1350 as the top compartment nears the 27th floor, lamp 1344 for the 28th floor is lighted. This lamp is maintained lighted by brush 1302 engaging contact 1343 upon the movement of brush 1284 into engagement with contact 1336 to effect the lighting of lamp 1337 for the 29th floor, as the top compartment nears that floor. The lamps for the floors above are thereafter lighted in sequence and in pairs. Although the lamps for floors thirty to forty-seven inclusive are omitted, the circuit arrangement for these lamps and the manner of causing their illumination will be evident from a consideration of the circuits for the floors above. Lamps 1331, 1323, 1304 and 1286 for the 48th, 49th, 50th, and 51st floors are lighted in sequence and in pairs, i. e., lamps 1331, 1323, then lamps 1323, 1304 and then lamps 1304, 1286, as the brushes move into engagement with contacts 1330, 1322, 1303 and 1285.

Brushes 1290 and 1307 for the commutator contacts of the upper commutator deck, being moved in unison with brushes 1302 and 1284, move onto contacts 1287 and 1306 as brushes 1284 and 1302 move onto contacts 1285 and 1303. Brushes 1290 and 1307, however, are "dead" at this time. Upon movement of brushes 1284 and 1302 into engagement with contacts 1273 and 1285 and brushes 1290 and 1307 with contacts 1275 and 1287, the lighting of the position indicator lamps is taken over by the upper commutator deck. The engagement of brush 1284 and contact 1273 connects upper commutator switch operating coil UC1265 and lower commutator switch reset coil LC1256 to the secondary winding 1197 of the supply transformer. This results in the separation of contacts LC1194 and the latching in engagement of contacts UC1195, rendering brushes 1284 and 1302 "dead" and brushes 1290 and 1307 "alive". Thus, the circuits for the 52nd and 51st floor indicator lamps 1274 and 1286 extend through brushes 1290 and 1307.

As continued upward movement of the car takes place, brushes 1290 and 1307 engage commutator contacts 1267, 1260, 1252, 1244, 1237, 1231, 1224 and 1216, causing the lighting of position indicator lamps 1266, 1257, 1251, 1243, 1236, 1230, 1223 and 1215 for the 53rd to 60th floors in sequence and in pairs. During double compartment operation, with the top compartment stopping at odd numbered floors in the local zone, a one floor run is made, in the event of a stop with the top compartment at the 59th floor, to the 60th floor.

Upon the car being started in the down direction, contactor device master switch 1173 is again closed and an impulse of current is again supplied through that one of the contactor device switches 1164, 1174 and 1183 through which was given the last impulse of current in the up direction, to the field coils of the impulse motors. However, as above explained, owing to the fact that auxiliary direction switch PC is deenergized during downward travel, this impulse is supplied to field coils of the impulse motors to cause one step of rotative movement of the impulse motor armatures in the opposite direction. This reverse rotative movement of the impulse motor armatures continues during downward travel of the car. Upon the engagement of brush 1307 with contact 1306, a circuit is completed for the lower commutator switch operating coil LC1305 and upper commutator switch reset coil UC1324. This results in the separation of contacts UC1195 and the engagement of contacts LC1194. This renders brushes 1307 and 1290 "dead" and brushes 1302 and 1284 "alive", causing the lighting of the indicator lamps by the lower commutator deck upon continued downward movement of the car.

It is to be understood that a two position switch having two pairs of contacts, one pair maintained in engagement in one position of the switch and the other pair maintained in engagement in the other position of the switch, may be employed in lieu of the two switches LC and UC illustrated. In such event, the switch coil for causing engagement of one pair of contacts would be connected to commutator contact 1273 in lieu of coils LC1256 and UC1265, while the coil for causing engagement of the other pair of contacts would be connected to commutator contact 1306 in lieu of coils LC1305 and UC1324.

The lighting of the lamps of the position indicator in the bottom compartment is accomplished in a similar manner. Brushes 1291 and 1310 which cooperate with lower deck commutator contacts are "alive" when brush 1302 is "alive" and brushes 1314 and 1294 which cooperate with the upper deck commutator contacts are "alive" when brush 1307 is "alive". A suitable arrangement for indicating the position of the bottom compartment in the express zone is illustrated, whereby in the lower half of the zone the position indicator lamp for the bottom compartment lower terminal is lighted and in the upper half of the zone the lamp for the bottom compartment upper terminal of the express zone is lighted. This operation is obtained by connecting the commutator contacts 1354, 1358, 1363, 1367 and 1374 for the floors in the lower half of the express zone to the position indicator lamp 1375 for the lower terminal and by connecting the commutator contacts 1351, 1345 for floors in the upper half of the express zone to lamp 1346 for the 28th floor.

Inasmuch as the bottom compartment, in the control system illustrated, can stop only at every other floor, even numbered floors under the present assumption, position indicator lamps are provided only for these even numbered floors in the local zone. These lamps, designated 1217, 1232, 1245, 1261, 1277, 1312 and 1333, for the 59th, 58th, 56th, 54th, 52nd, 50th and 48th floors, are connected to commutator contacts 1220, 1233, 1246, 1262, 1280, 1311 and 1332 respectively, the circuits for floors 30 to 47 being omitted as in the case of the circuits for the dispatcher's indicator. Commutator contacts 1225, 1240, 1253, 1270, 1283, 1313, 1276, 1292, 1325 and 1340 are not connected. With this arrangement, only one lamp is lighted at a time, the circuit for each lamp being initially completed by the leading brush and thereafter taken up by the following brush. For example, lamp 1261 for the 54th floor is lighted when the bottom compartment is in a zone including the 53rd and 54th floors.

The lighting of the lamps of the position indicator in the top compartment is also accomplished in a similar manner. Brushes 1295 and 1315 are "alive" when brushes 1284 and 1302 are "alive" and brushes 1301 and 1321 are "alive" when brushes 1290 and 1307 are "alive". As in the case of the position indicator for the bottom compartment, the top compartment position indicator may be arranged to light the top compartment lower terminal indicator lamp when the top compartment is in the lower half of the express zone, and to light the local zone lower terminal lamp when the car is in the upper half of the express zone. This arrangement has been illustrated, and consists in connecting the commutator contacts 1355, 1361, 1364 and 1370 to the top compartment lower terminal lamp 1371, and by connecting the contacts for the upper half of the express zone, including commutator contact 1352, by way of contact 1347 or contact 1341, to one or the other of lamps 1348 and 1342 for the 28th and 29th floors, depending upon whether single compartment or double compartment service is being provided. A lamp is provided for each floor of the local zone, these lamps being designated 1221, 1226, 1234, 1241, 1247, 1254, 1263, 1271, 1282, 1297, 1317, 1327 and 1335 for floors 60 to 48 inclusive respectively, the circuits for floors 30 to 47 inclusive having been omitted as in the case of the circuits for the other indicators. These lamps are connected to contacts 1222, 1227, 1235, 1242, 1250, 1255, 1264, 1272, 1283, 1296–1300, 1316, 1326 and 1334 respectively. Commutator contacts 1376, 1281 and 1320 are not connected.

In describing the operation of the position indicators for the dispatcher's station and bottom compartment, double compartment operation was assumed, the change-over switches 1201, 1202, 1210 and 1360 being illustrated in double compartment position. In the case of the position indicator for the top compartment, change-over switch 1210, in double compartment position, breaks the circuit common to the indicator lamps for the even numbered floors so that these lamps are not lighted during travel of the car. With this arrangement, as in the case of the position indicator in the bottom compartment, only one lamp is lighted at a time, the circuit for each lamp being initially completed by the leading brush and thereafter taken up by the following brush. For example, lamp 1327 for the 49th floor is lighted when the top compartment is in a zone including the 49th and 50th floors. Lamp 1342 for the 29th floor is connected by a change-over switch 1360 to the commutator contacts for the 27th floor and floors below in the upper half of the express zone so that when the top compartment is in this zone the 29th floor position indicator lamp is lighted.

The change-over switches 1201, 1202, 1210 and 1360 are arranged for operation by the master switch motor. Inasmuch as additional change-over switches are provided for the position indicator circuits for each of the other elevators, it may be desirable to employ a plurality of master switch motors connected for parallel operation. However, these change-over switches for the position indicator circuits may be operated by the individual change-over switch motors if desired.

Assume that change-over switches 1201, 1202, 1210 and 1360 are thrown from double compartment to single compartment positions. Switch 1201 disconnects commutator brushes 1302, 1291, 1310 and 1315 from the supply transformer secondary, and switch 1202 disconnects brushes 1307, 1294, 1314 and 1321 from the transformer secondary. Switch 1210 connects the wire common to the top compartment position indicator lamps for even numbered floors to the transformer secondary. Switch 1360 transfers the connection of top compartment commutator contact 1352 from the 29th floor lamp 1342 to 28th floor lamp 1348.

The dispatcher's position indicator, under such conditions, displays only one light at a time as the car moves up and down in the hatchway, owing to the fact that only one brush 1284, 1290 for each commutator deck is "alive." These brushes being positioned with respect to the commutator contacts in accordance with the position of the top compartment with respect to the floors for which these contacts are provided, the dispatcher's indicator registers the position of the top compartment in the hatchway.

The bottom compartment position indicator displays no light during movement of the car, owing to the fact that all of the commutator brushes are "dead." This is desirable because the bottom compartment, under single compartment operation, is not providing service.

The top compartment position indicator, as in the case of the dispatcher's panel indicator, displays only one light at a time, owing to the fact that only one brush 1295, 1301 for each commutator deck is "alive." However, a position indicator lamp is lighted for each floor in the local zone, owing to the fact that under single compartment operation the top compartment may stop at any of these floors. Brushes 1295, 1301 being positioned with respect to the commutator contacts in accordance with the position of the top compartment with respect to the floors for which these contacts are provided, the top compartment indicator registers the position of that compartment in the hatchway. Inasmuch as a stop may be made at the 28th floor under such conditions, the 28th floor lamp is lighted for the upper half of the express zone instead of the 29th floor lamp.

Various arrangements of position indicator circuits may be employed. For example, the position indicators in the compartments may be arranged to light the lamps for the lower terminal of the local zone immediately after leaving the lower terminal of the express zone. Under such conditions, all contacts above contact 1374 and up to and including contact 1351 would be disconnected from contact 1374 and connected to contact 1345 and all contacts above contact 1370 and below contact 1352 would be disconnected from contact 1370 and connected to contact 1352. Also, the indicators in the compartments may be arranged to display no lights after leaving the local terminal for the express zone until the car nears the lower terminal for the local zone. Under such conditions, change-over switch 1360 and its associated circuits are omitted and the contacts of the commutators for floors intermediate these two terminals are not connected. With such arrangement, the 29th floor lamp 1342 of the top compartment indicator lights as the car nears the 29th floor under double compartment operation and the 28th floor lamp lights as the car nears the 28th floor under single compartment operation.

The above described arrangement of the position indicator circuits reduces the number of wires from the remote control point to the indicators to a minimum. Twelve wires from the remote control point to the dispatcher's indicator are sufficient, while ten wires are sufficient from the remote control point to the indicators on the car, with switch 1360 omitted. A marked saving in the weight of the connecting or travel cable is made possible by this arrangement, because the connecting cables of a directly wired signalling system would ordinarily involve as a minimum as many wires plus one as there are signals to transmit.

It is to be noted that the circuit from the supply transformer secondary winding 1197 to the various position indicator lamps is subject to contacts LL1196 of the line switch relay. This prevents the lighting of the position indicators when the motor generator set is shut down and the car is out of service. A switch 1200 is also provided in the circuit from the transformer secondary winding 1197. This switch is arranged on the dispatcher's panel and is for the purpose of opening the circuit to the position indicator lamps when the car is out of service.

The transformer secondary winding 1197 is also arranged to supply current for additional indicating lamps, direction lamps and non-stop lamps being illustrated. The direction lamps 1207 and 1214 are arranged on the dispatcher's panel and are controlled by switches 1206 and 1213 operated by the contactor device. As explained in describing the operation of this device, these switches are operated only upon reversal of car travel being effected and are thus particularly suitable for controlling the circuits to lamps which indicate the direction of travel of the car. Non-stop lamps 1205 and 1212 for the top and bottom compartments respectively are arranged on the dispatcher's panel to advise him when a car is running by floors for which hall buttons have been operated. Lamp 1205 is controlled by contacts NST1204 of the top compartment non-stop relay, while lamp 1212 is controlled by contacts NSB1211 of the bottom compartment non-stop relay. It will be remembered that normally, with the motor generator set in operation and the potential switch operated, the coils of the non-stop relays are energized. Thus, under these conditions, contacts NST1204 and NSB1211 are separated and lamps 1205 and 1212 are extinguished. However, should either compartment non-stop switch 862 or 866, or both of them, or the non-stop switch 863 on the dispatcher's panel, be opened, the proper non-stop lamp is lighted to indicate the condition obtained. These non-stop lamps may be arranged, if desired, so as to be extinguished under emergency stop conditions. Such arrangement has been illustrated, auxiliary contacts C1203 of the potential switch being arranged in the common circuit for the lamps.

The elevators may be arranged so that all the compartments loaded from the first level of the lower terminal serve only odd numbered floors or so that they serve only even numbered floors and the compartments loaded from the second level of the lower terminal serve the floors next above. They may also be arranged so that, for example, half of those loaded from each level serve odd numbered floors and the other half even numbered floors. Each arrangement has certain advantages. The first arrangement provides a shorter interval for dispatching the cars, minimizes congestion in the corridors and reduces the possibility of partially loaded compartments. The second arrangement has psychological advantages and is particularly suitable for installations having entrances at different levels, as for example street level and subway entrances or entrances from different streets at different levels.

The second arrangement is illustrated schematically for two banks of cars in Figure 45. The bottom compartments 1630 of the cars in the left bank serve even numbered floors and the top compartments 1631 of these cars serve odd numbered floors. The bottom compartments 1632 of the cars in the right bank serve odd numbered floors while the top compartments 1633 of these cars serve even numbered floors. Assuming, for example, banks of four cars each, intending passengers at each level desiring to be carried to even numbered floors would be served by four compartments, as would the intending passengers desiring to be carried to odd numbered floors. Thus, convenient service is provided at each loading level.

Various arrangements of providing access to the loading levels at the lower terminal may be employed. When due to the situation of the building, entrances to both levels are naturally provided, this may be sufficient. It may be augmented by stairs, ramps and escalators. Where an additional entrance is provided at a level intermediate the loading levels, access to the elevator corridors may be provided by stairs leading upwardly and downwardly from the intermediate level. Such arrangement is illustrated schematically in Figure 44 in which 1634 designates the intermediate entrance level, 1635 the first loading level and 1636 the second loading level. The stairs 1637 lead from entrance level 1634 up to the second loading level 1636, while the stairs 1638 lead from level 1634 down to the first loading level 1635.

Similar arrangements may be employed where the situation of the building does not naturally provide entrances at the loading levels. The arrangement shown in Figure 44 is particularly suitable in such cases. In such buildings, the level 1634 may represent the main floor of the building with the stairs 1637 and 1638 leading to specially provided elevator corridors. On the other hand, level 1634 may be the street level and level 1636 the main floor of the building elevated from the street level. Various arrangements may be provided, depending for the most part upon the particular installation.

Where the top compartments of some of the elevators serve even numbered floors and the top compartments of the other elevators serve odd numbered floors, the most suitable arrangement is to have the floors served by the cars of equal height. Where the top compartments of all cars serve the same floors, for example, odd numbered floors, it is satisfactory if the distances between these floors and the floors next below are equal.

It would sometimes happen, during double compartment service, that a passenger, entering a compartment at some intermediate floor, would desire to be carried to a floor not served by the compartment, as, for example, a passenger entering at an even numbered floor and desiring to alight at an odd numbered floor. This passenger could be discharged at a floor adjacent the destination desired. On the other hand, he may take a car to the lower terminal in installations where compartments are available at each loading level for any floor, and transfer. Also, suitable intermediate transfer terminals may be provided to take care of interfloor traffic. During single compartment service, the passenger could be discharged at the desired floor.

If desired, car buttons may be provided in each compartment for each floor served by the car. These extra car buttons in the bottom compartment are connected to the corresponding stationary contacts of the selector machine in the rows designated bottom car slow-down and bottom car secondary slow-down in Figure 11, the contacts having been previously described as not connected. With this arrangement, all car buttons are effective during double compartment operation. Thus, the top compartment may be caused to slow down at any floor by pressing the car button in that compartment for that floor and the bottom compartment may be caused to slow down at any floor by pressing the car button in that compartment for that floor.

The control of the car by the hall buttons remains unchanged, i. e., those at certain alternate floors cause slow-down to be initiated at such point as to cause the stop to take place with the top compartment at those floors and those at intervening floors cause slow-down to be initiated at such point as to cause the stop to take place with the bottom compartment at those floors. Intending passengers at the lower terminal may enter any compartment and be carried to the desired destinations. This reduces the starting interval for the cars at the lower terminal over that where they are arranged so that some of the compartments at each loading level stop only at even numbered floors and others the same loading level stop only at odd numbered floors.

This arrangement is particularly suitable for interfloor traffic in the local zone, as an intending passenger at any floor in this zone may be carried directly to any other desired floor in that zone. During single compartment service, all car buttons in the non-used compartment would be cut out.

In reviewing the operation of the system according to the wiring diagrams illustrated in Figures 30, a, b, c and d and Figures 31 and 32, the motor generator set may be started or stopped from either compartment by a switch in that compartment. A signal is given in each compartment when the motor generator set is in operation, advising the attendant that the operated switch may be released.

Passengers at the lower terminal desiring to be carried to even numbered floors enter the compartment serving those floors, while passengers desiring to be carried to odd numbered floors enter the compartment serving those floors. The passengers, upon entering the compartments, call out their desired destinations. Each compartment attendant registers the desired floors by pressing car buttons for the floors designated by the passengers entering his compartment, and rejects any passenger that should enter a compartment serving other floors.

When the dispatcher gives the starting signal to the car, or when starting signals are given automatically as by a scheduling device, each attendant advances his starting switch to the start position. Thereupon, the compartment gates and hatchway doors close automatically and the car starts its upward trip. Upon the car attaining a certain speed, the starting switches may be released.

Travel is continued until the car approaches the first floor for which a car button or unanswered up hall button has been pressed. Upon the arrival of the compartment serving that floor at a certain distance from that floor, the car is caused to slow down. The car is thereafter brought to a stop with the proper compartment at an exact level with the floor landing. The compartment gate and hatchway door open automatically as the stop is made, permitting the passenger transfer to be effected immediately. The up hall lantern at the floor for that car is lighted during the slow-down operation and while the compartment is stopped at the floor, thus serving to advise intending passengers at the floor of the approach and presence of a compartment of an up travelling car.

If a push button has also been pressed for the floor served by the other compartment during such stop so that there is to be a transfer of passengers in both compartments, the gates for both compartments and the hatchway doors at those floors are opened upon the stop being made and the hall lanterns are lighted at both floors.

If there is to be no transfer of passengers in one of the compartments upon a stop being made to effect a passenger transfer in the other compartment, the gate of that compartment and opposite hatchway door are not opened and the hall lantern at the floor at which the non-passenger-transferring compartment is stopped is not lighted. A signal is given the attendant in the non-passenger-transferring compartment that the stop is a normal one.

Immediately the transfer of passengers in a compartment has been completed, the attendant of that compartment advances his starting switch. This causes the compartment gate and hatchway door to close. Upon the gate and door reaching closed position, the car restarts in the upward direction, provided the gate of the other compartment and its opposite hatchway door also are closed and the starting switch in the other compartment is in start position. As soon as the starting switch in one compartment is advanced, a signal to that effect is given the attendant of the other compartment. Upon receipt of this signal, the attendant advances his starting switch, in the event that he has not already done so, subject to the conditions that, where a passenger transfer is being effected in that compartment, this transfer be completed. In this manner, the time consumed in effecting the passenger transfers is minimized.

The lighted hall lantern is extinguished immediately the starting switch of the compartment stopped at that floor is advanced, without waiting on the closure of the door and gate. This eliminates the attraction of intending passengers to the compartment after the starting switch has been advanced.

The car continues its travel in the up direction until it approaches the next floor for which a car button or unanswered up hall button has been pressed, whereupon it is again caused to slow down and is thereafter brought to a stop with the proper compartment level with the floor landing. After the passenger transfer has been completed, the car is restarted as before. Car buttons and unanswered up hall buttons for succeeding floors are responded to in a similar manner during the up trip of the car.

As the car nears the upper terminal, it is slowed down automatically and finally brought to a stop. The compartment gates and hatchway doors at the floors constituting the upper terminal open automatically and hall lanterns for that car for the down direction are lighted at these floors. Also, the elevator is set for travel in the down direction so that, upon the starting switches being advanced and the gate and doors closed, the car is started in the down direction. Car buttons and unanswered down hall buttons are responded to during downward travel of the car in the same manner as car buttons and up hall buttons are answered during upward travel of the car.

The car buttons in each compartment of any car cause the slowing down of only that car. The hall buttons are common to all of the elevators of the group and may cause the slowing down of any one of the cars to be initiated. The car which answers each operated hall button is determined by the relative positions of the compartments serving that floor, and is selected automatically to provide efficient service. When a hall button is answered, the call registered by the hall button is restored, preventing later false stops. The floors are served in their natural order, regardless of the order in which the buttons are pushed.

If a hall button is pressed after the compartment serving that floor, travelling in the direction corresponding to that of the button pressed, has passed its slow-down initiating point for that floor, the call registered thereby is reserved for the next compartment, travelling in that direction, which serves that floor. However, if the slowing-down of the car has already been initiated preparatory to bringing the car to a stop at that floor, to effect a transfer of passengers in the other compartment at the adjacent floor, the hall lantern at that floor for that car is lighted and the compartment gate and hatchway door are opened as the car comes to a stop. Should the pressing of the button occur after the car is stopped, the hall lantern is lighted and the opening of the gate and door is effected immediately. If the pressing of the button is delayed until after the attendant in either compartment advances his starting switch, the hall lantern does not light and the compartment gate and hatchway door remain closed. The call is not cancelled but is reserved for the next car.

All the elevators may be changed from double compartment to single compartment operation. This change-over is controlled by a group change-over switch at the dispatcher's station. Upon the operation of this switch to effect such change, a warning signal is given immediately to the attendant in each compartment of each down travelling car and to the attendant in each compartment of each up travelling car upon the arrival of that car at the upper terminal. The complete change-over of each car is not effected until the car arrives at the lower terminal, where the final change-over operation takes place automatically. Should the car be positioned at the lower terminal at the time the change-over is effected, the complete change-over is delayed until the next return of the car to the lower terminal.

During single compartment operation, one of the compartments of each car is cut out of service, its gate remains closed and the car is operated by an attendant in the other compartment. The car is started by the starting switch in the used compartment. All hall buttons are answered by the used compartment and additional car buttons in that compartment are effective so that passengers in that compartment may be discharged at any desired floor.

The elevators may be changed back from single compartment to double compartment operation by operation of the switch at the dispatcher's station. A warning signal is given to the attendant of each down travelling car immediately the change-over is effected and to the attendant of each up travelling car upon its arrival at the upper terminal. The complete change-over of each car is delayed until the car arrives at the lower terminal. Upon the arrival of each car at the lower terminal, the gate of the cut-out compartment and hatchway door for that compartment at the lower terminal open automatically. If a car is at the lower terminal at the time the change-over is effected, the complete change-over is delayed until the next return of the car to that terminal.

One or more of the cars may be operated by a single attendant, using one compartment only, without affecting double compartment operation of the other elevators. If the cars are operating to provide double compartment service and it becomes desirable to operate one of them with only one attendant, a service switch for that car is operated at the dispatcher's station. As soon as the car becomes set for downward travel, a warning signal is given. Upon the arrival of the car at the lower terminal, the change-over is effected. One compartment is cut out and the car is operated solely from the other compartment. The car is started by the starting switch in the used compartment and the additional car buttons in that compartment are effective but hall buttons are answered by that compartment in accordance with double compartment operation.

If the cars are operating to provide single compartment service and it is desired to continue operating one or more of them each with a single attendant upon the change back to double compartment service, the service switches for those cars are operated. When the group change-over switch is operated, those cars which are to remain under control of single attendants do not receive warning signals but thereafter answer hall buttons in accordance with double compartment operation with the starting of the car controlled by the starting switch in the used compartment and all car buttons in that compartment effective.

When a compartment becomes fully loaded, the compartment attendant operates his non-stop switch. This prevents the answering of hall calls by that compartment. More specifically, the hall buttons for floors served by that compartment are rendered ineffective to initiate slow-down of the car. Also, each of these hall buttons is rendered ineffective to cause the lighting of the hall lantern for that car at the floor at which the button is pressed and the opening of the gate for that compartment and hatchway door for that compartment at that floor when a stop is made to effect a transfer of passengers in the other compartment. These "by-passed" hall calls are reserved for the next car travelling in the same direction. The hall calls for the other compartment are not affected by the operation of the switch.

The car may be caused to by-pass all hall calls by the operation of the non-stop switches in both compartments. This may be desirable when both compartments are fully loaded or when the car is behind on its schedule.

Operation of the safety switch in either compartment immediately stops the car. Whenever an emergency stop is made, the compartment gates are not opened and the normal stop signals are not given. This immediately advises the compartment attendants that an abnormal stop has been made.

Any car may be caused to operate at levelling speed by operating levelling emergency operating switches in the two compartments. Also, the direction of travel of the car may be reversed at any point by operating direction control switches in the two compartments. During double compartment operation, the direction control switch and levelling switch in each compartment which is cut out during single compartment operation serve as an interlock to control the effectiveness of the corresponding switches in the other compartment. In this manner, operation of any car at levelling speed or reversal of its direction of travel is prevented during double compartment operation unless the compartment attendants are in agreement. During single compartment or one attendant operation, the direction control switch and levelling switch in the used compartment are effective alone to control the direction of car travel and to effect operation of the car at levelling speed.

In case of any extreme emergency, such as a fire, when a compartment gate or hatchway door cannot be closed, operation may be had by means of emergency switches, such switches being provided in each compartment. During double compartment operation, the emergency switches in each compartment are effective only with respect to the gate of that compartment and the doors for floors served by that compartment. During single compartment operation, however, the emergency operating switches in the used compartment are effective with respect to any hatchway door and both compartment gates.

The position in the hatchway of each compartment of each car is indicated in that compartment and also at the dispatcher's station, a position indicator being provided in each compartment and a position indicator being provided at the dispatcher's station for each car. During double compartment operation, the position indicator in each compartment of each car registers the position of the compartment with respect to the alternate floors served by that compartment, while the position indicator for that car at the dispatcher's station registers the positions of both compartments simultaneously with respect to the floors served by both compartments. During single compartment operation, the position indicator in the unused compartment is cut out and the position indicator in the used compartment and the position indicator at the dispatcher's station register the position of the used compartment with respect to each floor.

Many alternative constructions and other changes have been referred to throughout the description. Many additional changes could be made in the mechanisms and system described, and many apparently widely different embodiments of the invention could be made without departing from the scope thereof. It is therefore intended that all matter contained in the above description or shown in the accompanying drawings shall be interpreted as illustrative and not in a limiting sense.

What is claimed is:

1. In an elevator installation; a plurality of floors; an elevator car having a plurality of superimposed passenger carrying compartments adapted to serve said floors in groups of adjacent floors with the number of floors in each group equal to the number of compartments and with each floor in only one group; a manually operable control for each of said floors; means responsive to the operation of any one of said controls for the floors of any of said groups for initiating the slowing down of the car for the floors of that group as it nears those floors; means for causing the car thereafter to be brought to a stop with the compartments at the floors of the group for which slow-down has been initiated; a device associated with each compartment; and means responsive, as the car is stopped at any of said groups of floors, to such controls for the floors of such group as are operated, for causing the operation of those devices associated with the compartments which serve the floors for which such controls are operated.

2. In an elevator installation; a plurality of floors; an elevator car having a plurality of superimposed passenger carrying compartments adapted to serve said floors in groups of adjacent floors with the number of floors in each group equal to the number of compartments and with each floor in only one group; a manually operable control for each of said floors; means responsive to the operation of any one of said controls for the floors of any of said groups for initiating the slowing down of the car for the floors of that group as it nears those floors; means for causing the car thereafter to be brought to a stop with the compartments at the floors of the group for which slow-down has been initiated; a device associated with each compartment; and means for causing, when a stop is made, the operation of the device for the compartment being brought to a stop at a floor in response to the control for that floor without causing the operation of the devices for the other compartments, provided the controls for the floors at which the other compartments are being brought to a stop are not operated.

3. In an elevator installation; a plurality of floors; an elevator car having a plurality of superimposed passenger carrying compartments adapted to serve said floors in groups of adjacent floors with the number of floors in each group equal to the number of compartments and with each floor in only one group; a manually operable control for each of said floors; means responsive to the operation of any one of said controls for the floors of any of said groups for initiating the slowing down of the car for the floors of that group as it nears those floors; means for causing the car thereafter to be brought to a stop with the compartments at the floors of the group for which slow-down has been initiated; closure means associated with each compartment; means for opening each of said closure means; and means for rendering effective, when a stop is made, the opening means for the closure means associated with the compartment being brought to a stop at a floor for which a control has been operated, without rendering effective the opening means for the closure means associated with the other compartments provided the controls for the floors at which the other compartments are being brought to a stop are not operated.

4. In an elevator installation; a plurality of floors; an elevator car having two superimposed passenger carrying compartments adapted to serve said floors in pairs of adjacent different floors; a push button switch for each of said floors; means responsive to the operation of either of said switches for any of said pairs of floors for initiating the slowing down of the car as it approaches the floors of that pair; means for causing the car thereafter to be brought to a stop with the upper compartment at the upper floor of that pair and with the lower compartment at the lower floor of that pair; closure means adapted when open to afford access between the upper compartment and said upper floor; closure means adapted when open to afford access between the lower compartment and said lower floor; and means for automatically causing, as the car is being brought to a stop, the opening of said closure means for the floor of that pair for which the switch has been operated without causing the opening of the closure means for the other floor of said pair, provided the switch for said other floor is not operated.

5. In an elevator installation; a plurality of floors; an elevator car having two superimposed passenger carrying compartments adapted to serve said floors in adjacent pairs of adjacent floors; a push button switch at each of said floors for operation by intending passengers; means responsive to the operation of either one or both of the switches at any of said pairs of floors for initiating the slowing down of the car as it approaches the floors of that pair from a given direction; means for causing the car thereafter to be brought to a stop with the upper compartment at the upper floor of that pair and with the lower compartment at the lower floor of that pair; closure means adapted when open to afford access between the upper compartment and said upper floor; closure means adapted when open to afford access between the lower compartment and said lower floor; means for opening each of said closure means; and means responsive to said switches for causing, as the car is being brought to a stop, the opening of the first named closure means by its opening means in the event the switch at said upper floor is operated and the opening of the second named closure means by its opening means in the event the switch at said lower floor is operated, without causing the opening of said first named closure means when the switch for said upper floor has not been operated or of said second named closure means when the switch for said lower floor has not been operated.

6. In an elevator installation; a plurality of floors; an elevator car having two superimposed passenger carrying compartments adapted to serve said floors in adjacent pairs of adjacent floors; a push button switch for each of said floors; means responsive to the operation of said switches for causing the car to slow down as it arrives at a predetermined distance from the floors of each of said pairs for either or both floors of which a switch has been operated; means for causing the car to be brought to a stop, after the initiation of each of said slow-downs, with the upper compartment at the upper one of the floors of the pair for which slow-down has been initiated and the lower compartment at the lower one of said floors; a hatchway door at each of said floors; power mechanism for opening each of said doors; and means controlled by said push button switches for causing, as the car is brought to each of said stops, the opening of the hatchway door, at each of the floors at which a stop is being made for which a switch has been operated, by its power mechanism without causing the opening of the hatchway door for the floor at which a stop is being made for which a switch has not been operated.

7. In an elevator installation; a plurality of floors; an elevator car having two superimposed passenger carrying compartments adapted to serve said floors in adjacent pairs of adjacent floors; a push button switch in each of said compartments for each of said floors served by that compartment; a push button switch at each of said floors; means responsive to the operation of any of said switches for any of said pairs of floors for causing the operation of said mechanism to slow down the car during its travel in a given direction as the compartments arrive at a predetermined distance from the floors of that pair; means for causing the car to be brought to a stop after each of such slow-downs with the compartments at the floors of the pair for which slow-down has been initiated; closure means adapted when open to afford access between the upper one of said compartments and the upper floor of the pair at which the car is being stopped; closure means adapted when open to afford access between the lower one of said compartments and the lower floor of the pair at which the car is being stopped; and means controlled by said switches for causing, as the car is being brought to a stop, the opening of the first named closure means when either of said switches for said upper floor of the pair has been operated and the opening of the second named closure means when either of said switches for said lower floor of the pair has been operated, without causing the opening of said first named closure means when neither switch for said upper floor has been operated or of said second named closure means when neither switch for said lower floor has been operated.

8. In an elevator installation; a plurality of floors; an elevator car having two superimposed passenger carrying compartments adapted to serve said floors in pairs of adjacent different floors; a push button switch for each of said floors; means responsive to the operation of either of said switches for any of said pairs of floors for initiating the slowing down of the car as it approaches the floors of that pair; means for causing the car thereafter to be brought to a stop with the upper compartment at the upper floor of that pair and with the lower compartment at the lower floor of that pair; closure means adapted when open to afford access between the upper compartment and said upper floor; closure means adapted when open to afford access between the lower compartment and said lower floor; means for selecting the closure means to be opened for each of said stops to be for each floor of the pair for which slow-down has been initiated for which a switch has been operated; and means operable as the car is being brought to each of said stops to open the closure means selected for that stop.

9. In an elevator installation; a plurality of floors; an elevator car having a plurality of superimposed passenger carrying compartments adapted to serve said floors in groups of adjacent floors with the number of floors in each group equal to the number of compartments and with each floor in only one group; a manually operable control for each of said floors; means responsive to the operation of any one of said controls for the floors of any of said groups for initiating the slowing down of the car for the floors of that group as it nears those floors; means for causing the car thereafter to be brought to a stop with the compartments at the floors of the group for which slow-down has been initiated; a device associated with each compartment; means for causing, when a stop is made, the operation of the device for the compartment being brought to a stop at a floor in response to the control for that floor without causing the operation of the devices for the other compartments, provided the controls for the floors at which the other compartments are being brought to a stop are not operated; and means for causing the operation of the devices for each of the other compartments when the controls for the floors at which the respective compartments are stopped are operated after the slowing down of the car has been initiated.

10. In an elevator installation; a plurality of floors; an elevator car having a plurality of superimposed passenger carrying compartments adapted to serve said floors in groups of adjacent floors with the number of floors in each group equal to the number of compartments and with each floor in only one group.

11. In an elevator installation; a plurality of floors; an elevator car having two superimposed passenger carrying compartments adapted to serve said floors in adjacent pairs of adjacent floors; switching means for controlling the starting of the car; means for causing the operation of said switching means after each stop as an incident to the starting operation; a push button switch for each of said floors; means responsive to the operation of either of said switches for any of said pairs of floors for initiating the slowing down of the car as it approaches the floors of that pair; means for causing the car thereafter to be brought to a stop with the upper compartment at the upper floor of that pair and with the lower compartment at the lower floor of that pair; closure means adapted when open to afford access between the upper compartment and said upper floor; closure means adapted when open to afford access between the lower compartment and said lower floor; means for automatically causing as the car is being brought to a stop the opening of said closure means for the floor of the pair for which the switch which caused the slow-down is provided; and means for automatically causing the opening of said closure means for the other floor of that pair in response to a late operation of the switch for that floor provided that switch is operated prior to the operation of said switching means.

12. In an elevator installation; a plurality of floors; an elevator car having two superimposed passenger carrying compartments for serving said floors in adjacent pairs of adjacent floors; a start control circuit; a manually operable starting switch in the upper one of said compartments for causing the completion of said circuit; an additional start control circuit; a manually operable starting switch in the lower one of said compartments for causing the completion of said additional circuit; a push button switch in the upper compartment for the upper one of each of said pairs of floors; a push button switch in the lower compartment for the lower one of each of said pairs of floors; a push button switch at each of said floors; slow-down and stopping mechanism; means responsive to the operation of any of said push button switches for causing the operation of said mechanism to slow down the car as it approaches each of said pairs of floors for either one or both of which one or more of said switches has been operated; means for causing the operation of said mechanism after each of said slow-downs to stop the car at the floors of the pair for which slow-down has been initiated with the upper compartment at the upper one of said floors and with the lower compartment at the lower one of said floors; a hatchway door at each of said floors; power mechanism for opening each of said doors; means for causing the opening of the hatchway door, for each floor of the pair for which slow-down has been initiated, by its power mechanism as the compartment which serves that floor arrives thereat, provided either of the switches for that floor has been operated at the time that such slow-down is initiated, and, when neither switch for one of said floors has been operated at that time but the switch at that floor is subsequently operated, for causing the opening of the hatchway door for that floor by its power mechanism; and means responsive to the completion of either of said circuits for preventing said opening of the hatchway door at such floor in response to such late operation of said switch at that floor for that stop of the car.

13. In an elevator installation; a plurality of floors; an elevator car having a plurality of superimposed passenger carrying compartments adapted to serve said floors in groups of adjacent floors with the number of floors in each group equal to the number of compartments and with each floor in only one group; a manually operable control for each of said floors; means for causing the car to be slowed down and brought to a stop at the floors of each of said groups with the compartments at the floors of the group for which slow-down has been initiated; signalling means associated with each of said compartments; and means for automatically causing, as the car is brought to a stop at the floors of the group, the operation of the signalling means for each compartment which is brought to a stop at a floor for which a control has been operated, without causing the operation of the signalling means for any compartment which is brought to a stop at a floor for which a control has not been operated.

14. In an elevator installation; a plurality of floors; an elevator car having two superimposed passenger carrying compartments adapted to serve said floors in pairs of adjacent different floors; a push button switch for each of said floors; means for causing the car to be slowed down and brought to a stop at the floors of each of said pairs with the upper compartment at the upper floor of that pair and with the lower compartment at the lower floor of that pair; signalling means at each of said floors; and means for automatically causing, during the slowing down of the car at the floors of each of said pairs, the operation of the signalling means at the upper floor of that pair when the switch for said upper floor has been operated and the operation of the signalling means at the lower floor of that pair when the switch for said lower floor has been operated, without causing the operation of said signalling means at said upper floor when the switch for that floor has not been operated or of said signalling means at said lower floor when the switch for that floor has not been operated.

15. In an elevator installation; a plurality of floors; an elevator car having two superimposed passenger carrying compartments adapted to serve said floors in pairs of adjacent different floors; a push button switch for each of said floors; means responsive to the operation of either of said switches for any of said pairs of floors for initiating the slowing down of the car as it approaches that pair of floors; means for causing the car thereafter to be brought to a stop with the upper compartment at the upper floor of that pair and with the lower compartment at the lower floor of that pair; signalling means at each of said floors; and means for automatically causing, as the car is being brought to said stop at the floors of that pair, the operation of the signalling means at said upper floor when the switch for said floor has been operated and the operation of the signalling means at said lower floor when the switch for said lower floor has been operated, without causing the operation of said signalling means at said upper floor when the switch for that floor has not been operated or of said signalling means at said lower floor when the switch for that floor has not been operated.

16. In an elevator installation; a plurality of floors; an elevator car having two superimposed passenger carrying compartments adapted to serve said floors in pairs of adjacent different floors; a push button switch for each of said floors; means responsive to the operation of either of said switches for any of said pairs of floors for initiating the slowing down of the car as it approaches that pair of floors; means for causing the car thereafter to be brought to a stop with the upper compartment at the upper floor of that pair and with the lower compartment at the lower floor of that pair; signalling means at each of said floors; means controlled by said switches for selecting the signalling means to be operated during each of said slow-downs to be at each floor of the pair for which slow-down has been initiated for which a switch has been operated; and means operable during each of said slow-downs to automatically cause the signalling means selected for that slow-down to be operated.

17. In an elevator installation; a plurality of floors; an elevator car having two superimposed passenger carrying compartments adapted to serve said floors in pairs of adjacent different floors; a push button switch in the upper one of said compartments for the upper one of each of said pairs of floors; a push button switch in the lower one of said compartments for the lower one of each of said pairs of floors; means responsive to the operation of either one or both of said switches for any of said pairs of floors for initiating the slowing down of the car as it approaches that pair of floors; means for causing the car thereafter to be brought to a stop with the upper compartment at the upper floor of that pair and with the lower compartment at the lower floor of that pair; signalling means at each of said floors; and means for causing during each of said slow-downs the operation of said signalling means at each floor of the pair for which slow-down has been initiated and for which the switch has been operated without causing the operation of signalling means at either floor of such pair of floors when the switch for that floor has not been operated.

18. In an elevator installation; a plurality of floors; an elevator car having two superimposed passenger carrying compartments adapted to serve said floors in adjacent pairs of adjacent floors; a push button switch in the upper one of said compartments for the upper one of each of said pairs of floors; a push button switch in the lower one of said compartments for the lower one of each of said pairs of floors; an up push button switch at each of said floors; a down push button switch at each of said floors; slow-down and stopping mechanism; means responsive to the operation of either one or both of said switches in said compartments for the floors of any of said pairs, to the operation of either one or both of said up switches at the floors of that pair or to the operation of both the switches in the compartments for the floors of that pair and the up switches at the floors of that pair for causing, during upward travel of the car, the operation of said mechanism to slow down the car as it nears the floors of that pair; means responsive to the operation of either one or both of said switches in said compartments for the floors of any of said pairs, to the operation of either one or both of said down switches at the floors of that pair or to the operation of both the switches in the compartments for the floors of that pair and the down switches at the floors of that pair for causing, during downward travel of the car, the operation of said mechanism to slow down the car as it nears the floors of that pair; means for causing the operation of said mechanism after the initiation of each of said slow-downs to bring the car to a stop with the compartments at the floors of the pair for which slow-down has been initiated; an up signal at each of said floors; a down signal at each of said floors; and means for causing during each of said slow-downs during up car travel the giving of the up signal at each floor of the pair for which slow-down has been initiated at which the up switch or for which the switch in the compartment serving that floor has been operated without causing the giving of the up signal at a floor of the pair for which slow-down has been initiated when the up switch at that floor or the switch in the compartment serving that floor has not been operated and for causing during each of said slow-downs during down car travel the giving of the down signal at each floor of the pair for which slow-down has been initiated at which the down switch or for which the switch in the compartment serving that floor has been operated without causing the giving of the down signal at a floor of the pair for which slow-down has been initiated when the down switch at that floor or the switch in the compartment serving that floor has not been operated.

19. In an elevator installation; a plurality of floors; an elevator car having two superimposed passenger carrying compartments for serving said floors in adjacent pairs of adjacent floors; switching means for controlling the starting of the car; means for causing the operation of said switching means after each stop as an incident to the starting operation; a push button switch for the upper one of each of said pairs of floors; a push button switch for the lower one of each of said pairs of floors; means responsive to the operation of said switches for causing the slowing down of said car as it arrives at a predetermined distance from any of said pairs of floors for one or both of which a switch has been operated; means for causing the car to be brought to a stop after each of said slow-downs with the compartments at the floors of the pair for which slow-down has been initiated; signalling means at each of said floors; and means for causing the operation of the signalling means at each floor of the pair for which slow-down has been initiated during the slow-down operation and while the car is stopped at that floor, provided the switch for that floor is operated prior to the operation of said switching means.

20. In an elevator installation; a plurality of floors; an elevator car having a plurality of superimposed passenger carrying compartments adapted to serve said floors in groups of adjacent floors with the number of floors in each group equal to the number of compartments and with each floor in only one group; a manually operable start control in each of said compartments; means responsive to the joint operation of said controls for causing the starting of the car; a push button switch for each of said floors; mechanism responsive to the operation of said switches for causing the car to slow down as it arrives at a predetermined distance from the floors of each group for any or all floors of which a switch has been operated; and means for causing the car to be brought to a stop after each of such slow-downs with the compartments at the floors of the group for which slow-down has been initiated.

21. In an elevator installation; a plurality of floors; an elevator car having two superimposed passenger carrying compartments adapted to serve said floors in adjacent pairs of adjacent floors; car actuating and stopping mechanism; a manually operable start control switch in each of said compartments; means responsive to the joint operation of said switches for causing said mechanism to start the car; a push button switch in each of said compartments for each of said floors served by that compartment; a push button switch at each of said floors; means responsive to the operation of any of said switches for any of said pairs of floors for causing the operation of said mechanism to slow down the car during its travel in a given direction as the compartments arrive at a predetermined distance from the floors of that pair; and means for causing the car to be brought to a stop after each of such slow-downs with the compartments at the floors of the pair for which slow-down has been initiated.

22. In an elevator installation; a plurality of floors; an elevator car having two superimposed passenger carrying compartments adapted to serve said floors in adjacent pairs of adjacent floors; a push button switch at each of said floors for operation by intending passengers; means responsive to the operation of either one or both of the switches for any of said pairs of floors for initiating the slowing down of the car as it approaches that pair of floors from a given direction; means for causing the car thereafter to be brought to a stop with the upper compartment at the upper floor of that pair and with the lower compartment at the lower floor of that pair; a manually operable control switch in each compartment; and means responsive to each of said control switches to prevent, so long as such switch is operated, the slowing down of the car in response to the operation of any of the push button switches at floors served by the compartment in which the control switch is operated, without affecting the slowing down of the car in response to the operation of any of the push button switches at floors served by the other compartment.

23. In an elevator installation; a plurality of floors; an elevator car having a plurality of superimposed passenger carrying compartments adapted to serve said floors in groups of adjacent floors with the number of floors in each group equal to the number of compartments and with each floor in only one group; a manually operable control at each of said floors; means responsive to the operation of any one of said controls at the floors of any of said groups for initiating the slowing down of the car for the floors of that group as it nears those floors; means for causing the car thereafter to be brought to a stop with the compartments at the floors of the group for which slow-down has been initiated; a device associated with each compartment; means responsive, as the car is stopped at any of said groups of floors, to such controls at the floors of such group as are operated, for causing the operation of those devices associated with the compartments which serve the floors at which such controls are operated; and a plurality of manually operable controls, one in each of said compartments, each of the latter controls being operable to prevent the operation of the device for the compartment in which the control is located when such compartment is brought to a stop at a floor at which one of the first named controls is operated.

24. In an elevator installation; a plurality of floors; an elevator car having two superimposed passenger carrying compartments adapted to serve said floors in adjacent pairs of adjacent floors; a push button switch at each of said floors; means responsive to the operation of said switches for causing the car during travel in a given direction to slow down as it arrives at a predetermined distance from each of said pairs of floors at either or both floors of which a switch has been operated; means for causing the car to be brought to a stop, after the initiation of each of said slow-downs with the upper compartment at the upper one of the floors of the pair for which slow-down has been initiated and the lower compartment at the lower one of said floors; closure means adapted when open to afford access between the upper compartment and said upper floor; closure means adapted when open to afford access between the lower compartment and said lower floor; means for opening each of said closure means; means responsive to said switches for causing, as the car is being brought to a stop, the opening of the first named closure means by its opening means when the switch at said upper floor has been operated and the opening of the second named closure means by its opening means when the switch at said lower floor has been operated; a manually operable control switch in each compartment; means controlled by said control switch in the upper compartment for preventing the opening of the first named closure means during such stop in response to the switch at said upper floor; and means controlled by said control switch in the lower compartment for preventing the opening of the second named closure means during such stop in response to the switch at said lower floor.

25. In an elevator installation; a plurality of floors; an elevator car having two superimposed passenger carrying compartments adapted to serve said floors in pairs of adjacent different floors; a push button switch at each of said floors; means responsive to the operation of either or both of said switches for any of said pairs of floors for initiating the slowing down of the car as it approaches that pair of floors from a given direction; means for causing the car thereafter to be brought to a stop with the upper compartment at the upper floor of that pair and with the lower compartment at the lower floor of that pair; a signal at each of said floors; means responsive to said switches for automatically causing, as the car is being brought to a stop, the giving of the signal at said upper floor when the switch at said upper floor has been operated and the giving of the signal at said lower floor when the switch at said lower floor has been operated; a manually operable control switch in each compartment; means responsive to said control switch in the upper compartment for preventing the giving of the signal at said upper floor in response to said push button switch at that floor; and means responsive to said control switch in the lower compartment for preventing the giving of the signal at said lower floor in response to said push button switch at that floor.

26. In an elevator installation; a plurality of floors; an elevator car having two superimposed passenger carrying compartments adapted to serve said floors in adjacent pairs of adjacent floors; a push button switch in each of said compartments for each of said floors served by that compartment; a push button switch at each of said floors; means responsive to the operation of any of said switches for any of said pairs of floors for causing the operation of said mechanism to slow down the car during travel in a given direction as the compartments arrive at a predetermined distance from the floors of that pair; means for causing the car to be brought to a stop after each of such slow-downs with the compartments at the floors of the pair for which slow-down has been initiated; signalling means at each of said floors; means controlled by said switches for causing, during said slow-down, the operation of the signalling means at said upper floor when either of said switches for that floor has been operated and the operation of the signalling means at said lower floor when either of said switches for that floor has been operated; a manually operable control switch in each of said compartments; and means controlled by each of said control switches for preventing the operation of said signalling means at any floor at which a stop is made for which the push button switch within the compartment which serves that floor is not operated.

27. In an elevator installation; a plurality of floors; an elevator car having two superimposed passenger carrying compartments adapted to serve said floors in adjacent pairs of adjacent floors; a push button switch for each of said floors; means responsive to the operation of either one or both of the switches for any of said pairs of floors for initiating the slowing down of the car as it approaches that pair of floors; means for causing the car thereafter to be brought to a stop with the upper compartment at the upper floor of that pair and with the lower compartment at the lower floor of that pair; closure means adapted when open to afford access between the upper compartment and said upper floor; closure means adapted when open to afford access between the lower compartment and said lower floor; means for opening each of said closure means; means controlled by said switches for causing, as the car is being brought to a stop, the opening of the first named closure means by its opening means when the switch for said upper floor is operated and the opening of the second named closure means by its opening means when the switch for said lower floor is operated, without causing the opening of said first named closure means when the switch for said upper floor has not been operated or of said second named closure means when the switch for said lower floor has not been operated; a signal in each of said compartments; means controlled by the first named closure means for causing the giving of the signal in the lower compartment while that closure means is open; means controlled by the second named closure means for causing the giving of the signal in the upper compartment while that closure means is open; start control switching mechanism in each compartment; means controlled by the start control switching mechanism in the upper compartment for causing the giving of the signal in the lower compartment to be discontinued; and means controlled by the start control switching mechanism in the lower compartment for causing the giving of the signal in the upper compartment to be discontinued.

28. In an elevator installation; a plurality of floors; an elevator car having a plurality of superimposed passenger carrying compartments adapted to serve said floors in groups of adjacent different floors; a control for each of said floors; means for maintaining each of said controls, once operated, in operated condition; means responsive to the operation of any one or more of said controls for the floors of any of said groups for initiating the slowing down of the car as it arrives at a predetermined distance from the floors of that group from a given direction; means for causing the car thereafter to be brought to a stop with the compartments at the floors of the group for which slow-down has been initiated; means for automatically restoring each of said operated controls for which slow-down in response thereto has been initiated as the compartment which serves that floor arrives at a predetermined distance therefrom and also for automatically restoring the control for any floor of a group for which slow-down already has been initiated when said control is operated after the slow-down starts; and means for preventing the restoring of said control for any of said floors operated after the car has arrived at a less distance from the floors of the group in which such floor is included under conditions where slow-down of the car for the floors of that group has not been initiated.

29. In an elevator installation; a plurality of floors; an elevator car having two superimposed passenger carrying compartments adapted to serve said floors in adjacent pairs of adjacent floors; switching means operable to control the starting of the car; means for causing the operation of said switching means after each stop as an incident to the starting operation; a push button switch at each of said floors; a floor relay for each of said switches, each floor relay being operated in response to the operation of the switch for which it is provided and being provided with means for thereafter maintaining it in operated condition; means responsive to each of said relays which is in operated condition for causing the slowing down of the car, during its travel in a certain direction, as it arrives at a predetermined distance from each of said pairs of floors for either or both of which a relay is operated; means for causing the car to be brought to a stop, after the initiation of each of said slow-downs with the upper compartment at the upper one of the floors of the pair for which slow-down has been initiated and the lower compartment at the lower one of said floors; and means operable upon each slow-down to automatically reset the relay or relays which caused the slow-down as the car arrives at a certain distance from the floors for which slow-down has been initiated and to automatically reset either relay when it is operated after the slow-down for the floor for which the relay is provided already has been initiated, provided the operation of the relay occurs prior to the operation of said switching means.

30. In combination; an elevator car having a plurality of superimposed passenger carrying compartments; a direct current hoisting motor for said car; a direct current supply generator for said motor; a driving motor for said generator; a running control circuit for said driving motor, said circuit having parallel branches; and switching mechanism in each of said compartments, each switching mechanism having starting contacts and holding contacts, all of said starting contacts being connected in parallel relation in one of said circuit branches whereby the engagement of the starting contacts of any one of the switching mechanisms completes the running circuit to start said driving motor, and all of said holding contacts being connected in series relation in the other branch whereby the separation of the holding contacts of any one of said switching mechanisms when all starting contacts are separated breaks the running circuit to stop said driving motor.

31. In combination; an elevator car having a plurality of superimposed passenger carrying compartments; a direct current hoisting motor for said car; a direct current supply generator for said motor; a driving motor for said generator; an electromagnetic switch operable to cause the starting of said driving motor; an operating circuit for said electromagnetic switch; a holding circuit for said switch; and switching mechanism in each of said compartments, each of said switching mechanisms being operable to complete said operating circuit to effect the starting of said driving motor and to break said holding circuit to effect the stopping of said driving motor.

32. In an elevator installation; an elevator car having a plurality of superimposed passenger carrying compartments; manually operable starting switching mechanism in each compartment; additional manually operable switching mechanism in each compartment; and car actuating mechanism responsive to the joint operation of said starting mechanisms to start the car and cause it to accelerate to full speed and responsive to the joint operation of said additional switching mechanisms to cause operation of the car at a speed less than said full speed.

33. In an elevator installation; an elevator car having an upper passenger carrying compartment and a lower passenger carrying compartment spaced to serve adjacent floors; a manually operable starting switch in each compartment; an additional manually operable switch in one compartment; a manually operable interlock switch in the other compartment; direction determining means; and car actuating mechanism responsive to the joint operation of said starting switches to start the car in a direction determined by said direction determining means and to cause the car thereafter to accelerate to a fast speed and responsive to said additional switch to cause operation of the car at a slow speed in either direction unaffected by said direction determining means, provided said manually operable interlock switch in the other compartment is operated.

34. In an elevator installation; an elevator car having an upper passenger carrying compartment and a lower passenger carrying compartment spaced to serve adjacent floors; a manually operable starting switch in each compartment; an additional manually operable switch in one compartment; means responsive to the joint operation of said starting switches to start the car and to cause it to accelerate to a fast speed and responsive to said additional switch to cause operation of the car at a slow speed; a manually operable interlock switch in the other compartment for preventing response of said means to said additional switch in said one compartment; and means for cutting out said other compartment so as to provide service with one compartment only, said last named means comprising means for rendering said first named means responsive solely to the starting switch in said one compartment to start the car and means for rendering said interlock switch ineffective to prevent response of said first named means to said additional switch.

35. In an elevator installation; an elevator car having a plurality of superimposed passenger carrying compartments; manually operable starting switching mechanism in each compartment; manually operable direction controlling switching mechanism in each compartment; car actuating mechanism responsive to the joint operation of said starting switching mechanisms to start the car; and means for determining the direction in which the car is started in response to said starting switching mechanisms, said direction determining means being responsive to the joint operation of said direction controlling switching mechanisms to change the direction in which the car is started in response to said starting switching mechanisms.

36. In an elevator installation; an elevator car having an upper passenger carrying compartment and a lower passenger carrying compartment spaced to serve adjacent floors; a manually operable starting switch in each compartment; a manually operable direction control switch in one compartment; means responsive to the joint operation of said starting switches to start the car; means for determining the direction in which the car is started in response to said starting switches, said direction determining means being responsive to said direction control switch to change the direction of car travel; and a direction interlock switch in the other compartment for preventing response of said direction determining means to said direction control switch.

37. In an elevator installation; an elevator car having an upper passenger carrying compartment and a lower passenger carrying compartment spaced to serve adjacent floors; a manually operable starting switch in each compartment; a manually operable direction control switch in each compartment; car actuating mechanism responsive to the joint operation of said starting switches to start the car; means for determining the direction in which the car is started in response to said starting switches, said means being responsive to the joint operation of said direction control switches to change the direction of car travel; means for stopping the car; and means for preventing response of said direction determining means to said direction control switches except when the car is stopped.

38. In an elevator installation; an elevator car having an upper passenger carrying compartment and a lower passenger carrying compartment spaced to serve adjacent floors; a manually operable starting switch in each compartment; a manually operable direction control switch in one compartment; means responsive to the joint operation of said starting switches to start the car; means for determining the direction in which the car is started in response to said starting switches, said direction determining means being responsive to said direction control switch to change the direction of car travel; a direction interlock switch in the other compartment for preventing response of said direction determining means to said direction control switch; and means for cutting out said other compartment so as to provide service with said one compartment only, said last named means comprising means for rendering said car actuating means responsive solely to the starting switch in said one compartment to start the car and means for rendering said direction interlock switch ineffective to prevent response of said direction determining means to said direction control switch.

39. In an elevator installation; an elevator car having a plurality of superimposed passenger carrying compartments; manually operable starting switching mechanism in each compartment; and car actuating mechanism responsive to the joint operation of said switching mechanisms to start the car.

40. In an elevator installation; a plurality of floors; an elevator car having two superimposed passenger carrying compartments adapted to serve said floors in pairs of adjacent floors; closure means adapted when open to afford access between the upper compartment and the floor at which that compartment is stopped; closure means adapted when open to afford access between the lower compartment and the floor at which that compartment is stopped; a manually operable control in each compartment; and means responsive to the operation of both of said controls to cause the closing of the respective closure means and the starting of the car.

41. In an elevator installation; an elevator car having an upper passenger carrying compartment and a lower passenger carrying compartment spaced to serve adacent floors; a manually operable starting switch in each compartment; car actuating mechanism responsive to the joint operation of said switches to start the car; and means for cutting out one compartment so as to provide service with the other compartment only, said means comprising means for rendering said actuating means responsive solely to said starting switch in said other compartment to start the car.

42. In an elevator installation; a plurality of floors; an elevator car for serving said floors; a source of current; a plurality of stationary contacts, one for each of said floors, spaced in accordance with the distance between their respective floors; means operable to connect said contacts individually to one side of said source; a contact movable successively to engage said stationary contacts, said movable contact being connected to the other side of said source; means for moving said movable contact in accordance with the movement of the car; and means responsive to the engagement of said movable contact with any of said stationary contacts connected to said source for causing the slowing down of the car and the immediate disconnection of said movable contact from said other side of said source.

43. In an elevator installation; a plurality of floors; an elevator car for serving said floors; an up slow-down initiating contact; a down slow-down initiating contact; means for moving said contacts in accordance with movement of the car; stationary contacts for said floors adapted to be engaged by said movable contacts; electromagnetic means for advancing said up contact in case of a multi-floor run during up car travel; and separate electromagnetic means for advancing said down contact in case of a multi-floor run during down car travel.

44. In an elevator installation; a plurality of floors; an elevator car for serving said floors; means for slowing down and stopping said car at said floors; closure means adapted when open to afford access between the car and the floor at which it is stopped; means for opening said closure means; and means for causing the operation of said opening means, as the car is being stopped at a floor, to initiate the opening of the closure means at varying distances from the floor, depending upon the speed of the car within a certain zone with respect to that floor.

45. In an elevator installation; a plurality of floors; an elevator car for serving said floors; means for slowing down and stopping said car at said floors; closure means adapted when open to afford access between the car and the floor at which it is stopped; means for opening said closure means; means for causing the operation of said opening means, as the car arrives at a predetermined distance from a floor at which it is being stopped, to initiate the opening of said closure means in the event the car is not travelling above a certain speed at that time; and means for causing the operation of said opening means to initiate said opening operation when the car arrives at a less distance from the floor in the event that it was travelling above said certain speed at the time when it arrived at said certain distance from said floor.

46. In an elevator installation; a plurality of floors; an elevator car for serving said floors; means for slowing down and stopping said car at said floors; closure means adapted when open to afford access between the car and the floor at which it is stopped; means for opening said closure means; means for causing the operation of said opening means, as the car arrives at a predetermined distance from a floor at which it is being stopped, to initiate the opening of said closure means in the event the car is not travelling above a certain speed at that time; means for causing the operation of said opening means to initiate said opening operation when the car arrives at a less distance from the floor in the event that it was travelling above said certain speed at the time that it arrived at said certain distance from said floor; means for delaying the operation of said means for causing the operation of said opening means at said less distance from said landing, in the event that the car is travelling at such speed at the time of arrival at said less distance from the floor as to cause it to be carried more than said less distance past said floor, until the return of said car to said less distance from said floor; and means for causing the return of the car to the floor in case of such overrun.

47. In an elevator installation; a plurality of floors; an elevator car for serving said floors; a source of current; a plurality of stationary contacts, one for each of said floors, spaced in accordance with the distance between their respective floors; a plurality of signals, one at each of said floors, each signal being connected to the stationary contact for the floor at which the signal is located and to one side of said source; a contact movable successively to engage said stationary contacts; a second contact movable successively to engage said stationary contacts after their engagement by the first movable contact during travel of the car in a certain direction; means for moving said movable contacts in accordance with the movement of the elevator car; a push button switch for each of said floors; means responsive during travel of the car in said certain direction to the operation of any one of said switches for slowing down and stopping the car at the floor for which the switch is provided; means responsive during travel of the car in said certain direction to the operation of said stopping means in response to said operated switch for causing the connection of the leading movable contact to the other side of said source upon the arrival of the car at a predetermined distance from the floor for which the switch is provided, said stationary contacts being so positioned that the leading movable contact is in engagement with the stationary contact for such floor at the time that the leading movable contact is connected to the source, thereby completing the circuit for the signal at that floor, and for causing the connection of the following movable contact to the other side of the source and the disconnection of the leading movable contact therefrom upon the arrival of the car at a certain less distance from the floor, said movable contacts being positioned so that both of them are in engagement with the stationary contact for said floor at the time the change in connections of said movable contacts is effected, thereby transferring the signal at that floor to a circuit through said following movable contact.

48. In an elevator installation; an elevator car having a plurality of superimposed passenger carrying compartments; a plurality of floors served thereby; car stopping mechanism; means for controlling the operation of said stopping mechanism to stop the car, either so that the car is stopped at the floors in groups of adjacent floors with the number of floors in each group equal to the number of compartments and with each compartment at a certain floor of each group thereby serving said floors in groups, or so that the car is stopped at the floors by bringing a certain one of said compartments to a stop at any one of said floors thereby serving said floors individually by said one compartment; a position indicator for said car; means for causing operation of said indicator to indicate simultaneously the position of each of said compartments with respect to the floors served thereby under conditions where the car serves the floors in groups; and switching mechanism for altering the circuits for said indicator so that said means causes the operation of said indicator to indicate only the position of said one compartment with respect to all of said floors under conditions where said one compartment serves all of said floors individually.

49. In an elevator installation; an elevator car having a plurality of superimposed passenger carrying compartments; a plurality of floors served thereby; car stopping mechanism; means for controlling the operation of said stopping mechanism to stop the car either so that the car is stopped at the floors in groups of adjacent floors with the number of floors in each group equal to the number of compartments and with each compartment at a certain floor of each group thereby serving said floors in groups, or so that the car is stopped at the floors by bringing a certain one of said compartments to a stop at any one of said floors thereby serving said floors individually by said one compartment; a position indicator in each of said compartments; means for causing operation of each of said indicators to indicate the position of the compartment with respect to the floors served thereby under condition where the car serves the floors in groups; and switching mechanism disconnecting the indicators in all but one of said compartments and for altering the circuits for said indicator so that said means for operating that indicator causes the operation of the indicator to indicate the position of said one compartment with respect to all of said floors under conditions where said one compartment serves all of said floors individually.

50. In an elevator installation; an elevator car having a plurality of superimposed passenger carrying compartments; a plurality of floors served thereby; car stopping mechanism; means for causing the operation of said stopping mechanism to stop the car at the floors in groups of adjacent floors with the number of floors in each group equal to the number of compartments and with each compartment at a certain floor of each group, thereby serving said floors in groups; and switching mechanism for altering the operation of said means to cause the stopping mechanism to bring the car to a stop with a certain one of said compartments at any one of said floors, thereby serving said floors individually by said one compartment.

51. In an elevator installation; an elevator car having a plurality of superimposed passenger carrying compartments; a plurality of floors served thereby; car stopping mechanism; means for controlling the operation of said stopping mechanism so that the car is stopped at the floors in groups of adjacent floors with the number of floors in each group equal to the number of compartments and with each compartment at a certain floor of each group, thereby serving said floors in groups, or so that the car is stopped with a certain one of said compartments at any one of said floors, thereby serving said floors individually by said one compartment; a manually operable stop control for each of said floors; and means responsive, under conditions where said floors are served in groups, to the operation of any of said controls for the floors of any of said groups for causing the operation of said stopping mechanism to bring the car to a stop with the compartments at the floors of the group for the floor of which the control is provided, and responsive, under conditions where said floors are served individually by said one compartment, to the operation of any one of said controls for causing the operation of said stopping mechanism to bring said one compartment to a stop at the floor for which the control is provided.

52. In an elevator installation; an elevator car having a plurality of superimposed passenger carrying compartments; a plurality of floors served thereby; car stopping mechanism; means operable either to cause said mechanism to stop the car at said floors in groups of adjacent floors with the number of floors in each group equal to the number of compartments and with each floor in only one group, or to stop the car with a certain one of said compartments at any of said floors; circuits and control mechanism for controlling the type of service provided by the car; switching means operable at any time to cause the partial operation of said control mechanism and partial alteration of said circuits preparatory to changing the type of service provided by the car; and additional switching means operable, as said one compartment arrives at a certain floor after the first named means has been operated, to cause the completion of the operation of said control mechanism and the completion of the alteration of said circuits to change the type of service provided by the car, to render, under conditions where said floors were being served in groups before said first named switching means was operated, said first named means ineffective to cause said stopping mechanism to stop any but said one compartment at said floors and to render, under conditions where said floors were being served individually by said one compartment before said first named switching means was operated, said first named means effective to cause said stopping mechanism to stop the car at said floors in said groups of floors.

53. In an elevator installation; an elevator car having a plurality of superimposed passenger carrying compartments; a plurality of floors served thereby; car stopping mechanism; means operable either to cause said mechanism to stop the car at said floors in groups of adjacent floors with the number of floors in each group equal to the number of compartments and with each floor in only one group, or to stop the car with a certain one of said compartments at any of said floors; circuits and control mechanism for controlling the type of service provided by the car; switching means operable at any time to cause the partial operation of said control mechanism and partial alteration of said circuits preparatory to changing the type of service provided by the car; additional switching means operable, as said one compartment arrives at a certain floor after the first named means has been operated, to cause the completion of the operation of said control mechanism and the completion of the alteration of said circuits to change the type of service provided by the car, to render, under conditions where said floors were being served in groups before said first named switching means was operated, said first named means ineffective to cause said stopping mechanism to stop any but said one compartment at said floors and to render, under conditions where said floors were being served individually by said one compartment before said first named switching means was operated, said first named means effective to cause said stopping mechanism to stop the car at said floors in said groups of floors; a warning signal carried by the car; and means responsive to the operation of said first named switching means for causing the giving of said warning signal.

54. In an elevator installation; an elevator car having a plurality of superimposed passenger carrying compartments; a plurality of floors served thereby; car stopping mechanism; means operable either to cause said mechanism to stop the car at said floors in groups of adjacent floors with the number of floors in each group equal to the number of compartments and with each floor in only one group, or to stop the car with a certain one of said compartments at any of said floors; circuits and control mechanism for controlling the type of service provided by the car; switching means operable at any time to cause the partial operation of said control mechanism and partial alteration of said circuits preparatory to changing the type of service provided by the car; additional switching means operable, as said one compartment arrives at a certain floor after the first named means has been operated, to cause the completion of the operation of said control mechanism and the completion of the alteration of said circuits to change the type of service provided by the car, to render, under conditions where said floors were being served in groups before said first named switching means was operated, said first named means ineffective to cause said stopping mechanism to stop any but said one compartment at said floors and to render, under conditions where said floors were being served individually by said one compartment before said first named switching means was operated, said first named means effective to cause said stopping mechanism to stop the car at said floors in said groups of floors; and means for delaying the operation of the second named switching means in the event said one compartment is at said certain floor at the time said first named switching means is operated until the next return of said one compartment to said certain floor.

55. In an elevator installation; a plurality of floors; an elevator car having two superimposed passenger carrying compartments; means for controlling the type of service either so that both compartments provide service and serve said floors in adjacent pairs of adjacent floors or so that one compartment serves said floors individually and the other compartment is cut out; a push button switch at each of said floors; means responsive under double compartment service conditions to the operation of either one or both of said switches at any of said pairs of floors for initiating the slowing down of the car as the compartments arrive at a predetermined distance from the floors of that pair; means for causing the car thereafter to be brought to a stop with the upper compartment at the upper floor of that pair and with the lower compartment at the lower floor of that pair; and means responsive under single compartment service conditions to the operation of any of said switches for initiating the slowing down of the car as said one compartment arrives at a predetermined distance from the floor at which the switch is located, said stopping means causing the car thereafter to be brought to a stop with said one compartment at that floor.

56. In an elevator installation embodying a plurality of floors and an elevator car having upper and lower compartments adapted to serve said floors in pairs of adjacent floors; a control system for said elevator comprising a push button at each floor, stopping switch mechanism including means adapted to respond to the operation of either push button associated with any of said pairs of floors to cause the stopping of said car with said upper compartment at the upper floor of the associated pair of floors and the lower compartment at the lower floor of that pair, to thereby provide double compartment service; said stopping switch mechanism also including means adapted to respond to the operation of any of said push buttons to cause the stopping of one of said compartments at the associated floor, to thereby provide single compartment service; and transfer mechanism selectively operable to control said stopping switch mechanism to determine the type of service provided.

57. In an elevator installation; a plurality of floors; an elevator car having two superimposed passenger carrying compartments; means for causing service to be provided in such manner that both of said compartments are used and serve said floors in adjacent pairs of adjacent floors; means for causing service to be provided in such manner that one of said compartments serves said floors individually and the other compartment is cut out; a push button switch in the upper compartment for the upper one of each of said pairs of floors; a push button switch in the lower compartment for the lower one of each of said pairs of floors; means responsive under double compartment service conditions to the operation of either one or both of said switches for any of said pairs of floors for initiating the slowing down of the car as the compartments arrive at a predetermined distance from the floors of that pair; means for causing the car thereafter to be brought to a stop with the upper compartment at the upper floor of that pair and with the lower compartment at the lower floor of that pair; additional push button switches in said one compartment, one for each of the floors served by said other compartment during double compartment service; and means responsive under single compartment service conditions to the operation of any of the first named or additional push button switches in said one compartment for initiating the slowing down of the car as said other compartment arrives at a predetermined distance from the floor for which the switch is provided, said stopping means causing the car thereafter to be brought to a stop with said one compartment at that floor.

58. In an elevator installation; a plurality of floors; an elevator car having two superimposed passenger carrying compartments; means for causing service to be provided in such manner that both of said compartments are used and serve said floors in adjacent pairs of adjacent floors; means for causing service to be provided in such manner that one of said compartments serves said floors individually and the other compartment is cut out; a push button switch in the upper compartment for the upper one of each of said pairs of floors; a push button switch in the lower compartment for the lower one of each of said pairs of floors; means responsive under double compartment service conditions to the operation of either one or both of said switches for any of said pairs of floors for initiating the slowing down of the car as the compartments arrive at a predetermined distance from the floors of that pair; means for causing the car thereafter to be brought to a stop with the upper compartment at the upper floor of that pair and with the lower compartment at the lower floor of that pair; additional push button switches in said one compartment, one for each of the floors served by the other compartment during double compartment service; means responsive under single compartment service conditions to the operation of any of the first named or additional push button switches in said one compartment for initiating the slowing down of the car as said one compartment arrives at a predetermined distance from the floor for which the switch is provided, said stopping means causing the car thereafter to be brought to a stop with said one compartment at that floor; means for controlling the effectiveness of said push button switches either to cut out said additional switches and render the switches in said other compartment effective or to cut out said switches in said other compartment and render all of said switches in said one compartment effective; switching means for causing the operation of said controlling means to change from one of said kinds of service to the other; and means for delaying the operation of said controlling means after the operation of said switching means until the next return of said other compartment to a predetermined one of said floors.

59. In an elevator installation; a plurality of floors; an elevator car having two superimposed passenger carrying compartments; means for causing service to be provided in such manner that both of said compartments are used and serve said floors in adjacent pairs of adjacent floors; means for causing service to be provided in such manner that one of said compartments serves said floors individually and the other compartment is cut out; a push button switch in the upper compartment for the upper one of each of said pairs of floors; a push button switch in the lower compartment for the lower one of each of said pairs of floors; a push button switch at each of said floors; means responsive under double compartment service conditions to the operation of either one of said switches in said compartments for the floors of any of said pairs or either one of said switches at said floors of any of said pairs for initiating the slowing down of the car, during travel in a given direction, as the compartments arrive at a predetermined distance from the floors of that pair; means for causing the car to be brought to a stop after each of said slow-downs with the upper compartment at the upper floor of the pair for which slow-down has been initiated and with the lower compartment at the lower floor of that pair; additional push button switches in said one compartment, one for each of the floors served by said other compartment during double compartment service; means responsive under single compartment service conditions to the operation of any of the first named or additional push button switches in said one compartment or any of the push button switches at the floors for initiating the slowing down of the car as said one compartment arrives at a predetermined distance from the floor for which the switch is provided, said stopping means causing the car thereafter to be brought to a stop with said one compartment at that floor; means for controlling the effectiveness of the push button switches within the compartments either to cut out said additional switches in said one compartment and render the switches in said other compartment effective or to cut out said switches in said other compartment and render said additional switches in the said one compartment effective; switching means for causing the operation of said controlling means; and means for preventing the operation of said controlling means in response to the operation of said switching means during double compartment service to cut out said switches in the said other compartment and to render said additional switches in said one compartment effective until the next return of said one compartment to a predetermined one of said floors and for preventing the operation of said controlling means in response to the operation of said switching means during single compartment service to cut out said additional switches in said one compartment and render said switches in said other compartment effective until the next return of said one compartment to said predetermined one of said floors.

60. In an elevator installation; a plurality of floors; a plurality of plural compartment elevator cars, each having the same number of compartments and each adapted to serve said floors in groups of adjacent floors with each floor in only one group and with the number of floors in each group equal to the number of compartments; a manually operable control for each of said floors, said controls being common to all of said cars; means responsive to the operation of any of said controls for the floors of any of said groups for causing any one of said cars to be brought to a stop with the compartments thereof at the floors of the group for the floor of which the control is provided; means for selecting the car to be brought to a stop in response to each operated one of said controls to be in accordance with the positions of the cars in their respective hatchways and their directions of travel; and switching mechanism for altering the operation of said means with respect to any one of said cars without affecting the operation of said other cars whereby said means for said one car responds only to controls for floors served by a certain one of said compartments of that car to cause said car to be brought to a stop with said one compartment at the floor for which the control is provided.

61. In an elevator installation; a plurality of floors; a plurality of plural compartment elevator cars, each having the same number of compartments and each adapted to serve said floors in groups of adjacent floors with each floor in only one group and with the number of floors in each group equal to the number of compartments; a manually operable control for each of said floors, said controls being common to all of said cars; means responsive to the operation of any of said controls for the floors of any of said groups for causing any one of said cars to be brought to a stop with the compartments thereof at the floors of the group for the floor of which the control is provided, each car thereby serving said floors in groups; means for selecting the car to be brought to a stop in response to each operated one of said controls to be in accordance with the positions of the cars in their respective hatchways and their directions of travel; switching mechanism for altering the operation of said means with respect to one or more of said cars without affecting the operation of the other cars, whereby said means for said one or more cars responds only to controls for floors served by a certain one of the compartments of each of said one or more cars to cause said car to be brought to a stop with said one compartment at the floor for which the control is provided, and whereby said means for said other cars responds to any of said controls for the floors of any of said groups for causing the cars to be stopped at the floors of any group for a floor of which a control has been operated; and additional switching mechanism for further altering the operation of said means, whereby said means responds to said controls for causing any one of said cars to be brought to a stop with a certain one of the compartments thereof at any floor for which a control is operated, each car thereby serving said floors individually with said one compartment.

DAVID LEONARD LINDQUIST.
HAROLD WATERS.
WILLIAM FRANK GLASER.

CERTIFICATE OF CORRECTION.

Patent No. 1,997,260.  April 9, 1935.

DAVID LEONARD LINDQUIST, ET AL.

It is hereby certified that error appears in the printed specification of the above numbered patent requiring correction as follows: Page 42, second column, line 45, for "latter" read letter; page 46, first column, line 23, for "bringing" read bridging; page 50, first column, line 64, for "for" read far; page 53, first column, line 67, for "or" read of; and page 63, second column, line 26, claim 10, strike out the period and insert a semicolon and the words ; manually operable control means for starting the car; a manually operable control for each of said floors; means responsive to the operation of any one of said controls for the floors of any of said groups for initiating the slowing down of the car for the floors of that group as it nears those floors; means for causing the car thereafter to be brought to a stop with the compartments at the floors of the group for which slow-down has been initiated; a device associated with each compartment; means for causing, when a stop is made, the operation of the device for the compartment being brought to a stop at a floor in response to the control for that floor without causing the operation of the devices for the other compartments, provided the controls for the floors at which the other compartments are being brought to a stop are not operated; and means for causing the operation of the devices for each of the other compartments when the controls for the floors at which the respective compartments are stopped are operated after the slowing down of the car has been initiated, provided such operation occurs prior to the operation of said manually operable control means to restart the car.; and that the said Letters Patent should be read with these corrections therein that the same may conform to the record of the case in the Patent Office.

Signed and sealed this 16th day of July, A. D. 1935.

Leslie Frazer (Seal)  Acting Commissioner of Patents.